United States Patent
Ando et al.

(10) Patent No.: US 10,691,089 B2
(45) Date of Patent: Jun. 23, 2020

(54) INFORMATION PROCESSING APPARATUS OR INFORMATION COMMUNICATION TERMINAL, AND INFORMATION PROCESSING METHOD

(71) Applicant: KABUSHIKI KAISHA TOSHIBA, Tokyo (JP)

(72) Inventors: Hideo Ando, Tokyo (JP); Fumihiko Murakami, Kanagawa (JP); Takumi Hara, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 306 days.

(21) Appl. No.: 15/444,752

(22) Filed: Feb. 28, 2017

(65) Prior Publication Data
US 2017/0168472 A1 Jun. 15, 2017

Related U.S. Application Data

(63) Continuation of application No. PCT/JP2015/077540, filed on Sep. 29, 2015.

(51) Int. Cl.
*G06F 9/44* (2018.01)
*H04L 29/06* (2006.01)
(Continued)

(52) U.S. Cl.
CPC .......... *G05B 19/042* (2013.01); *G06F 8/54* (2013.01); *G06F 9/445* (2013.01);
(Continued)

(58) Field of Classification Search
CPC . G06F 8/20; G06F 8/60; G06F 9/4484; G06F 9/455; G06F 9/45537; G06F 9/448;
(Continued)

(56) References Cited

U.S. PATENT DOCUMENTS 8,131,130 B2 * 3/2012 Ikeda ..................... G11B 20/10
386/241
8,661,407 B2 * 2/2014 Siegemund ............... G06F 8/20
717/108

(Continued)

OTHER PUBLICATIONS

Taewoo Kim et al., A Two-Stage Modeling and Simulation Process for Web-Based Modeling and Simulation, 2002, [Retrieved on Feb. 14, 2020]. Retrieved from the internet: <URL: https://dl.acm.org/doi/pdf/10.1145/643114.643118?download=true> 19 Pages (230-248) (Year: 2002).*

(Continued)

*Primary Examiner* — Anibal Rivera
(74) *Attorney, Agent, or Firm* — Oblon, McClelland, Maier & Neustadt, L.L.P.

(57) ABSTRACT

According to one embodiment, an information processing apparatus is used with a network including one or more units each includes a sensor and/or actuator. The information processing apparatus is configured to use one or more computer programs (written in programming languages such as JAVASCRIPT and JAVA) each for controlling the sensor and/or actuator of the connected units. A library (default library/user-defined library) is prepared. The library includes classes each describing a method to control the sensor and/or actuator of the one or more units. The computer program can be created by combining one or more classes obtained from the library. The information processing apparatus is configured to control the sensor and/or actuator according to the created computer program.

6 Claims, 68 Drawing Sheets

(51) Int. Cl.
  *G06F 9/445* (2018.01)
  *H04L 29/08* (2006.01)
  *G05B 19/042* (2006.01)
  *G06F 8/54* (2018.01)
  *G06F 9/455* (2018.01)
  G06F 8/60 (2018.01)
  G06F 8/20 (2018.01)
  G06F 9/448 (2018.01)

(52) U.S. Cl.
  CPC ...... *G06F 9/44521* (2013.01); *G06F 9/45529* (2013.01); *G05B 2219/31161* (2013.01); *G06F 8/20* (2013.01); *G06F 8/60* (2013.01); *G06F 9/4484* (2018.02); *G06F 9/45504* (2013.01); *G06F 9/45537* (2013.01)

(58) Field of Classification Search
  CPC .. G06F 9/45504; G06F 9/30101; G06F 9/541; G06F 9/44521; G06F 21/51; H04L 67/10; H04L 67/42; H04L 67/02; H04L 67/12; H04L 63/08
  See application file for complete search history.

(56) References Cited

U.S. PATENT DOCUMENTS

| | | | | |
|---|---|---|---|---|
| 9,094,777 | B2* | 7/2015 | Umapathy | H04L 41/0813 |
| 9,213,826 | B2* | 12/2015 | Gu | G06F 21/51 |
| 9,407,728 | B2* | 8/2016 | Marshall | H04L 67/42 |
| 9,841,494 | B2* | 12/2017 | Meadow | G01S 5/10 |
| 10,045,175 | B2* | 8/2018 | Skog | H04W 4/70 |
| 2004/0015678 | A1* | 1/2004 | Strom | G06F 9/30101 |
| | | | | 712/202 |
| 2007/0154172 | A1* | 7/2007 | Watanabe | G11B 20/10527 |
| | | | | 386/291 |
| 2009/0327996 | A1* | 12/2009 | Siegennund; Frank | G06F 8/20 |
| | | | | 717/107 |
| 2011/0010724 | A1* | 1/2011 | Thokur Lakshminarayanan | G06F 9/541 |
| | | | | 719/315 |
| 2011/0314389 | A1* | 12/2011 | Meredith | G06F 8/60 |
| | | | | 715/751 |
| 2012/0246487 | A1* | 9/2012 | Gu | G06F 21/51 |
| | | | | 713/190 |
| 2014/0143390 | A1* | 5/2014 | Umapathy | H04L 41/0813 |
| | | | | 709/221 |
| 2014/0143395 | A1* | 5/2014 | Geltner | H04W 4/70 |
| | | | | 709/223 |
| 2014/0236756 | A1* | 8/2014 | Bourke | G06Q 30/0631 |
| | | | | 705/26.7 |
| 2014/0359552 | A1* | 12/2014 | Misra | H04L 67/12 |
| | | | | 717/100 |
| 2015/0007171 | A1* | 1/2015 | Blake | G06F 9/45537 |
| | | | | 718/1 |
| 2015/0031381 | A1* | 1/2015 | Kotecha | H04W 4/70 |
| | | | | 455/452.1 |
| 2015/0113172 | A1* | 4/2015 | Johnson | G06Q 10/10 |
| | | | | 709/245 |
| 2015/0134722 | A1* | 5/2015 | Marshall | H04L 67/42 |
| | | | | 709/203 |
| 2015/0134801 | A1* | 5/2015 | Walley | H04L 43/50 |
| | | | | 709/223 |
| 2015/0134954 | A1* | 5/2015 | Walley | H04L 63/08 |
| | | | | 713/168 |
| 2015/0188949 | A1* | 7/2015 | Mahaffey | H04L 63/20 |
| | | | | 726/1 |
| 2015/0298548 | A1* | 10/2015 | Maru | G01C 21/3697 |
| | | | | 715/234 |
| 2016/0080474 | A1* | 3/2016 | Argenti | H04L 67/10 |
| | | | | 709/201 |
| 2016/0087933 | A1* | 3/2016 | Johnson | H04W 4/70 |
| | | | | 709/245 |
| 2016/0112262 | A1* | 4/2016 | Johnson | G06F 9/45504 |
| | | | | 709/221 |
| 2016/0132343 | A1* | 5/2016 | Kajigaya | G06F 9/44521 |
| | | | | 719/331 |
| 2016/0173959 | A1* | 6/2016 | Seema | H04N 21/8456 |
| | | | | 725/116 |
| 2016/0195602 | A1* | 7/2016 | Meadow | G01S 5/0036 |
| | | | | 701/517 |
| 2016/0308957 | A1* | 10/2016 | Zhang | G06F 9/4484 |
| 2017/0034298 | A1* | 2/2017 | Agarwal | H04L 67/2842 |
| 2017/0272316 | A1* | 9/2017 | Johnson | H04L 61/301 |
| 2017/0373936 | A1* | 12/2017 | Hooda | H04L 63/08 |
| 2018/0262388 | A1* | 9/2018 | Johnson | G06F 9/448 |
| 2019/0158353 | A1* | 5/2019 | Johnson | H04L 67/125 |

OTHER PUBLICATIONS

Yao-He Liu et al., The research and application of remote control and monitoring in smart structure, 2007, [Retrieved on Feb. 14, 2020 ]. Retrieved from the internet: <URL: https://www.spiedigitallibrary.org/conference-proceedings-of-spie/6423/1/> 6 Pages (1-6) (Year: 2007).*

International Search Report and Written Opinion dated Jan. 12, 2016, in International Application No. PCT/JP2015/077540.

David Boswarthick et al. (translated (abridged) by Norikazu Yamasaki et al.), "Basic Technique of M2M: Theory and System of ETSI Standard," Dec. 26, 2013, pp. 4-5, 18.

Kazuhiro Kihei, "Network live video delivery system "WebView"" Internet Streaming—Technical / use cases / Expectation for 2005-, Jul. 15, 2000, pp. 90-99.

Kaisei Hamamoto, "Lead Java 1st Google Web Toolkit", Web+DB Press, 2010, vol. 57, pp. 130-137.

Ryota Ozaki, "Remote device management mechanism corresponding to dynamic change of network", Information Processing Society Research Report, vol. 2005, No. 28, Mar. 18, 2005, pp. 53-59.

Nagase, Y., et al., "Implementation-based Detailed Design and Sample Program", Interface, vol. 24 No. 12, Dec. 1, 1998, pp. 163-170 (with English translation).

Nakano, Toru, "Implementation and Application of Industrial Network Computer with Java", Interface, vol. 25 No. 9, Sep. 1, 1999, pp. 105-116 (with English translation).

Takeuchi, Yasuhiro, "Proposal of Java Platform PDA 'PocketCosmo-TM' ", Monthly Bar Code, vol. 16 No. 7, Jun. 2, 2003, pp. 8-13 (with English translation).

* cited by examiner

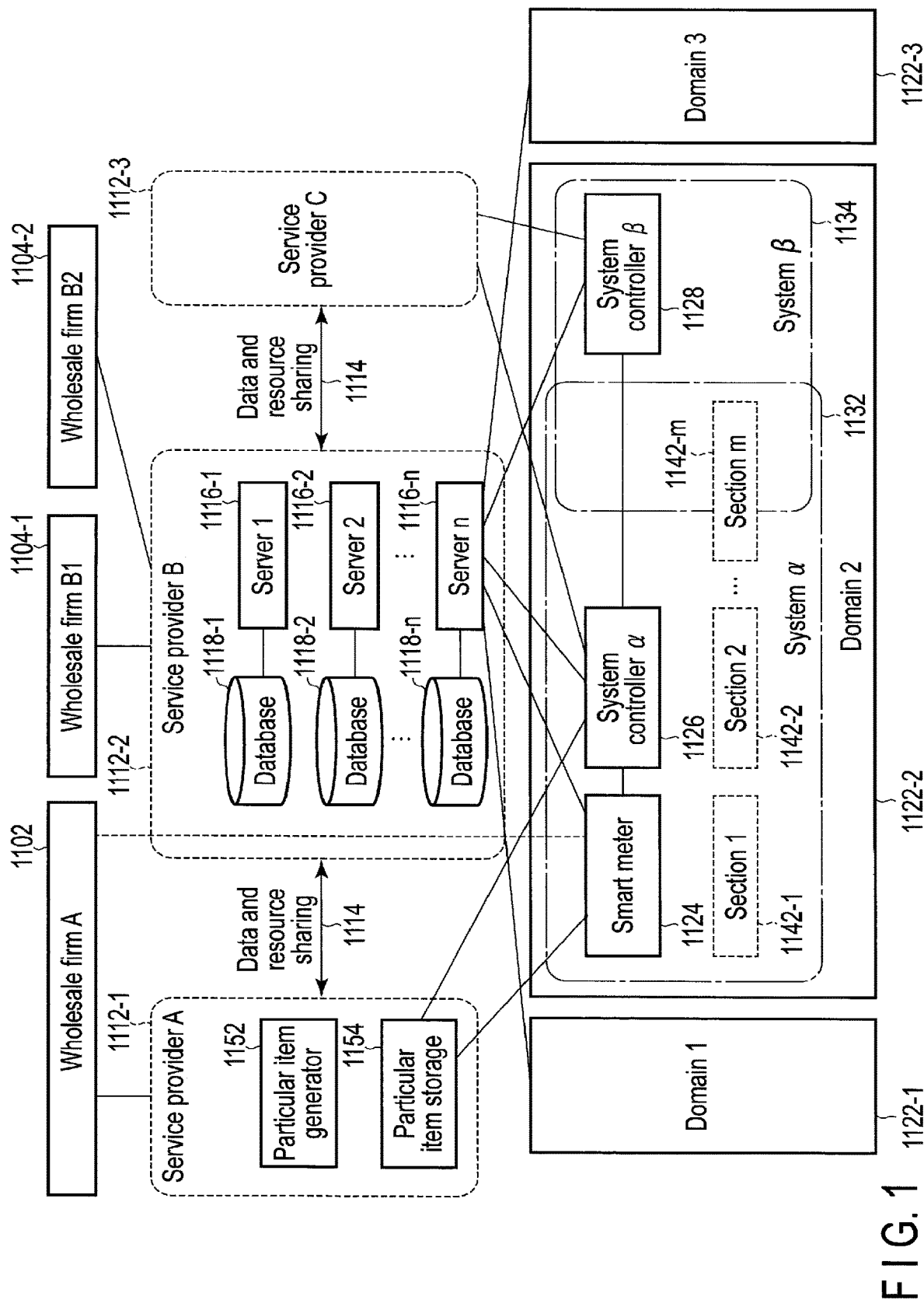
F I G. 1

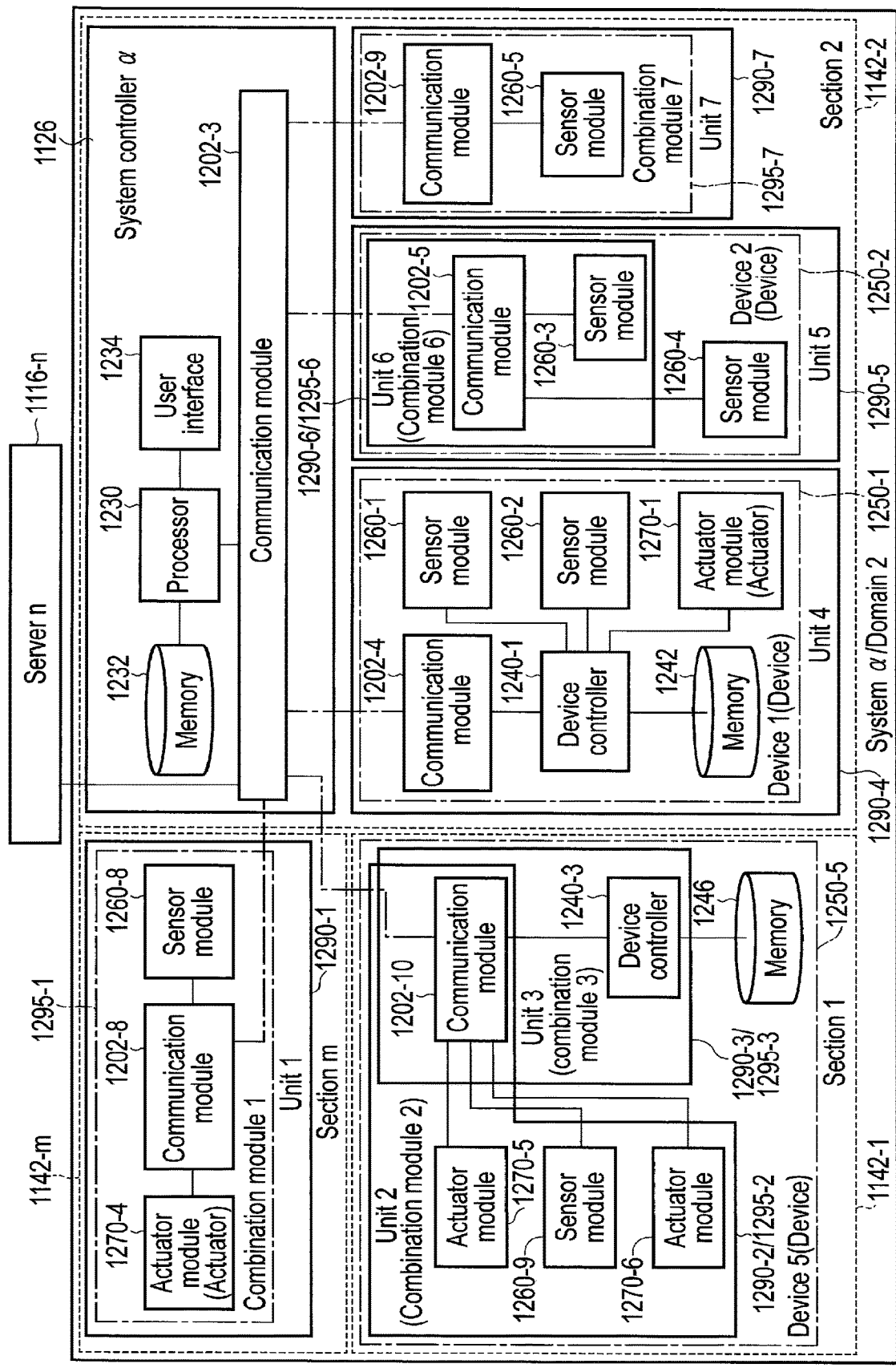
F I G. 2

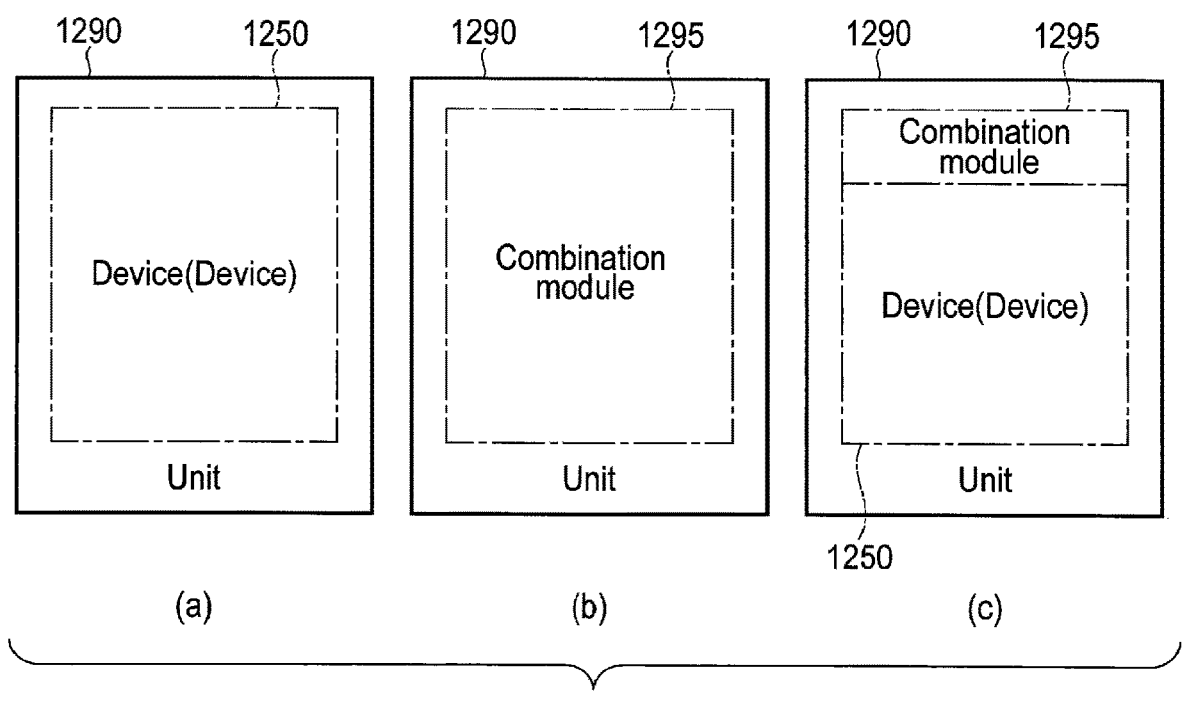
F I G. 3A

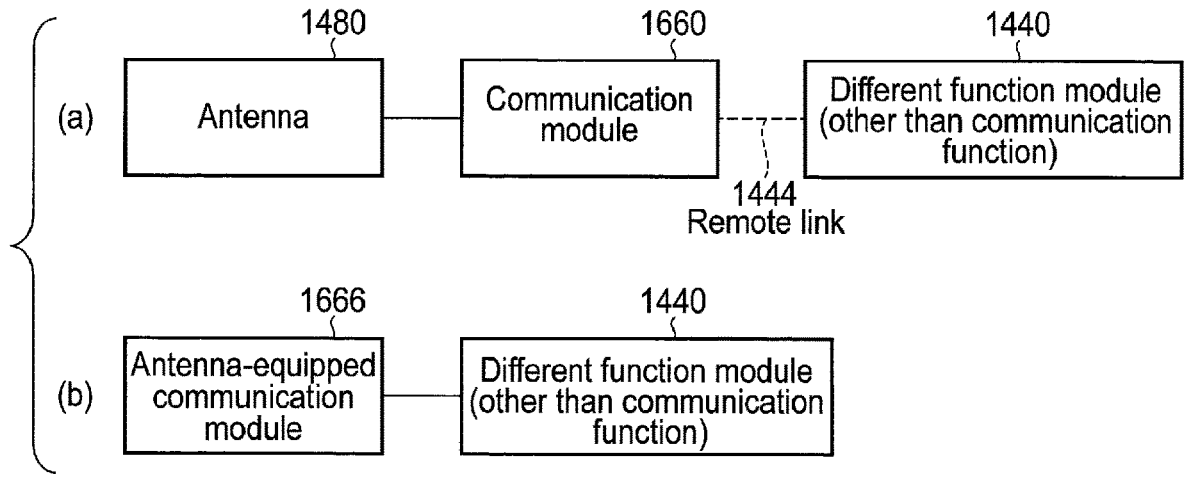
F I G. 4A
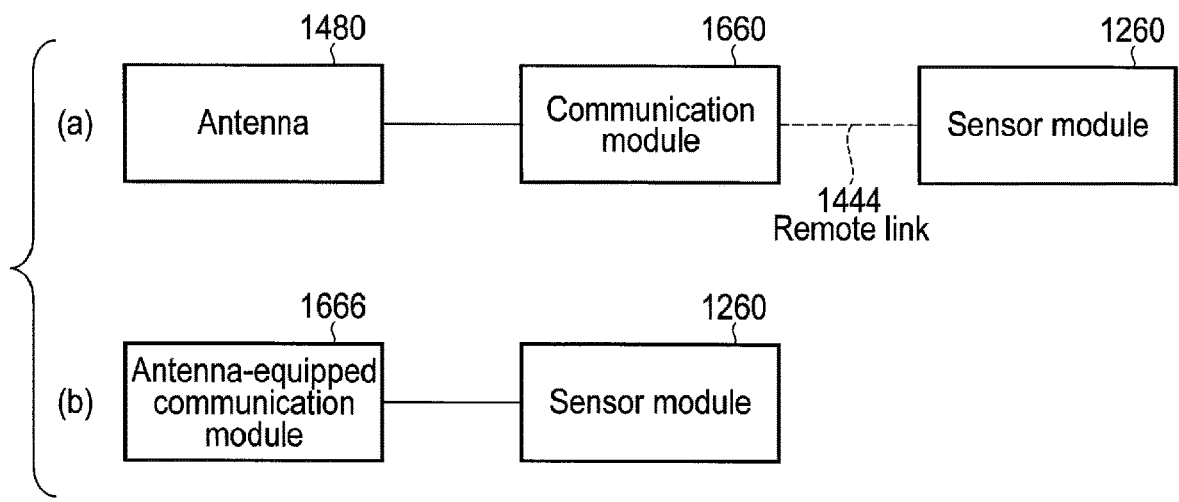
F I G. 4B

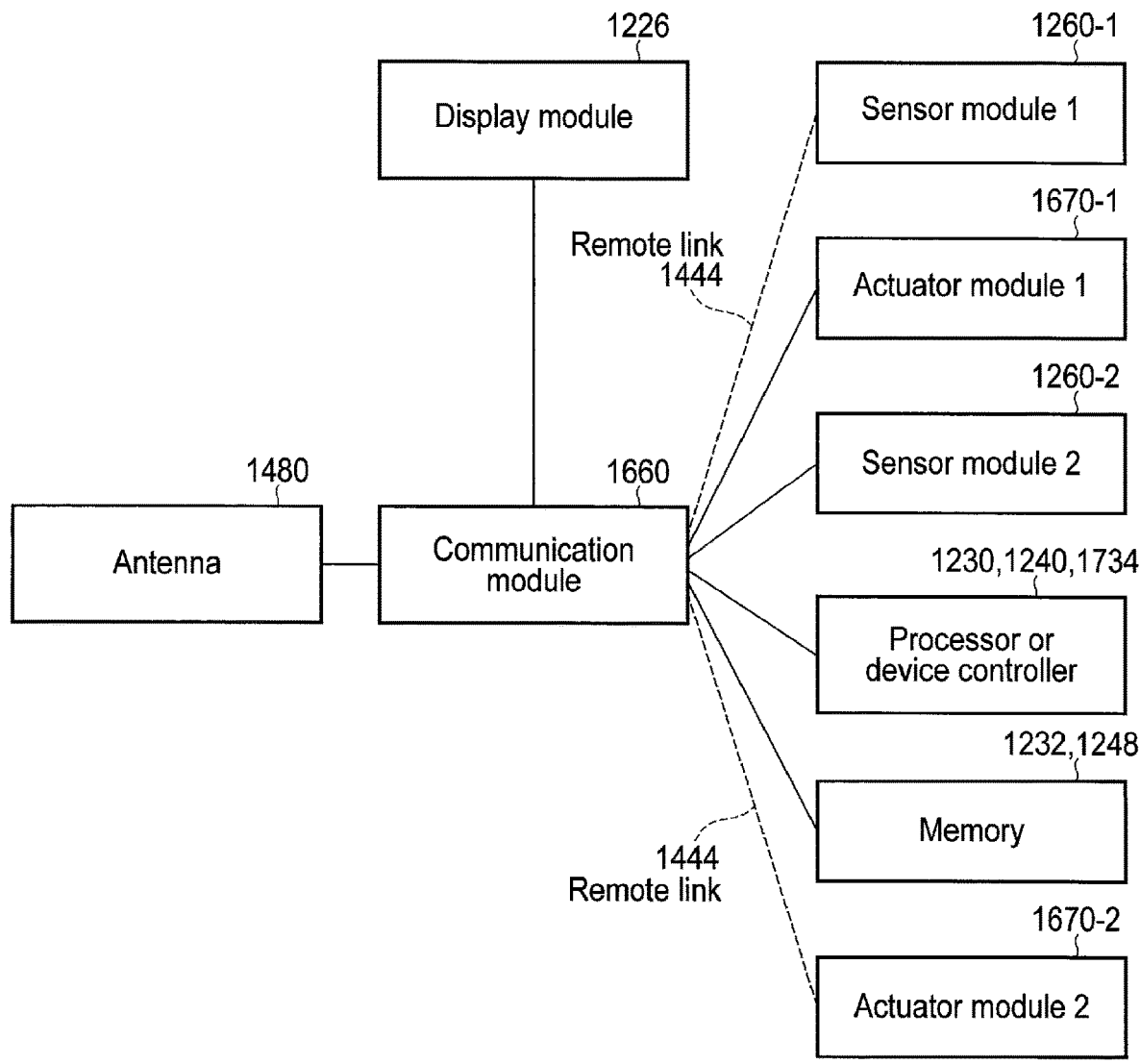
F I G. 4F

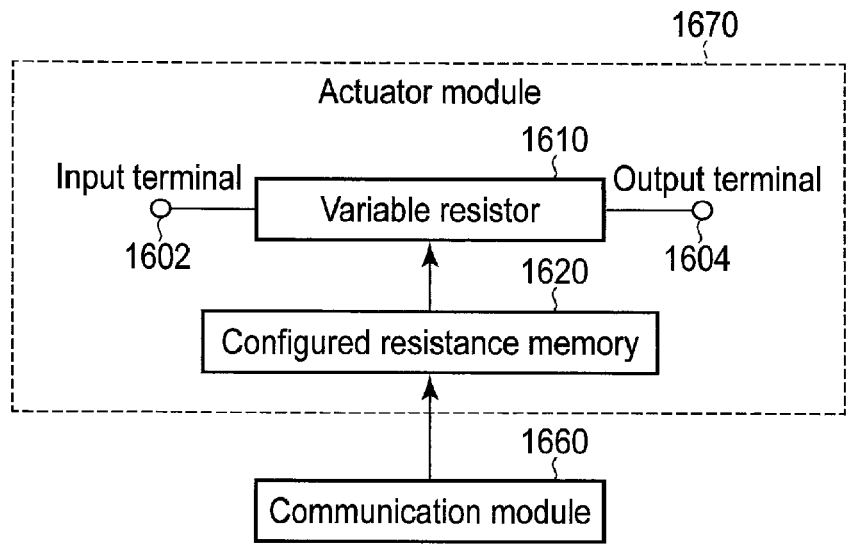
F I G. 6A
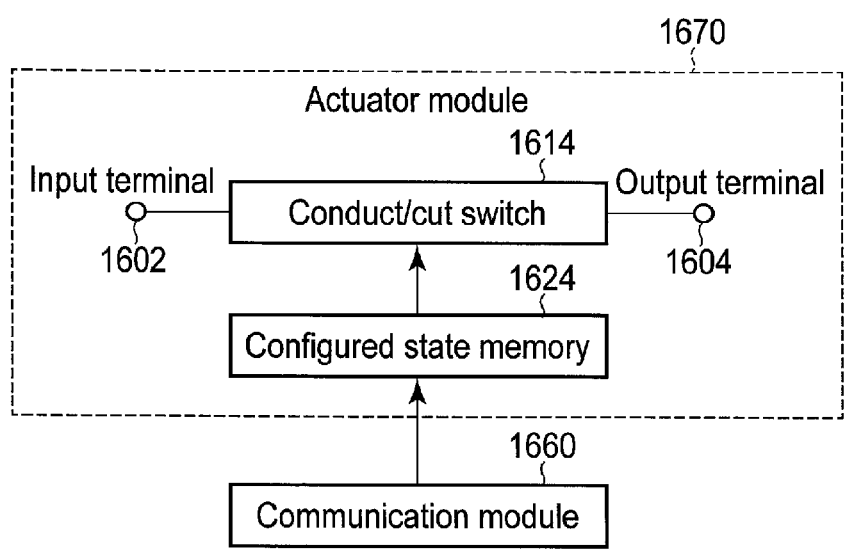
F I G. 6B

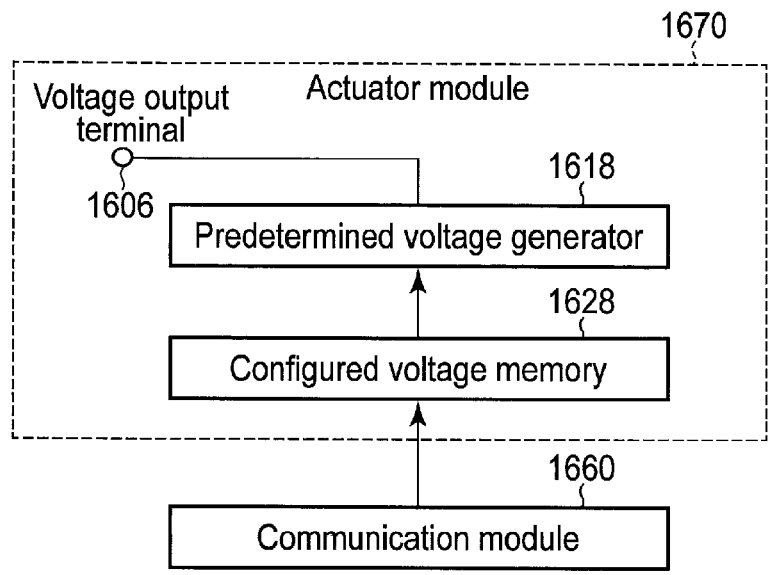
F I G. 6C
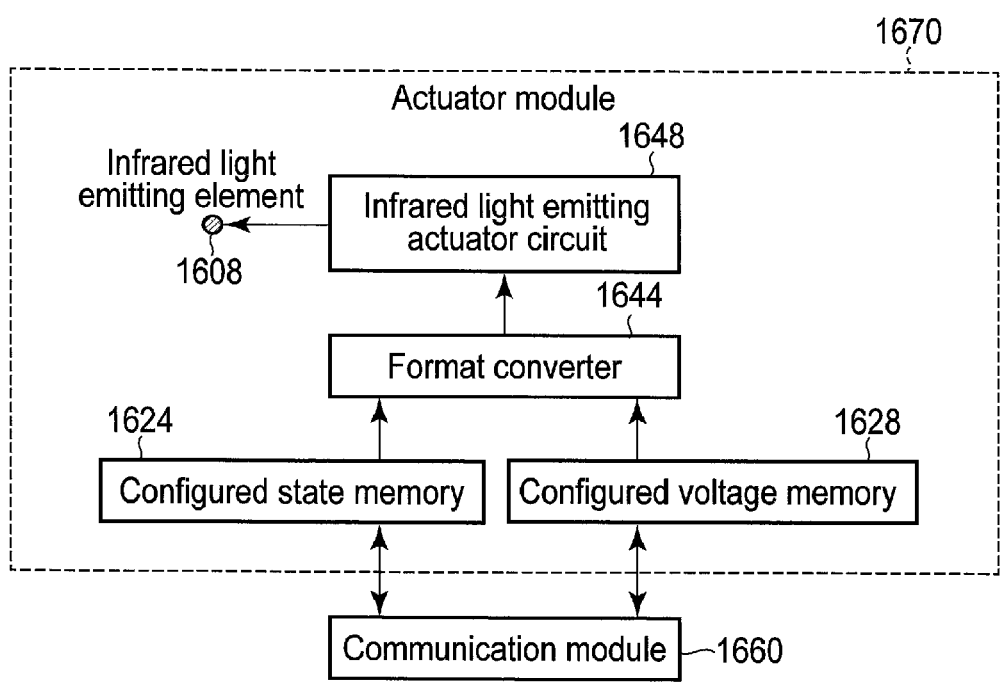
F I G. 6D

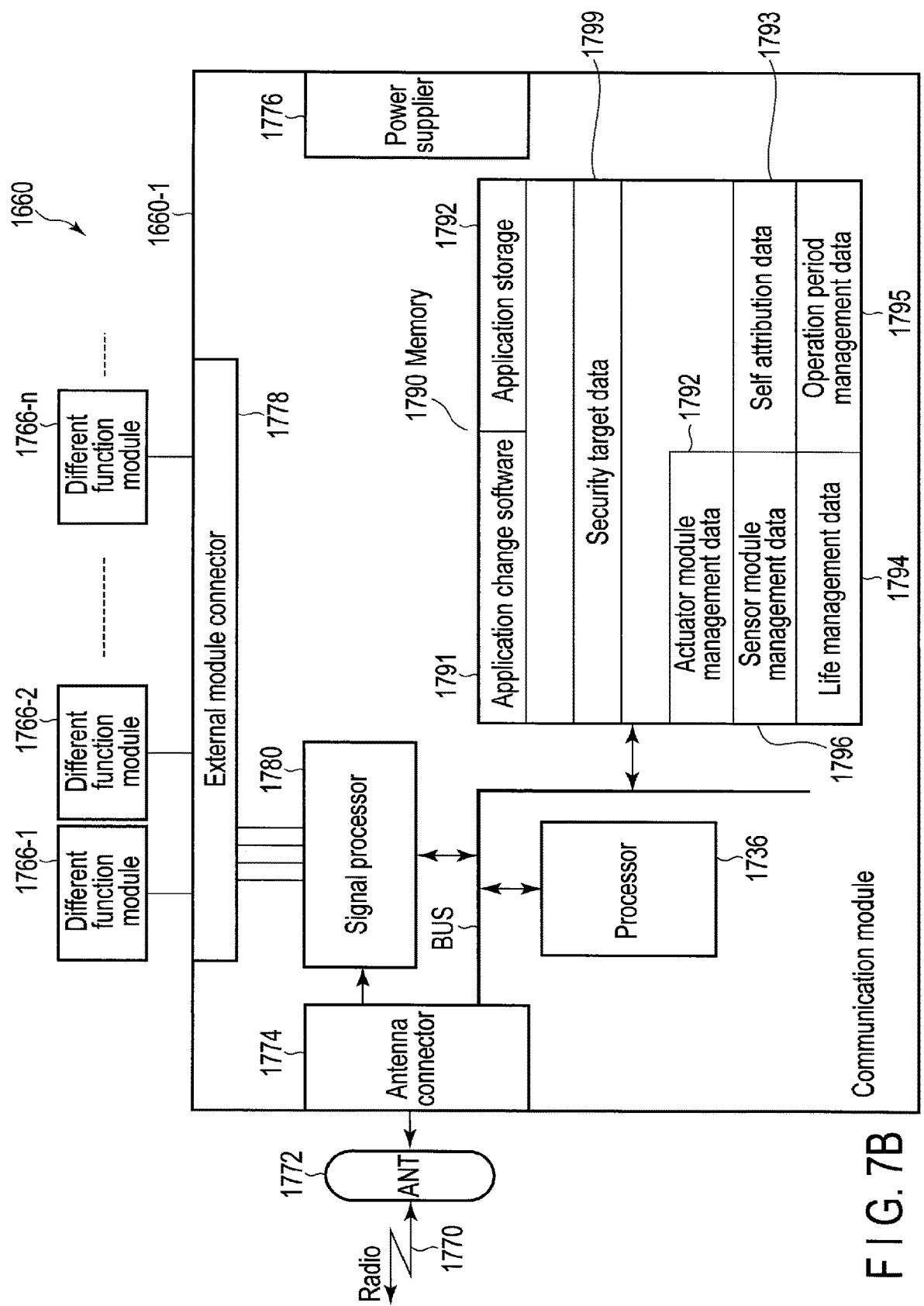
F I G. 7B

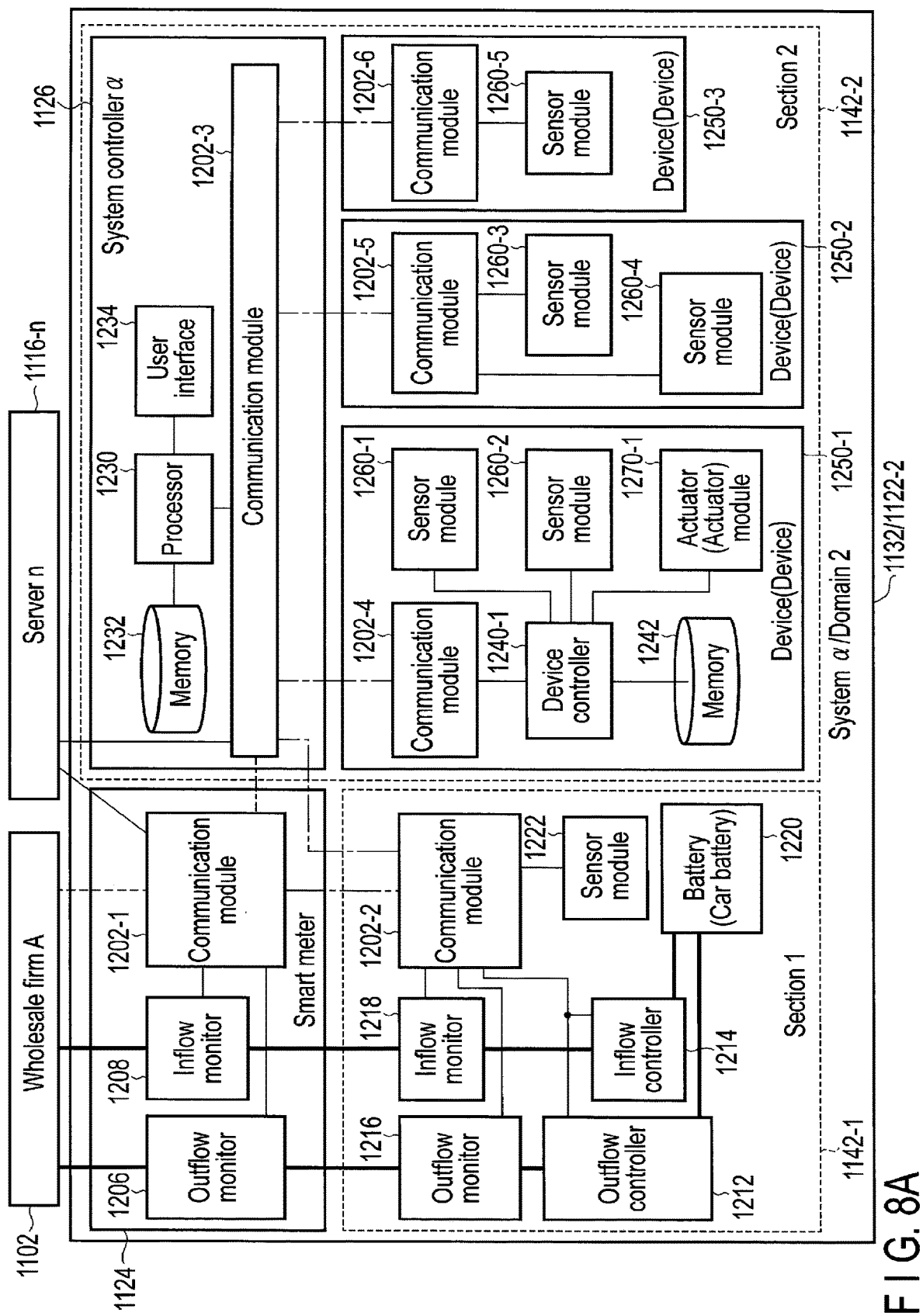
F I G. 8A

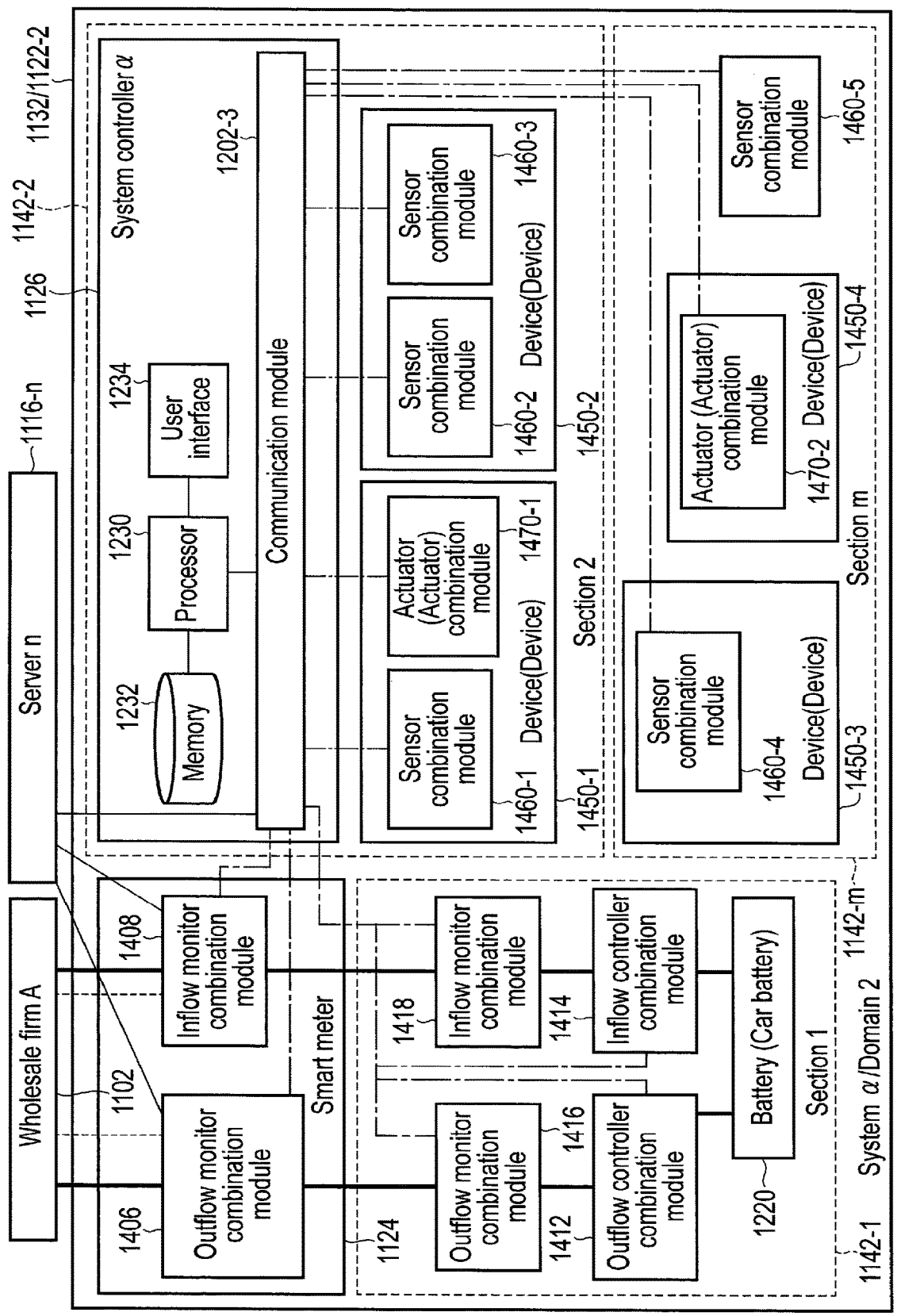
F I G. 8B

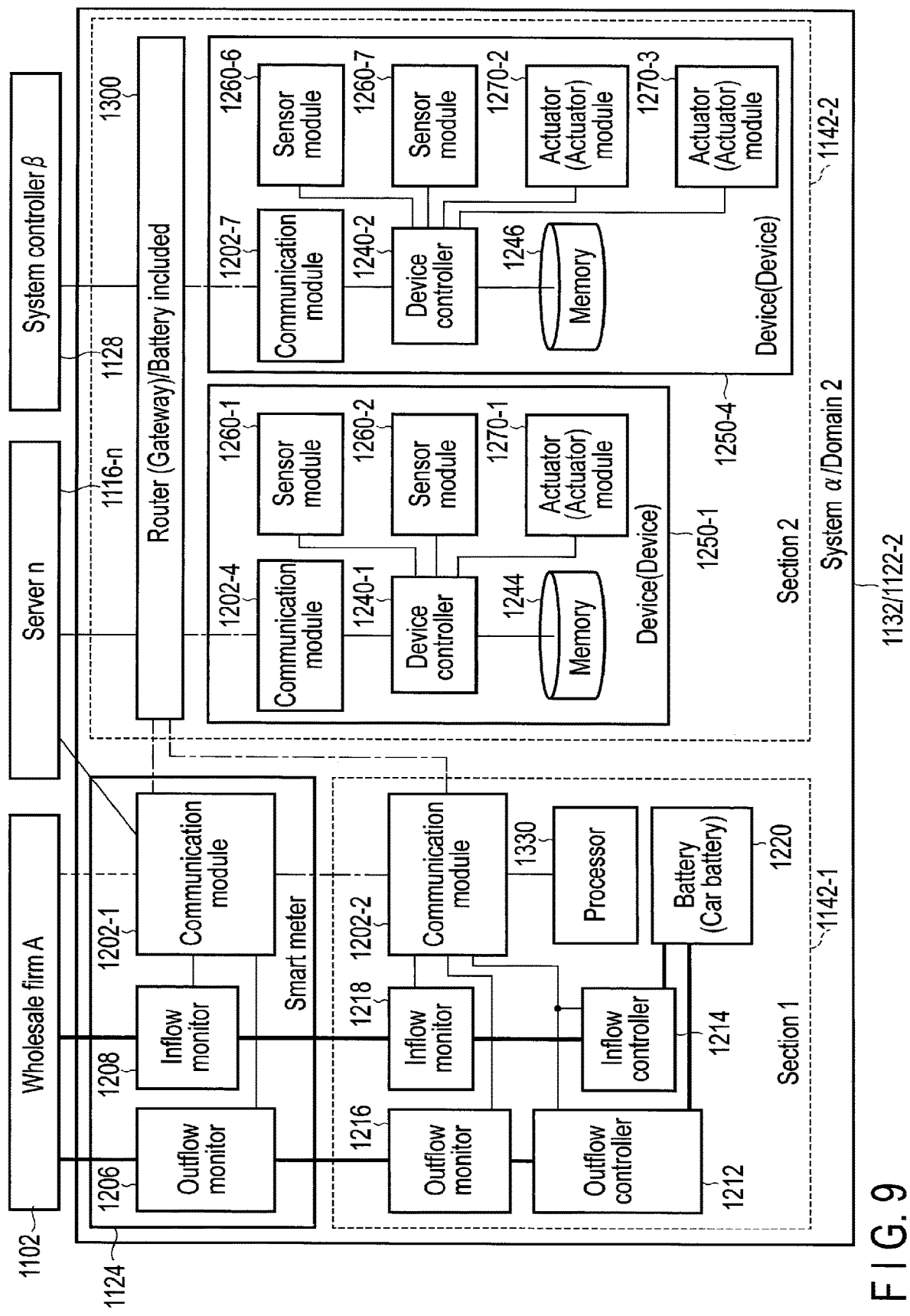
F I G. 9

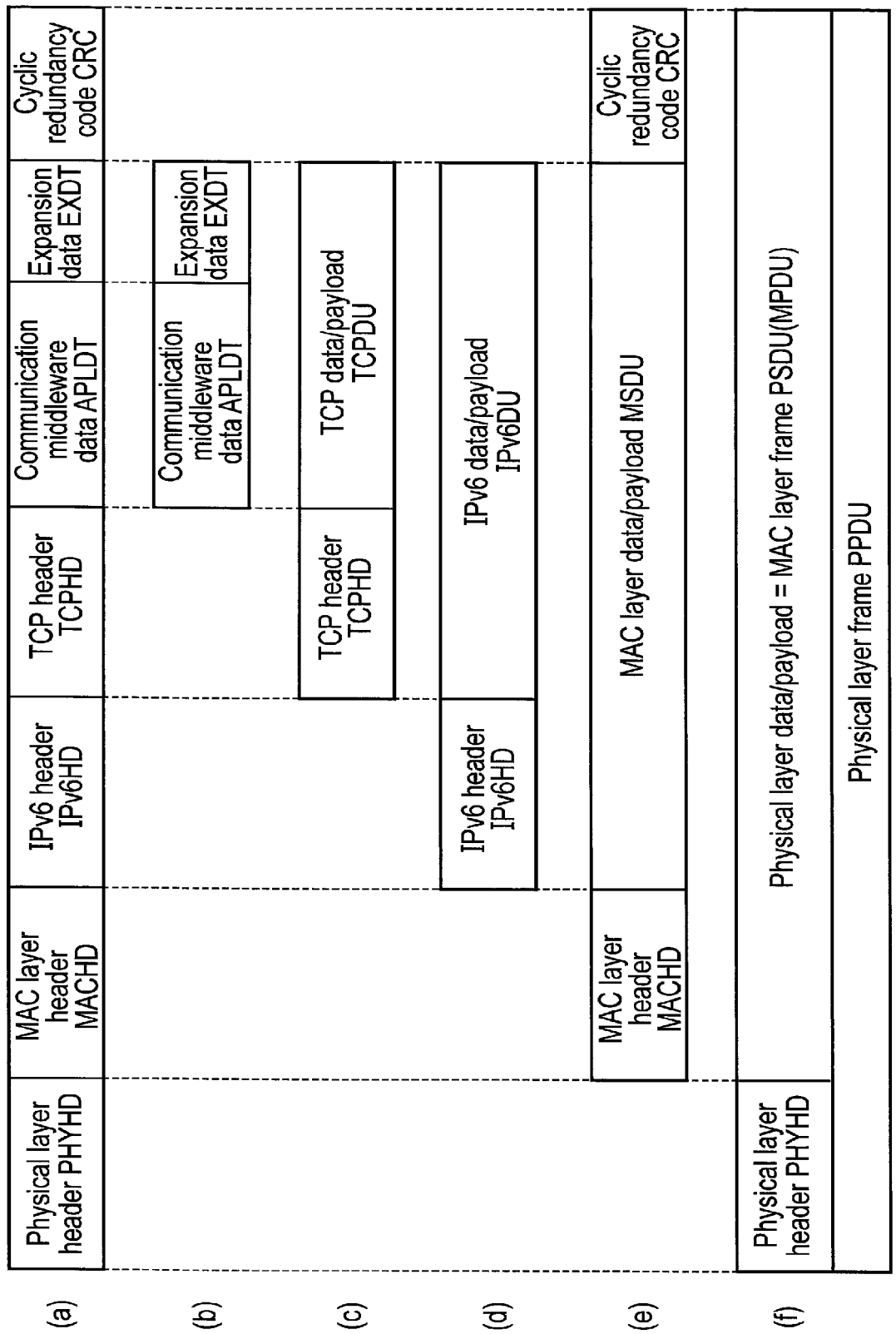
F I G. 11

(a) | Physical layer header PHYHD | MAC layer header MACHD | IPv6 header IPv6HD | TCP header TCPHD | Communication middleware data APLDT | Expansion data EXDT | Cyclic redundancy code CRC |

(b) | MAC layer frame control data (2-byte) MACNTL | MAC layer sequence number (1-byte) MASQNM | Address data MADRS |

(c) | Receiver PAN unique ID data DPANID | Receiver IEEE expansion address DEXADRS | Sender PAN unique ID data SPANID | Sender IEEE expansion address SEXADRS |

(d) | Expanded IEEE extension address (1-byte) EXEXADRS | IEEE 802.15.4 conformable per-chip address (8-byte) ADRSIEEE |

(e) | Module structure data (1-bit) MST
[0]: Communication module only
[1]: Combination module structure | Combination module structure data (1-bit) CMST
[0]: Sensor combination module
[1]: Actuator combination module | Combination module type identification data (6-bit) CMTID |

F I G. 12B

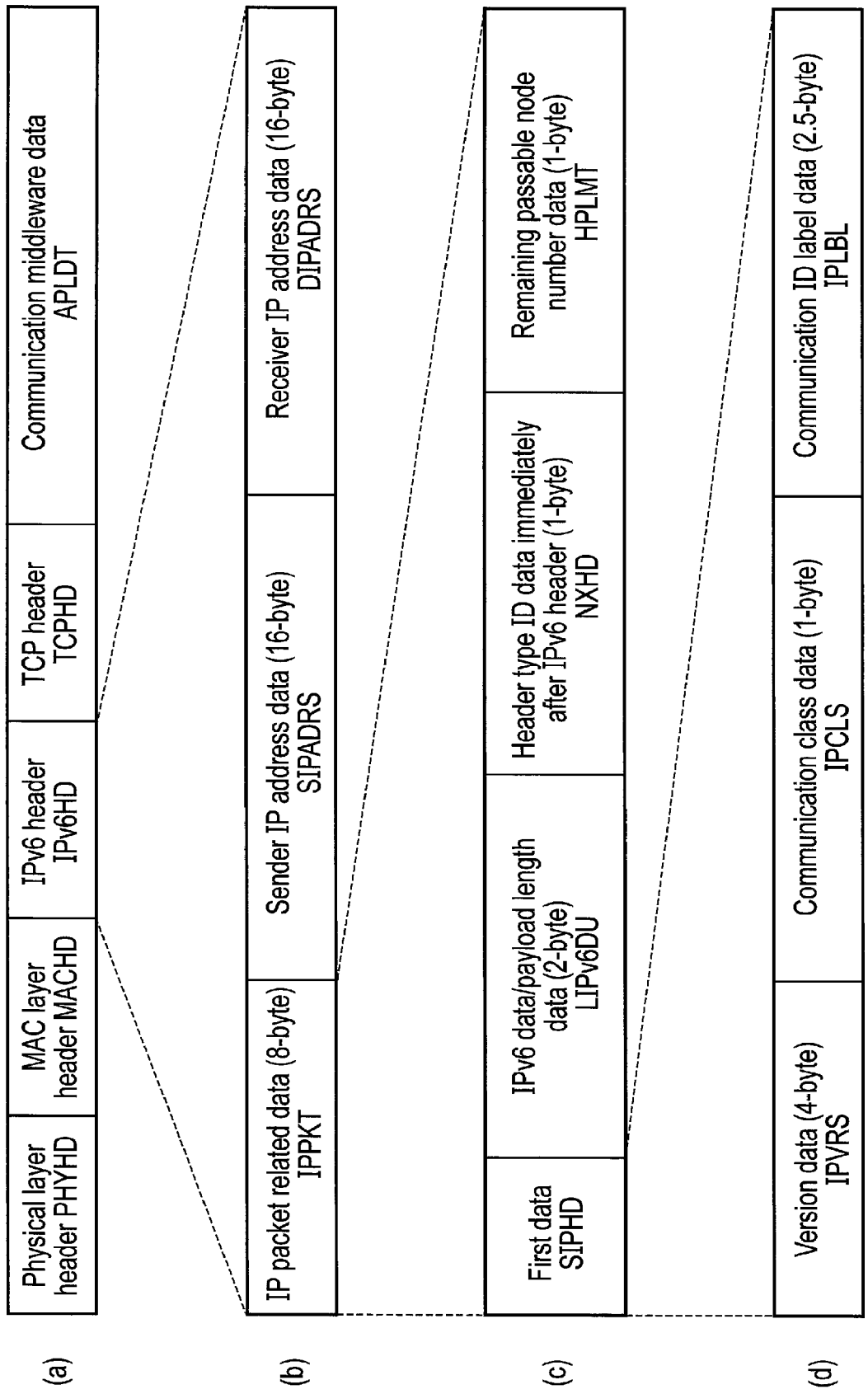
F I G. 13

(a)

| Physical layer header PHYHD | MAC layer header MACHD | IPv6 header IPv6HD | TCP header TCPHD | Communication middleware data APLDT |
|---|---|---|---|---|

(b)

| IP packet related data (8-byte) IPPKT | Sender IP address data (16-byte) SIPADRS | Receiver IP address data (16-byte) DIPADRS |
|---|---|---|

(c)

| First data SIPHD | IPv6 data/payload length data (2-byte) LIPv6DU | Header type ID data immediately after IPv6 header (1-byte) NXHD | Remaining passable node number data (1-byte) HPLMT |
|---|---|---|---|

(d) 1830

| Communication access control data (3-bit) | Multi-valued transmission data (4-bit) CTMDT | Binary transmission data (1-bit) CT2DT | Expansion transmission data CEDT |
|---|---|---|---|
| [011]: Response (data) request<br>[010]: Response reply/report notification<br>[001]: Acknowledgement notification<br>[000]: Alarm notification<br>[111]: Reset instruction/download instruction<br>[110]: Threshold level setting instruction<br>[101]: Report interval instruction<br>[100]: Data accumulation interval instruction<br>(Transmission data [0]⇒instant data measurement) | In case of binary data: [0000]<br>Include next bit in case of % display<br>0% to 100%: [00010] to [11111] | ON/OFF response<br>[1]: ON/OK<br>[0]: OFF/Not OK<br>Alarm response<br>[1]: Sensor/actuator error<br>[0]: Low battery<br>[11]: Target erroneous identification notification<br>Multi-value response ⇒ LSB | (When setting/transferring detailed data such as temperature) |

F I G. 14

FIG. 15A (a) Physical layer header PHYHD | MAC layer header MACHD | IPv6 header IPv6HD | TCP header TCPHD | Communication middleware data APLDT (b) E-format header E-HD [1081h] | Request-response association ID data (2-byte) TID | E-format data E-DT (Exchangeable data 1810)

(c) Sender device ID data (3-byte) SEOJ | Receiver device ID data (3-byte) DEOJ | Communication access control data (1-byte) ESV (1830) | Control/process related data CMI (d) Device type group code (1-byte) DTGC | Device type code (1-byte) DTC | Same type device ID code (1-byte) DIDC (e) Number of control/process data (1-byte) NCM | Initial control/process data CM-1 | ... | Nth control/process data CM-n (f) Exchangeable data type ID data (1-byte) EPC (1840) | Data size of individual exchangeable data (1-byte) PDC | Individual exchangeable data (PDC designated size) EDT (a)

| Physical layer header PHYHD | MAC layer header MACHD | IPv6 header IPv6HD | TCP header TCPHD | Communication middleware data APLDT |
|---|---|---|---|---|

(b)

```
<tdl date="12/25/14">
  <table name="DEVICE_NAMEPLATE_TBL" number="02" type="E_ELECTRIC_DEVICE_RCD"
  accessibility="WRITEONLY">  (Attribution of name or number corresponds to exchangeable data type ID data 1840)
    <packedRecord name="E_ELECTRIC_DEVICE_RCD">
      <element name="E_KH" type="STRING(6)">
        <description>
          Watt-hours per revolution (May be presented as unit-hours per equivalent revolution).
                              (accessibility = "$$" corresponds to communication access control data 1830)
        </description>
      </element>
      <element name="E_AMPS"         type="E_AMPS_RCD"/>
      <set name="E_AMPS_RCD" accessibility="WRITEONLY" deprecated="true">
        <enumerator name="E_AMPS" label="Supplied amperes of Electric Unity End Device">
          <enum value="$$$$" text="Supplied amperes of Electric Unity End Device"/>
        </enumerator>
      </set>
    </packedRecord>
  </table>    (Description in <table --->Element corresponds to contents of exchangeable data (table) 1810)
</tdl>
```

FIG. 15B

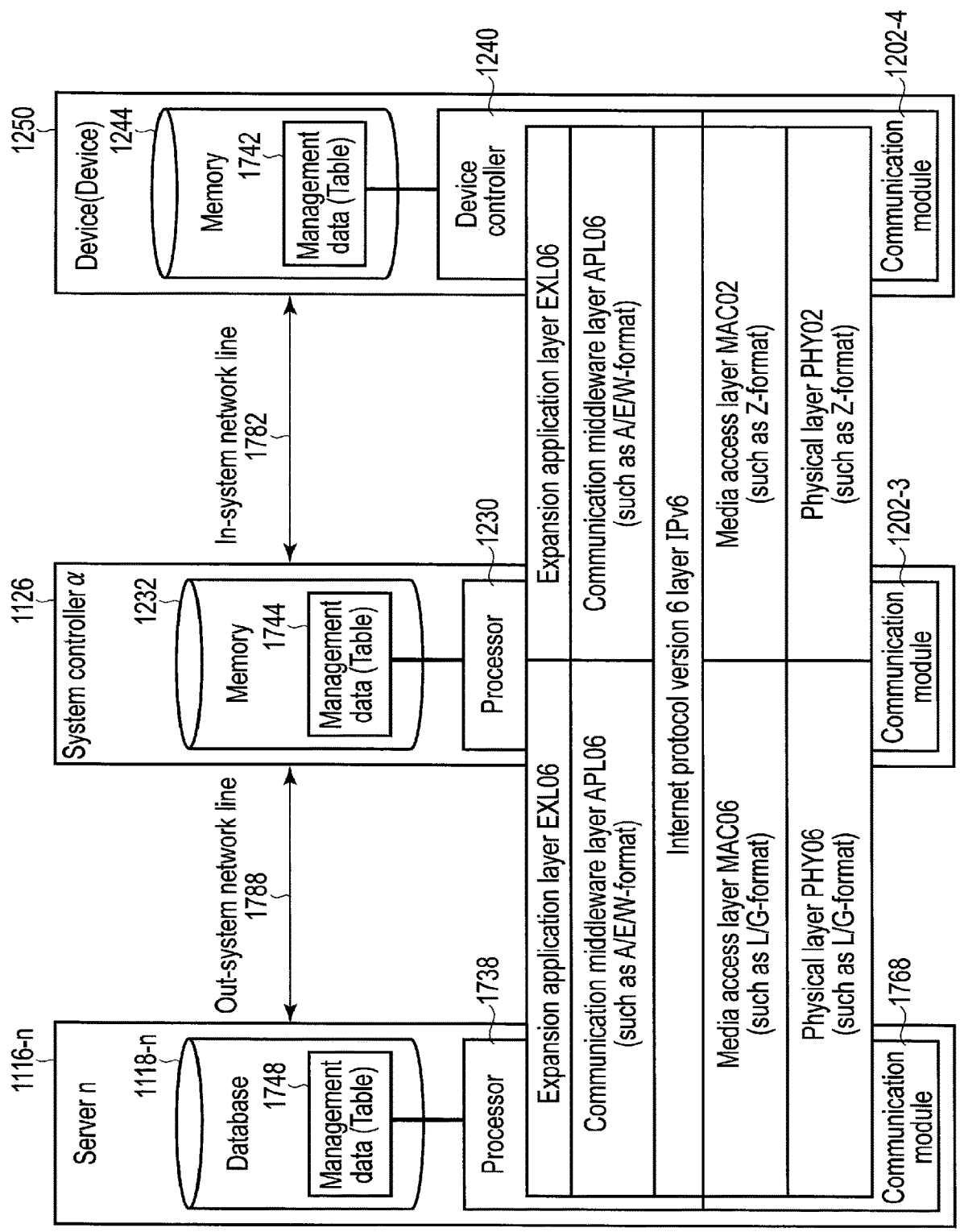
F I G. 16

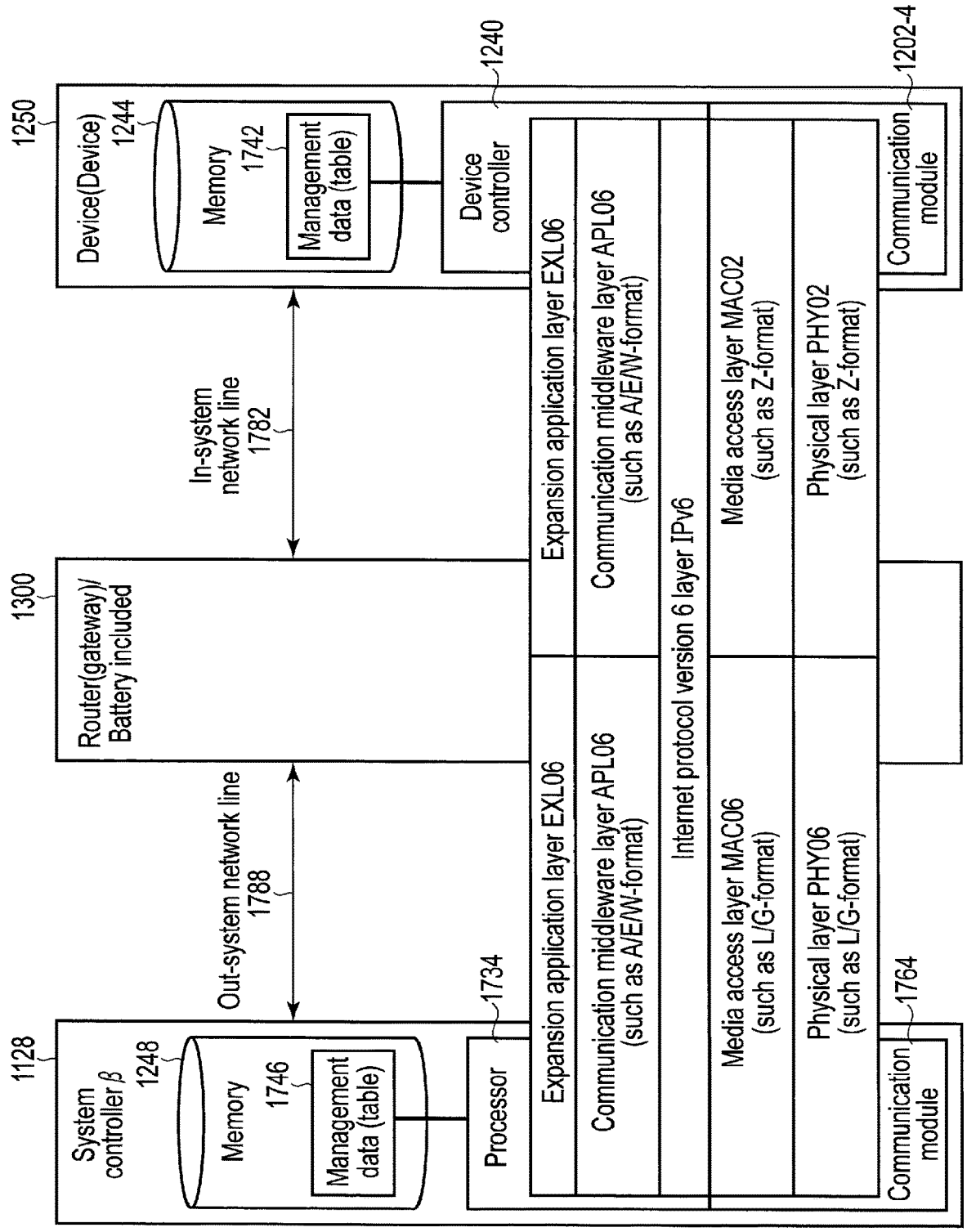
F I G. 17B

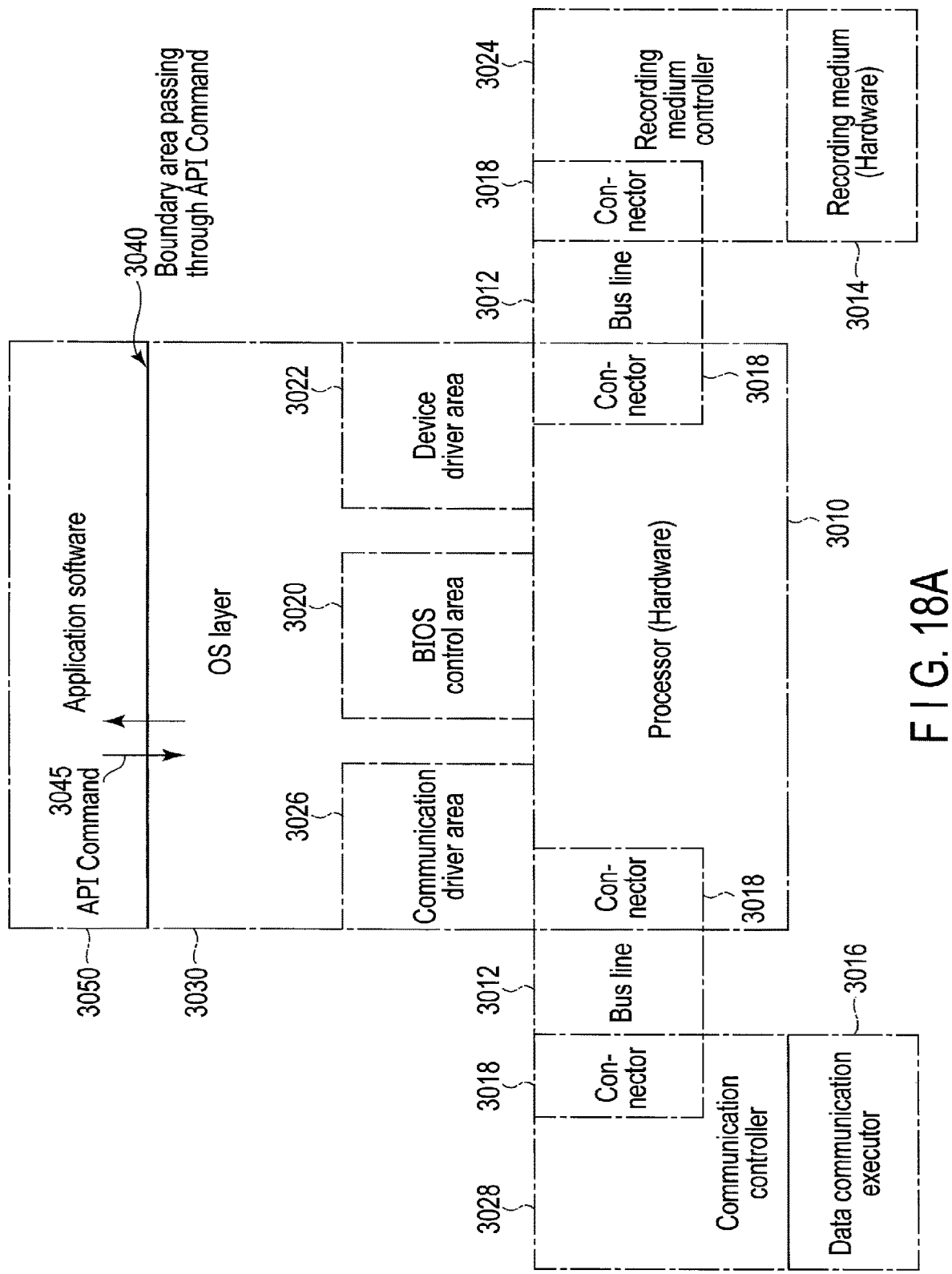
F I G. 18A

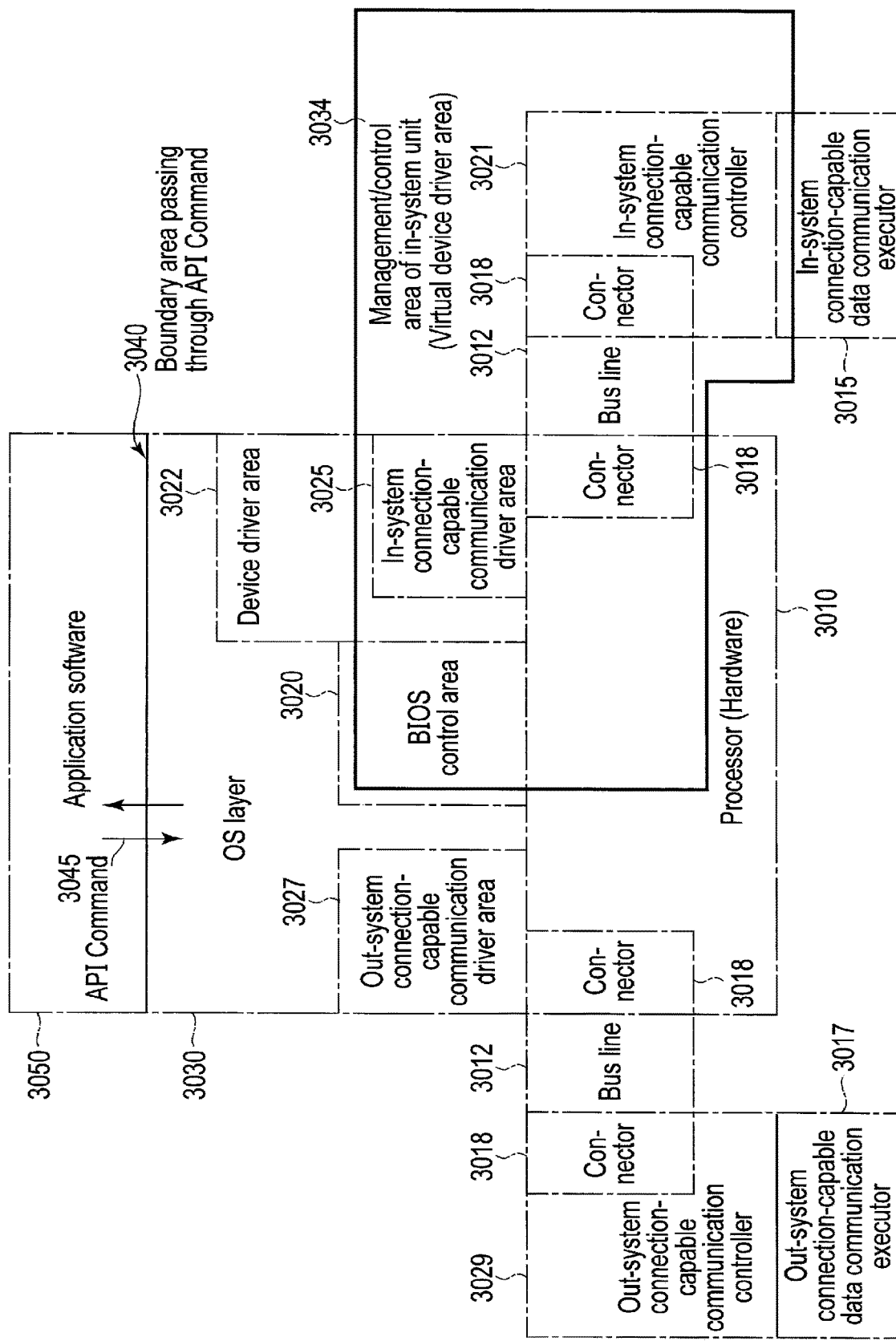
F I G. 18B

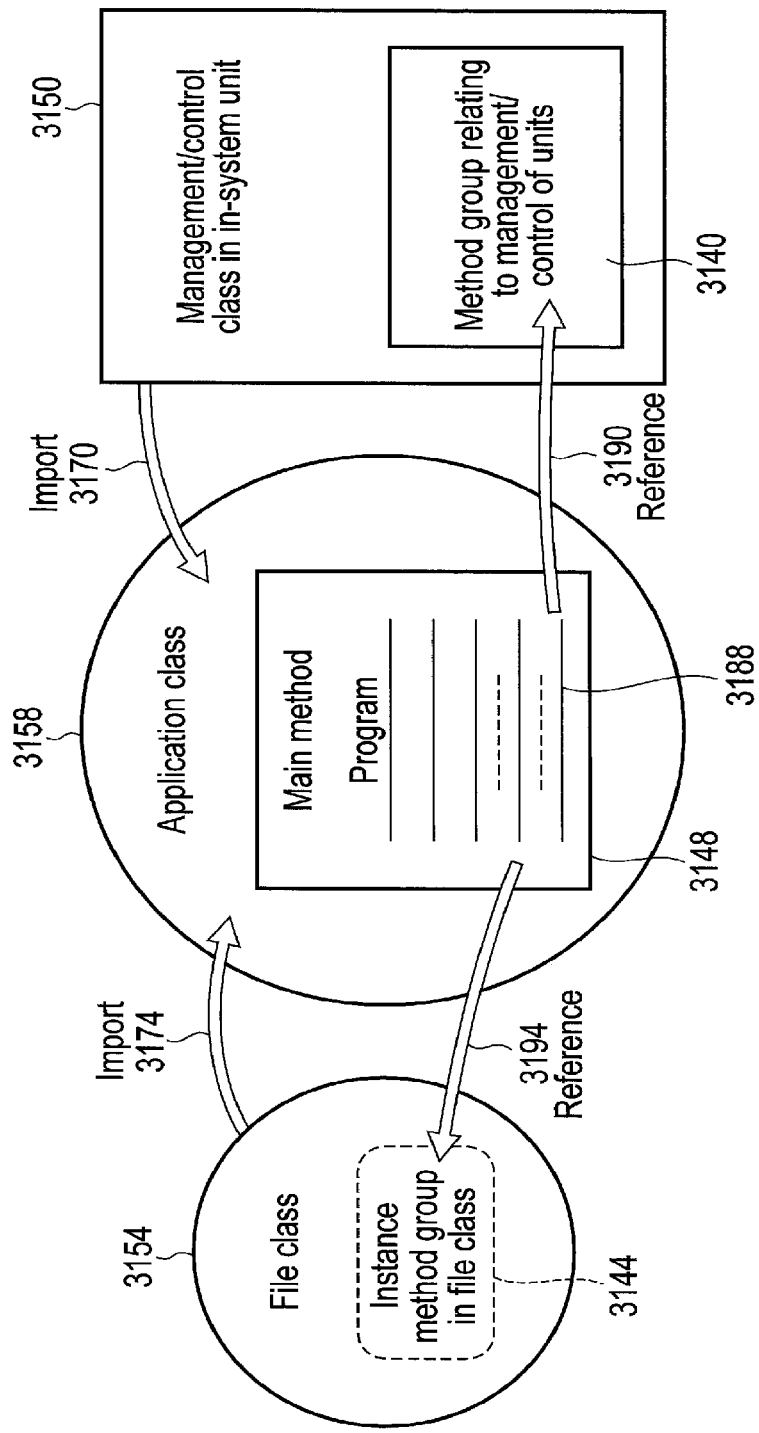
F I G. 19B

| | Existing file system | Unit managing method of present embodiment |
|---|---|---|
| Management data | File management data (such as FAT and UFD) | Address table |
| Management data storage place | In storage medium | In memory of system controller |
| Contents accessing method | Specify file name/address range in file | Specify address of corresponding unit |
| List of all contents | None | Time-series data tracking table |
| Data to be read | Contents in file | Sensor data, various types of state data, exchangeable data (table) 1810 |
| Data to be changed | Contents in file | (Change of) setting status, exchangeable data (table) 1810 |

F I G. 20

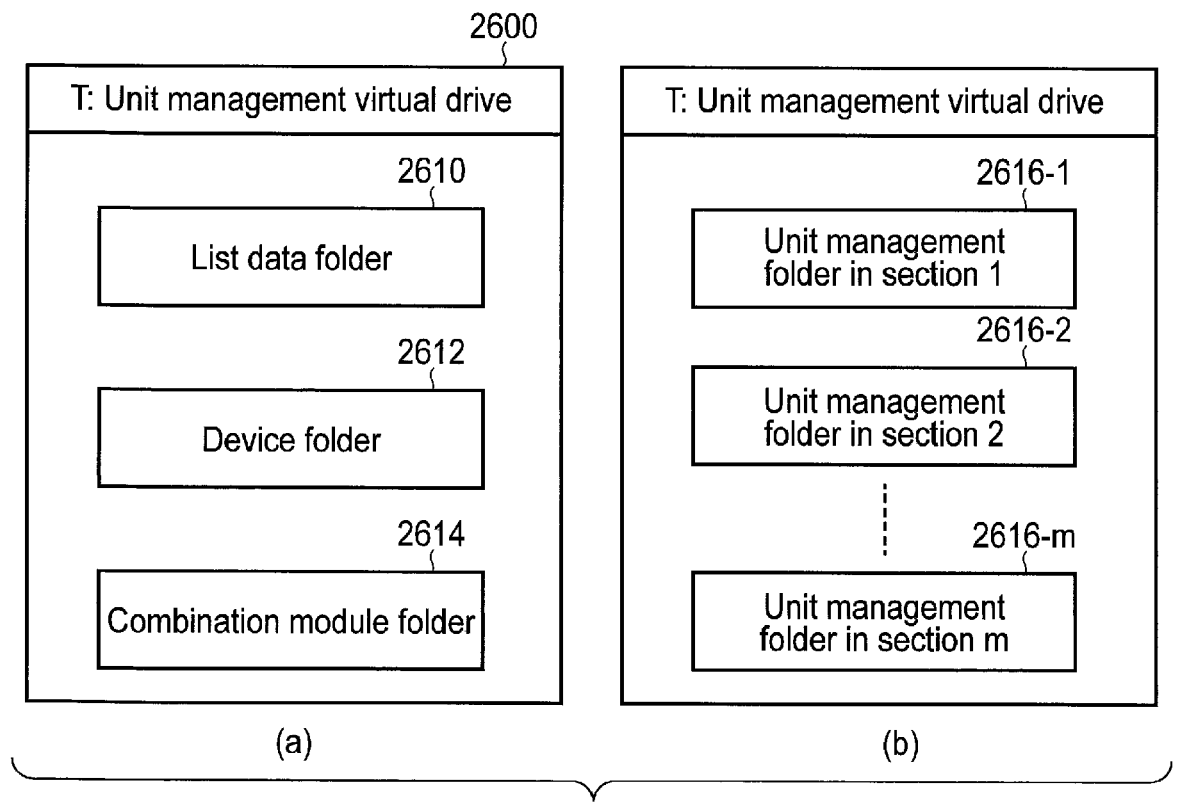
F I G. 21A
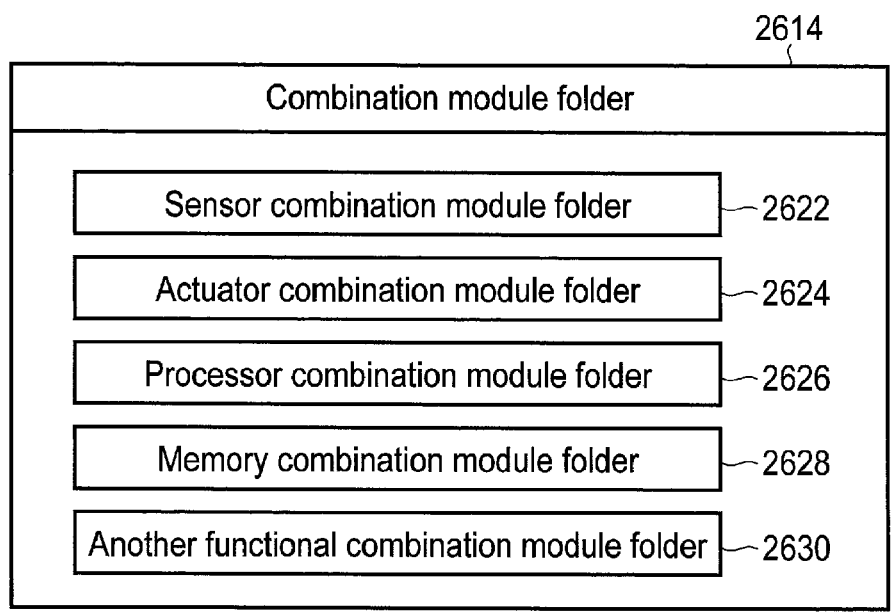
F I G. 21B

| Target module | Sensor module | Actuator module | ... | Actuator combination module | Sensor combination module |
|---|---|---|---|---|---|
| | 1260-1 | 1270-1 | | 1470-2 | 1460-5 |
| Storage device data | 1250-1 | 1250-1 | ...... | 1450-4 | None |
| Domain data | 2_1122-2 | 2_1122-2 | ...... | 2_1122-2 | 2_1122-2 |
| System data | α_1132 | α_1132 | ...... | α_1132 | α_1132 |
| Section data | 2_1142-2 | 2_1142-2 | ...... | m_1142-m | m_1142-m |
| PAN-specific data PANID | 2_1142-2 | 2_1142-2 | ...... | m_1142-m | m_1142-m |
| IEEE Extension address EXADRS | 1202-4 (Communication module) | 1202-4 (Communication module) | ...... | 1470-2 | 1460-5 |
| IP address IPADRS | 1260-1 | 1270-1 | ...... | 1470-2 | 1460-5 |
| Device type group code | 12 | 12 | ...... | 14 | None |
| Device type code | 1250 | 1250 | ...... | 1450 | None |
| Device identification code in same type DIDC | 1250-1 | 1250-1 | ...... | 1450-4 | None |
| Final confirmation date data | YYMMDDHMS | YYMMDDHMS | ...... | YYMMDDHMS | YYMMDDHMS |

F I G. 23

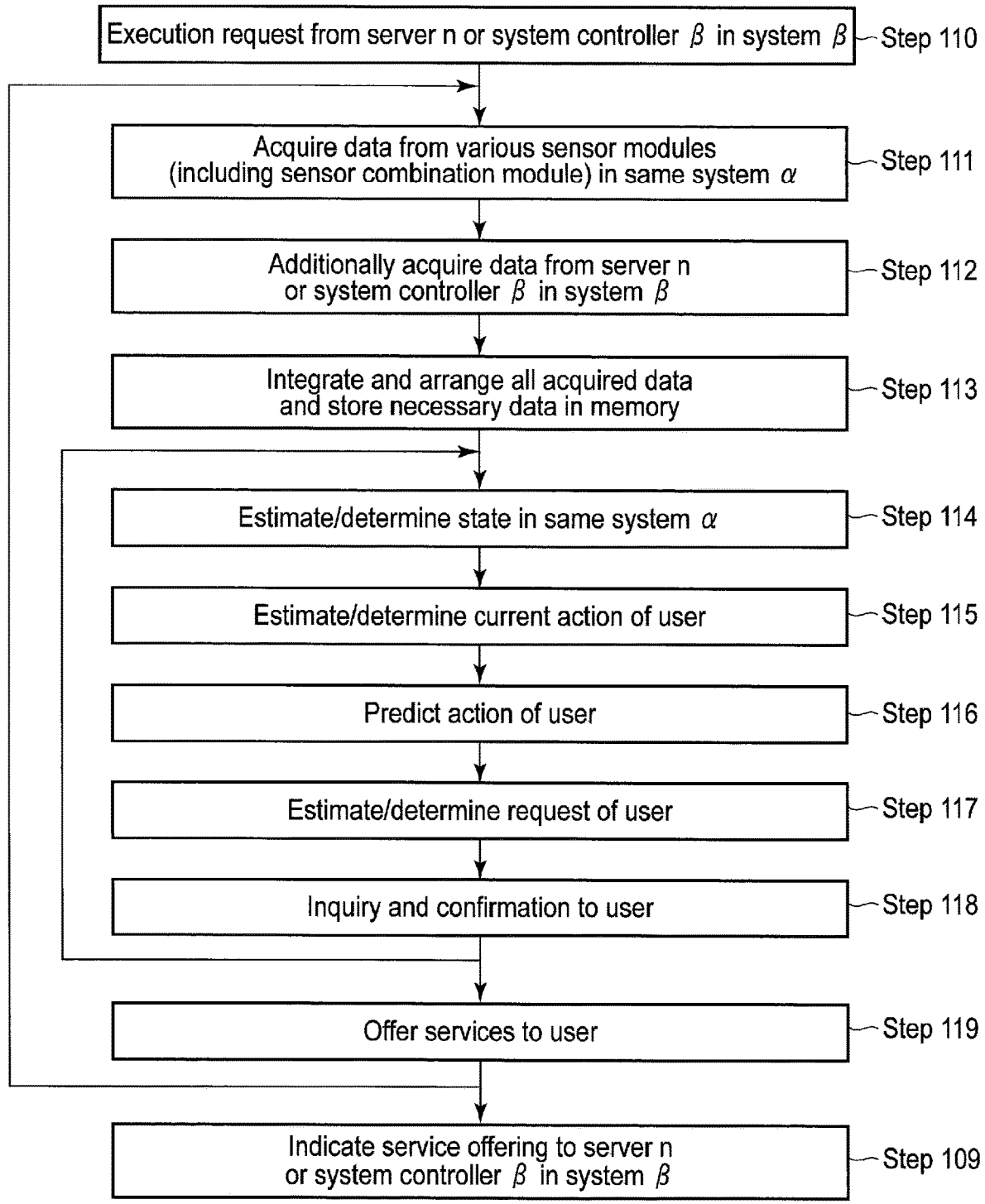
F I G. 26A

FIG. 27

| | | State item | | | User action item | | | User request item | | |
|---|---|---|---|---|---|---|---|---|---|---|---|
| | | State α | State β | ... | Action α | Action β | ... | Request α | Request β | ... |
| 1250-1 Device | State A | 80 | ... | ... | 25 | 64 | ... | 98 | -46 | ... |
| | State B | ... | -32 | ... | 11 | 5 | ... | ... | 22 | ... |
| | ... | ... | ... | ... | ... | ... | ... | ... | ... | ... |
| 1460-5 Sensor combination module | | 57 | ... | ... | ... | -5 | ... | 84 | ... | ... |
| | ... | ... | ... | ... | ... | ... | ... | ... | ... | ... |

2320 — State item
2340 — User action item
2360 — User request item

| Elapsed time 2310 | Device 1250-1 | | ... | Sensor combination module 1460-5 | | State probability 2330 | Action probability 2350 | Request probability 2370 |
|---|---|---|---|---|---|---|---|---|
| | Section | State A | ... | Section | Sensor data | State α | Action α | Request α |
| t1 | 2 | ON | ... | 2 | Present | 87% | 3% | 2% |
| t2 | 2 | ON | ... | 2 | Present | 79% | 7% | 6% |
| t3 | 2 | ON | ... | 2 | Present | 91% | 4% | 4% |
| t4 | 2 | ON | ... | 5 | None | 52% | 87% | 98% |
| t5 | 2 | ON | ... | 5 | None | 48% | 23% | 92% |

F I G. 28

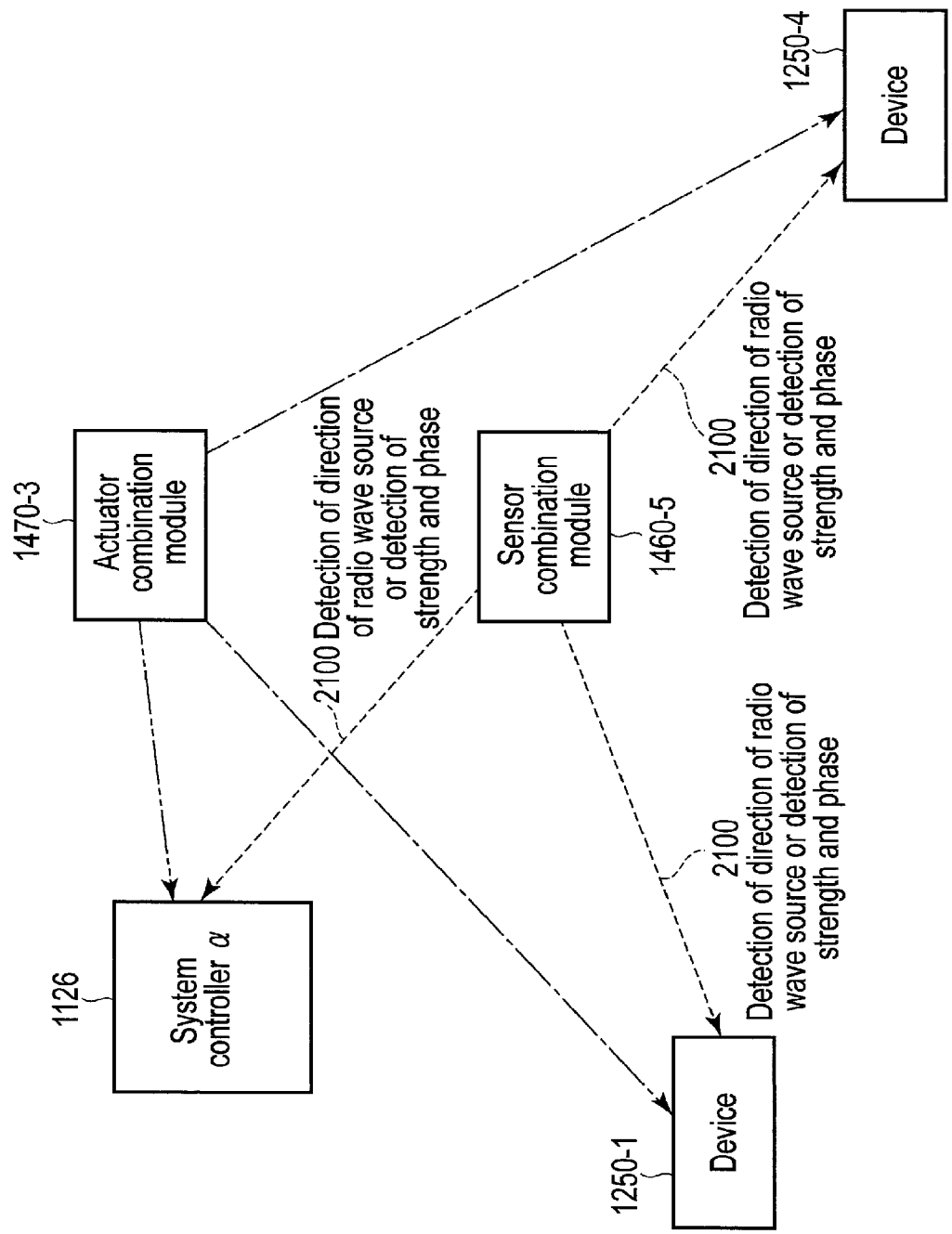
F I G. 31

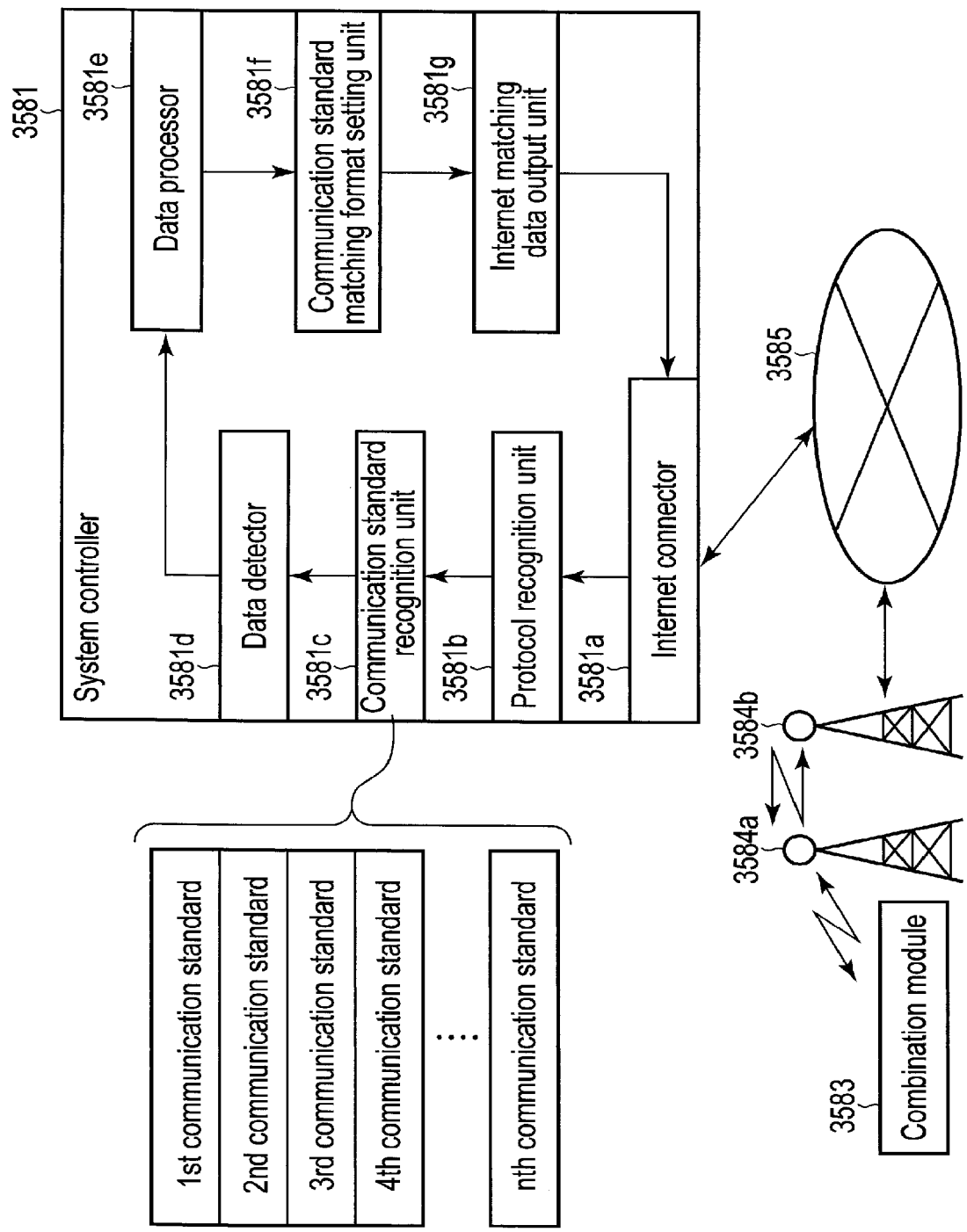
F I G. 36A

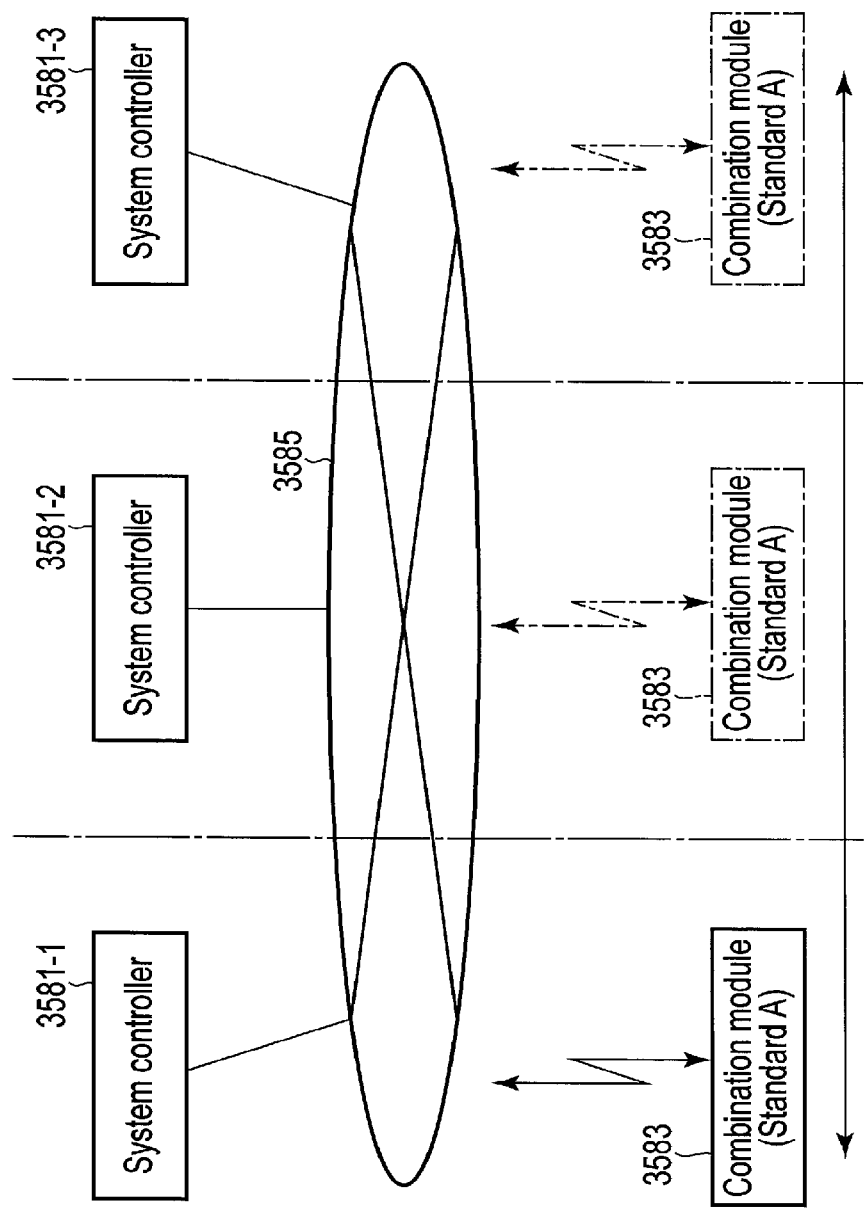
F I G. 36B

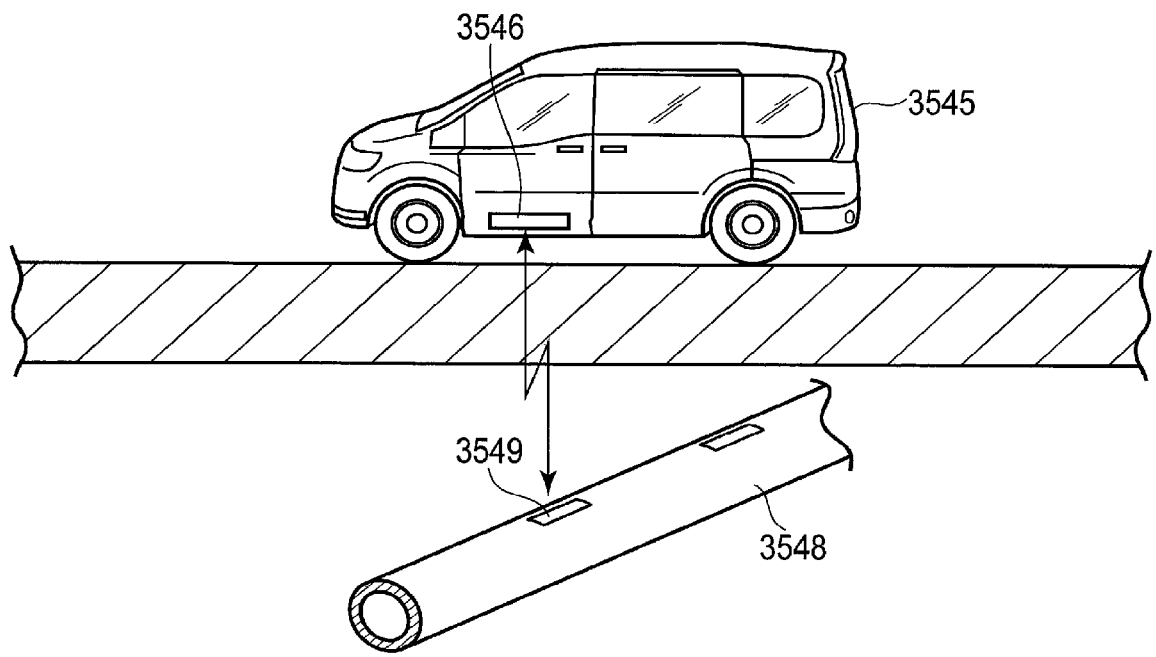
F I G. 37E
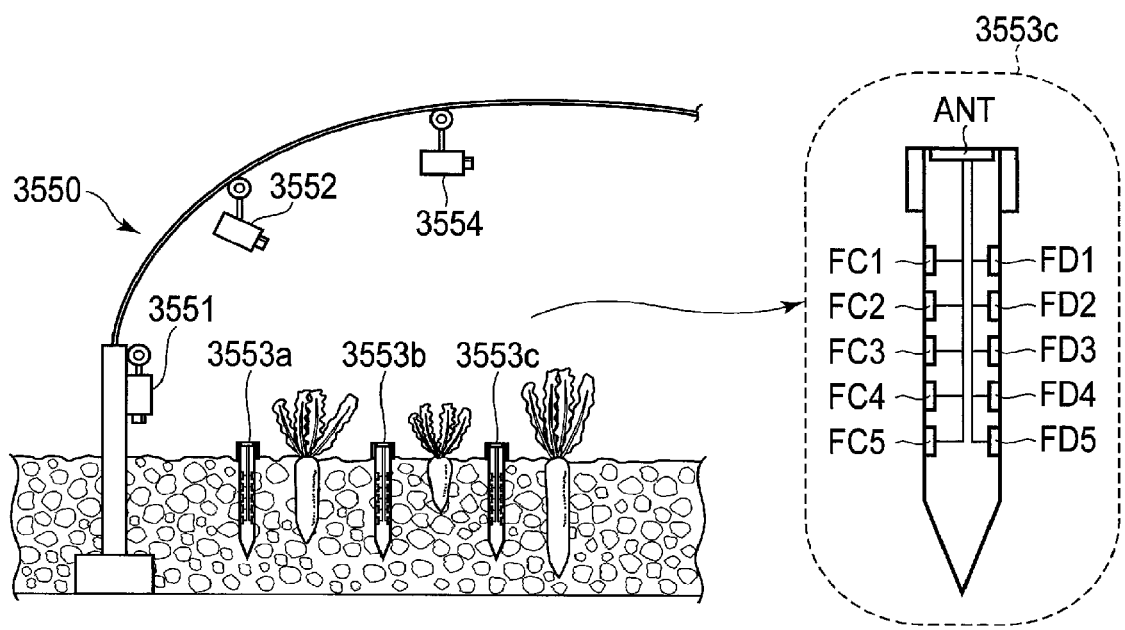
F I G. 37F

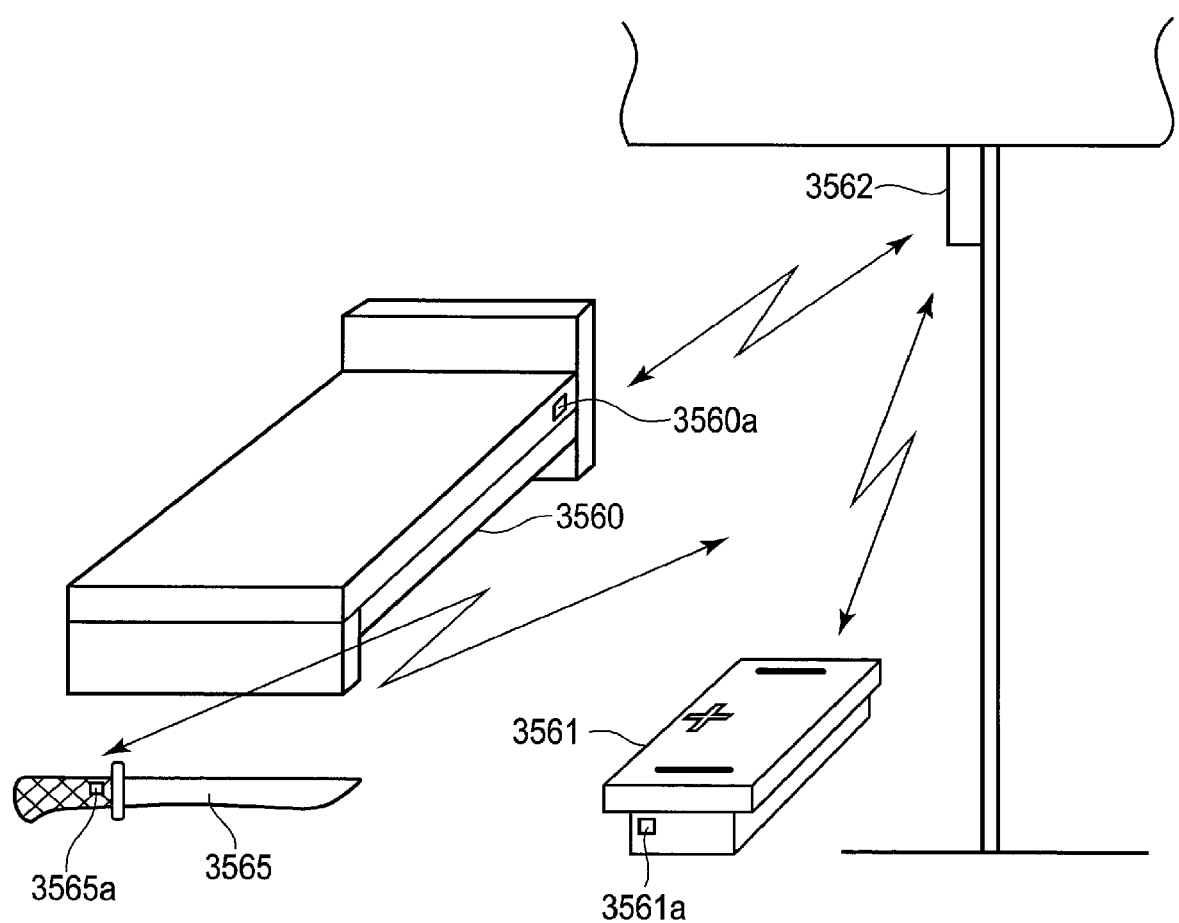
F I G. 37G

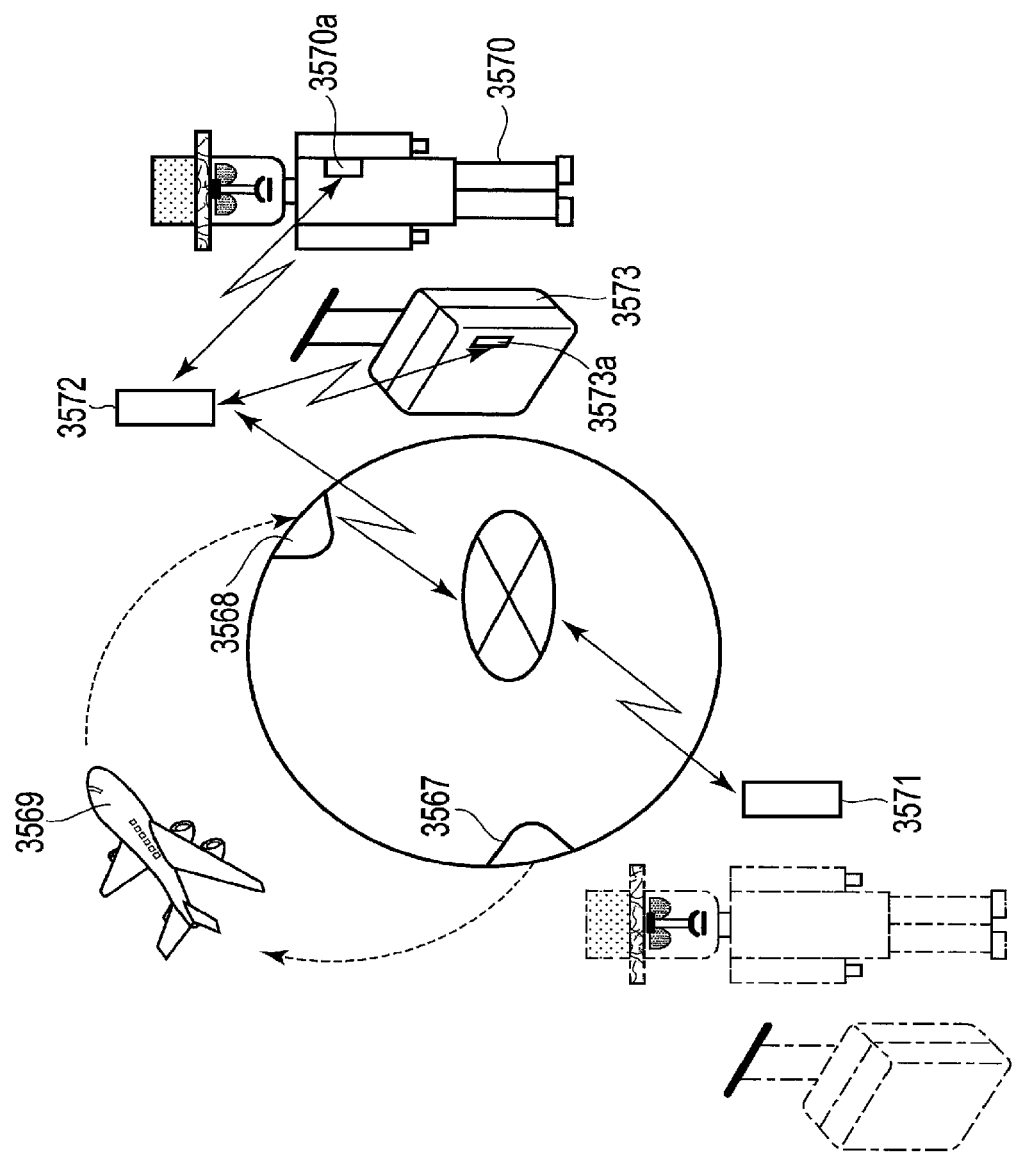
F I G. 37H

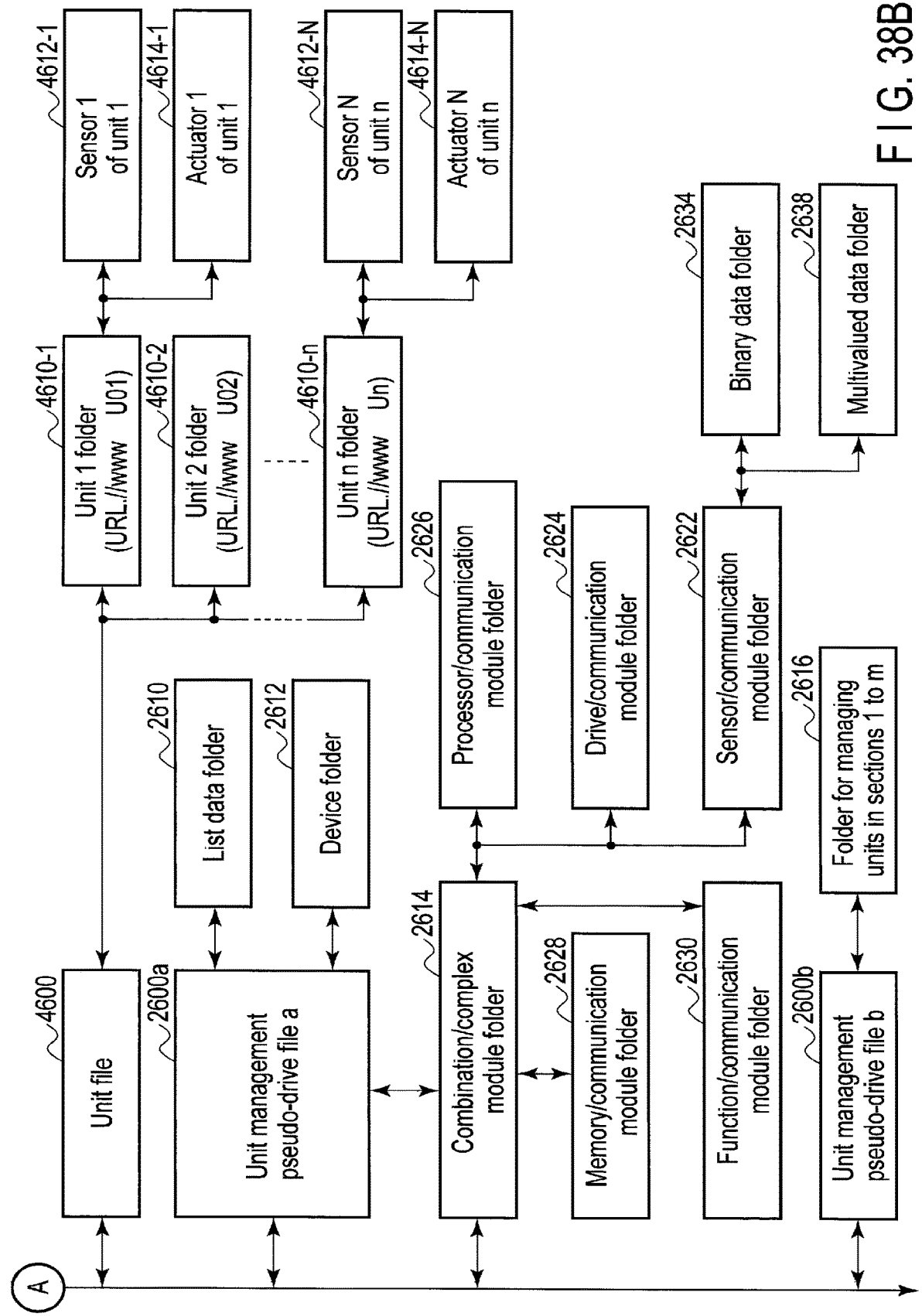
F I G. 38B

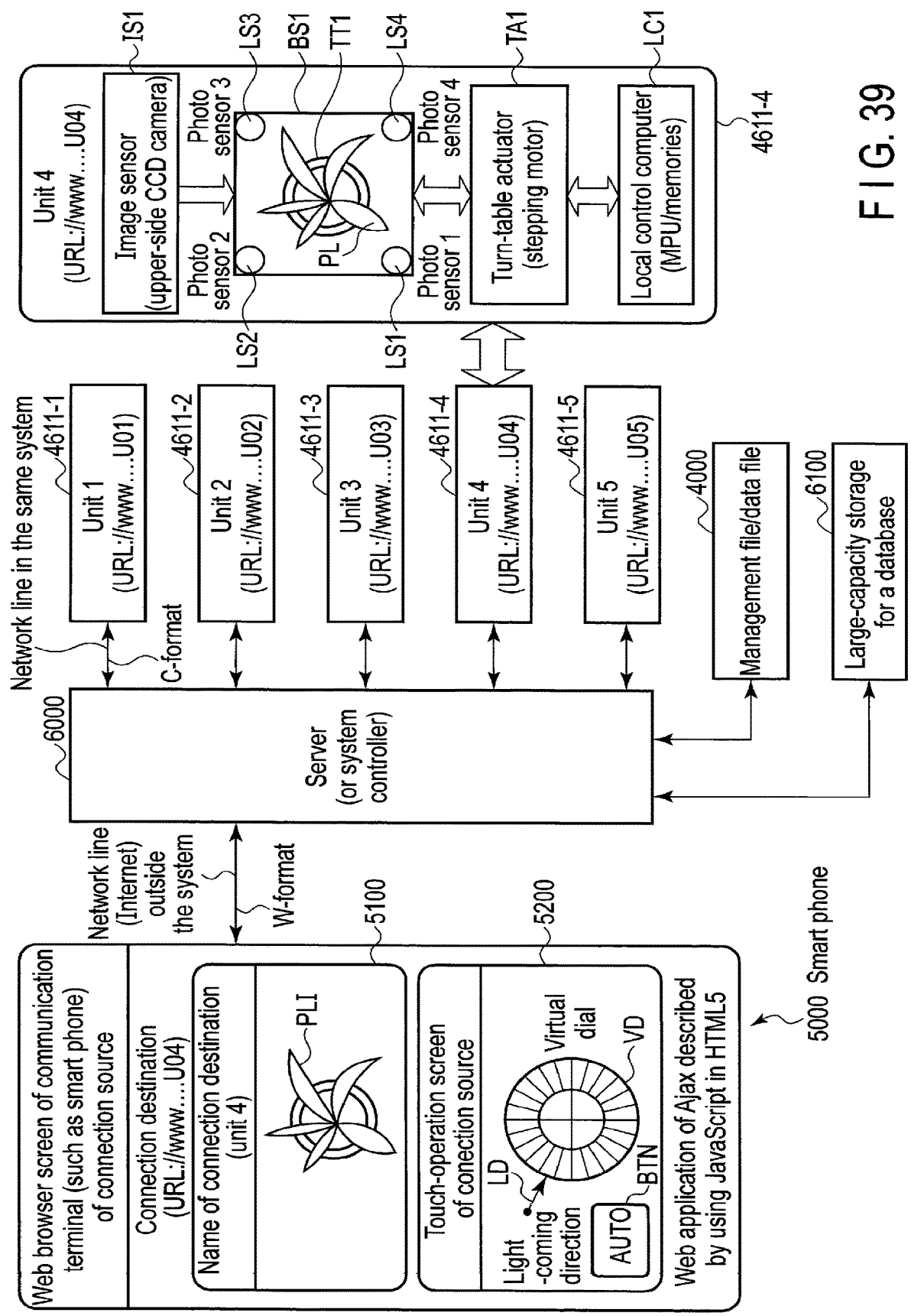
F I G. 39

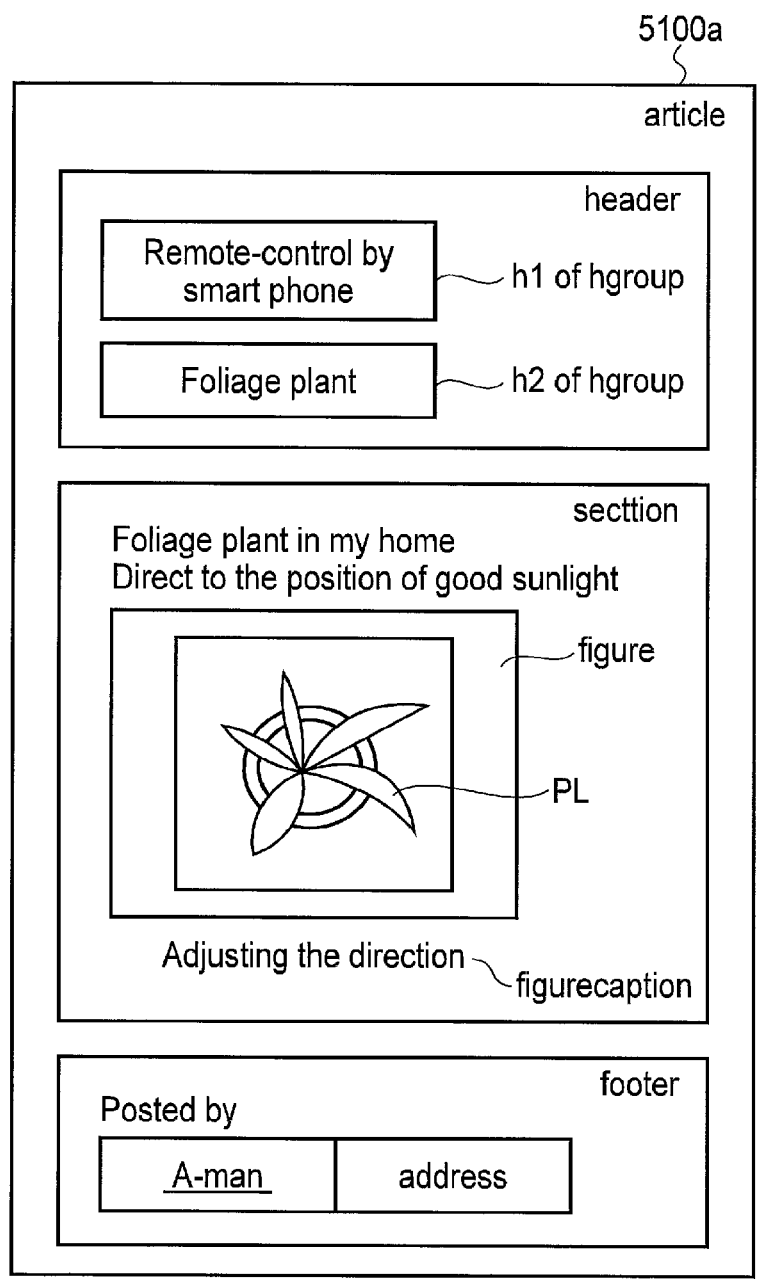
F I G. 40

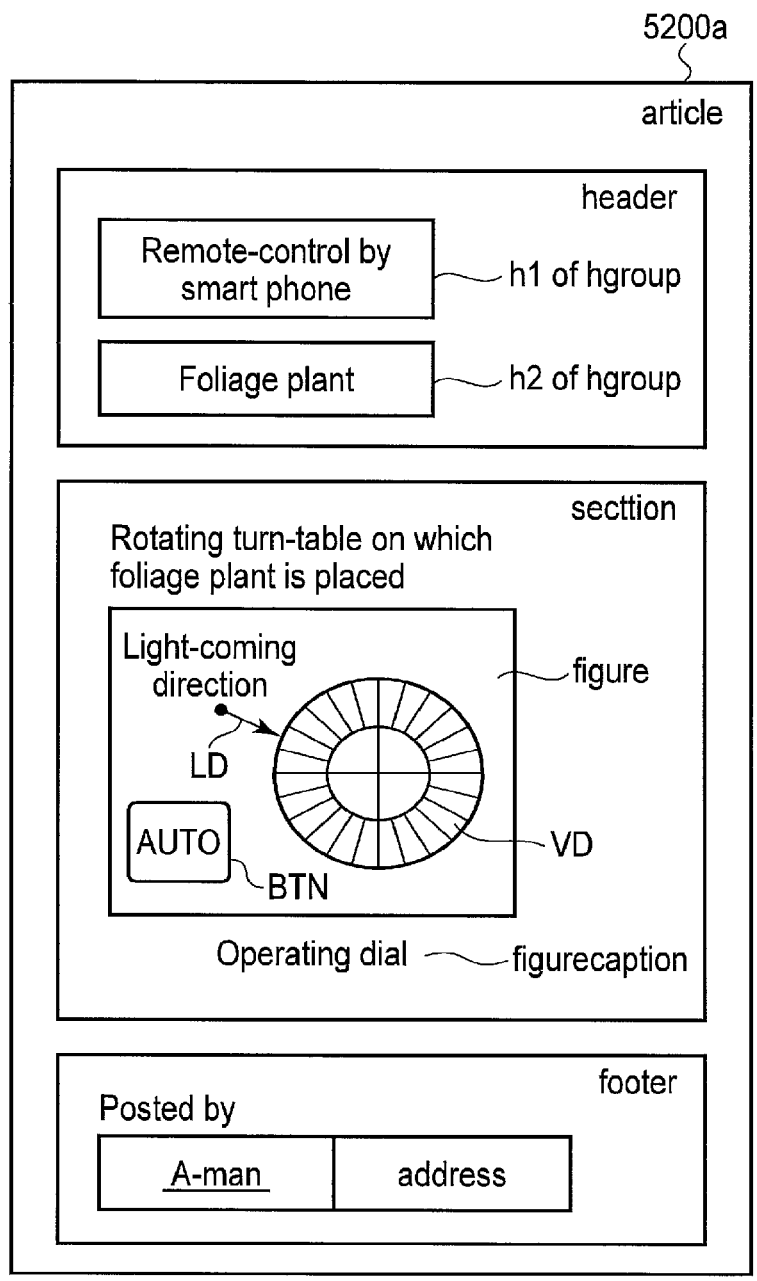
F I G. 41

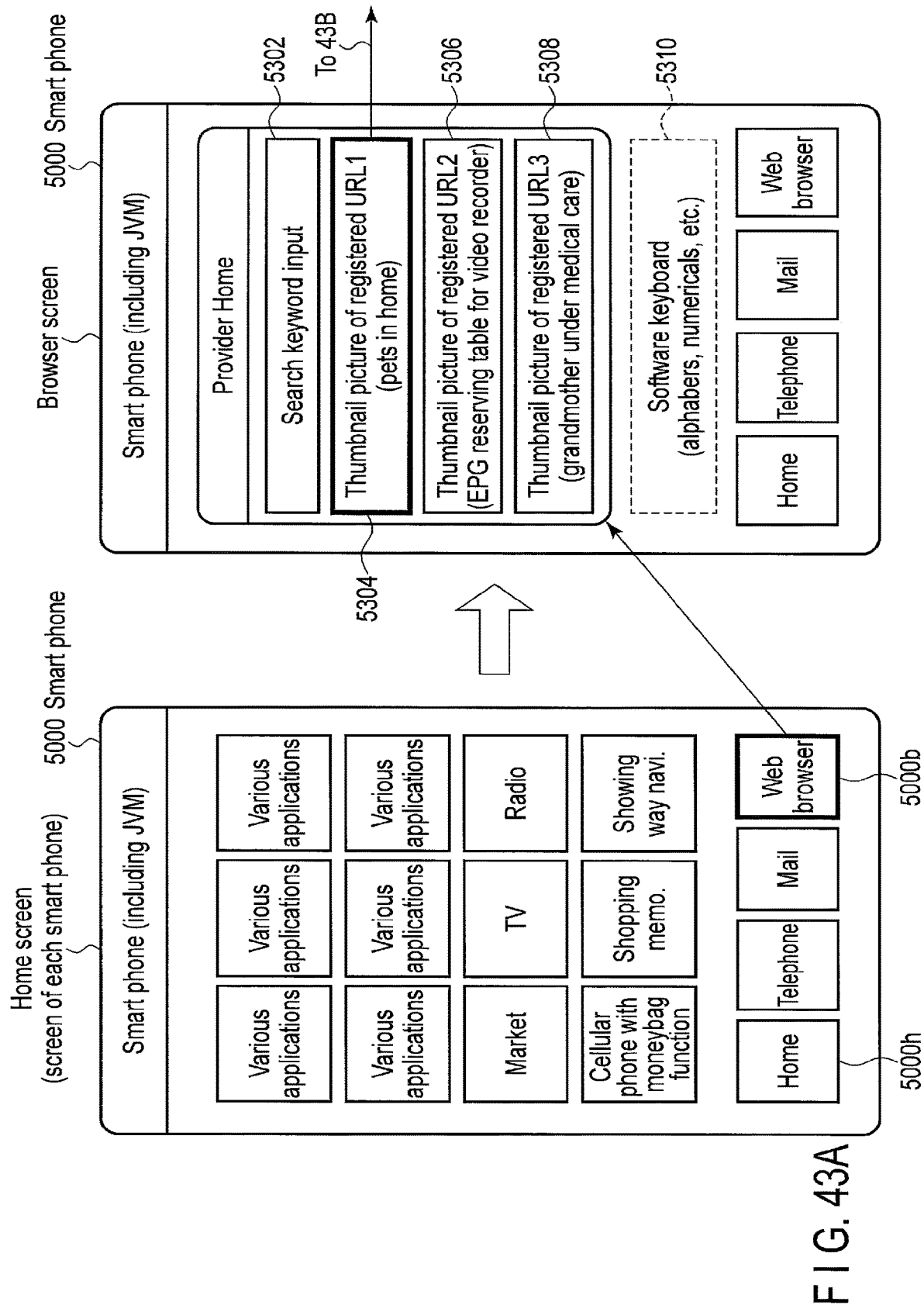
F I G. 43A

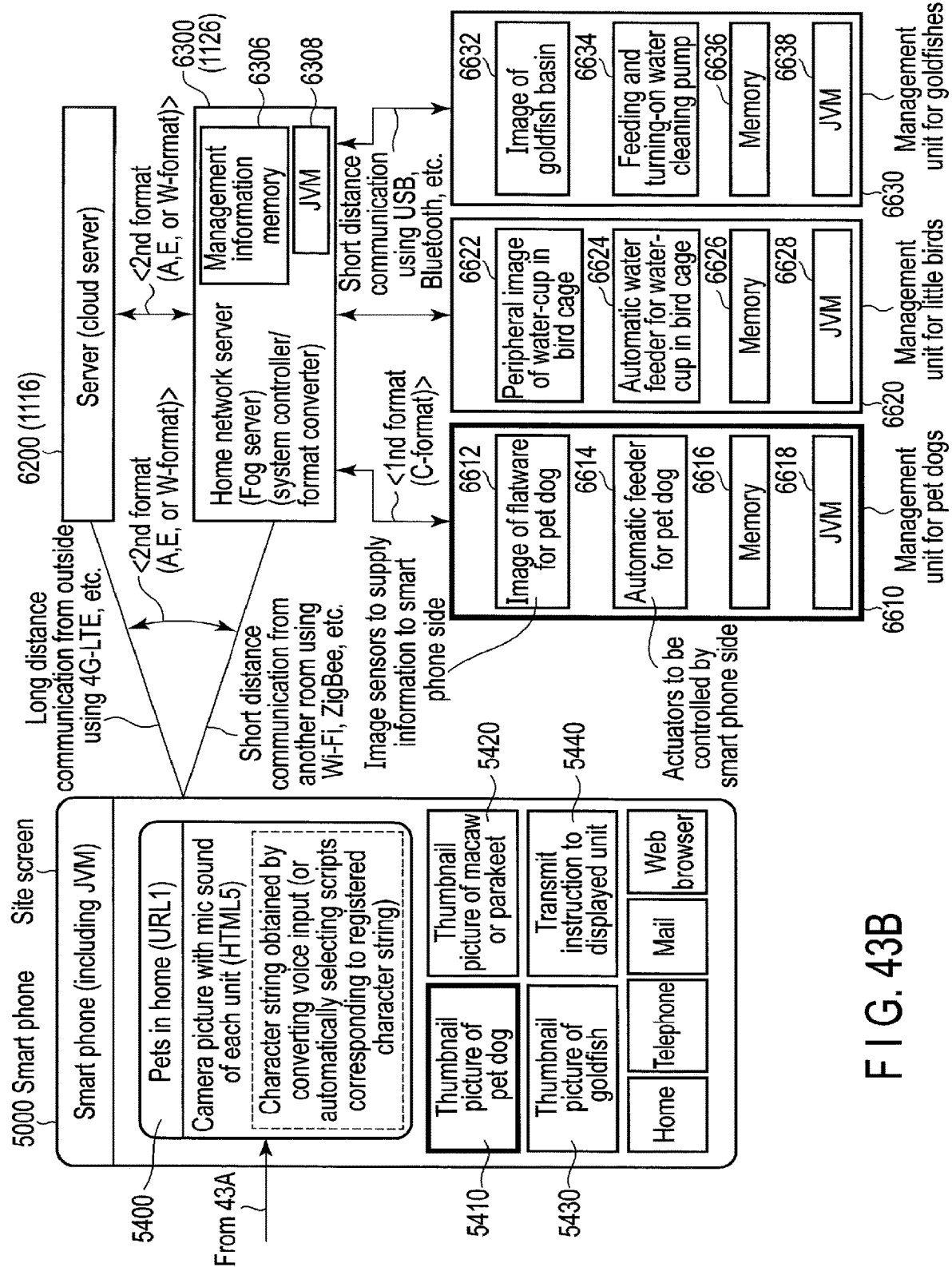
F I G. 43B

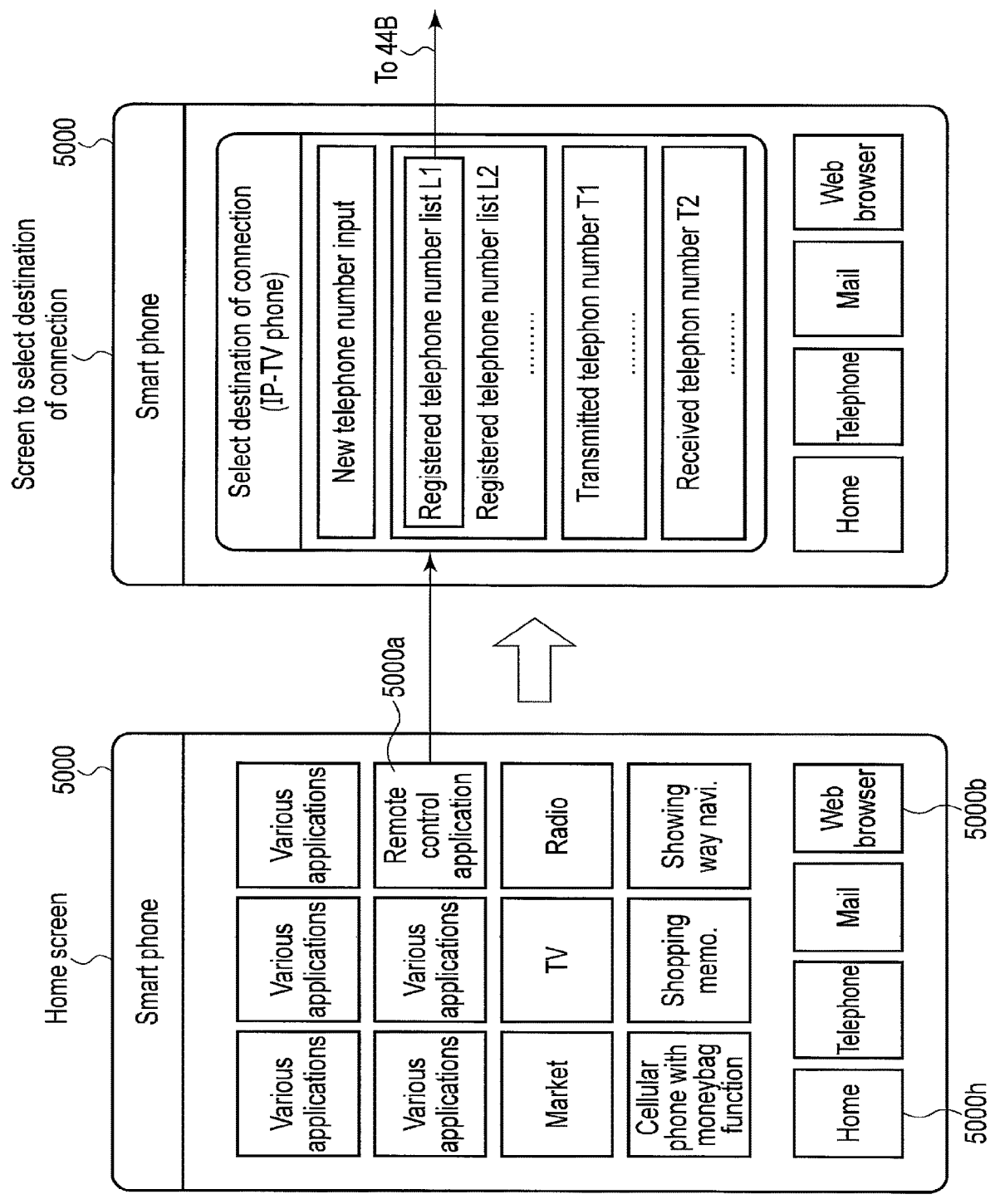
F I G. 44A

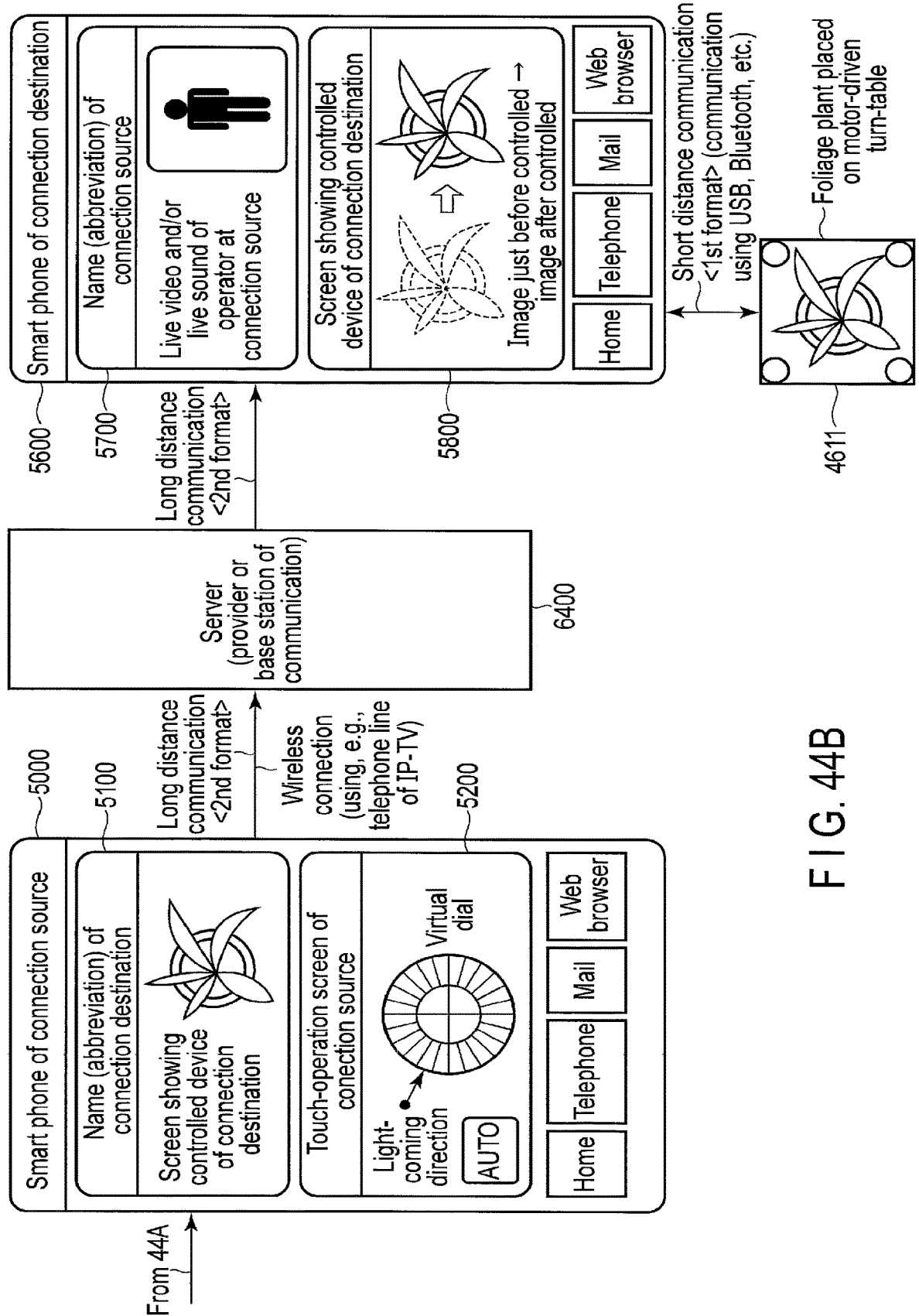
F I G. 44B

INFORMATION PROCESSING APPARATUS OR INFORMATION COMMUNICATION TERMINAL, AND INFORMATION PROCESSING METHOD

CROSS REFERENCE TO RELATED APPLICATIONS

This application is a Continuation application of PCT Application No. PCT/JP2015/077540, filed Sep. 29, 2015, the entire contents of which are incorporated herein by reference.

FIELD

Embodiments described herein relate generally to a technology to acquire data using various sensors installed in public and/or domestic facilities and/or to control various items based on the acquired data, namely, a machine-to-machine (M2M) applied technology or an Internet of Things (IoT) applied technology. In the following description when the term IoT is used singularly, this term may include meaning of the M2M as the case may be.

BACKGROUND

The global standardization of the M2M or IoT applied technology is now in progress. An aim of this standardization is to determine a universal standard to collect and/or manage data obtained from various sensors comprehensively and/or use results from the data in various services.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows a wide-area network structure of a system of a present embodiment.

FIG. 2 shows a local network structure of the system of the present embodiment.

FIG. 3A shows a unit model (1).

FIG. 4A shows an example of combination module (1).

FIG. 4B shows an example of combination module (2).

FIG. 4F shows an example of combination module (6).

FIG. 6A shows a first example of a specific internal structure of an actuator combination module.

FIG. 6B shows a second example of a specific internal structure of the actuator combination module.

FIG. 6C shows a third example of a specific internal structure of the actuator combination module.

FIG. 6D shows a fourth example of a specific internal structure of the actuator combination module.

FIG. 7B shows another example of the specific structure within the communication module.

FIG. 8A shows another example of a local network structure.

FIG. 8B shows a different example of the local network structure.

FIG. 9 shows a variation of the local network structure.

FIG. 11 shows a data structure transmitted through a network in the present embodiment.

FIG. 12B shows details of IEEE extension address of the present embodiment.

FIG. 13 shows a data structure in an IPv6 header.

FIG. 14 shows a communication middleware data structure of C-format.

FIG. 15A shows a communication middleware data structure of E-format.

FIG. 15B shows a communication middleware data structure of A-format.

FIG. 16 shows a variation of the basic structure of application/communication layer.

FIG. 17B shows another example (2) of the structure of application/communication layer.

FIG. 18A shows an example of computer system constitution including a device driver.

FIG. 18B shows a present embodiment regarding a computer system constitution including a management/control area of in-system unit.

FIG. 19B shows an example of software constitution indicating management/control method in the in-system unit.

FIG. 20 shows a comparison between a conventional file system and a unit management method of the present embodiment.

FIG. 21A shows a display example indicating hierarchic configuration controlled by a virtual management drive for managing units.

FIG. 21B shows a display example indicating an internal configuration of a combination module folder.

FIG. 23 shows an example of an address table managed in the system of the present embodiment.

FIG. 26A shows a basic process flow in a system controller.

FIG. 27 shows an estimation/determination method of the present embodiment.

FIG. 28 shows an example of time-dependent changes in communication data.

FIG. 31 shows a position monitoring method of each device and/or combination module.

FIG. 36A shows an example of application of a combination module in different middleware layers.

FIG. 36B shows an example of application of a combination module in different systems.

FIG. 37E shows still another example of application of the combination module.

FIG. 37F shows still another example of application of the combination module.

FIG. 37G shows still another example of application of the combination module.

FIG. 37H shows still another example of application of the combination module.

FIG. 38B shows another file management configuration for management files and data files used in one embodiment.

FIG. 39 shows an example of remote-controlling via Internet a specific unit under file management.

FIG. 40 shows an example of a Web page including an image of the object to be remote-controlled.

FIG. 41 shows an example of an operation screen for remote-controlling the operation target by using a Web page.

FIG. 43A shows an example of remote-controlling a specific operation target within a plurality of operation targets connected to a receiver-side network, wherein a communication terminasu such as a smart phone is used for the transmitter-side information control.

FIG. 43B further shows an example of remote-controlling a specific operation target within a plurality of operation targets connected to a receiver-side network, wherein a communication terminasu such as a smart phone is used for the transmitter-side information control.

FIG. 44A shows an example of remote-controlling a specific operation target using smart phones at the operation information transmitter-side and at the operation information receiver-side.

FIG. 44B further shows an example of remote-controlling a specific operation target using smart phones at the operation information transmitter-side and at the operation information receiver-side.

DETAILED DESCRIPTION

Figure 3B:
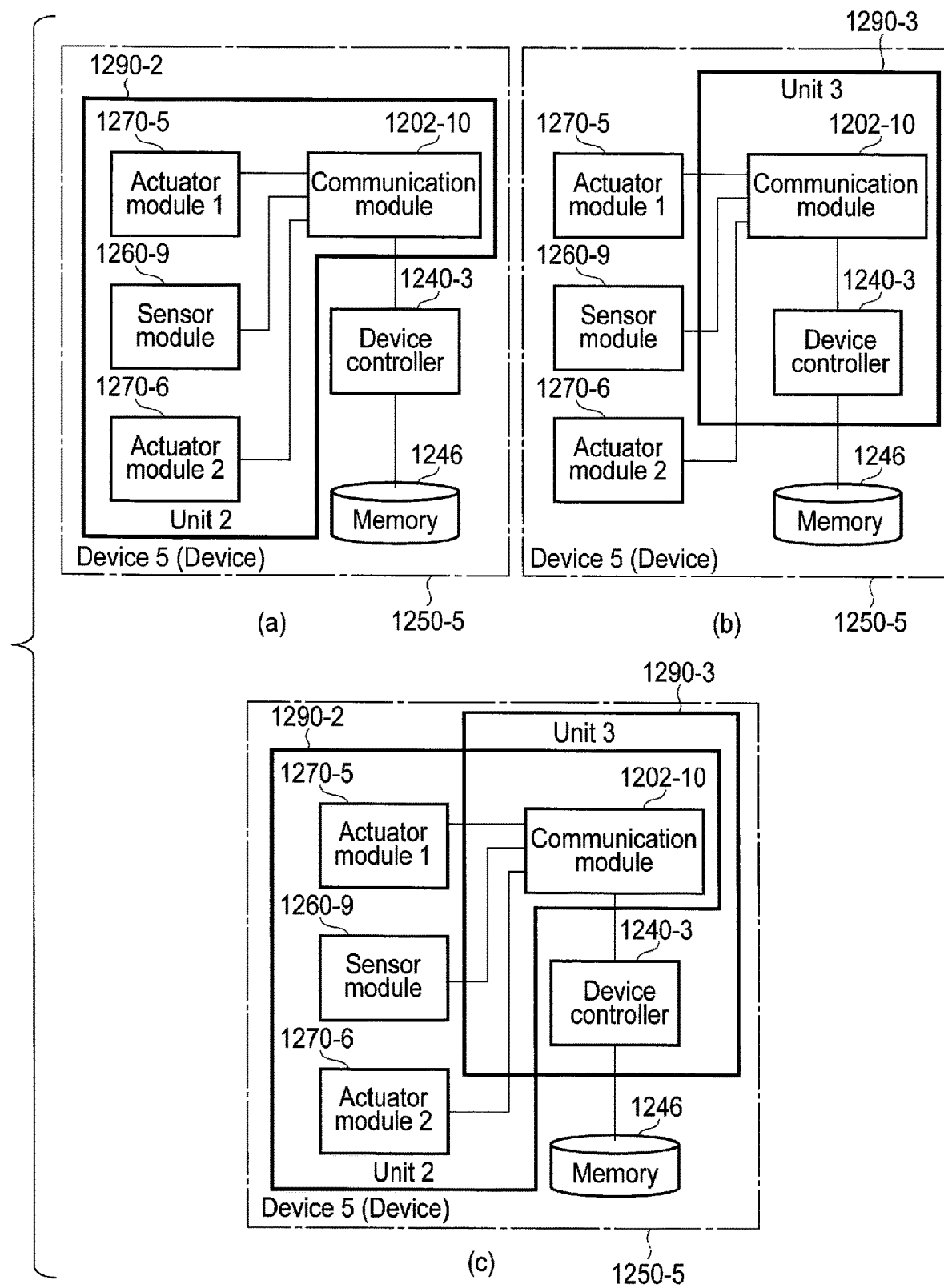
FIG. 3B shows a unit model (2).

Various embodiments will be described hereinafter with reference to the accompanying drawings.

In general, according to one embodiment, an information processing apparatus (such as a smart phone) according to an embodiment may be used with a network including one or more units (IoT devices) each comprising a sensor and/or actuator. The information processing apparatus is connectable to any of the units. The information processing apparatus is configured to use one or more computer programs (written in programming languages such as JAVASCRIPT and JAVA) each for controlling the sensor and/or actuator of the one or more units being connected to the information processing apparatus. In the embodiment a library (standard (or default) library/user-defined library) is provided, where the library includes one or more classes each describing a method to control the sensor and/or actuator of the one or more units. The computer program can be created by a combination of one or more classes obtained from the library. The information processing apparatus is configured to control the sensor and/or actuator of the one or more units according to the created computer program.

According to another embodiment, a mark-up language (such as HTML5 or its future version) used in Internet communication is configured to mark up JavaScript and/or a code of Java. Information display corresponding to the elements (described contents) of the mark-up language (HTML) may be performed by using a Web browser of an information communication terminal (such as a smart phone, tablet, personal computer, digital TV with Internet connectability).

Embodiments will be hereinafter described with reference to the accompanying drawings. The description of embodiments of the present application may be separated into the following chapters and sections.

Chapter 1 System Overview of Present Embodiment

Section 1.1 Overview of Entirety of System of Present Embodiment

Section 1.2 Explanation of Units

Section 1.3 Internal Structure of Combination Module

Section 1.4 Internal Structure of Sensor Combination Module

Section 1.5 Internal Structure of Actuator Combination Module

Section 1.6 Example of Internal Structure of Communication Module

Section 1.7 Explanation of Whole Structure of Wide Area Network System of Embodiment Section 1.8 Explanation of Local Network System Structure of Embodiment Section 1.9 Example of Use of Combination Modules in Local Network System Chapter 2 Outline of Hierarchy of Communication Data and Data Structure Section 2.1 Hierarchy of Network Communication Related Function of Present Embodiment Section 2.2 Relationship Between Hierarchy of Communication Related Functions and Communication Data on Network Line Section 2.3 Data Structure of Z-format in Physical Layer and Media Access Layer Section 2.4 Data Structure of Internet Protocol Version 6 Layer Section 2.5 Data Structure of C-format in Communication Middleware Layer Section 2.6 Data Structure of E-format in Communication Middleware Layer Section 2.7 Data Structure of A-format in Communication Middleware Layer Section 2.8 Address Table Used in System of Present Embodiment and Example of Use Thereof Chapter 3 Management/Display Method for Each Unit Section 3.1 Outline of Basic Unit Management Method Section 3.2 Unit Management Means Section 3.3 Specific Unit Management Example and Display Example Chapter 4 Outline of Section in System of Present Embodiment Section 4.1 Position of Section in System of Present Embodiment Section 4.2 Method of Managing Position in Section of Various Modules or Devices Section 4.3 Processing Method from Data Acquisition to Service Offering for Each Section Section 4.4 Method of Tracking Movement between Sections in Various Modules or Devices Section 4.5 Adaptability between Different Systems in Unit (Combination Module or Device)

Chapter 5 Examples of Various Applicable Fields

Section 5.1 Examples of Application to Consumer Electronics Technology

Section 5.1.1 Example of Application of Wide Area Network System to Consumer Electronics Technology Section 5.1.2 Examples of Application of Combination module to Consumer Electronics Technology Section 5.1.3 Example of Application of Section Division Method to Consumer Electronics Technology Section 5.2 Example of Application to Social infrastructure Field Section 5.2.1 Example of Application 1 of Wide-area Network System to Social infrastructure Field Section 5.2.2 Examples of Application of Combination module to Social Infrastructure Field Section 5.2.3 Example of Application of Section Division Method to Social Infrastructure Field Section 5.3 Example of Application to Health Care Field Section 5.3.1 Example of Application of Wide Area Network System to Health Care Field Section 5.3.2 Example of Application of Combination module to Health Care Field Section 5.3.3 Example of Application of Section Division Method to Health Care Field Chapter 6 Java/JavaScript According to the above table of contents, each part/chapter is described hereinafter.

Chapter 1 System Overview of Present Embodiment

Section 1.1 Overview of Entirety of System of Present Embodiment

Firstly, an overview of the system entirety of the present embodiment will be described with reference to FIGS. 1 and 2. FIG. 1 shows the entire structure of a wide-area network system in the system entirety of the present embodiment. FIG. 2 shows a local network system which is a component of the wide-area network system. Furthermore, details, services and novel advantages those are described with reference to FIG. 1 are as-is applied to the system of FIG. 2. Similarly, details, services, and novel advantages those are described with reference to FIG. 2 (or later described with reference to FIGS. 8A, 8B, and 9) are applied to the whole wide-area network system of FIG. 1.

In FIG. 1, a management agency and organization dealing in specific items and data are referred to as wholesale firms A_1102, B1_1104-1, and B2_1104-2. Furthermore, an organization and group providing specific service are referred to as service providers A_1112-1 to C_1112-3. Each of service providers A_1112-1 to C_1112-3 has one or more servers 1_1116-1 to n_1116-*n*. Furthermore, in the system of the present embodiment, servers 1_1116-1 to n_1116-*n* may be referred to as cloud servers or a cloud. Service providers A_1112-1 to C_1112-3 acquire items (or data) from wholesale firm B1_1104-1 and/or wholesale firm B2_1104-2 dealing in similar items (or data) and provide each of domains 1_1122-1 to 3_1122-3 with services. Domains 1_1122-1 to 3_1122-3 indicate specific network spaces, and one domain 2_1122-2 is composed of one or more systems $\alpha$_1132 and $\beta$_1134. Here, in the description hereinafter, systems $\alpha$_1132 and $\beta$_1134 may be referred to as a network system or a client system. Therefore, the terms "network system" and "client system" appearing in the following description may be interpreted as "systems $\alpha$_1132 and $\beta$_1134". Furthermore, as mentioned above, a single domain 2_1122-2 may be composed of different systems $\alpha$_1132 and $\beta$_1134. In the description hereinafter, domain 2_1122-2 may be referred to as a complex client system. Therefore, the term "complex client" appearing in the following description may be interpreted as "domain 2_1122-2".

Here, wholesale firms A_1102, B1_1104-1, and B2_1104-2, service providers A_1112-1 to C_1112-3, and domains 1_1122-1 to 3_1122-3 are connected to each other via a network. Furthermore, the service providers A_1112-1 to C_1112-3 are connected to each other via a network to perform data and resource sharing 1114.

System $\alpha$_1132 shown in FIG. 1 is a minimum network system unit in which internal components are connected to each other via a network. Furthermore, in many cases, one system controller $\alpha$_1126 is disposed in system $\alpha$_1132. System controller $\alpha$_1126 manages or operates the (network) system. Similarly, system $\beta$_1134 which is a minimum network system unit may be composed of a single system controller $\beta$_1128. Furthermore, systems $\alpha$_1132 and $\beta$_1134 constituting the same domain 2_1122-2 may be located physically apart. Furthermore, different systems $\alpha$_1132 and $\beta$_1134 in the same domain 2_1122-2 can operate cooperatively.

In the system of the present embodiment, predetermined service units to be provided to users in system $\alpha$_1132 may be defined as sections 1_1142-1 to m_1142-*m*. Furthermore, units used to unify, manage, and control the data acquired in system $\alpha$_1132 may be defined as sections 1_1142-1 to m_1142-*m*. And the same section of 1-*m*_1142-1-*m* may be used as both the service unit and the data unification/management/control unit. When service provision, data acquisition, and data management are performed by each unit of the sections 1_1142-1 to m_1142-*m*, efficiency in the service provision, data acquisition, and data management are improved and user convenience is thus improved.

FIG. 2 shows the local network system structure formed in system $\alpha$_1132 of FIG. 1. System controller $\alpha$_1126 includes a processor 1230 and a memory 1232, and network communication is performed in system $\alpha$_1132 via the communication module 1202-3. Furthermore, in parallel, system controller $\alpha$_1126 can perform network communication between external devices via the communication module 1202-3.

In the system of the present embodiment, basic units having a network communication function other than system controller $\alpha$_1126 in the network system $\alpha$_1132 are defined as units 1_1290-1 to 7_1290-7. Furthermore, in the present embodiment, these units 1_1290-1 to 7_1290-7 are dispersed in network system α_1132, and these units 1_1290-1 to 7_1290-7 having various functions are treated as managed units or controlled units. And using the units managed and/or controlled, various functions in the same network system α_1132 can easily be managed/controlled though each of the units may have each of various physical forms. As shown in FIG. 2, each of units 1_1290-1 to 7_1290-7 includes each of communication modules 1202-4 to 1202-10 to achieve a network communication function. Instead of the communication modules 1202-4 to 1202-10, the network communication function may be provided with a part of a specific module or with a part of a device to achieve the network communication function. Furthermore, the network communication function may be achieved as a part of functions of specific software.

In the system of the present embodiment, the system controller α_1126 basically performs management/operation/control of the network communication in the network system α_1132. In many cases, system controller α_1126 may be physically disposed in the network system α_1132 as shown in FIG. 2. However, as described later with reference to FIG. 9, system controller β_1128 physically disposed outside the network system α_1132 may perform management/operation/control of the network communication in the network system α_1132. And in that case, units 1_1290-1 to 7_1290-7 can individually perform data communication directly with system controller α_1126 or β_1128. Instead of the direct communication with system controller α_1126 or β_1128, units 1_1290-1 to 7_1290-7 may individually perform data communication with each other under the control of system controller α_1126 or system controller β_1128.

Section 1.2 Explanation of Units

In the previous section, it has been described that various predetermined functions dispersed in system α_1132 are managed and controlled on the basis of unit by system controller α_1126. As shown in FIG. 2, a large number of function achieving means are dispersed in the single network system α_1132, so that, up to the present, collective management and control of these means have been performed with great complexity. Moreover, there is a wide variety of physical forms of the units used to achieve the functions, including devices 1250, combination module 1295 (described in Section 1.3), sensor module 1260, and actuator module 1270, for example. Therefore, the collective management and control of the means are performed with greater complexity.

As a countermeasure to the complexity, a wide variety of function achieving means dispersed in the network system α_1132 are managed/controlled as units with reference to network communication function (using network communication function achieving means of each unit as a basic unit) in the system of the present embodiment. And a single function or a collection of various functions which is achievable in cooperation with a minimum network communication function is interpreted as a unit which is a common and generalized concept. Furthermore, as described above, units can individually be formed in various physical forms; however, management/control/data acquisition are performed using a common/generalized unit as a basic unit regardless of specific physical forms. Since a unit which does not depend on individual functions or physical forms in the network system α_1132 is defined as a management unit (or control/data acquisition unit), the management, control, and data acquisition within the network system α_1132 by system controller α_1126 or system controller β_1128 can be simplified significantly. Note that specific examples of management/control using a unit are described in Chapter 3.

As a specific physical form example of a unit, the entirety of device 1_1250-1 may be related to unit 4_1290-4, and independent combination modules 1_1295-1 and 7_1295-7 may be related to unit 1_1290-1 and 7_1290-7 as shown in FIG. 2. Furthermore, combination modules 6_1295-6, 2_1295-2, and 3_1295-3 which are part of device 2_1250-2 and device 5_1250-5 may be related to units 6_1290-6, 2_1290-2, and 3_1290-3. Here, unit 2_1290-2 and unit 3_1290-3 may overlap each other at the part of communication module 1202-10 as in FIG. 2. As can be understood from this point, in the present embodiment, partial overlap in different units 2_1290-2 and 3_1290-3 may be acceptable. Furthermore, an inclusion relationship between different units (one unit completely encompassed by a different unit) may be adopted.

Following to a specific example of FIG. 2, possible forms of the units are explained with reference to FIG. 3A. In the unit form of FIG. 3A (a), a device 1250 having a network communication function corresponds to a single unit 1290. If device 1250 has multiple complex functions, unit 1290 is handled as a basic unit having the multiple complex functions as well and its management, control and data acquisition are performed in the network system α_1132.

On the other hand, as shown in FIG. 3A (b), a combination module 1295 (which will be described in Section 1.3) independently existing in the network system α_1132 may be related to a single unit 1290. Or, as another management model (control data acquisition unit form), a specific device 1250 (which may or may not have a network communication function independently) with a certain combination module 1295 added thereto may be regarded as a single unit 1290 as shown in FIG. 3A (c).

Unit forms defined within device 5_1250-5 in FIG. 2 are explained with reference to FIG. 3B for better understanding. As shown in FIG. 3B, a single sensor module 1260-9 having a sensor function, and two actuator modules 1_1270-5 and 2_1270-6 having different actuation or operation functions are stored in device 5_1250-5. Furthermore, a communication module 1202-10 having a network communication function to perform network communication with system controller α_1126 in the network system α_1132 is also stored. And a device controller 1240-3 is provided with device 5_1250-5 to control operations of the modules collectively and to collectively acquire and manage status data of the modules and sensor data obtained therefrom. Here, the data acquired or generated independently by device controller 1240-3 can be stored in a memory 1246.

As mentioned above, as basic units for suitable management, control, and data acquisition in the network system α_1132, system controller α_1126 or system controller β_1128 can flexibly set (define) unit forms (as a unit 2_1290-2 or a unit 3_1290-3). For example, if system controller α_1126 or system controller β_1128 needs to control individual sensor functions and actuation (operation) functions within device 5_1250-5 or to acquire data via a network (that is, via the communication module 1202-10), unit 2_1290-2 may be defined (set) as shown in FIG. 3B (a). In that case, unit 2_1290-2 is composed of the sensor module 1260-9, two actuator modules 1_1270-5 and 2_1270-6, and communication module 1202-10. Thus, system controller α_1126 (or system controller β_1128) can perform detailed control with respect to each module in unit 2_1290-2.

In contrast, as FIG. 3B (b) shows, a unit 3_1290-3 is composed of the communication module 1202-10 and device controller 1240-3 alone. Therefore, when system controller α_1126 (or system controller β_1128) perform data communication with unit 3_1290-3, sophisticated control of and data acquisition as to the entirety of device 5_1250-5 are collectively performable. As a result, unlike the data communication with unit 2_1290-2, detailed data communication processes with respect to individual modules are not required in the data communication with unit 3_1290-3. Therefore, if unit 3_1290-3 is set (defined), the process in system controller α_1126 (or system controller β_1128) is greatly simplified and the process efficiency is improved. As can be understood from the above, if the form (structure) of unit 1290 is changed, the communication data content between system controller α_1126 (or system controller β_1128) and unit 1290 is also changed.

Note that a unit may have a certain function achieved in cooperation with a minimum network communication function. Therefore, a minimum network communication function is provided with each of the units. If the communication module 1202-10 is structured as in FIG. 3B as an example of such a network communication function, the communication module 1202-10 is simultaneously provided within the units. As a result, unit 2_1290-2 and unit 3_1290-3 overlap each other sharing the communication module 1202-10 as shown in FIG. 3B (c).

In conclusion, specific forms in unit 1290 are configured flexibly within the network system α_1132 such that different units can overlap each other while sharing some functions, the freedom of the management (or control or data acquisition) of system controller α_1126 (or system controller β_1128) can be improved.

Section 1.3 Internal Structure of Combination Module

As a form of unit 1295, FIG. 3A (b) shows the structure of combination module 1295. In the present embodiment, a combination module is defined as a module which can perform both a communication function and a function other than the communication function. It is emphasized that the function other than the communication function is achieved with the participation of the communication function. Data communication between the combination module 1295 and external devices (outside the combination module 1295) is performed via the communication function. Therefore, using the communication function of the combination module 1295, data obtained by the combination module 1295 can be acquired from the external devices (from the outside of the combination module 1295) so that the external devices easily gather the data resulted from the specific function belonging to the combination module 1295. On the other hand, using the communication function of the combination module 1295, the specific function of the combination module 1295 can be controlled externally (from the outside of the combination module 1295).

The specific function other than the communication function may be, for example, a sensor function, actuator (or operation) function, control (process) function, memory function, or display function. However, no limitation is intended thereby, and any function other than the communication function may be adopted in a combination module. A combination module having a sensor function is especially referred to as a sensor combination module 1460 and a combination module having an actuation (operation) function is especially referred to as an actuator combination module 1470. Furthermore, a combination module having a control (process) function is referred to as a processor combination module 1465, a combination module having a memory function is referred to as a memory combination module 1475, and a combination module having a display function is referred to as a display combination module 1478.

Now, a difference between the combination module explained here and the unit explained in Section 1.2 is explained. The combination module 1295 may be a component of device 1290 as a prescribed module. Or, the combination module 1295 may exist independently within the network system. In contrast, unit 1290 is a basic unit to perform management, control, and data acquisition within the network system in which various forms such as device 1290, the combination module 1295, and a combination thereof are used in common or generally. Thus, as FIG. 3A (b) shows, one or more combination modules 1295 can be included in a single unit 1290, and the single unit 1290 may include the one or more combination modules 1295. This is evident from the point that a device 1250 may correspond to an unit 1290 though the combination module 1295 is simply a part of the device 1290. Here, in this inclusion relationship, the communication function achieving means may be shared in both the unit 1290 and the combination module 1295. As explained in Section 1.2, system controller α_1126 is not belong to unit 1290. In contrast, it is another significant difference between the unit 1290 and the combination module 1295 that the system controller α_1126 may have the combination module 1295 partially.

The communication function and the other function in the combination module may be achieved through software (program) or hardware (circuit), or may be achieved through a combination of software and hardware (the functions are partly achieved through hardware and the rest is achieved through software). And the communication function and the other function are not necessarily separated whether they are achieved through software or hardware, and achieving means of both functions may mix, partly overlap, or have an inclusion relationship therebetween. Furthermore, the achieving means of both functions are not necessarily connected directly with each other on software or hardware. That is, an achieving means of the communication function and an achieving means of the other function may be disposed significantly apart from each other on hardware or in program, and the achieving means of both functions may operate cooperatively by some kind of linking means.

The structures in the combination module are shown in FIGS. 4A to 4F as block diagrams for the convenience of explanation. The block may be a predetermined circuit (hardware) or may be a predetermined collection of programs (software). Furthermore, the blocks may not necessarily separated on the software or the hardware, and the blocks may mix, be dispersed, partly overlap each other (be shared), or have an inclusion relationship therebetween.

FIG. 4A shows the basic structures of the combination module 1295. To achieve the communication function of the combination module 1295, a communication module 1660 is provided. In the structure of FIG. 4A (a), a radio signal sender/receiver antenna 1480 is independently arranged to be connected to the communication module 1660. On the other hand, in the structure of FIG. 4A (b), a radio signal sender/receiver antenna is stored in the communication module and they constitute an antenna-equipped communication module 1666. Furthermore, the antenna-equipped communication module 1666 is functionally connected to (functions in cooperation with) a different function module (other than the communication function) 1440 which achieves a function other than the communication function. Note that a direct link between the antenna-equipped communication module 1666 and the different function module

1440 as in FIG. 4A (b) is not essential and a different kind of link therebetween is acceptable. For example of such a link, a distant link 1444 may be adopted as shown in FIG. 4A (a) such that the communication module 1666 and the different function module (other than the communication function) 1440 are located separately to be linked by a distant cable. If, for example, the combination module is of a software structure and a program for the communication module 1660 and a program for the different function module 1440 are arranged in distant servers, the programs may be operated cooperatively via link data corresponding to the distant link 1444 (such as uniform resource locator (URL)). If, for example, the different function module (other than the communication function) 1440 is required to be activated in special environments (underground, underwater, deep within a steel-frame building, and the like) where radio communication (achievement of the communication function by the communication module 1660 with the antenna 1480) is impossible, the combination module 1295 can stably function even in such special environments because of the distant link 1444. Furthermore, the structure of the combination module is not limited to those of FIG. 4A and, for example, the antenna-equipped communication module 1666 and the different function module (other than the communication function) 1440 may be located distantly while a distant link 1444 is established therebetween by a distant cable.

FIG. 4B shows structural examples of the combination module 1295 using the sensor combination module 1460. The part utilized as the different function module (other than the communication function) 1440 in the structure of FIG. 4A is replaced by a sensor module 1260 in the examples of FIG. 4B. The sensor module 1260 may generate a qualitative or quantitative sensing signal within the system $\alpha\_1132$. The sensor module 1260 may be disposable within the system $\alpha\_1132$ or may be movable (mobile) in the system $\alpha\_1132$ to measure or observe the conditions in the corresponding system $\alpha\_1132$.

As a specific example of a target of sensing, the sensor module 1260 may generate human body related data including body temperature, pulse, heartbeats, or a counted number of respiration, identification data including human expression, face shape, looks, or body size data such as height or width, physical data including luminosity (brightness), speed, temperature, humidity, power/current/voltage, or flow (of water and gaseous), human sensory detection data including the number of existing people or crowdedness within a predetermined section 1142, movement data including human or vehicle traffic conditions, or architectural data including temperature, strain, shape, cracks, internal hollow capacity of architecture. However, no limitation is intended thereby and any sensible target will be applied.

Figure 4C:
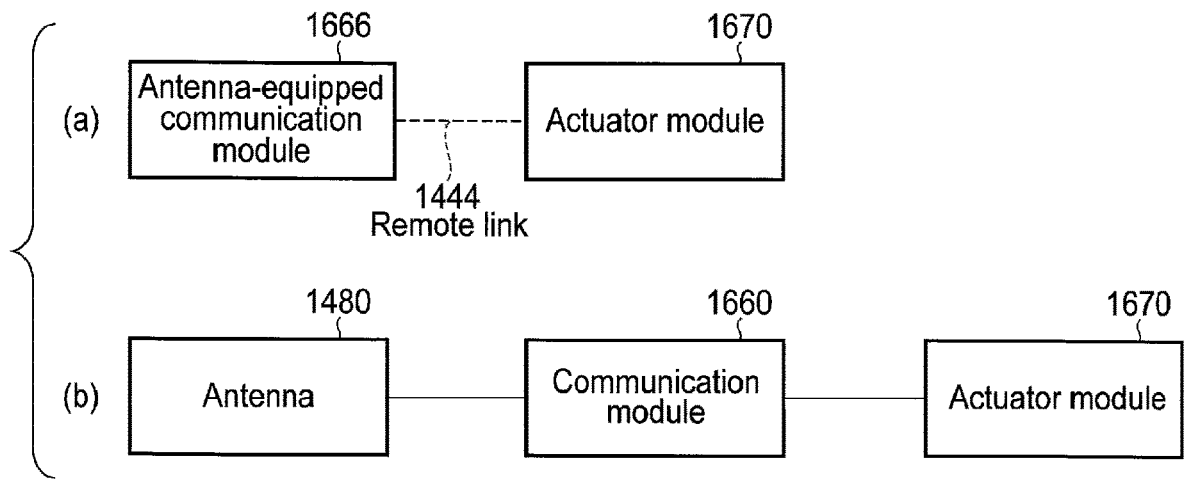
FIG. 4C shows an example of combination module (3).

FIG. 4C shows structural examples of the combination module 1295 using the actuator combination module 1470. The part utilized as the different function module (other than the communication function) 1440 in the structure of FIG. 4A is replaced by an actuator module 1670 in the examples of FIG. 4C. An external antenna 1480 connectable to the communication module 1660 may be adopted (as in FIG. 4C (b)), or the antenna-equipped communication module 1666 including a radio signal sender/receiver antenna may be adopted (as in FIG. 4C (a)). In the example of FIG. 4C (a), the antenna-equipped communication module 1666 and the actuator module 1670 may be located distantly while a distant link 1444 is established therebetween by a distant cable. However, no limitation is intended thereby and a distant link 1444 may be established between the communication module 1660 connectable to the external antenna 1480 and the actuator module 1670.

The actuator module 1670 defined here functions as a service provision related function module to provide specific service or as a condition change control function module used to control specific condition change within the system $\alpha\_1132$. A word "actuator" used in the term actuator module may be misunderstood as an actual movable part or operable part; however, motion is not essential for this actuator module. Thus, as specific examples of the function of the actuator module, there are a predetermined data transfer function (remote control function) used as a part of a data transfer path to present sounds and display images, and to maintain, change, and control the luminosity of light or the intensity of scent, a data communication relay function, or a remote manipulation function (of the predetermined device 1250).

The sensor combination module 1460 and the actuator combination module 1470 explained above perform relatively passive data communication under the control of system controller $\alpha\_1126$ (or system controller $\beta\_1128$). In contrast, the processor combination module 1465 shown in FIG. 4D performs a relatively spontaneous or aggressive function. In the present embodiment, as control (process) function achieving means within the processor combination module 1465, not only a device controller 1240 within device 1250 but also the processor 1230 in system controller $\alpha\_1126$ (in FIG. 2) or a processor 1734 in system controller $\beta\_1128$ (in FIG. 17A/B) may be adopted. Especially, as shown in FIG. 2, the communication module 1202-3 within system controller $\alpha\_1126$ or system controller $\beta\_1128$ can perform data communication with an equipment (such as server n_1116-$n$) disposed outside system $\alpha\_1132$ and system $\beta\_1134$. Here, the combination module 1295 at least requires a data communication function within system $\alpha\_1132$ (or system $\beta\_1134$). Therefore, in the example of FIG. 4D, the communication module 1202-3 is functionally divided into an in-system communication responsive module 1752 and an out-system communication responsive module 1758, and only the in-system communication responsive module 1752 may be used as the processor-communication module 1465. However, no limitation is intended thereby and the out-system communication responsive module 1758 may be included in the processor combination module 1465. If the processor combination module 1465 is included in the device 1250, the out-system communication responsive module 1758 may be originally excluded from the device 1250 in many cases.

If the processor combination module 1465 performs a relatively spontaneous or aggressive function within the system $\alpha\_1132$ (or system $\beta\_1134$), the processor combination module 1465 often treats useful data and the useful data may be stored in the "recording area of data related to management data (table) 1740" (which is described later with reference to FIG. 10A/B). Therefore, if the processor combination module 1465 is required to perform a spontaneous/aggressive function, the processor combination module 1465 may include a part of a memory 1242 in device 1_1250-1, a part of a memory 1246 in device 5_1250-5, a part of memory 1232 within system controller $\alpha\_1126$ (cf. FIG. 2), or a part of a memory 1248 within system controller $\beta\_1128$ (cf. FIG. 17A/B).

For example, when the data recorded in memory 1242 in device 1_1250-1 are read by system controller $\alpha\_1126$, a high-class data exchange between the processor 1230 within system controller $\alpha\_1126$ and device controller 1240-1 within device 1_1250-1 is required. On the contrary, as shown in FIG. 4E, a memory combination module 1475 can simply perform a direct data communication to the system controller $\alpha\_1126$ (or system controller $\beta\_1128$) using a greatly simplified communication protocol because the memory combination module 1475 independently has the in-system communication responsive module 1752 which can treat the simplified communication protocol alone. Moreover, the memory combination module 1475 includes the "recording area of data related to management data (table) 1740" in the memories 1242, 1246, 1232, and 1248, and the recoding area 1740 stores the management data (table). Therefore, the memory combination module 1475 simplifies communication of data recorded in the recording area 1740 of the management data (table) related data.

As examples of functions performed by the different function module 1440 in FIG. 4A, FIGS. 4B to 4E show a monofunction respectively. However, as shown in FIG. 4F, multiple different functions may be achieved in a single combination module 1295. For example, in the combination module 1295, multiple different sensor functions (by sensor modules 1_1260-1 and 2_1260-2), multiple different actuator (operation) functions (by actuator modules 1_1670-1 and 2_1670-2), control (process) function (by processor 1230, 1734, or device controller 1240), memory function (by memory 1232 or 1248), and display function (by display module 1226) may be achieved at the same time. Furthermore, as in the example shown in FIG. 4F, if the antenna 1480 connected to the communication module 1660 is greatly distant from the sensor module 1_1260-1 and the actuator module 1670-2, respectively, a distant link 1444 may be established therebetween, respectively, using a distant cable.

Note that, in the example of FIG. 4F, the communication module 1660 is individually connected to the different function modules other than the communication function. Alternately, the communication module 1660 and the multiple different function modules may be connected to a common busline. In that case, the different function modules to be directly connected to the communication module 1660 are switched one another by a selector operation or address designation in a time modulation manner.

Section 1.4 Internal Structure of Sensor Combination Module

Figure 5:
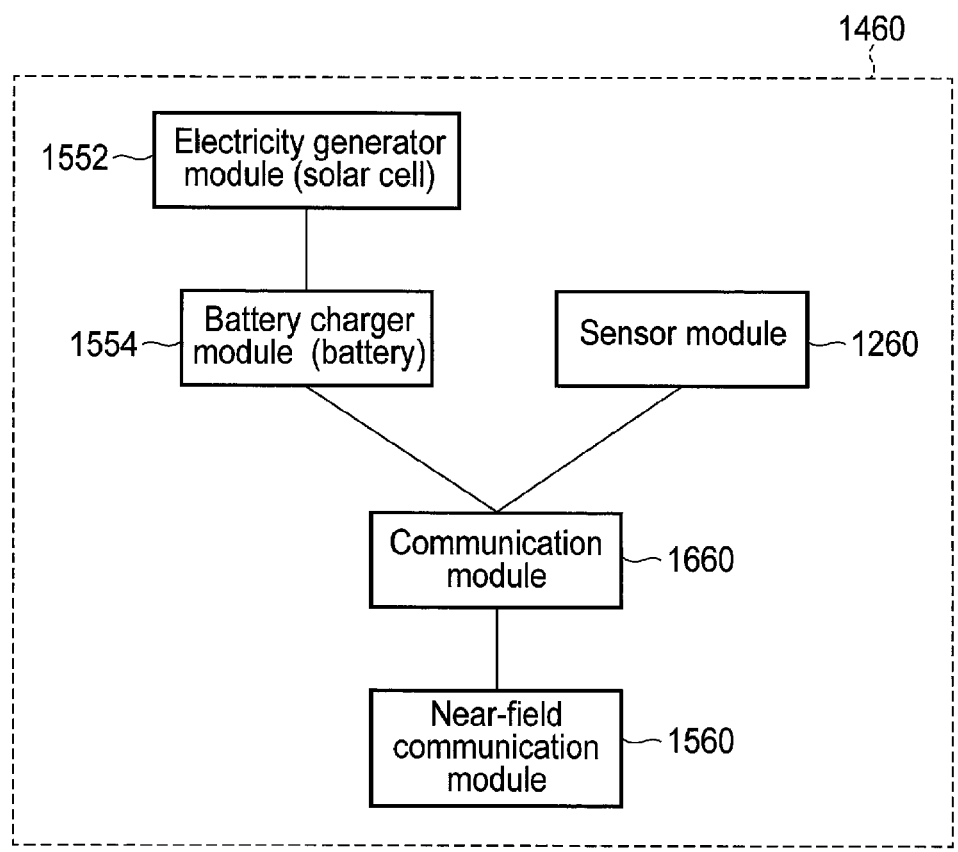
FIG. 5 shows an example of a specific internal structure of a sensor combination module.

FIG. 5 shows a more specific and detailed structural example of the sensor combination module 1460 explained with reference to FIG. 4B. Basically, sensor signals or detection data obtained by the sensor module 1260 are transferred to the communication module 1660. And the sensor signals or the detection data are transferred to the communication module 1202-3 (cf. FIG. 2) of system controller $\alpha\_1126$ through the communication module 1660. The communication module 1660 of FIG. 5 may also execute a process of data communicated with a communication middleware layer APL02 conforming to C-format which is described in Chapter 2 with reference to FIGS. 10A and 10B.

Power supplied to the sensor module 1260 and the communication module 1660 is obtained from a battery charger module (battery) 1554. Furthermore, the sensor combination module 1460 of FIG. 5 includes a solar electricity generator module (solar cell) 1552 which has a photoelectric conversion function, and power generated in the solar electricity generator module (solar cell) 1552 having the photoelectric conversion function is stored in the battery charger module (battery) 1554. FIG. 5 shows a solar electricity generator module (solar cell) having a photoelectric conversion function as a power generator but any other energy converter may be used instead. As an alternative energy converter, a thermoelectric converter such as a thermocouple may be used. The thermoelectric converter may be incorporated in the sensor combination module 1460 and a user may wear the sensor combination module 1460. Here, the body temperature of the user is used to generate power for the operation of the sensor communication module 1460. Furthermore, as a different example, radio energy received by the communication module 1660 from the communication module 1202-3 in system controller $\alpha\_1126$ of FIG. 2 may be converted to power and stored, or a near-field energy received from a near-field communication nodule 1560 may be converted to power and stored. As can be understood from the above, with an energy converter such as a solar electricity generator module 1552 and an integral battery charger module (battery) 1554 included therein, the sensor combination module 1460 can operate long without an external power supply.

Here, if the sensor module 1260 is used to measure luminosity, ambient temperature, or ambient humidity, or if the sensor module 1260 is used as a presence sensor, the sensor module 1260 is disposed on the surface of devices 1_1250-1, 2_1250-2, and 5_1250-5 (cf. FIG. 2) to be exposed outside. At the same time, the solar electricity generator module (solar cell) 1552 is disposed on the surface of devices 1_1250-1, 2_1250-2, and 5_1250-5 to be exposed outside.

Here, if the sensor combination module 1460 is left in the dark for a long time, the energy of the battery charger module (battery) 1554 decreases and the power to be supplied to the sensor module 1260 and the communication module 1660 may possibly be insufficient. In consideration of this point, if the output voltage of or the energy remaining in the battery charger module (battery) 1554 becomes lower than a predetermined reference value, an energy shortage notification may be sent in a timely manner to system controller $\alpha\_1126$ in FIG. 2 through the communication module 1660. Although details are explained in Chapter 2 with reference to FIG. 14, an alarm indicative of "low battery" may be reported to system controller $\alpha\_1126$ from the sensor combination module 1460. Then, the processor 1230 in system controller $\alpha\_1126$ detects the low battery status of the battery charger module (battery) 1554 in the sensor combination module 1460, and notifies the user of the low battery status through a user interface 1234. As can be understood from the above, since the output voltage of or the energy remaining in the battery charger module (battery) 1554 is reported in a timely manner to system controller $\alpha\_1126$, a stop of an operation of the sensor combination module 1460 because of the low battery status can be prevented and the operability of the whole system of the present application can be secured.

In the sensor combination module 1460 of FIG. 5, a near-field communication module 1560 which can perform near-field radio communication is stored. As a near-field radio transmission technique used here will be, for example, TransferJet and Felica (a combination of words felicity and card) which is a standard for contactless smartcard technology. Using the near-field communication module 1560, the above-described external power supply can be performed and a location of the sensor combination module 1460 in the initial setting can be detected as explained below. That is, if a combination module 7_1295-7 corresponding to the sensor combination module is independently disposed in the system of the present embodiment in FIG. 2, or if a device 2_1250-2 including a combination module 6_1295-6 corresponding to the sensor combination module is disposed, the near-field communication module 1560 performs close-range communication with a mobile external device (not shown) having a Global Positioning System (GPS) function during the initial setting. At that time, the GPS positional data is reported to system controller α_1126 through the communication module 1202-3. As a result, location data of the combination module 7_1295-7 corresponding to the sensor combination module, or location data of device 2_1250-2 including the combination module 6_1295-6 corresponding to the sensor combination module are registered in system controller α_1126. The registered data are stored in memory 1232 (cf. FIG. 2) in system controller α_1126 in the format shown in FIG. 23 which will be explained in Chapter 2. After the initial setting of the sensor combination module 1460 through the near-field communication by a mobile external device having a GPS function, the location of the sensor combination module 1460 is clear and user-friendly services can be presented.

Section 1.5 Internal Structure of Actuator Combination Module

FIGS. 6A to 6D show more specific and detailed structural examples of the internal structure of the actuator combination module 1470 outlined with reference to FIG. 4C. If the actuator combination module 1470 which is externally controllable is used as a part of the circuit (as a circuit component) in the device 1250, the module 1470 is, in many cases, used as an on/off switch, predetermined voltage output, or variable resistance. In the present embodiment, the above standard (used most frequently in the circuit) functions are incorporated in the device 1250 as the module. Thereby, cost effective and easily assembled device 1250 can be provided. As to the exemplified functions, the internal structure of the actuator combination module 1470 having a variable resistance function is shown in FIG. 6A, the internal structure of the actuator combination module 1470 having an on/off switch is shown in FIG. 6B, and the internal structure of the actuator combination module 1470 having a predetermined voltage output function is shown in FIG. 6C. To provide the variable resistance function and the on/off switch function, an input terminal 1602 and an output terminal 1604 are required. In the structure of FIG. 6A, a variable resistance 1610 is provided between these terminals to set a variable resistance therebetween. In the structure of FIG. 6B, a conduct/cut switch 1614 is provided between these terminals and the conduct/cut switch 1614 is configured to be an on/off switch. As a circuit element for the variable resistance 1610 and the conduct/cut switch 1614, a complementary metal-oxide semiconductor (CMOS) type field-effect transistor (FET) may be used. As the variable resistance 1610, an element having a gentle gamma characteristic is used. Because the gamma characteristic is the resistance characteristic between the input terminal 1602 and the output terminal 1604 with respect to an input voltage applied to the variable resistance 1610 or the conduct/cut switch 1614, and the element having a gentle gamma characteristic is an element in which a change in its resistance is gentle even if the applied input voltage is changed significantly. As the conduct/cut switch 1614, an element having a steep gamma characteristic is used. Because the element having a steep gamma characteristic is an element in which its resistance changes from nearly zero conductivity to a significantly great cut only by a minute change in an input voltage around a predetermined threshold. In the present embodiment, however, a circuit element is not limited to the CMOS-FET, and any other circuit element having a variable resistance function or having an on/off switch function under some kind of control can be used.

On the other hand, as shown in FIG. 6C, a single voltage output terminal 1606 is required to achieve the predetermined voltage output function. The output voltage from the terminal is connected to the output of a predetermined voltage generator 1618 in the actuator module 1670. As a specific example of the circuit structure in the predetermined voltage generator 1618, a variable resistance is connected between a constant voltage source in the actuator combination module 1470 or a constant voltage externally supplied (a power source voltage, for example) and a ground (earth), and an intermediate voltage is extracted from the variable resistance and is maintained by a current supply buffer circuit. The extracted voltage is then maintained by a current supply buffer circuit (an electronic circuit which can supply relatively great external current to maintain an output voltage even if an external impedance is low). However, no limitation is intended thereby, and any scheme and circuit which can generate and maintain a predetermined voltage can be used.

In the examples of FIGS. 6A to 6C, configuration values are supplied from the communication module 1660 outside the actuator module 1670. Here, regulation value memory parts are provided inside the examples of the present embodiment to maintain the regulation values even if power to the actuator combination module 1470 is cut. The memory parts are a configured resistance memory 1620 in the example of FIG. 6A, configured status memory 1624 in the example of FIG. 6B, and configured voltage memory 1628 in the example of FIG. 6C. They each are a nonvolatile semiconductor memory such as a NAND memory. However, no limitation is intended thereby, and any nonvolatile memory can be used as the memory part. That is, in the examples of FIGS. 6A to 6C, the regulation values notified from the communication module 1660 are initially sent to and stored in the configured resistance memory 1620, configured status memory 1624, and configured voltage memory 1628 in nonvolatile manner. At the same time, the regulation values stored in the memory parts are output to control the operation of the variable resistance 1610, conduct/cut switch 1614, or predetermined voltage generator 1618.

If actuator module 1270-1 or 1270-6 is used to control and change regulation of device 1_1250-1 or 5_1250-5 in FIG. 2, actuator module 1270-1 or 1270-6 may be an extended form of a commercially-available remote controller using infrared communication. That is, an actuator combination module 1470 (a kind of combination module 1295) is composed of actuator module 1270-1 in device 1_1250-1 and a communication module 1202-4 and is disposed outside device 1_1250-1 as a new remote controller. Similarly, an actuator combination module 1470 (a kind of combination module 1295) is composed of an actuator module 1270-5 in device 5_1250-5 and a part of the communication module 1202-10 and is disposed outside device 5_1250-5 as a new remote controller. Conceptually such new remote controllers may be used as advanced versions (replacements) of conventional infrared communication remote controllers which are accessories of air-conditioners, TVs, and lighting equipment.

FIG. 6D shows an internal structure of the actuator combination module 1470 suitable for the above use. The example of FIG. 6D can respond to both a binary state transition control (change of status configuration) such as switching on/off and a detailed control of status configuration using multi-valued data items. Furthermore, the binary state transition control (change of status configuration) by the communication module 1660 which has received the communication data exchanged in the network system α_1132 is stored or updated in the configured status memory 1624. On the other hand, the control data for detailed control of status configuration using multi-valued data items sent from the communication module 1660 are stored or updated in the configured voltage memory 1628.

The data stored or updated in the configured status memory 1624 and the configured voltage memory 1628 are subjected to a format conversion in a format converter 1644, then subjected to luminous modulation in an infrared light emitting element 1608 passing through an infrared light driving circuit 1648, and sent to a remote-controller-compatible infrared light receiver in device 1_1250-1 or 5_1250-5. By simply changing a commercially-available infrared communication remote controller with the actuator combination module 1470 in FIG. 6D, various commercially-available devices 1250 such as an air-conditioner, TV, and lighting equipment can be incorporated in network system α_1132 without any replacement of the main body of devices 1_1250-1 and 5_1250-5.

Here, a conventional remote controller of least necessary function may not memorize the control status of the device 1250. However, with the configured status memory 1624 and the configured voltage memory 1628 stored in the actuator combination module 1460, the system controller α_1126 can later confirm a control history via the communication module 1660. Note that, as mentioned above, a NAND memory or any other nonvolatile memory can be used as the configured status memory 1624 and the configured voltage memory 1628.

As communication data exchanged between the system controller α_1126 and the actuator combination module 1470, C-format described in Chapter 2 will be used. Explained below is how the actuator combination module 1470 transfers communication data to the system controller α_1126 in FIG. 2 based on the C-format; however, the data exchange between the system controller α_1126 and the actuator combination module 1470 can be performed based on any other optional format such as A-format or E-format. Considering a case where the system controller α_1126 instructs (issues a command to) a commercially-available device 1250 to begin its operation (to be turned on), network access control data 1830 in communication data (FIG. 14 (d)) from the system controller α_1126 to its corresponding actuator communication module 1470 are set to [111] (reset instruction), multi-valued transmission data CTMDT are set to [0000], and binary transmission data CT2DT are set to [1] (ON). Then, the communication module 1660 receives the data, and the data indicative of [1] (power on) are transferred/stored to/in the configured status memory 1624 in the actuator module 1670. Furthermore, the data are notified to a format converter 1644 through the configured status memory 1624 and are converted into data indicative of power on in a commercially-available remote controller. The converted data are transferred to the infrared light driving circuit 1648 and the light emission of the infrared light emitting element 1608 is controlled. Then, the converted data are transferred to the commercially-available device 1250 and the device 1250 is turned on.

In the C-format of FIG. 14 (d), multi-valued data change configuration (reset) corresponding to, for example, a temperature change of an air-conditioner and an illumination degree change of an illumination device can be performed together. In that case, the network access control data 1830 in the communication data (FIG. 14 (d)) are set to [111] (reset instruction), and the multi-valued transmission data CTMDT are set to a value other than [0000]. In that case, 5-bit data as a combination of the multi-valued transmission data CTMDT and the binary transmission data CT2DT are allocated between [00010] and [11111] as 0 to 100%. Then, the communication module 1660 receives the data and converts the changed values into a percentage. The data after the percentage conversion are transferred/stored to/in the configured voltage memory 1628. The data after the percentage conversion are notified to the format converter 1644 through the configured voltage memory 1628 and are converted into data indicative of a state configuration change value in the commercially-available remote controller. The converted data are used to operate the infrared light driving circuit 1648, control the light emission of the infrared light emitting element 1608, and change the configuration state of the commercially-available device 1250.

Next, a method by which the system controller α_1126 confirms a state already configured in the actuator combination module 1470 will be explained. In the method, communication data in which the network access control data 1830 are set to [011] (response [data] request) are initially sent to the actuator communication module 1470 from the system controller α_1126. Then, the communication module 1660 in FIG. 6D receives the response (data) request from the system controller α_1126 and reads data already stored in the configured status memory 1624 and the configured voltage memory 1628. The communication module 1660 then sets a result to the binary transmission data CT2DT or the multi-valued transmission data CTMDT in FIG. 14 (d). Here, the network access control data 1830 in the communication data to be sent from the actuator combination module 1470 to the system controller α_1126 are set to [010] (response reply).

Figure 7A:
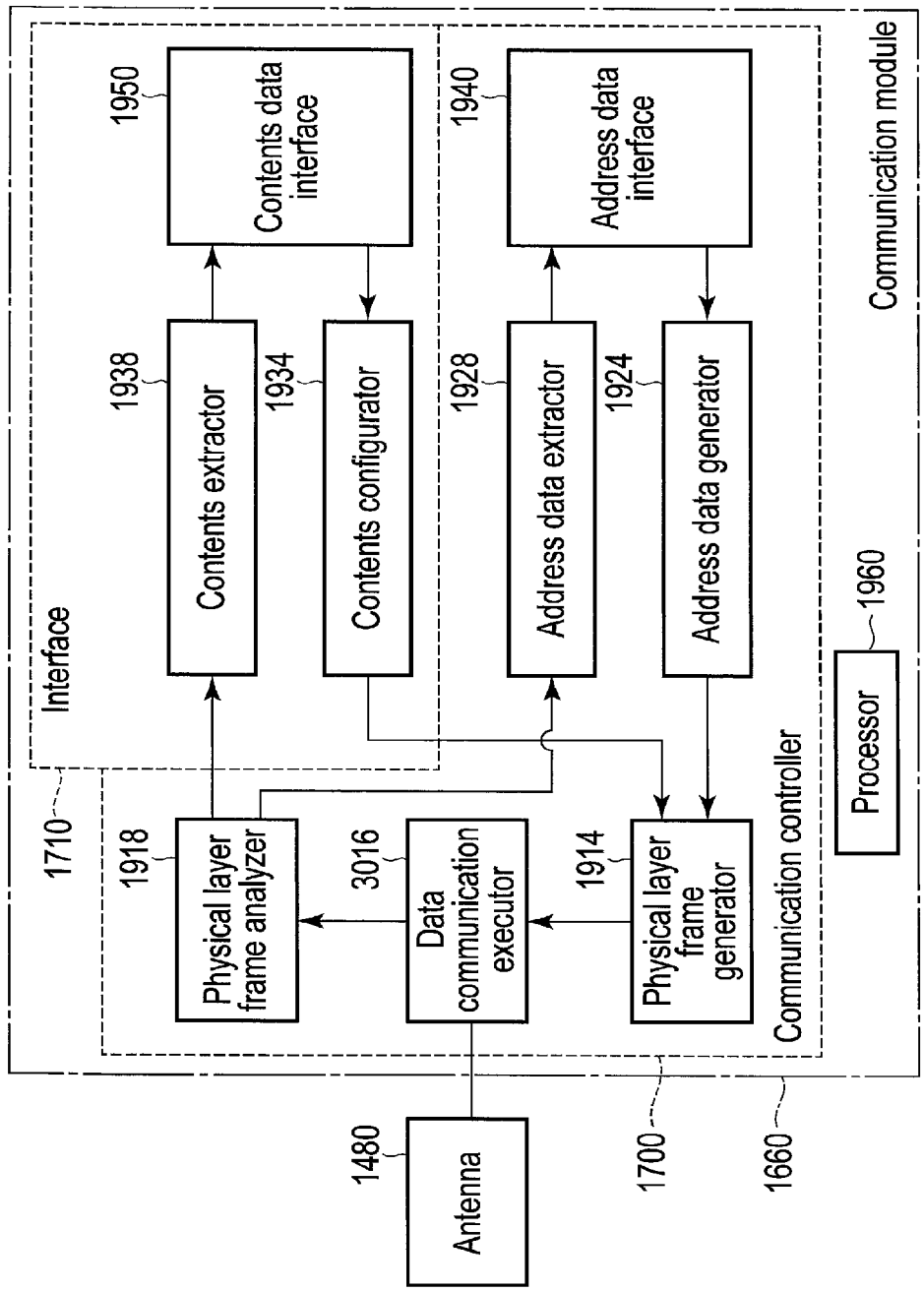
FIG. 7A shows an example of a specific structure within a communication module.

The operation of the actuator combination module 1470 of the present embodiment has been described as hardware (electronic circuit) for the sake of understandable explanation of the module 1470. However, no limitation is intended thereby, and the actuator combination module 1470 may be formed as a software module in the system of the present embodiment. Note that, even if the actuator combination module 1470 is formed as a software module, input/output terminals 1602 and 1604, voltage output terminal 1606, and the infrared light emitting element 1608 shown in FIGS. 6A to 6D are provided with such a software module. Now, a use of the software module will be explained. The communication modules 1202-4 to 1202-10 in FIG. 2 and the communication module 1660 in FIGS. 6A to 6D, processors 1960 and 1736 shown in FIGS. 7A and 7B are stored, and they perform a communication control process according to a predetermined communication control program. As the communication control program, any optional program language executable in the processors 1960 and 1736 will be used.

In the explanation below, a program used to control the whole communication will be referred to as a main program and a parcel of predetermined miniature programs called from the main program will be referred to as a subprogram module. However, no limitation is intended thereby. Since Java (registered trademark) script which does not depend on an operating system (OS) and a Java applet compatible with HTML/HTML5 are adoptable, terms related to Java programming will be written along with the terms of the present application. In the main program (class) used for the operation of the processor stored in the communication module 1660 of FIGS. 6A to 6D, the process according to a subprogram module (method) corresponding to the actuator module 1670 is performed. In the subprogram module (method), processes corresponding to input/output terminals 1602 and 1604 and the voltage output terminal 1606 are performed based on predetermined regulation values in the subprogram module (method). When a configuration change command is notified (issued) from the system controller α_1126 to the actuator combination module 1470 in FIG. 2, a different subprogram module (different method) is called up to perform a regulation value change process in the main program (class). After that, the processes corresponding to input/output terminals 1602 and 1604 and the voltage output terminal 1606 are performed based on the changed regulation values.

Note that the actuator combination module 1470 which is an example of the combination module 1295 is exemplified in the above explanation; however, no limitation is intended thereby. That is, a combination module 1295 of any type such as a sensor combination module 1460, processor combination module 1465, and memory combination module 1475 may be achieved in the software module.

Furthermore, although some modules are omitted from FIGS. 6A to 6D for the sake of simpler explanation, modules such as a solar electricity generator module (solar cell) 1552 as an energy converter, battery charger module (battery) 1554, and near-field communication module 1560 as in FIG. 5 may be stored in the actuator combination module 1470 of FIGS. 6A to 6D.

Section 1.6 Example of Internal Structure of Communication Module

FIGS. 7A and 7B show examples of inner structure of the communication module 1660 with external antenna 1480, used as a component of the combination modules of the examples of FIGS. 4A to 4F. Note that the antenna-equipped communication module 1666 and the in-system communication module 1752 shown in FIGS. 4A to 4E each include an antenna 1480 for a single system communication within the communication module 1660 shown in FIGS. 7A and 7B.

The single communication module 1660 of the present embodiment can be used uniformly in the system controller α_1126 (or system controller β_1128), the device controllers 1240-1 and 1240-3 of the device 1_1250-1 and the device 5_1250-5, and the independent combination modules 1_1295-1 and 7_1295-7. Since the single communication module 1660 can be shared with many structural members (system controller α_1126 (system controller β_1128) and the unit 1290) in the same network system α_1132, costs used to produce the communication module 1660 can be reduced by a mass production effect.

As a specific method to achieve the above shared communication module 1660, functions shared with various combination modules 1295 as exemplified in FIGS. 4B to 4F are provided with the communication module 1660. The functions shared with various combination modules 1295 as exemplified in FIGS. 4B to 4F are used to:

[1] support for a communication protocol shared with the same network system α_1132; and

[2] conform to data communication schemes of various data items related to other functions than a communication function. As explained in Sections 1.2 and 1.3, the communication module 1660 is always connected to the different function modules having other functions than the communication function, and thus, the function of [2] is especially important.

The above functions of [1] and [2] are provided with the communication module 1660. Specifically, a communication controller 1700 in FIG. 7A mainly achieves the function [1]. Furthermore, an interface 1710 in FIG. 7A mainly achieves the function [2]. In FIG. 7A, a region of the communication controller 1700 and a region of the interface 1710 are separated for easier understanding; however, no limitation is intended thereby. The circuits used to perform the above functions [1] and [2] may be mixed. Alternately, some of the functions [1] and [2] may be achieved through either of the circuits.

To impart the versatility to the communication module 1660 to be shared in various types of combination modules 1295, the structure of an interface (I/F) with the different function modules 1440 is improved in the present embodiment. Specifically, a connector with the different function modules 1440 is divided into a contents data interface 1950 and an address data interface 1940 and connection methods are varied corresponding to the type of the different function modules 1440 which are the connection targets. The versatility of the communication module 1660 with respect to various types of different function modules 1440 is improved and the communication module 1660 can be adoptable in multiobjective (various) combination modules 1295.

The above point will be explained in detail below. If the combination module 1295 is realized as a monofunctional sensor combination module 1460 as in FIGS. 4B and 5, or as a monofunctional actuator combination module 1670 as in FIGS. 4C and 6A to 6C, the data communication in the network system α_1132 can be established if only address data unique to the combination module 1295 and address data of the system controller α_1126 (system controller β_1128) are stored therein. Therefore, if the connector is connected to only one sensor module 1260 (FIG. 4B) or to only one actuator module 1670 (FIG. 4C) as a different function module 1440 (FIG. 4A), the address data interface 1940 in FIG. 7A is not used.

Figure 4D:
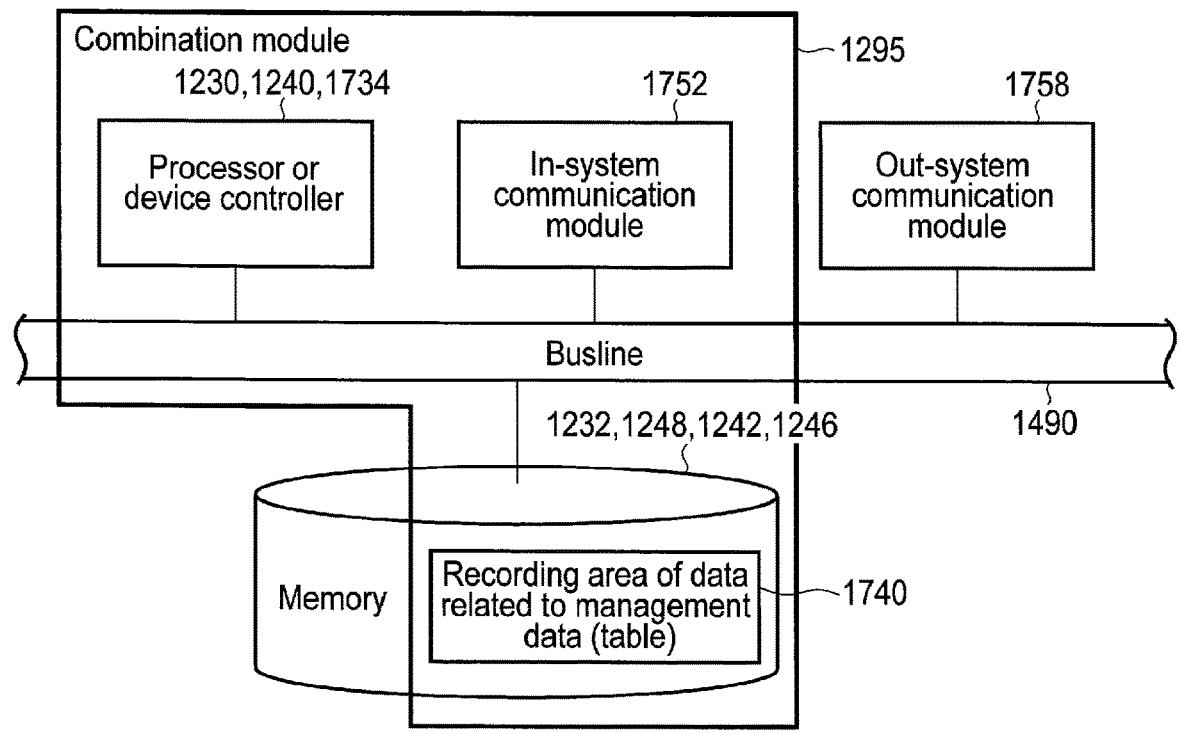
FIG. 4D shows an example of combination module (4).
Figure 4E:
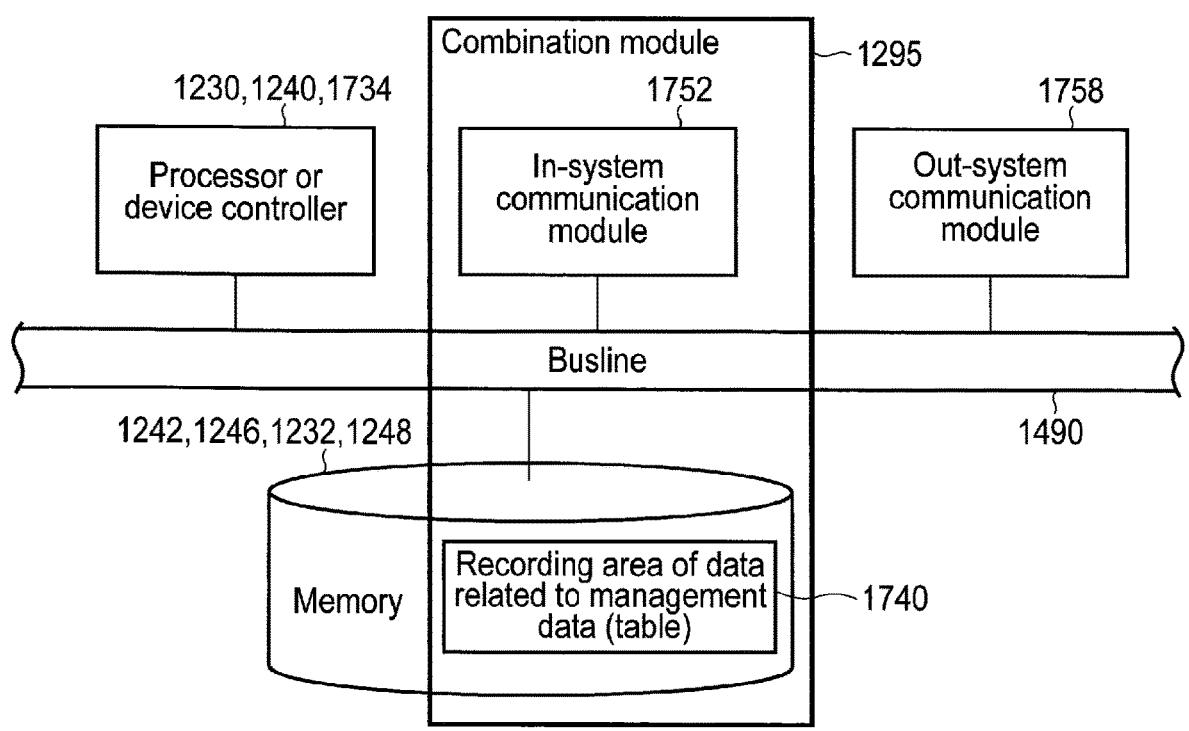
FIG. 4E shows an example of combination module (5).

On the other hand, if the combination module 1295 is used as a part of the processor combination module 1465 as in FIG. 4D to be used in the system controller α_1126 (system controller β_1128), address data are different in each unit 1290 (combination module 1295). Therefore, address data of communication targets are notified from the processors 1230 an 1734 in FIG. 4D to the in-system communication module 1752 through the busline 1490. At that time, the address data interface 1940 is used as address data notification means (data notification input/output terminal).

Furthermore, if the combination module 1295 is used within the memory combination module 1475 as shown in FIG. 4E, the in-system communication module 1752 needs to designate an address range within the memories 1242, 1246, 1232, and 1248 in which the recording area 1740 of data related to management data (table) is stored via the busline 1490. Therefore, both the contents data interface 1950 and the address data interface 1940 in FIG. 7A are connected to the busline 1490 in the processor combination module 1465 of FIG. 4D and the memory combination module 1475 of FIG. 4E.

At the end of Section 1.3, a method by which a communication module is connected to a plurality of different function modules through a common busline is explained as an alternate method of the example of FIG. 4F. In that case, an address corresponding to the different function modules directly connected to the communication module 1660 in a part of the address data interface 1940 is designated. Thereby, the different function modules directly connected to the communication module 1660 can be switched in a time modulation manner.

If the network communication in the network system α_1132 is performed through a wireless communication media, a sender supplies current to the antenna 1480 to generate radio waves, and a receiver detects weak current flowing in the antenna 1480 and detects signals. Both the current supply and the signal detection corresponding to the antenna 1480 are performed within a data communication executor 3016.

The communication data exchanged between the data communication executor 3016 and the other communication modules 1660 via the antenna 1480 have the structure of FIG. 11 (a). Note that the communication data structure indicated in FIG. 11 will be explained in Section 2.2. Then, communication middleware data APLDT (and expansion data EXDT) of FIG. 11 (b) in the communication data are processed in the interface 1710 of FIG. 7A. That is, the communication middleware data APLDT (and expansion data EXDT) are analyzed in a contents extractor 1938 and necessary data are sent to the different function modules 1440 via the contents data interface 1950. As a specific example of the necessary data, state configuration change data (control data) of the device 1250 and the actuator combination module 1470 may be included in the communication middleware data APLDT (and expansion data EXDT) of FIG. 11 (b). In that case, the specific contents of the data are decoded in the contents extractor 1938 and a decoded result is notified to the actuator module 1670 via the contents data interface 1950. Then, the operation (state configuration change) of the actuator module 1670 is initiated corresponding to the notified contents.

Furthermore, data input from the different function module 1440 via the contents data interface 1950 are subjected to the format conversion in the contents configurator 1934 and the communication middleware data APLDT (and expansion data EXDT) are generated. As a specific example, if contents data interface 1950 is connected to the sensor module 1260, the sensor data obtained in the sensor module 1260 are converted into the communication middleware data APLDT (and expansion data EXDT) in the contents configurator 1934. Then, the communication data are transmitted to the system controller $\alpha\_1126$ (system controller $\beta\_1128$) via the data communication executor 3016 and the antenna 1480.

Data items of FIGS. 11 (c) to 11 (f) within the structure of FIG. 11 (a) are processed in the communication controller 1700 of FIG. 7A. That is, the data items of FIGS. 11 (c) to 11 (f) are generated in a physical layer frame generator 1914 and are combined with the data items of FIG. 11 (b). The combined data items are transmitted to the data communication executor 3016 and the communication data transmission is performed. Contrary, in the communication data reception, the communication data having the structure of FIG. 11 (a) are analyzed in the physical layer frame analyzer 1918 and the data items of FIG. 11 (b) extracted therein are sent to the contents extractor 1938.

Furthermore, if the address data interface 1940 is connected during transmission, address data of the receiver are notified via the address data interface 1940. Then, the address data conforming to the format of FIG. 11 (a) are generated in the address data generator 1924 and communication data of FIG. 11 (a) are generated in the physical layer frame generator 1914.

If the address data interface 1940 is connected during reception, the data items of FIGS. 11 (c) to 11 (f) are selected in the physical layer frame analyzer 1918, and transferred to an address data extractor 1928. Then, only the predetermined address data are extracted in the address data extractor 1928 and sent to the address data interface 1940.

If the communication module 1660 is used in a monofunctional sensor combination module 1460, address data of a system controller $\alpha\_1126$ (system controller $\beta\_1128$) of the receiver are stored in advance in the address data generator 1924, instead of using the address data interface 1940. Thereby, the sensor data can automatically be addressed to the system controller $\alpha\_1126$ (system controller $\beta\_1128$).

Furthermore, if the communication module 1660 is used in a monofunctional actuator combination module 1470, its own address data are stored in advance in the address data extractor 1928, instead of using the address data interface 1940. That is, radio data detected in the data communication executor 3016 are entirely transmitted to the physical layer frame analyzer 1918 and data corresponding to the contents extractor 1938 and data corresponding to the address data extractor 1928 are distributed to the respective extractors. Then, the receiver side address data extracted in the address data extractor 1928 are determined whether or not they match the own address data. If the receiver side address data do not match the own address data, the data temporarily stored in the contents extractor 1938 are suitably destroyed. If the receiver side address data match the own address data, the data temporarily stored in the contents extractor 1938 are determined to be the communication data with respect to the combination module 1295 and transferred to the contents data interface 1950.

The series of process described above is controlled by a processor 1960. Note that a connection line of the processor 1960 is omitted from the depiction of FIG. 7A; however, the connection of the processor is optional such as the processor 1736 which is directly connected to a busline BUS as in FIG. 7B or the processor 1960 may be directly connected to respective parts in the module.

FIG. 7B shows another example of the internal structure of the communication module 1660. In the example of FIG. 7B, the communication module 1660 contains a memory 1790. Therefore, when the unit 1290 containing the communication module 1660 is transferred from a system to a different system (from system $\alpha\_1132$ to system $\beta\_1134$), the unit transfer can seamlessly and easily be performed between different systems.

Note that an external module connector 1778 of FIG. 7B corresponds to the contents data interface 1950 and the address data interface 1940 of FIG. 7A. Furthermore, a signal processor 1780 of FIG. 7B corresponds to the contents extractor 1938 and the contents configurator 1934 of FIG. 7A. The signal processor 1780 may include the functions of the address data extractor 1928 and the address data generator 1924 of FIG. 7A, and may further include the functions of the data communication executor 3016, physical layer frame analyzer 1918, and physical layer frame generator 1914.

The communication module 1660 of FIG. 7B is attached to, embedded in, adhered to, or mounted on the different function module 1440 having a function other than communication as shown in FIG. 4A. The combination module 1295 includes the communication module 1660 attached to, embedded in, adhered to, or mounted on the different function module 1440. The unit 1290 includes the combination module 1295 as shown in FIGS. 3A (b) and 3A (c). The unit 1290 can be realized as any substance such as a part, product, item, device, material, and Specifically, the communication module 1660 includes various function blocks structured on an insulating substrate 1660-1 through an integration technique. The communication module 1660 includes an antenna connector 1774 to connect an antenna ANT_1772 thereto for transmission/reception of radio 1770. The antenna ANT_1772 may be formed on the insulating substrate 1660-1 of the communication module 1660. The communication module 1660 includes the external module connector 1778 and is connectable to a plurality of different function modules 1766-1, 1766-2, . . . , and 1766-*n* via the external module connector 1778. The different function modules 1766-1, 1766-2, . . . , and 1766-*n* may be the sensor module 1260, actuator module 1670, processor module 1680, memory module 1690, and/or display module 1226.

Different function modules 1766-1 to 1766-*n* may include various kinds of sensors as the sensor modules 1260. Such sensors are to detect, for example, a temperature, humidity, pressure, deformation, water quality (through a chemical reaction or filtering), gas (through a chemical reaction), brightness, supersonic wave, color, and pulse. One or more sensors are selectively set in the different function modules 1766-1 to 1766-*n* based on the environment in which the communication module 1660 is used. Furthermore, different kinds of sensors may be combined as required. Some of the sensors may be wirelessly connected to the external module connector 1778 (via radio wave, infrared, supersonic wave, or the like).

Furthermore, the actuator module 1670 used in different function modules 1766-1 to 1766-*n* may be, for example, an electric switch, mechanical switch, light emitting substance, heat generator, reformable substance (shape memory medium), and elastic substance (rubber), selected optionally based on a use.

Here, one or more different function modules 1766-1, 1766-2, . . . , and 1766-*n* may be formed on the insulating substrate 1660-1. Furthermore, some of the different function modules may optionally be connected to the communication module 1660 via the external module connector 1778.

Furthermore, the communication module 1660 includes a power supplier 1776 and is connected to a power source via the power supplier 1776. The power source may be provided apart from the communication module 1660. Alternately, a power source mount may be provided with the insulating substrate 1660-1 such that the power source is formed integrally with the communication module 1660.

The following various schemes can be used to charge battery in a power source (not shown). For example, there is a scheme by which current from solar power generating elements is charged in a battery. This scheme corresponds to the combination of the solar electricity generator module (solar cell) 1552 and the battery charger module (battery) 1554 in FIG. 5. There is another scheme by which current induced in a coil by an electromagnetic wave effect is charged in a battery. This scheme corresponds to the combination of the near-field communication module 1560 and the battery charger module (battery) 1554 in FIG. 5. There is another scheme by which a voltage produced in piezoelectric elements by mechanical oscillation is converted into current and is charged in a battery. The mechanical oscillation may be made by, for example, pressure and vibration of sound, pressure and vibration by aerial substance (wind, gas, and the like), and pressure and vibration by liquid (water and oil), selected optionally. Based on an environment in which the communication module 1660 is used, one or more schemes or a combination of several schemes can be selected.

The antenna connector 1774, external module connector 1778, and power supplier are connected to the signal processor 1780. Furthermore, the processor 1736, memory 1790, and signal processor 1780 are connected such that mutual communication can be established via the bus BUS in the communication module 1660. Here, the processor 1736 controls the general operation of the communication module 1660 based on the applications stored in the application storage 1792 of the memory 1790.

The processor 1736 and the signal processor 1780 are operated based on the applications. Processes performed therein include, for example, a take-in process of outputs from the sensor module 1260, output processes of control signals to the actuator module 1670 and the display module 1226, cooperative control process with the processor module 1680, input/output process of recorded data with respect to the memory module 1690, feeding process of transfer signals to the antenna ANT_1772, take-in process of reception signals from the antenna ANT_1772, data write to the memory 1790, and data read from the memory 1790.

The memory 1790 includes an application change software storage 1791 and a security target data storage 1799. The memory 1790 further includes an actuator module management data storage 1792, sensor module management data storage 1796, self attribution data storage 1793, life management data storage 1794, and operation period management data storage 1795.

The actuator module management data storage 1792 in the memory 1790 stores management data of the actuator module 1670 connected thereto through the external module connector 1778. Furthermore, the sensor module management data storage 1796 stores management data of the sensor module 1260 connected thereto through the external module connector 1778.

For example, the communication module 1660 is sometimes inspected during the inspection of the communication module 1660, or at the time of shipment from the factory. When an inspection device (not shown) gives a particular command to the communication module 1660 during the inspection through the antenna ANT_1772, management data of the actuator module 1670 stored in the actuator module management data storage 1792 and/or management data of the sensor module 1260 stored in the module management data storage 1796 are read. The management data read therefrom are sent to the inspection device through the antenna ANT_1772. The inspection device can refer to a sensing performance and a drive performance of the communication module 1660.

Note that, although this is not shown in FIG. 7B, the memory 1790 may include a processor module management data storage which stores management data of the processor module 1680, memory module management data storage which stores management data of the memory module 1690, or display module management data storage which stores management data of the display module 1226.

Incidentally, as shown in FIG. 1, the system of the present embodiment includes a plurality of systems (systems α_1132 and β_1134) in the same domain 2_1122-2. Similarly, domain 1_1122-1 and domain 3_1122-3 each include one or more systems (in many cases, include several systems). Furthermore, such systems may be used for different purposes and fields such as a consumer products field, infrastructure field, and healthcare field. Thus, even if a combination module 1295 or a unit 1290 including the communication module 1660 of FIG. 7B moves between such systems of different purposes and fields, the operation of the combination module 1295 or the unit 1290 can be optimized corresponding to each system. That is, if the combination module 1295 or the unit 1290 moves between the systems α_1132 and β_1134 of the same domain 2_1122-2 or different systems of different domains 1_1122-2, 2_1122-2, and 3_1122-3, the operation of the combination module 1295 or the unit 1290 changes arbitrarily to be optimized for the application fields and purposes of the system α_1132 (or system β_1134). To achieve the above, the memory 1790 includes at least one of an application storage 1792, application change software storage (application change software) 1791, security target data storage 1799, self attribution data storage 1793, life management data storage 1794, and operation period management data storage 1795. Thus, the combination module 1295 or the unit 1290 of the present embodiment can be used with flexible system applicability and versatility.

As described above, a unit 1290 (cf. FIG. 3A) includes a combination module 1295 (cf. FIG. 4) or a device 1250 (cf. FIG. 2) in which a communication module 1660 of FIG. 7B or a communication module 1202 is incorporated. In the unit 1290, data may be preliminarily recorded in at least any one of the application storage 1792, security target data storage 1799, self attribution data storage 1793, life management data storage 1794, and operation period management data storage 1795 through external radiowaves. Additionally, a system controller α_1126 may write such data in such a storage at the time of a check-in process executed by a user after purchase of the unit 1290 or of a plug-in process (described in Section 4.2.

The application change software storage 1791 is used if a modification or a change occurs in an application which controls the operation of the communication module 1660. For example, if the combination module 1295 or the unit 1290 including the communication module 1660 is transferred from one system to another system (for example, from system β_1134 to system α_1132), a plug-in process is performed at each transference. If application field or purpose is significantly different between system β_1134 of pre-transference and system α_1132 of post-transference, software used for execution of new application is sent from the system controller α_1126 (or system controller β_1128) configured to manage/control/operate system α_1132 of post-transference through the communication module 1202-3 of FIG. 2. The software used for execution of new application is arbitrarily stored in the application change software storage (application change software) 1791. The process of the processor 1736 is performed based on the software used for execution of new application, and thus, even if the combination module 1295 or the unit 1290 is transferred to system α_1132 directed to a totally different application field or purpose, the operation of system α_1132 can be optimized.

Here, a change of application may be initiated as follows: the communication module 1660 requires new application, or an application change command is given externally (for example, from the system controller systems α_1126). Such a change of application may occur in various occasions such as when the communication module 1660 is shipped from a factory, when the operation mode is switched from one to another during the use, when the environment of the communication module 1660 is changed (transference between systems α_1132 and β_1134), or when a period of use of the communication module 1660 is fulfilled. Since the application change software storage (application change software) 1791 is disposed in the memory 1790, the communication module 1660 can freely change, add, or update application to correspond to a change of environment or purpose.

On the other hand, the application storage 1792 of the memory 1790 of FIG. 7B includes common application software which is irrelevant to a change of the system. Therefore, the combination module 1295 or the unit 1290 including the communication module 1660 is transferred between different systems, the common application software preliminarily stored in the application storage 1792 is not changed and is stored/used continuously therein.

Note that the application software stored in the application change software storage (application change software) 1791 and in the application storage 1792 is described using a particular program language or a script (including machine language). The application software 3050 may include an API command 3045 corresponding to an OS_3030 (or a particular command) as described later with reference to FIG. 18B. Or, the application software may be described using a Java script, or a machine language and its relevant language as described later with reference to FIGS. 19A and 19B. Or, it may be described using a web-related language such as Hyper-text Markup Language (HTML) or Extensible Markup Language (XML).

The security target data storage 1799 is used for storage of highly important data such as personal sensitive data. Furthermore, the security target data storage 1799 may be used for storage of optional data privately.

For example, a communication module 1660 is used in a patient's record card in a hospital. In such a usage, personal sensitive data (including patient's name, age, disease, treatment progress) are stored in the security target data storage 1799. Here, such a patient's record card is not permanently kept in a hospital and may be discarded, or may be replaced with a new record card. In such a case, the data of security target existing in the communication module must be erased.

Erase of the security target data can be performed through various ways at arbitrary timing. For example, the security target data are erased when the communication module 1660 does not make a communication with the system controller α_1126 for a particular period. In that case, the communication module 1660 is determined to be discarded or replaced arbitrarily and the security target data is erased. Or, the system controller α_1126 may request the communication module 1660 to erase the security target data. Or, the security target data may be erased when the sensor module 1260 connected to the communication module 1660 detects a particular atmosphere and/or an element (such as a pressure, heat, humidity, and moisture). That is, if the sensor module 1260 detects a particular atmosphere and/or an element (such as a pressure, heat, humidity, and moisture), the processor 1736 automatically recognizes a change in the environment and erases the security target data. Or, the security target data may be erased when particular conditions are met.

On the other hand, if record cards are restored and the security target data need to be moved to a new record card, the system controller α_1126 may control transference and reception of the security target data between the record cards.

The self attribution data storage 1793 includes attribution data indicative of how to handle a unit (product, component, material, or item) in which the communication module 1660 is, for example, attached, bonded, mounted, or embedded. Specifically, attribution data may include identification data of the unit (item name, component name, or product name) and identification data of a factory location or a manufacturer.

For example, a combination module 1295 (or a unit 1290) including a communication module 1660 is adhered to or embedded in an aluminum can for beverage. Aluminum cans are used, and may be recycled. If attribution data indicate that a material of the target in which the module is adhered to or embedded in is aluminum, aluminum cans can be automatically sorted and sent to a section for aluminum recycle process in a recycle plant. In that case, the entirety of the recycle plant corresponds to the system α_1132 and a sorting machine in the recycle plant corresponds to the system controller α_1126. The sorting machine corresponding to the system controller α_1126 sends a particular command to the communication module 1660 and reads the self attribution data. The material of the can be determined based on the self attribution data.

On the other hand, a combination module 1295 (or unit 1290) including the communication module 1660 may be embedded in a plastic bottle for beverage. In that case, a sorting machine sends a particular command to the communication module 1660 to read self attribution data and recognizes that the bottle is plastic. The sorting machine can easily and automatically send the bottle to a section for plastic recycle process. The above example does not intend any limitation; self attribution data can be used for any object (component, product, item, device, material, and item) in which the combination module 1295 (or unit 1290) including the communication module 1660 is adhered, embedded, bonded, or attached.

Here, if a combination module 1295 (or unit 1290) including the communication module 1660 is transferred from one system to another, the environment may change. The content of the self attribution data may progressively change to correspond to such a change of the environment. For example, if a can for beverage is displayed in a store, data such as a price, display location, and item category may be stored in the memory 1790 as the self attribution data. In that case, the system controller α_1126 which monitors the store may perform a stock check and accounting service for customers using the self attribution data.

As another example, a combination module 1295 (or unit 1290) may be added to a fish. Fish are caught in the sea, shipped to a port, sold to a bidder in an auction held in the port, delivered by an automobile to a market store, and bought by a customer.

For example, a tag (combination module 1295/unit 1290) added to a fish includes a sensor module 1260 which is a combination of a temperature sensor and a humidity sensor for quality control. In this example, the self attribution data include a suitable temperature range, suitable humidity range, and edibility expiration date. Here, the self attribution data will be input by a fisherman or a market manager.

If an ambient temperature or humidity exceeds a suitable range during the transportation or storage of the fish, the communication module 1660 can send a first alert signal to the system controller α_1126 disposed in a ship or transport truck. Furthermore, when the edibility expiration date approaches and passes, a second alert signal and a third alert signal are sent, respectively, through an antenna 1772.

Then, when fish are displayed in a store, data such as a price, display location, and item category are added to the self attribution data. In that case, the self attribution data are automatically sent from another system controller α_1126 in the store to be stored in the memory 1790. Using the self attribution data, the stock check and accounting service for customers can be performed.

As above, when a combination module 1295/unit 1290 is moved from one system to another (system α_1132, for example) to be disposed therein (to belong thereto), the self attribution data 1793 are automatically added to or updated in the combination module 1295/unit 1290 by the system controller α_1126 which manages, controls, and operates the system α_1132. Therefore, the flexibility and versatility of the combination module 1295 or the unit 1290 can be improved. That is, using the self attribution data added or updated as above, the system controller α_1126 can perform a suitable process for the system α_1132.

Or, the self attribution data may be used to allow a communication module 1660 to respond to a particular command (request signal) and to output a response signal which acknowledges the presence of the communication module 1660. For example, a communication module 1660 is embedded in a surgical instrument or an inspection tool of an airplane or a train. In that case, an operation site is considered as a system α_1132, and a system controller α_1126 disposed in the operation site requests the communication module 1660 to respond. A response from the communication module 1660 in the operation site (system α_1132) indicates a surgical instrument or an inspection tool left in the operation site. Using a data communication process of the self attribution data, items left after surgery or inspection can be detected.

As another example of the use of the self attribution data 1793, owner data of a unit 1290 (or a combination module 1295, or a device 1250) may be added thereto. To sell a unit 1290 (or a combination module 1295, or a device 1250) with the self attribution data 1793 recorded therein, it is displayed in a store as described above. In that case, the store corresponds to a system β_1134. When a user buys the unit 1290 (or combination module 1295, or device 1250), it is moved to the user's house. The user's house corresponds to a system α_1132 (cf. FIG. 1). Therefore, the unit 1290 (or combination module 1295, or device 1250) is disposed in different systems before and after its sale. When the unit 1290 is disposed in the user's house, the system controller α_1126 used for management, operation, and data collection in the system α_1132 performs a check-in process as described in Section 4.2. At that time, the system controller α_1126 records user data related to the owner to a part of the self attribution data 1793. The user data include, not only the name of the owner, but also an ID, address, phone number, and mail address of the user. Using the user data recorded to a part of the self attribution data 1793, a unit 1290 can be easily located if it is lost outside.

The owner is not limited to the user of the unit 1290. The owner may be a person, organization, or corporate who or which is related to the use of the unit 1290 (or combination module 1295, or device 1250). Or, the owner may be a person, organization, or corporate who or which is related to the use of an item, component, or material in which the combination module 1295 with the self attribution data 1793 recorded therein is disposed, inserted, or mixed.

For example, a combination module 1295 with the self attribution data 1793 recorded therein is inserted or mixed in a pill or a powdered medicine. When a user swallows such a pill or medicine in a hospital, nursing home, or house, the system controller α_1126 records the name and the date of intake to the self attribution data 1793. The name of the medicine is also recorded to the self attribution data 1793. When a user goes to some place where a system controller β_1134 is disposed, the system controller β_1134 can refer to and manage data indicative of who takes what medicine at what time. For a person who suffers from a chronic disease, taking medicines regularly is very important but easily missed. If such a system controller β_1134 can manage the above data regularly, disremembering of taking medicine can be prevented.

As above, the self attribution data 1793 include a plurality of data items related to each other, and thus, the combination module 1295 (unit 1290) with the self attribution data 1793 recorded therein can easily manage its use condition with high accuracy.

The life management data storage 1794 can store life management data used to manage the life of the combination module 1295 (or unit 1290) including the communication module 1660. The life management data indicate a life limit of the combination module 1295 (or unit 1290) including the communication module 1660. After the life limit passes, the communication module 1660 stops its operation. Thus, there is no unnecessary radiation of radiowaves after the life limit.

For example, when a beverage can is wasted or a fish is cooked, a tag therein (combination module 1295/unit 1290) is no longer useful. If the memory 1790 includes the life management data storage 1794 and the tag can be stopped automatically after the life limit as above, produce of unnecessary radiowaves within the system $\alpha\_1132$ can be prevented. By preventing such produce of unnecessary radiowaves, the data communication efficiency in the system $\alpha\_1132$ can be improved.

The operation period management data storage 1795 can store data used for setting an operation period of the communication module 1660. The operation period and a sleep period of the communication module 1660 are set based on its environment and condition of use to increase a power save effect and to prevent interference with periphery devices. Using the operation period management data, the operation period and the sleep period can be set hourly and the operation period and the sleep period can be set based on outputs from the sensor.

Section 1.7 Explanation of Whole Structure of Wide Area Network System of Embodiment The system of the present embodiment has been described in Section 1.1. In this section, a whole structure of a wide area network system of the present embodiment will be explained in detail with reference to FIG. 1. As shown in FIG. 1, the service provider B_1112-2 acquires items (or data) from the wholesale firm B1_1104-1 and/or wholesale firm B2_1104-2 which handle similar items (or data) for providing services.

The wholesale firms A_1102, B1_1104-1, and B2_1104-2 are management organizations handling particular items and data. Such organizations include, for example, a private profit making organization including an incorporated foundation and a business corporation, and also a public organization such as a government, local government, public corporation, and public-service corporation. Thus, from the standpoints of the service provides A_1112-1 to C_1112-3, the wholesale firms may include not only a company of business but also a trustee of a particular service or a guide/approver of a particular service. For example, if the wholesale firm is a company of business of the service providers A_1112-1 to C_1112-3, items handled by the wholesale firm include common goods such as power, gas, water, and gasoline, and also include general materials, liquid assets such as cash, bond, and jewelry, and fixed assets such as real estate, and also include valuable information which is difficult to obtain through the ordinary web (information related to market research, specific individual, or specific area, specifically, local weather information, or local traffic information, or the like).

The service providers A_1112-1 to C_1112-3 in the system of the present embodiment are organizations which provide particular services. Especially, the service providers A_1112-1 to C_1112-3 perform general management of particular services. Furthermore, services provided by the service providers include various services which use data obtained from the sensor module 1260 described later. As specified later, data obtained from a sensor module within the domains 1_1122-1 to 3_1122-3 through the network are transferred to a server n_1116-*n* within the service provider B_1112-2 with data related to the obtained data, and the service provider B_1112-2 provides particular services based on the data. As can be understood from the above, in the system of the present embodiment, the service providers A_1112-1 to C_1112-3 can extract items and data from domains 1_1122-1 to 3_1122-3. Furthermore, the service provider B_1112-2 includes a plurality of servers 1_1116-1 to n_1116-*n* and manages databases 1118-1-*n* of the servers 1_1116-1 to n_1116-*n*. Furthermore, distributed processing is performed cooperatively by the servers 1_1116-1 to n_1116-*n* to accelerate the process. Although this is omitted from FIG. 1, servers and corresponding databases are disposed in the service provider A_1112-1 and the service provider C_1112-3.

As a specific operation, a service provider can distribute (let in and let out) items and data received from the wholesale firm A_1102 or the wholesale firm B1_1104-1 and B2_1104-2 in the domains 1_1122-1 to 3_1122-3. Such a service will be categorized into the following examples:

α] Retailing items and data handled by the wholesale firms A_1102, B1_1104-1, and B2_1104-2 to end users;

β] Independently processing items and data handled by the wholesale firms A_1102, B1_1104-1, and B2_1104-2 and providing the end users with a result of the processing;

γ] Providing a service determined to be optimal based on data obtained from a sensor module; and δ] Combination of α] to γ].

Here, retail items handled by service providers include common goods such as power, gas, water, and gasoline, and also include general materials, liquid assets such as cash, bond, and jewelry, and fixed assets such as real estate. Data (items) handled by service providers also include valuable information which is difficult to obtain through the ordinary web (information related to market research, specific individual, or specific area, specifically, local weather information, or local traffic information, or the like).

The service provider A_1112-1 obtains items (or data) from the wholesale firm A_1102 which are different from those of the wholesale firms B1_1104-1 and B2_1104-2 and provides a different service. Between the service provider A_1112-1 and the service provider B_1112-2, or between the service provider B_1112-2 and the service provider C_1112-3, data and resource sharing 1114 is performed to facilitate and advance the service. Furthermore, the service provider A_1112-1 includes a particular item storage 1154 to store the items obtained from the wholesale firm A_1102. Furthermore, the service provider A_1112-2 of FIG. 1 includes a particular item generator 1152 which manufactures a new item by materializing an item obtained from the wholesale firm A_1102, or generates a new item (or new data) by processing an item (or data) obtained from the wholesale firm A_1102. Although this is omitted from FIG. 1, a particular item storage 1154 and a particular item generator 1152 are disposed in the service providers B_1112-2 and C_1112-3.

The particular item generator 1152 of FIG. 1 generates an original item to which an original additional value is added. As an example of the generation of such an original item, there is a treatment process of a raw material obtained from the wholesale firm A_1102. In manufacturing industries, product manufacturing factories correspond to the particular item generator 1152. Furthermore, in the present embodiment, the particular item generator 1152 may correspond to a power plant including a solar power generator, wind power generator, thermal power generator, or geothermal power generator, and to a peripheral installment such as a substation or a transmission station. Furthermore, the system of the present embodiment is not limited to the above example, and a production location of common goods including a refinery of gasoline or a reservoir may correspond to the particular item generator 1152. In addition, a location where original information is generated in the service provider A as a form of an item may correspond to the particular item generator 1152. For example, various data available on the internet may be analyzed, and such analyzed data may be used in, for example, a market research or a weather forecast. Such analyzed data are a form of the original item.

Note that the particular item storage 1154 of FIG. 1 temporarily stores the following items (including data):

α] Items and data received from the wholesale firm A_1102 or the wholesale firms B1_1104-1 and B2_1104-2;

β] Items and data generated in the particular item generator 1152;

γ] Items and data extracted from the domains 1_1122-1 to 3_1122-3; and

δ] Combination of α] to γ].

For example, when an item temporarily stored in the particular item storage 1154 is power, the storage 1154 is composed of a battery, charge/discharge monitor (which corresponds to a smart meter 1124 in the system α_1132), and charge/discharge controller. Or, when an item temporarily stored is tap water or town gas, the storage 1154 is composed of a water tank or a gas tank, charge/discharge monitor, and charge/discharge controller.

Services from the service providers A_1112-1 to C_1112-3 are received by the domain 2_1122-2 or the system α_1132 therein (described later). A price of the service is directly paid to the service providers A_1112-1 to C_1112-3. Here, as shown in FIG. 1, a server n_1116-n within the service provider B_1112-2 and the particular item storage 1154 within the service provider A_1112-1 are connected to the smart meter 1124 and the system controller α_1126 within the domain 2_1122-2 and the system α_1132 through a network. Furthermore, as depicted by dotted lines in FIG. 1, the smart meter 1124 is connected to the wholesale firm A_1102 and directly communicates therewith. Here, in the example of FIG. 1, a value measured by the smart meter 1124 is transmitted to the server n_1116-n in the service provider B_1112-2, the system controller α_1126 in the system α_1132, or the wholesale firm A_1102. Alternatively, the value measured by the smart meter 1124 may be transmitted to the system controller β_1128 in the system β_1134 in the domain 2_1122-2 or other devices in the domain 2_1122-2.

The smart meter 1124 is a device which measures the amount of inflow/outflow items (similar items) between the inside and the outside of the domain 2_1122-2 (or system α_1126) at certain intervals. The smart meter 1124 mainly measures the inflow/outflow of common goods such as power, gas, water, and sewerage and it can collect the inflow (or the amount consumed in the inside) of such goods along with the outflow (the amount sold to the outside) of such goods as measurement values. In the system of the present embodiment, however, the smart meter 1124 may measure not only the inflow/outflow of such common goods but also the inflow/outflow of general goods, liquid assets, and specific information dealt through electronic commerce or mail-orders, and results may be sent out.

Especially, in the system of the present embodiment, a communication module 1202-1 is included in the smart meter 1124 (FIG. 8A), and it sends out the measurement values of the smart meter 1124 at certain intervals. Furthermore, the intervals can be arbitrarily changed by the server n_1116-n, system controller α_1126, or wholesale firm A_1102. Or, the measurement value of the smart meter 1124 may not be sent out at certain intervals but may be sent out at any arbitrary timing requested by the system controller α_1126, server n_1116-n, or wholesale firm A_1102. Or, the measurement value of the smart meter 1124 may be sent out when the smart meter 1124 itself determines data sending necessary.

An example of a service provided by the service provider A_1112-1 using the smart meter 1124 will be explained. In this example, particular items and particular data preliminarily stored in the particular item storage 1154 in the service provider A_1112-1 are sent to the domain 2_1122-2 (or in the system α_1132) through the system controller α_1126 or the smart meter 1124. Or, items left in the domain 2_1122-2 (or in the system α_1132) may be returned to the particular item storage 1154 through the smart meter 1124. Then, a different between the amount of items supplied from the particular item storage 1154 to the domain 2_1122-2 (or in the system α_1132) and the amount of items returned to the particular item storage 1154 through the smart meter 1124 is charged by the service provider A_1112-1 as a used item amount.

In parallel, the domain 2_1122-2 may directly receive items (or data) using the infrastructure and delivery system owned or managed by the wholesale firm A_1102 or the wholesale firm B1_1104-1 and B2_1104-2. That is, as depicted in FIG. 1 with a dotted line between the wholesale firm A_1102 and the smart meter 1124, items (or data) handled by the wholesale firm A_1102 may be directly sent to the domain 2_1122-2 or the system α_1132 therein through the smart meter 1124. In that case, at the same time, data related to the contents and amount of the items (or data) received by the domain 2_1122-2 are notified from the smart meter 1124 to the server n_1116-n in the service provider B_1112-2 one after another, and a service fee is periodically charged to a user from the service provider B_1112-2 based on the notification data. Here, pathways from the wholesale firm A_1102 to the smart meter 1124 which functions as a window of the item supply to the domain 2_1122-2 or the system α_1132 are prepared in a plurality of ways (the direct line which is represented by the dotted line and lines going through the service provider A_1112-1 between the wholesale firm A_1102 and the smart meter 1124 in FIG. 1), and with these pathways, original services can be provided by the service provider A_1112-1. Original services achieved thereby will be described in Section 5.2.1.

Now, the domain 2_1122-2 and the system α_1132 therein which can receive services from the service providers A_1112-1 to C_1112-3 through a wide area network will be explained. As shown in FIG. 1, one domain 2_1122-2 includes one or more systems α/β_1132/1134, and the systems α/β_1132/1134 include system controllers α/β_1126/1128, respectively. Furthermore, the system controllers α/β_1126/1128 and the smart meter 1124 may be connected to each other directly or through the server n_1116-n for mutual data transference. Furthermore, the system α_1132 may be divided into sections 1_1142-1 to m_1142-m (sections will be described in Chapter 4.)

As described above, the system of the present embodiment allows coexistence of a plurality of different systems (client systems) at the same time. In consideration of the contents of FIG. 1 and FIG. 2, there is a complex client system (corresponding to the domain 2_1122-2 of FIG. 1) including a plurality of client systems α_1132 (and β_1134) (client systems α_1132 and client systems β_1134) with a unit 1290 which acquires or prepares data for communication and a system controller α_1126 (and β_1128) which acquires and manages the data from the unit 1290, wherein the system controller α_1126 which manages the client system α_1132 included in the complex client system (domain 2_1122-2) divides a plurality of units 1295-1 to 1295-7 into management target sections (sections 1_1142-1, 2_1142-1, and m_1142-m in FIG. 2), and data related to each section of each unit (section data in FIG. 23) are maintained.

Here, the domains 1_1122-1 to 3_1122-3 are a network space including one or more cooperative systems. Especially, a domain of the system of the present embodiment corresponds to a network space as a target of various condition measurements or a network space as a target of a particular operation or execution or a target of management and execution (related to a particular service). To participate and operate in a particular domain, an identification information ID unique to the domain and a unique password may be necessary in some cases. Here, if the systems α/β_1132/1134 are associated with particular locations which are physically or geographically close to each other, the domains 1_1122-1 to 3_1122-3 are associated with particular areas on the network managed/used by members of a particular group which can transcends such physical and geographical restriction. The system α_1132 is a minimum unit of the network system in which internal units are connected to each other through the network and a single system controller α_1126 is disposed. Furthermore, the network system is managed and operated by the system controller α_1126. The physical and geographical range of the system α_1132 may be set as particular areas which are physically and geographically close to each other related to one or more particular users (an area defined by a behavioral range of one or more particular users within a particular period of time, for example). The system α_1132 in the present embodiment may be associated with a network unit specified by particular identification information such as personal area network (PAN), local area network (LAN), metropolitan area network (MAN), and wide area network (WAN). For example, according to institute of electrical and electronic engineers (IEEE) 802.15.4, identification information of personal area network identifier (PANID) should be set to each PAN, and a single PAN defined by such PANID may be associated with a system of the present embodiment. Or, as other examples, a system may be associated with one home, one vehicle, one peripheral space of a mobile device, or one work station area.

Furthermore, one system includes one or more system controllers α/β_1126/1128 to manage and operate the communication within network systems which correspond to the systems α/β_1132/1134. Furthermore, as described above, using the system controllers α/β_1126/1128, connection to a wide area network which is outside the systems α/β_1132/1134 (network used for data communication with the service providers A_1112-1 to C_1112-3) is established. Furthermore, the system controllers α/β_1126/1128 include processors used for collection and proper processing of signals and data obtained from one or more sensor modules within the same systems α/β_1132/1134 (sensor modules 1260 described later with reference to FIGS. 8A and 9). Such a system controller may be, for example, a personal computer (PC), a mobile device such as a smartphone, tablet, and mobile phone, processor-equipped switchboard, processor-equipped refrigerator, television, recorder, and audio recorder. Furthermore, the smart meter 1124 may include a processor to function as a system controller α_1126, or a remote controller of an air conditioner, television, or illumination device may include a processor and a communication module (communication module 1202 described later with reference to FIGS. 8A and 9) to function as a system controller. However, no limitation is intended thereby, and in the present embodiment, any processor-equipped device including a program used for collecting signals and data obtained from a sensor module in a system and providing services to users may be used as a system controller. Furthermore, a system controller may be composed of a physical combination of several devices or may be a sum of cooperative operations of several devices.

Especially, when a processor and a communication module are installed in a remote controller to be used as a system controller and such a remote controller is fixed or detachably attached on a wall or a shelf by screws or the like, an original use (and an advantage obtained thereby) is achieved. In that case, such a remote controller needs to be fixed or positioned in a location from which infrared communication with a main device such as an air conditioner, television, and illumination device is performable. Furthermore, sensor/communication modules (described later with reference to FIG. 8B) related to temperature sensors, air current sensors, or close-range motion sensors are provided with many positions in a room to allow communication with the remote controller (system controller α_1126) in the system α_1132. Thereby, services including a prioritized temperature control of exact locations of users in a room with high accuracy, and a display control of a television to show three-dimensional images for different users in different positions with naked eyes are provided with users. Thus, by simply replacing a commercially-available remote controller with the above remote controller with a system controller function, its corresponding commercially-available device (air conditioner, television, or illumination device) which has already been installed can be operated more efficiently.

In many cases of the conventional techniques related to machine-to-machine (M2M) or internet of things (IoT), a cloud server (which corresponds to a server n_1116-n of FIG. 1) collects the entire signals and data obtained from home sensor modules in a house, and services are provided with end users directly from the cloud server. In such cases, a system controller α_1126 simply functions as a gateway or a router as in FIG. 9 to relay signals and data transference on the network. Such conventional techniques face:

(1) a problem that personal data of a user is sent to a server n_1116-n which is relatively public and the security thereof may be jeopardized; and (2) a problem that services to end users become unavailable if a trouble occurs in a communication line between the system controller α_1126 or the smart meter 1124 and the server n_1116-n, and the whole system is vulnerable.

In the present embodiment, the system controller α_1126 functions not only as a gateway or a router configured to relay the signal and data transference on the network but also as a processor configured to perform determination, conversion, treatment of the collected signals and data from sensor modules and to perform original services to the users based on the signals and data. Thereby, in the present embodiment:

(1) the personal data of a user can be secured since the system controller α_1126 independently determines whether or not each signal and data transference to server n_1116-n is performed; and (2) original services can be provided with users based on the determination by the system controller α_1126 based on the collected signals and data from the sensor modules, and since these services can be performed even if there is a trouble in the communication lines to the servers n_1116-n, the whole system structure becomes strong. Especially, the system controller α_1126 of the present embodiment can gather the data from the sensor modules 1260 determine/estimate behaviors of users (for example, if a user is present, or if a user is sleeping or not) and conditions of users (for example, if a user is a child or adult) and can estimate requests of users. Therefore, even without a server n_1116-n, suitable services can be provided with users independently by the domain 2_1122-2.

Furthermore, in the system of the present embodiment, system controllers α/β_1126/1128 can work cooperatively in the domain 2_1122-2. Therefore, one system controller α_1126 can collect signals and data obtained from the entre sensor modules in the domain 2_1122-2 (and, although this is not depicted, including sensor modules disposed in the system β_1134). As a result, the system controller α_1126 can collect data in the domain 2_1122-2 and provide suitable services in the system α_1132 to users.

To achieve the cooperative operation of the system controllers α/β_1126/1128 in the domain 2_1122-2, the present embodiment provides two network pathways: a direct network pathway through which data are directly exchanged between the system controllers α/β_1126/1128 using, for example, wireless communication as in FIG. 1; and a indirect network pathway through which data are indirectly exchanged between the system controllers α/β_1126/1128 through a server n_1116-n using, for example, the internet. Thus, users can receive various services. For example, if a home PC is a system controller α_1126 and a mobile device such as a smartphone or a tablet is a system controller β_1128, and they are physically close to each other, rapid data exchange can be performed through wireless local area network (WLAN) or wireless personal local area network (WPAN). If the Internet line including a cable one is used between the system controllers α/β_1126/1128, data exchange therebetween is guaranteed regardless of the physical distance therebetween. If direct data exchange is performed between the system controllers α/β_1126/1128, privacy is kept therebetween without involving a server n_1116-n, and a possibility of leakage of personal sensitive data to the server n_1116-n which is relatively public. The server n_1116-n can acquire data such as local weather forecast data or traffic jam data, which are not acquirable in the domain 2_1122-2, through a different network pathway. Therefore, the system controllers α/β_1126/1128 can perform indirect data exchange therebetween through the server n_1116-n and can provide various services using the data originally owned by the server n_1116-n to users. Here, as mentioned above, the system controller α_1126 itself can estimate behaviors and conditions of users and desired and requests of users, and thus, the system controller α_1126 itself can switch, based on its own determination, connection pathways between the systems controllers α/β_1126/1128.

Section 1.8 Explanation of Local Network System Structure of Embodiment

In Section 1.1, a structural example of local network system in the system α_1132 in the domain 2_1122-2 of FIG. 1 has been explained with reference to FIG. 2. In this section, examples of systems other than that of FIG. 2 will be described with reference to FIGS. 8A to 9.

In the example of FIG. 8A, devices 1250-1-3 include communication modules 1202-4-6, respectively, and allow data communication within the system α_1132. Furthermore, the devices 1250-1-3 include sensor modules 1260-1-5 and an actuator module 1270-1. In the example of FIG. 8B, the relationship between the communication modules 1202-4-6 and the sensor modules 1260-1-5 of FIG. 8A is interpreted and managed as sensor combination modules 1460-1-5. Similarly, the relationship between the communication module 1202 and the actuator module 1270 is interpreted and managed as actuator combination modules 1470-1-2. Or, as explained in Section 1.3, they may be interpreted and managed as a combination module 1295 including, for example, a processor combination module 1465, memory combination module 1475, and display combination module 1478. Or, as the sensor combination module 1460-5 of FIG. 8B, a single combination module may be disposed alone.

In the system of the present embodiment, the amount (or total amount) of common goods such as power, gas, clean water/sewerage used in a single system (for example, system α_1132) in every particular period is measured automatically and the data measured are periodically and automatically sent out by a smart meter 1124. Actually, one smart meter 1124 is disposed to each item of the common goods including power, gas, and clean water/sewerage; however, for the sake of simple illustration, the smart meter 1124 alone is depicted in the examples of FIGS. 8A and 8B. Or, the amount (or total amount) of common goods of each of sections 1_1142-1, and 2_1142-2, which are described later, may be automatically measured and sent out.

The smart meter 1124 includes, as shown in FIGS. 8A and 9, an inflow monitor 1208 (for example, buy-power amount measure) and an outflow monitor 1206 (for example, sell-power amount measure). With the outflow monitor 1206, excess of common goods in the system α_1132 is measured and discharged (sold) to the wholesale firm A_1102 by the smart meter 1124. Each measurement value (or accumulation value) obtained in the smart meter 1124 is periodically reported to a server n_1116-n through a communication module 1202-1, and to the wholesale firm A_1102.

The communication modules 1202 shown in FIGS. 8A and 9 are communication function parts conformable to wired or wireless data transference communication schemes. The communication function parts conforms to wired data transference communication schemes such as local image signal transference line, local audio signal transference line, phone line, and internet-related Ethernet (registered trademark) corresponding communication line. Furthermore, the communication function parts conforms to wireless data transference communication schemes including close range wireless communication schemes such as ZigBee (registered trademark), Bluetooth (registered trademark), ultra wide band (UWB), and Z-wave, middle range wireless communication schemes such as wireless fidelity (Wi-Fi), EnOcean, and long range wireless communication schemes such as second generation/personal digital cellular (2G/PDC), global system for mobile communications (GSM) (registered trademark), third generation/code division multiple access (3G/CDMA), and world wide interoperability for microwave access (WiMAX).

Especially, the system of the present embodiment has a function to execute minimum essential processes in the communication modules 1202 and 1660 as described later with reference to FIG. 10A. Thus, the communication protocol (communication data) structured as in FIGS. 11 to 15B, which will be described in Chapter 2, is processed and executed in the communication modules 1202 and 1660. Such a process may be performed in accordance to basic (standard) application with a versatile program such as Java script which does not require a particular OS. Or, such a process may be performed in accordance with ECMA script, decryption of HTML or HTML5, or execution of Java applet corresponding to the decryption, for example. No limitation is intended by the above-mentioned commercially-available versatile scripts, and original processing scheme may be adopted.

In the examples of FIGS. 8A and 9, the communication module 1202 is stored in each of the system controller α_1126, smart meter 1124, and devices 1250 to allow data communication therebetween. As shown in FIGS. 8A and 9, either a sensor module 1260 or an actuator module 1270 or both are disposed in each of the devices 1250.

In the example of FIG. 8A, the devices 1250-1-3 disposed in the system α_1132 use the communication modules 1202-4-6, respectively, and perform data communication with the system controller α_1126 through the communication module 1202-3. As in FIG. 8A, there are three types of devices, that is, a device including one or more sensor modules as the devices 1250-2-3 including sensor modules 1260-3-5, a device including both one or more sensor modules and an actuator module as the device 1250-1 including sensor modules 1260-1-2 and actuator module 1270-1, and a device including one or more actuator modules (which is not shown). In the example of FIG. 8A, the device 1250-1 including a device controller 1240-1 and a memory 1242 which can store and manage history data related to the sensor modules 1260-1-2 and the actuator module 1270-1 and the devices 1250-2-3 can be mixed in the system.

Here, as the service provider A_1112-1 explained with reference to FIG. 1 in Section 1.7, if a function corresponding to the particular item generator 1152 or a function corresponding to the particular item storage 1154 is adopted in the system α_1132, the excess of common goods can be secured and temporarily maintained therein. In the examples of FIGS. 8A and 8B, a battery (car battery) 1220 functions as the particular item storage 1154. However, no limitation is intended thereby. In the system of the present embodiment, any device functioning as the particular item generator 1152 or the particular item storage 1154 may be disposed in the system α_1132. For example, a power center or a reservoir (or such storage facilities) may be disposed in a building or in an area to temporarily maintain the excess of common goods in the building or the area.

In the explanation of FIGS. 8A and 8B, the battery (car battery) 1220 is exemplified, and an internal space of a vehicle is referred to as a section 1_1142-1. Specifically, various data in the vehicle (for example, the amount of consumed gasoline, engine torque, room temperature, and condition of each human being in the vehicle) are detected by the sensor module 1222, and results are sent to the system controller α_1126 through the communication module 1202-2. In the section 1_1142-1 (in the internal space of the vehicle), an inflow monitor 1218 which measures power charged in the battery (car battery) 1220 and an outflow monitor 1216 which measures power discharged (sold) to the outside from the battery (car battery) 1220, and values measured thereby are sent to the system controller α_1126 through the communication module 1202-2. In the system of the present embodiment, especially, an outflow controller 1212 which can accurately control the power discharged (sold) to the outside from the battery (car battery) 1220 and an inflow controller 1214 which can accurately control the power charged in the battery (car battery) 1220. Both are connected to the system controller α_1126 through the communication modules 1202-2 and 1202-3. Thus, the system controller α_1126 can send feedback of the discharged (sold) power measured by the outflow monitor 1216 to the outflow controller 1212 such that the power discharged (sold) to the outside can be accurately controlled.

Similarly, the system controller α_1126 can send feedback of the incoming (bought) power measured by the inflow monitor 1218 to the inflow controller 1214 such that the power charged in the battery (car battery) 1220 can be accurately controlled.

As described in Section 1.7, the system controller α_1126 controls, manages, and operates the communication in its corresponding system α_1132 (network system). As shown in FIG. 8A, the system controller α_1126 includes a processor 1230. The processor 1230 collects data from the entire sensor modules 1222, and 1260-1-5 in the domain 2_1122-2, and stores the data in the memory 1232 as history data. Furthermore, the processor 1230 stores command data to the actuator module 1270-1 as history data. Furthermore, the system controller α_1126 includes a user interface 1234 which receives direct input by a user and displays the current status to the user. However, no limitation is intended thereby, and the user interface 1234 may be disposed outside the system controller α_1126 and may be connected thereto through the communication module 1202-3.

Especially, in the system of the present embodiment, the entire data related to the sensor modules 1222 and 1260-1-5 and the actuator module 1270-1 within the domain 2_1122-2 are not automatically transferred to a server n_1116-n, but system controller α_1126 (or the processor 1230 therein, specifically) independently chooses necessary data and send them to the server n_1116-n. Thus, personal private data of a user can be secured. Furthermore, what to be sent to the server n_1116-n may not be the necessary data chosen by the system controller α_1126 but may be a part of data extracted and analyzed from the necessary data by system controller α_1126. Thus, the server n_1116-n can collect only the essential data and the collective management process performed by the service provider B_1116-1 can be more efficient.

Furthermore, in the system of the present embodiment, the system controller α_1126 (or the processor 1230 therein, specifically) can collect original data from the server n_1116-n through the communication module 1202-3 and store the original data in the memory 1232. The original data are data which cannot be obtained from the domain 2_1122-2, such as traffic jam information, local weather forecast, and current price of common goods. The data stored in the memory 1232 are analyzed by the system controller α_1126 (or the processor 1230 therein, specifically) to estimate/determine behaviors, conditions, or requests of end users. Based on the estimation/determination, the system controller α_1126 (or the processor 1230 therein, specifically) controls the system α_1132 (or the domain 2_1122-1) and provides suitable services to the end users. As a service providing method, the actuator module 1270-1 in FIG. 8A may be remotely controlled. The system controller α_1126 (or the processor 1230 therein, specifically) independently analyzes the data collected from the sensor modules 1222 and 1260-1-5 and server n_1122-2 and command history to the actuator module 1270-1 collectively, and thus, original services including a user friendly service performed within the domain 2_1122-2 which has been difficult before. Furthermore, such an original service in the domain 2_1122-2 can be securely provided to the users even if there is a communication shutdown with the server n_1116-n caused by a system trouble, and thus, the strength of the services provided to the end users can be secured.

FIG. 9 shows a variation of the system of the present embodiment of FIG. 8A. In the example of FIG. 9, a processor 1330 or a device controller 1240-1 or -2 is stored in the entire devices within the domain 2_1122-2 except for the smart meter 1124 and router (gateway) 1300, and direct data exchange can be performed between the system of FIG. 9 and a server n_1116-*n* through the router (gateway) 1300 including a battery.

Here, the processor 1330 stored in the section 1_1142-1 (a vehicle) performs the control of the vehicle including not only charging/discharging power in/from the battery (car battery) 1220 but also air conditioning in the vehicle and energy efficient engine burning. The data related to these controls can be transferred to the server n_1116-*n* through a router (gateway) 1300 (or directly). Furthermore, the entire communication modules 1202-1-7 are connected to the server n_1116-*n* through the router (gateway) 1300. In the variation of FIG. 9, the router (gateway) 1300 does not perform any discrimination or determination and automatically transfer the entirety of the data from the devices 1250-1 and 1250-4, and this is a major difference from the function of the system controller α_1126 of FIG. 8A.

In the variation of FIG. 9, the entire devices 1250-1 and 1250-4 in the domain 2_1122-2 include memories 1244 and 1246, respectively. The signals and data detected by the sensor modules 1260-1-7 at each moment are chronologically stored in the memories 1244 and 1246. Furthermore, command data arbitrarily issued from the device controllers 1240-1-2 to the actuator modules 1270-1-3 are stored in the memories 1244 and 1246. Using the data stored in the memories 1244 and 1246, the device controllers 1240-1-2 can provide original services to end users by each of the devices 1250-1 and 1250-4. When providing the original services, the devices controllers 1240-1 and 1240-2 estimate/determine the behavior, condition, or request of an end user and control the actuator modules 1270-1-3 using the detection signals and history of measured data sent from the sensor modules 1260-1-7 which change at each moment stored in the memories 1244 and 1246 (this will be detailed in Sections 4.2 to 4.4.

The variation of FIG. 9 performs the management and control of the entirety of the network communication system α_1132 from the outside of (a physical space area formed by) the network communication system α_1132 and the variation of FIG. 9 does not involve a system controller α_1126 which is disposed inside (a physical space area formed by) the network communication system α_1132 to perform the management or control of the network communication system α_1132. From such a standpoint, the management and operation of the data communication within an in-system network line 1782 formed by the devices 1250-1 and 1250-4 in the system α_1132 through the battery-equipped router (gateway) 1300 may be performed by a system controller β_1128 which is physically remote from the system α_1132 instead of the server n_1116-*n*.

As a further variation, a mixture of the system of FIG. 2 or FIG. 8A/B and the system of FIG. 9 may be used. In that case, to relay the inside and the outside of the system α_1132, such a system may include both the system controller α_1126 and the battery-equipped router (gateway) 1300. Furthermore, the management, operation, and control of the entirety of the network communication system α_1132 may be performed by the system controllers α_1126 and β_1128 in cooperation, or may be performed by the system controller α_1126 alone in a normal state. Data exchange between the system controllers α_1126 and β_1128 is performed frequently such that the data collected from the sections 1_1142-1 to m_1142-*m* and the data necessary for the service providing are entirely shared between the system controllers α_1126 and β_1128. In that case, relative files stored in the memory 1232 of the system controller α_1126 are arbitrarily copied in the memory 1248 of the system controller β_1128 through a mirroring process. Here, the data collected from the sections 1_1142-1 to m_1142-*m* and the data necessary for the service providing include, for example, an address table shown in FIG. 23, an estimation/determination comparison table shown in FIG. 27, and a chronological data tracing table shown FIG. 28 will be described later. Since the data are arbitrarily shared between the system controllers α_1126 and β_1128, even if the main controller of the management/operation is switched therebetween (or is performed in cooperation), processes in the system α_1132 can be continued without a mix-up. Or, the system controller α_1126 and the server n_1116-*n* may cooperate to perform the management, operation, and control of the network communication system α_1132. In that case, as mentioned above, the data collection from the sections 1_1142-1 to m_1142-*m* and the data necessary for the service providing may be entirely shared between the system controller α_1126 and the server n_1116-*n* (by mirroring or the like). Since the management, operation, and control of the network communication system α_1132 are performed by a plurality of devices in different positions, processes such as an emergency response can be performed with flexibility, and the security and reliability of the network communication system α_1132 can be improved. For example, even if the system controller α_1126 is accidentally shut down, or even if the data stored in the memory 1232 are entirely destroyed by a head crash or the like, the controller is automatically switched to the system controller β_1128 or to the server n_1116-*n* as an emergency response. Thus, the processes of the system α_1132 are securely continued without causing any stress to a user. Not only that, since a user can remotely operate the system controller β_1128 to perform data collection from the network communication system α_1132 or the control of the network communication system α_1132, it is more user efficient. Furthermore, in that case, combination modules including the devices 1250-1 and 1250-4 with the device controller 1240 and the memory 1242, device 1250-2 and 1250-3 without a device controller 1240 or a memory 1242, sensor combination module 1460, and actuator combination module 1470 may be mixed in the system α_1132.

The mixture will be further explained. As shown in FIG. 5, in many cases, a combination module 1295 (or unit 1290) disposed inside the network system α_1132 includes a battery charger module (battery) 1554. Thus, even if a power failure occurs in the system α_1132, the combination module 1295 (or unit 1290) basically continues its operation without being affected. Furthermore, in the system of FIG. 9, the router (gateway) 1300 which performs relay of the data communication inside and outside the system α_1132 includes a battery, and thus, there is no effect of the power failure in the network system α_1132. Thus, with a backup for the management/control of the network system α_1132, even if there is an accident such as a power failure or a breakdown, the data communication within the system α_1132 can be continued without interruption caused by such an accident.

As stated in Section 1.1 that a system controller α_1126 performs the management, control, operation, and data collection of the data communication within the network system α_1132, the management, control, operation, and data collection of the data communication within the network system α_1132 are normally performed by the system controller α_1126. However, if there is an accident such as a power failure or a breakdown, the system controller β_1128 temporarily performs the management, control, operation, data collection of the data communication within the network system α_1132 as a substitute. Here, in the ordinary operation, a system controller β_1128 may be handled as a single unit 1290 in the network system α_1132.

As explained in Section 1.1 with reference to FIGS. 1 and 2, the system controller α_1126 which performs the management, control, operation, and data collection of the data communication in the network system α_1132 performs in-system data communication with each unit 1290 in the network system α_1132 and performs out-system data communication with a server n_1116-n (cloud or cloud server) outside the network system α_1132. If the system controller β_1128 temporarily substitutes the above functions for the system controller α_1126 to respond to an accident such as a power failure or a breakdown, the data communication between each unit 1290 and the server n_1116-n should be performed in the same data communication format used before the substitution. This is because the same data communication format allows a smooth and seamless substitution process.

Figure 10A:
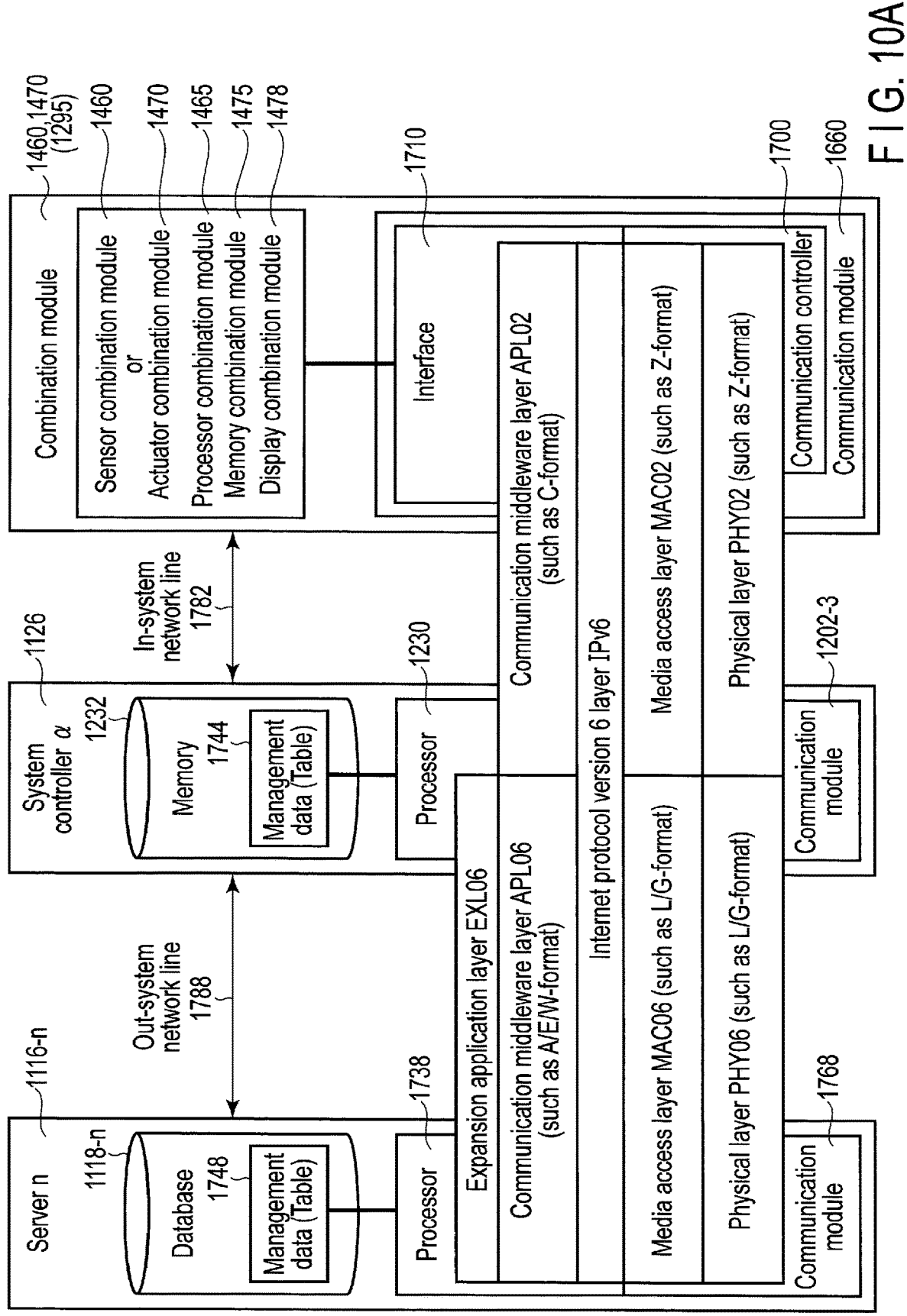
FIG. 10A shows a basic structure of application/communication layer of the system of the present embodiment.

As explained in Section 2.1 with reference to FIG. 10A, C-format can be used in the data communication of a communication middleware layer APL02 between the system controller α_1126 and the combination module 1295. On the other hand, A-format, E-format, or W-format can be used in the data communication of a communication middleware layer APL06 between the system controller α_1126 and the server n_1116-n (cloud or cloud server). If the system controller β_1128 substitutes the system controller α_1126, the same data communication format should be used. That is, C-format is used in the data communication of the communication middleware layer APL02 between the system controller β_1128 and the combination module 1295, and A-format, E-format, or W-format is used in the data communication between the system controller β_1128 and the server n_1116-n (cloud or cloud server).

When the contents of Section 2.1 explained with reference to FIGS. 10A and 17A and the above system are combined, a client system is achieved. A client system (system α_1132) is an electronic device system connectable to external cloud (server n_1116-1 of FIG. 1) (through a system controller α_1126 of FIG. 10A, router (gateway) 1300, or system controller β_1128), and including a first system controllers α_1126 which acquires and manages data from a unit 1290 (or combination module 1295) with a function to send the data independently acquired or created, and a second system controller β_1128 which acquires and manages the data from the unit 1290 (or combination module 1295), wherein the system controller α_1126 divides a plurality of units 1290 (or combination modules 1295) into sections 1142 (as in FIG. 1) and retains data related to sections to which each unit attributes (address table of FIG. 23 or chronological data tracing table of FIG. 28 explained in Section 4.3, and a first data format (C-format of FIG. 17A) is used for the communication between the second system controller β_1128 and the units 1290 (or combination modules 1295) and a second data format (A/E/W-format of FIG. 17B) is used for the communication between the second system controller β_1128 and the cloud (server n_1116-n of FIG. 1).

As mentioned above, the system controller β_1128 may be handled as a unit 1290 in the network system α_1132 which performs the management, control, operation, and data collection of the system controller α_1126 in a normal state. Furthermore, in the system of the present embodiment, data communication between different units 1290 in the same network system through the network system α_1132.

As mentioned above, when the data communication is performed between the system controller α_1126 and unit 1290, C-format is used for the data communication of the communication middleware layer APL02. Thus, when data communication is performed between the system controllers α_1126 and β_1128, C-format should be used in the data communication of the communication middleware layer APL02 to facilitate the management, control, operation, and data collection related to the system controller α_1126.

On the other hand, when data communication is performed between the system controller β_1128 and the server n_1116-n (cloud or cloud server), A-format, E-format, or W-format should be used in the data communication of the communication middleware layer APL06. Thereby, even if the system controllers α_1126 becomes unusable by a power failure or a breakdown, the substitution of the management, control, operation, and data collection of the network system α_1132 can be performed smoothly and seamlessly.

In other words, the client system (system α_1132) can be connected to external cloud (server n_1116-1 of FIG. 1) (through a system controller α_1126 of FIG. 10A, router (gateway) 1300, or system controller β_1128), and the client system (system α_1132) includes a first system controllers α_1126 which acquires and manages data from a unit 1290 (or combination module 1295) with a function to send the data independently acquired or created, and a second system controller β_1128 which acquires and manages the data from the unit 1290 (or combination module 1295), wherein the system controller α_1126 divides a plurality of units 1290 (or combination modules 1295) into sections 1142 (as in FIG. 1) and retains data related to sections to which each unit attributes (address table of FIG. 23 or chronological data tracing table of FIG. 28 explained in Section 4.3, and a first data format (C-format or the like) is used for the communication between the second system controller β_1128 and the units 1290 (or combination modules 1295) and a second data format (A/E/W-format of FIG. 17B) is used for the communication between the second system controller β_1128 and the cloud (server n_1116-n of FIG. 1).

Here, the above description has been made relatively focusing on the cooperation and substitution between the system controllers α_1126 and β_1128. However, no limitation is intended thereby. For example, the system of the embodiment shown in FIG. 9 which does not include a system controller α_1126 in the first place can be described as follows. The client system (system α_1132) is an electronic device system connectable to external cloud (server n_1116-1 of FIG. 1) (through a system controller α_1126 of FIG. 10A, router (gateway) 1300, or system controller β_1128), and including a unit 1290 (or combination module 1295) with a function to send the data independently acquired or created, a system controller β_1128 which acquires and manages the data from the unit 1290 (device 1250 of FIG. 9), and a gateway 1300 which performs the communication between the unit 1290 (device 1250 of FIG. 9) and the system controller β_1128, wherein the system controller β_1128 divides a plurality of units 1290 (devices 1250 of FIG. 9) into sections 1_1142-1 and 2_1142-2 and retains data related to the sections 1_1142-1 and 2_1142-2 to which each unit attributes (address table of FIG. 23 or chronological data tracing table of FIG. 28 explained in Section 4.3, and a first data format (C-format or the like) is used for the communication between the second system controller β_1128 and the units 1290 (devices 1250 of FIG. 9) and a second data format (A/E/W-format of FIG. 17B) is used for the communication between the second system controller β_1128 and the cloud (server n_1116-n of FIG. 1).

Section 1.9 Example of Use of Combination Modules in Local Network System

In the examples shown in FIGS. 8A and 9, the system controller α_1126 of FIG. 8A and the server n_1116-*n* of FIG. 9 basically communicates with devices 1250-1-4. Conventionally, since basic functions of a device have been preliminarily determined, contents of network communication data (communication protocols in communication middleware layers APL or exchangeable data 1810 which will be explained in Chapter 2) have been preliminarily standardized to suit for such basic functions. However, as time changes, devices have been evolved/developed diversely on a daily basis, and the standardization to suit for functions of such rapidly evolving devices has become difficult to achieve. For example, a basic function of televisions is receiving broadcast waves and displaying contents to a user. However, Japanese high-end televisions include not only the above basic function but also a data communication function using a network line and a recording function. Furthermore, although this is not so popular, naked-eye three dimensional televisions include a function to detect positional data of a viewer. In future, a luminosity sensor may possibly be included in televisions (to optimize the brightness of the display screen). In consideration of such diversity and expansion of devices, the communication data format (exchangeable data 1810) and communication protocol of the devices 1250-1-4 may be made with versatility; however, in such a case, devices 1250-1-4 including high-performance device controllers 1240-1-2 used for decoding the communication data would become expensive. That is, the device 1250-2 or device 1250-3 in FIG. 8A has difficulty in decoding such versatile complicated communication data, and a device controller 1240 is required for decoding the data and performing various processes in the device corresponding to a result of decoding.

To deal with the above, the example of FIG. 8B allows sensor combination modules 1460-1-5 and actuator combination modules 1470-1-2 which attribute combination modules 1295 and are disposed inside devices 1450-1-4 or independently outside the devices.

Here, for the sake of simpler explanation, the devices 1450-1-4 of FIG. 8B include the sensor combination modules 1460-1-4 and actuator combination modules 1470-1-2 which attribute combination modules 1295. However, no limitation is intended thereby, and an example of FIG. 3 (*c*) or the like may be adopted. That is, the combination module 1295 (sensor combination module 1460 or actuator combination module 1470) may be additionally stored in devices 1250-1-4 as in FIGS. 8A and 9. In that case, the devices 1250-1-4 shown in FIGS. 8A and 9 perform the data communication related to a basic function of a device (for example, a function of receiving broadcast waves and displaying contents to a user). Combination modules 1295, 1460, and 1470 newly added directly perform the data communication related to newly added functions caused by technological development and diversity. The system controller α_1126 collectively performs the management/grasp and control the whole functions of the highly diverse/evolving devices 1250. Thereby, the expansion of newly added functions in commercially-available devices (expansion of incorporated sensors/drive types) can be easily performed. Furthermore, since the functions of the combination modules 1295, 1460, and 1470 are very limited and simplified, communication data exchanged between the combination modules 1295, 1460, and 1470 and external devices can be greatly reduced. With greatly reduced communication data exchanged with external devices, high-performance device controllers 1240-1-2 used for decoding/controlling complex communication data are not required and the combination modules 1295, 1460, and 1470 can be produced cost effectively and miniaturized.

In the example of FIG. 8B, the devices 1450-1 and 1450-2 are disposed in section 2_1142-2 and the devices 1450-3-4 are disposed in section m_11142-*m*. However, this does not mean that positions of the devices 1450-1-4 are fixed, and an end user can freely choose any of the devices 1450-1-4 and dispose it in a different section.

Furthermore, in the system of the example of FIG. 8B, a sensor module and a actuator module are independently integrated with a communication module in the smart meter 1124 and section 1_1142-1 (corresponding to the entirety of a vehicle, for example). As a result, the smart meter 1124 of FIG. 8B includes an outflow monitoring combination module 1406 and an inflow monitoring combination module 1408 which are independently connected to the system controller α_1126 and the server n_1116-*n*. Similarly, the section 1_1142-1 includes an outflow monitoring combination module 1416, inflow monitoring combination module 1418, outflow controller combination module 1412, and inflow controller combination module 1414, and they are independently connected to the system controller α_1126 (the processor 1230 therein) through the communication module 1202-3. Here, the outflow monitoring combination module 1406, inflow monitoring combination module 1408, outflow monitoring combination module 1416, and inflow monitoring combination module 1418 correspond to the sensor combination module 1460. Furthermore, the outflow controller combination module 1412 and the inflow controller combination module 1414 correspond to the actuator combination module 1470. In that case, the entire detection signals and measured data obtained in the sensor combination modules 1460-1-5, outflow monitoring combination modules 1406 and 1416, and inflow monitoring combination modules 1408 and 1418 in the system α_1132 are gathered and collected (and stored in the memory 1232) by the system controller α_1126. Furthermore, the system controller α_1126 collectively controls (and commands) the actuator combination modules 1470-1-2, outflow controller combination module 1412, and inflow controller combination module 1414 in the system α_1132. As a result, the system controller α_1126 singly manages and controls the devices 1450-1-5 in the system α_1132 efficiently and provides services of high quality to end users.

Furthermore, if the example of the system of FIG. 8B is adopted, the devices 1450-1-5 can be produced highly cost effectively. That is, by mass-producing versatile and standardized combination modules 1460 and 1470, the production cost thereof can be greatly reduced. Since there is no need of a novel interface connecting the combination modules 1295, 1460, and 1470, they can be incorporated into the devices 1450-1-5 easily and cheaply by a simple physical arrangement. If the actuator combination modules 1470-1-2 can be supplied cost effectively, the number of actuator combination modules 1470-1-2 incorporated in the devices 1450-1-5 can be increased that that of the example of FIG. 8B. Furthermore, the incorporation of the combination modules 1295, 1460, and 1470 into the devices 1450-1-5 is not necessarily performed with screws, and it may be performed with a double-sided tape or an adhesive tape by end users. That is, in the example of FIG. 8B, the devices 1450-1 and 1450-3 include the sensor combination modules 1460-4 and 1460-5, respectively, and the device 1450-2 includes the sensor combination modules 1460-2-3. However, the above method allows an end user to reattach any particular one of the sensor combination modules 1460-2-5 to a different device 1450.

In the system of the example of FIG. 8, the sensor combination module 1460-5 is not disposed in any of the devices 1450 but is disposed alone at an arbitrary location within a particular section 1142 (or domain 1122). Such a disposition of a combination module 1460-5 (or combination module 1295, 1460, or 1470) alone may be performed by fixing it on a wall, roof, or floor by a user with a fixation member such as a tape, adhesive agent, or thumbtack, or by mixing it in a paint and applying the mixture on a wall, roof, or floor by a user. Furthermore, although this is not shown, an actuator combination module 1470 (as a remote controller which controls, for example, an air conditioner, television, or illumination) may be disposed alone at an arbitrary location within a particular section 1142 (or domain 1122).

As another example of the system of the present embodiment, the combination modules 1295, 1460, and 1470 may be arranged to be mobile with a user to measure position changes of the combination modules 1295, 1460, and 1470 in order to collect a behavioral history the user. Furthermore, although this is not shown, the actuator combination module 1470 may be arranged to be mobile with a user to control a condition change (for example, air condition or brightness by controlling an air conditioner, television, or illumination) from a location of the user within a particular section 1142 (or domain 1122). Such modules 1295, 1460, 1470, or the like can be mobile with a user by temporarily fixing or adhering the module to user's belongings such as glasses, tiepin, shoes, or wallet with a tape or an adhesive agent, or by firmly fixing the module thereto with a screw or the like, or by incorporating the module in such belongings.

Chapter 2 Outline of Hierarchy of Communication Data and Data Structure

Throughout Chapter 1, the whole structure of the system of the present embodiment has been described with reference to FIGS. 1 to 9. In Chapter 2, significances and details of the structure (contents of communication protocol) of the communication data exchanged within the system of the present embodiment described in Chapter 1 will be explained.

Section 2.1 Hierarchy of Network Communication Related Function of Present Embodiment In the network communication of the present embodiment, there is a hierarchy levels of which correspond to different functions, as shown in FIGS. 10A, 10B, and 16 to 17B. In this hierarchy, physical communication media required for the network communication are defined by the lowest physical layers PHY02 and PHY06 corresponding to physical functions shown in FIGS. 10A, 10B, and 16 to 17B. If a physical communication medium is Ethernet connected by a cable or a wire, a cable and a connector of shape and characteristics defined by the standard of the physical layer PHY06 are used. On the other hand, a communication medium is a wireless scheme, a frequency, channel, modulation scheme, basic communication frame structure defined by the standard of the physical layers PHY02 and PHY06 are used.

Media access layers MAC02 and MAC06 correspond to access functions to communication media and they are positioned above the physical layers PHY02 and PHY06. The media access layers MAC02 and MAC06 define data required for proper data transference to a node connected to the network (device 1250 of FIG. 8A or combination modules 1460 and 1470 of FIG. 8B). Furthermore, at the highest layer, an expansion application layer EXL06 and communication middleware layers APL02 and APL06 define various services using the network communication (various service providing functions using the communication).

The hierarchy including levels corresponding to the functions allows a suitable selection/combination of format for each level determined based on the characteristics and performances of the communication sender/receiver. As a result, the whole system (combination modules 1460 and 1470 of FIG. 8B) can be achieved at a low cost, and the communication data (exchanged with the devices 1250 of FIG. 8A) can be achieved with high performance. This advantage will be explained in the following. First, in the physical layer PHY02 and the media access layer MAC02, Z-format (which will be described in Section 2.3 can be used since it is applicable to close range wireless communication which is suitable for the power efficiency required for the combination modules 1460 and 1470. Furthermore, C-format (which will be described in Section 2.5 can be used for the communication middleware layer APL02 since it has simplified communication data which are suitable for the low cost required for the combination modules 1460 and 1470. On the other hand, A-format (which will be described in Section 2.7, E-format (which will be described in Section 2.6, or W-format can be used for the communication middleware layer APL06 since they can handle various data items at the same time in the communication and is thus suitable for the high performance communication required to communicate with a server n_1116-n and a device 1250-1, and therein, the communication data of the expansion application layer EXL06 may be used.

As an intermediate layer of the above hierarchy (layer above the media access layers MAC02 and MAC06 and below the communication middleware layers APL02 and APL06), an Internet protocol version 6 layer IPv6 which corresponds to an internet protocol function is provided, and the data defined thereby can be shared. Sharing of the data means that communication data (which will be described in Section 2.4 defined by the internet protocol version 6 layer IPv6 can be shared by the entire nodes connected to the network within the system of the examples of FIGS. 1 to 8B (communication targets corresponding to senders and receives in the network communication and are specifically, the devices 1250, server n_1116-n, wholesale firm A_1102 of FIG. 8A or the complex modules 1460 and 1470 of FIG. 8B) during the communication. The above situation will be interpreted as follows. That is, as shown in FIG. 10A, the communication data used in (sent by) an out-system network line 1788 and an in-system network line 1782 (which will be described later) may include data defined in common by a standard corresponding to the Internet protocol version 6 layer IPv6. Here, the internet protocol version 6 layer IPv6 defines the communication protocol on the Internet and performs address management and communication route management on the Internet. Thus, the standard defined by the internet protocol version 6 layer IPv6 can set an original internet protocol (IP) address to every node (communication target) regardless of different types of nodes such as the wholesale firm A_1102, server n_1116-n, system controller the systems α_1126, device 1250-1, and combination modules 1460 and 1470. During communication between different systems within the domain 2_1122-2 (during communication between the systems α_1132 and β_1134 in FIG. 1), the management of the communication sender/receiver can be greatly simplified by using the IP addresses (which will be described in Section 2.8. As a result, the following can be achieved, for example. Even if a user goes on a business trip to a foreign country (system β_1134 of FIG. 1, data collection by the sensor combination module 1460 in the home (systems α_1132 of FIG. 1) or operation of the actuator combination module 1470 can be controlled by a mobile device (system controller β_1134) such as a smartphone or a tablet by the user, and this is a great improvement of convenience of the user. Furthermore, at that time, the trip destination (system β_1134) and the home (system α_1132) are protected by the domain 2_1122-2 which does not allow an intruder, and this is a firm security of the system.

Figure 10B:
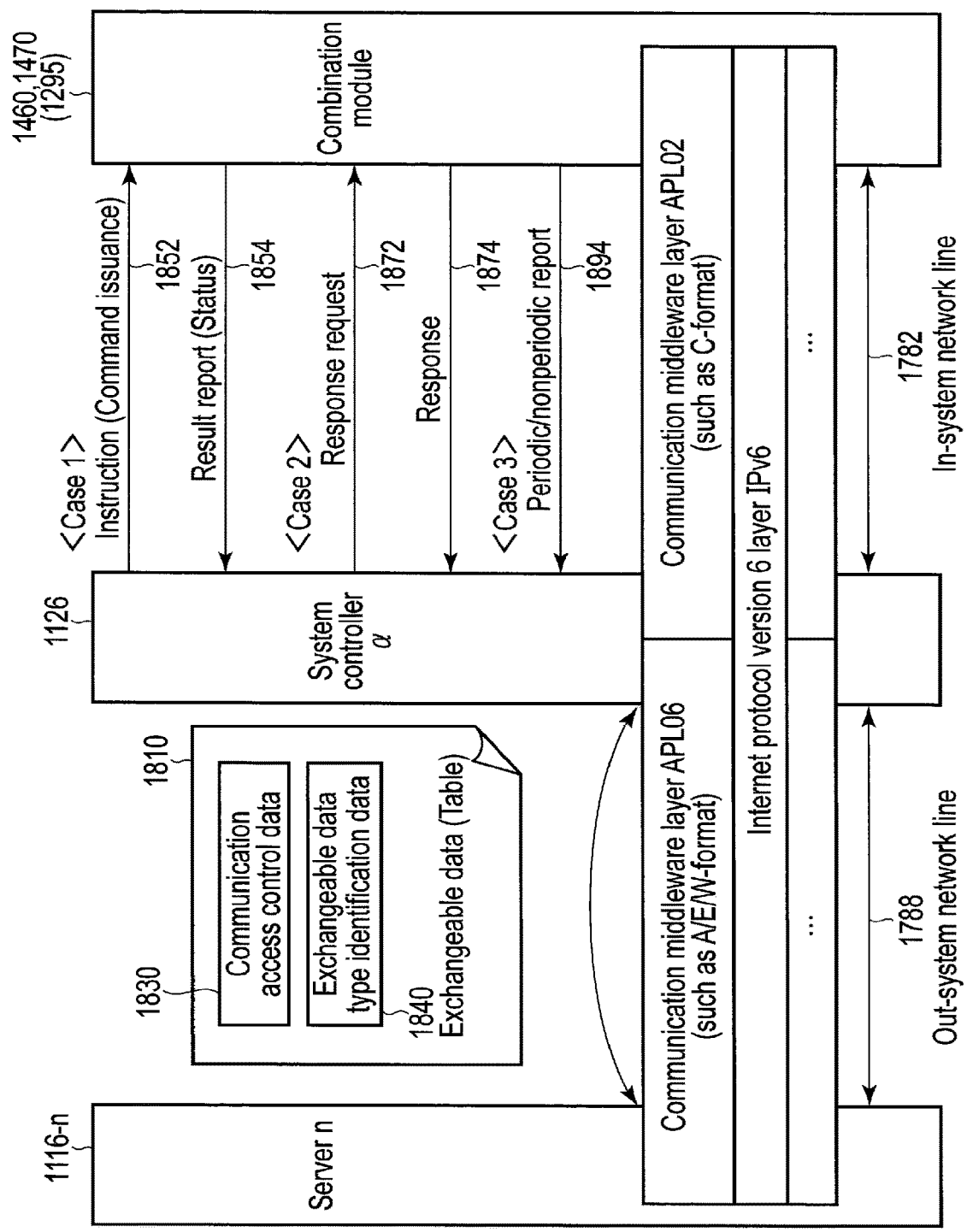
FIG. 10B shows a schematic structure of data exchanged in a communication middleware layer.

Now, based on the system model shown in FIG. 8B, the hierarchy (architecture) levels of which correspond to the functions related to the network communication will be explained with reference to FIG. 10A. Since the examples of FIGS. 10A and 10B are prepared based on the system model of FIG. 8B, the combination modules 1460 and 1470 are disposed in the system as network nodes at the right end. Instead of the combination modules 1460 and 1470, communication modules 1202-5-6 (and sensor modules 1260-3-5) within devices 1250-2-3 which do not involve a device controller 1240-1 shown in FIG. 8A may be used as network nodes at the right end of the in-system network line 1782.

In the left of FIG. 10A, the hierarchy (architecture) levels of which correspond to the functions related to the communication between the server n_1116-n and the system controller α_1126 is shown. Furthermore, in the right of FIG. 10A, the hierarchy (architecture) levels of which correspond to the functions related to the communication between the system controller α_1126 and each of the combination modules 1460 and 1470 is shown.

Here, in the system of FIG. 1, the server n_1116-n can be disposed physically outside the area of the system α_1132 in which the system controller α_1126 is disposed. Thus, as shown in the left of FIG. 10A, the communication between the server n_1116-n and the system controller α_1126 uses the out-system network line 1788. The out-system network line 1788 may be a cabled or wired or wireless internet line. However, no limitation is intended thereby, and a network line used in a relatively tight area such as LAN can be used, for example.

As a physical communication medium, a fiber-optic cable may be used, for example. The physical communication medium is not limited thereto, and it may be any signal transference means such as an electric cord, telephone line, or power line. Furthermore, the signals transferred may be either analogue or digital. The communication standard in the physical layer PHY06 may differ depending not only on physical or signal characteristics of the communication medium but also on communication service provider or country in charge of the communication. Therefore, in the system of the present embodiment, communication standards passing through a physical line in the physical layer PHY06 will be referred to as L-format. On the other hand, if wireless communication is used as the out-system network line 1788 in the physical layer PHY06, communication standards of long range wireless communication scheme such as 2G or 3G or WiMAX may be used. Or, communication standards of middle range wireless communication scheme may be used in the system of the present embodiment. Wireless communication standards including such long range wireless communication schemes and middle rang wireless communication schemes are here referred to as G-format.

Comparing to the above, the combination modules 1460 and 1470 of FIG. 8B are disposed in common in the system α_1132 which is managed by the system controller α_1126. A range of physical formation of the system α_1132 is limited to a relatively small area. Thus, the data communication between the system controller α_1126 and the combination modules 1460 and 1470 is performed using the in-system network line 1782 of FIG. 10A. Here, to distinguish from G-format and L-format used in the out-system network line 1788, the communication standards of the data communicated in the in-system network line 1782 used in the physical layer PHY02 will be referred to as Z-format. In the system of the present embodiment, the in-system network line 1782 may be achieved as either wireless or wired (or wireless/wired switchable).

On the other hand, the standard used in the media access layer MAC02/06 is, in many cases, discussed and proposed by a standard developing committee together with the physical layer PHY02/06. Thus, to conform to that of the physical layer PHY06, L-format or G-format can be used in the media access layer MAC06 which is transferred on the out-system network line 1788 between the server n_1116-n and the system controller α_1126. Similarly, Z-format can be used in the media access layer MAC02 which is transferred on the in-system network line 1782 between the system controller α_1126 and the combination modules 1460 and 1470. However, no limitation is intended thereby. For example, Z-format may be used in the physical layer PHY02 and L-format or G-format may be used in the media access layer MAC02. Or, L-format or G-format may be used in the physical layer PHY06 and Z-format may be used in the media access layer MAC06.

Note that data processing (mainly communication control processing) related to each function of the physical layer PHY06 to the internet protocol version 6 layer IPv6 are performed by the server n_1116-n and the communication modules 1768 and 1202-3 in the system controller α_1126. Note that the communication module 1660 in the combination module 1460 or 1470 explained with reference to FIGS. 5 and 6 as to its internal structure may be divided by its functions into a communication controller 1700 and an interface 1710. The communication controller 1700 performs data processing (mainly communication control processing) related to each function of the physical layer PHY06 to the internet protocol version 6 layer IPv6.

The data related to each function of the physical layer PHY06 to the internet protocol version 6 layer IPv6 are mainly related to the communication control and are not so firmly related to, for example, the function, operation, or performance of the devices 1450. With respect to this point, the communication middleware layers APL02 and APL06 and expansion application layer EXL06 of FIG. 10A are related to various service providing functions using the network communication. The communication data processing related to the functions of the communication middleware layer APL06 and expansion application layer EXL06 (mainly processing related to service providing to users) are performed by processors 1738 and 1230 in the server n_1116-n and the system controller α_1126. On the other hand, the data related to the functions of the communication middleware layer APL02 communicated through the in-system network line 1782 are processed in the interface 1710 in the communication module 1660 in the combination modules 1460 and 1470. That is, in the system of the present embodiment, the entire communication data communicated through the in-system network line 1782 can be processed in the communication module 1660 without providing an expensive processor with the combination modules 1460 and 1470. Since there is no need of disposing any expensive processor therein, the combination modules 1460 and 1470 can be presented cost effectively.

In the system of the present embodiment, amongst the data communicated through the out-system network line 1788, original data which are exclusively usable on particular application software installed in both the server n_1116-*n* and the system controller α_1126 can be stored in the expansion application layer EXL06 to be used in the communication. Thereby, such particular application software can be distinguished from other application software installed in both the server n_1116-*n* and the system controller α_1126. This will cause eager development of application software in software companies based on the market competition principle, and the software-related technique thus will be advanced. Furthermore, this will be convenient for users. Furthermore, since the original data stored in the expansion application layer EXL06 are used, the quality of the services provided with users by the application software can be improved. Note that the performance of the devices 1250-1-2 shown in FIGS. 8A and 9 and their additional extended functions are improved/developed in future, the standards of A-format, E-format, and W-format used in the communication middleware layer APL06 must be updated to correspond to such improvement/development. However, a very complicated procedure is required to update such standards of the above formats and performing the update of standards to keep up with such improvement of performance and extension of additional functions of the devices 1250-1-2 is very difficult. With respect to this point, application software venders can easily respond to the improvement of performance and extension of additional functions of the devices 1250-1-2 by using the expansion application layer EXL06 without waiting for the update of standards. Since particular software vender can freely set data stored in the expansion application layer EXL06 to be used for the communication, the description format of the communication data is not necessarily defined preliminarily as a world standard.

On the other hand, communication data related to the service providing function of the communication middleware layer APL02/APL06 may be based on defined formats such as A-format, E-format, W-format, and C-format. If the communication data related to the service providing function of the communication middleware layer APL02/APL06 conform particular standard format, compatibility between the server 1116 and the system controllers 1126/1128 and between the combination modules 1460 and 1470 can be easily achieved.

Figure 25:
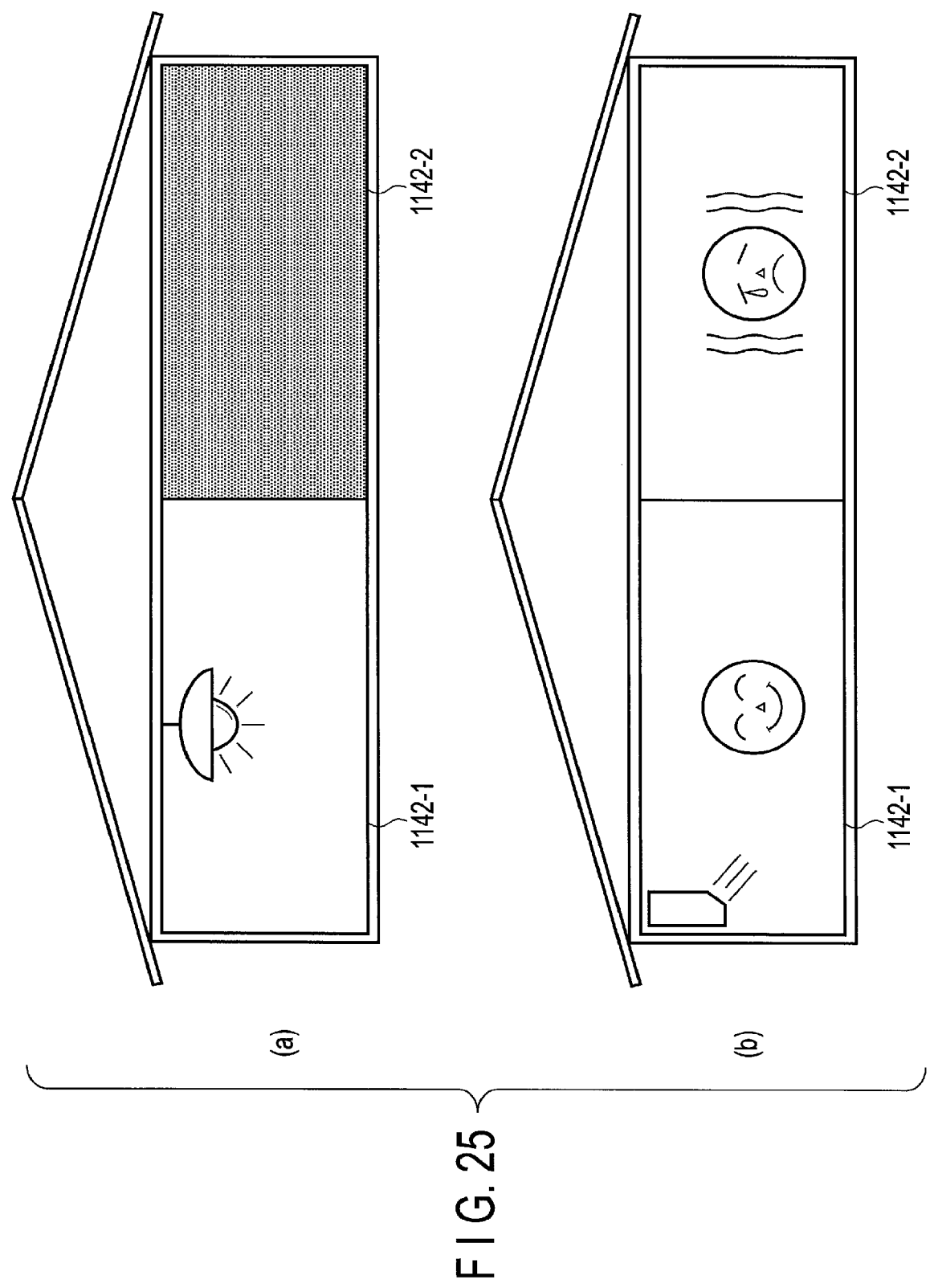
FIG. 25 shows an example method for setting sections spatially separated each other on the basis of efficiency for sensing and/or servicing.

As shown in FIG. 25, both the server n_1116-*n* and the system controller α_1126 include a mass storage memory 1232 (and database 1118-*n*) and high-speed and powerful processors 1738/1230. Thus, various and large quantity of communication data corresponding to various services can be set in the communication middleware layer APL06 exchanged between the server n_1116-*n* and the system controller α_1126. As compared thereto, the combination modules 1460 and 1470 have difficulty in including such a processor for multiple service providing. Therefore, in the system of the present embodiment, a format (C-format or the like) may be used in the communication middleware layer APL02, which is different from a format (A-format, E-format, or W-format) used in the communication middleware layer APL06 in the data communication with the combination modules 1460 and 1470. Especially, by relatively simplifying C-format (described in Section 2.5) used in the communication middleware layer APL02, the load of the processing and costs thereof in the combination modules 1460 and 1470 can be reduced. Furthermore, since the processing can be performed relatively speedy and shortly, the power used by the battery charger module (battery) 1554 can be reduced. However, no limitation is intended thereby, and A-format, E-format, or W-format may be used in the data communication with the combination modules 1460 an 1470.

Here, switching (conversion) of data used in the communication middleware layer APL02 contained in the communication data using the in-system network line 1782 and data used in the communication middleware layer APL06 contained in the communication data using the out-system network line 1788 is performed in the system controller α_1126. Note that, in the communication middleware layers APL02 and APL06 of the system of the present embodiment, the communication data used in the in-system network line 1782 and the communication data used in the out-system network line 1788 do not necessarily make a perfect match and may partly differ. The method of this process will be explained here. As already explained in Sections 1.1 and 1.7 and shown in FIG. 8B, the management and operation of the network communication in the network system α_1132 are performed by the system controller α_1126. Then, the data detected successively and in real time by the entire sensor combination modules 1460 through the in-system network line 1782 and the data of the entire conditions controlled (set) by the actuator combination modules 1470 are arbitrarily stored in the memory 1232 in the system controller α_1126 as management data 1744. The management data 1744 may be stored as a management table in a table format. Furthermore, the structures of FIGS. 8A and 8B are mixed, the data of the entire devices 1250 (detected data and current status data, for example) are stored as a part of the management data 1744 in the system controller α_1126. Then, the system controller α_1126 excerpts only particular data with user privacy data secured from the management data 1744 and sends the data to the server n_1116-*n* through the out-system network line 1788. The data sent to the server n_1116-*n* are stored in the database 1118-*n* as the management data 1748 (which may be converted in a table format) which is managed by the server n_1116. Since the system controller α_1126 performs the conversion (switching) of the communication data used in the communication middleware layers APL02 and APL06 as above, the data of users can be secured, and since minimum required data can be selected in advance and received, the process of the server n_1116-*n* can be simplified as well.

The client system as a combination of the above-explained contents and the outline of the system of the present embodiment as explained in Section 1.1 will produce the following feature. A client system (system α_1132) is an electronic device system connectable to external cloud (server n_1116-1 of FIG. 1), and including a system controller α_1126 which manages data and units (units 1_1290-1-7_1290-7 in FIG. 2) configured to acquire or prepare data to be provided with the system controller α_1126, wherein the system controller α_1126 divides the units into sections 1142 (sections **1_1142-1-*m*_1142-*m* in FIG. 1) as management targets and retains data related to sections to which each unit attributes, and communication between the system controller and the units (including combination modules 1295, 1460, and 1470) is performed using a first data format (C-format or Z-format of FIG. 10A) and communication between the system controller α_1126 and the cloud (server n_1116**-*n*) is performed using a second data format (A/E/W-format or L/G format). Note that the first data format and the second data format are different data formats.

Then, as described in Section 2.2, the first data format includes a header (corresponding to a physical layer header PHYHD in FIG. 11), first data (data from a MAC layer header MACHD to a TCP header TCPHD in FIG. 11), and second data (communication middleware data APLDT).

Furthermore, when communication processing of the communication data with the above characteristics is performed through the system controller $\alpha\_1126$, it proceeds as follows. That is, the system controller $\alpha\_1126$ converts the communication data obtained from the units (combination modules 1295, 1460, and 1470 included therein) into the second data format (A/E/W-format or L/G format in FIG. 10A) and sends the converted data to the cloud (server n_1116-n), and the system controller $\alpha\_1126$ converts data from the cloud (server n_1116-n) into the first data format (C-format or Z-format) and sends the data in the first data format to the units (combination modules 1295, 1460, and 1470).

The units include a function to transfer data to the system controller (this function is performed by the communication module 1660 in FIG. 4A), a function to detect external environment data (including, for example, a temperature and a luminosity) as the data (this function is performed by the sensor module 1260 in FIG. 4B), and a state changing function to change the state of the unit which is a basis of the transferred data (this function is performed by the actuator module 1670 in FIG. 4C). Thus, the units acquire or prepare the data in the first data format as a part of the above data transfer function.

Note that, for the sake of simpler explanation, the communication module 1660, sensor module 1260, and actuator module 1670 are depicted separately in the examples of FIGS. 4A to 4C. However, no limitation is intended thereby, and they may be shared or partly functionally overlapped. In that case, the detection function, the state changing function, and the data transfer function are merged in the units.

Furthermore, if the structure of FIG. 7A is adopted in the communication module 1660, the functions of the communication module 1660 may be achieved by a combination of functional circuits without using the processor 1960 which has been explained with reference to FIG. 7A. In that case, a central processing unit (CPU) which processes the data is omitted in the units.

Now, characteristics of communication data used (transmitted) between the in-system network line 1782 and the out-system network line 1788 in the communication middleware layers APL02 and APL06 will be compared with reference to FIG. 10B. Communication data in accordance with A-format or E-format may be used in the communication between the system controller $\alpha\_1126$ and the server n_1116-n through the out-system network line 1788. Note that, in the system of the present embodiment, A-format includes any formats described in text formats in a broad sense as the communication data related to the communication middleware layer APL. On the other hand, as described in Section 2.6, E-format includes any formats which store a configuration code in a particular area which is preliminarily defined in an area of the communication middleware data APLDT (cf. Section 2.2). Especially, A-format and E-format have a characteristic of communicating (sending) data including plurality of items at once. Note that, the out-system network line 1788 may become busy if it is used by other users. Thus, if a scheme in which data transference is repeated very frequently between the system controller $\alpha\_1126$ and the server n_1116-n, the communication therebetween will be slowed when the network line is extremely busy. In contrast, if the format which can communicate data including plurality of items at once is used as in the present embodiment, the frequency of the data transference between the system controller $\alpha\_1126$ and the server n_1116-n can be reduced and such a risk of slow communication can be reduced. However, the system of the present embodiment is not limited to the above formats, and the communication between the system controller $\alpha\_1126$ and the server n_1116-n may be performed with communication data in accordance with C-format or W-format.

In A-format and E-format, a plurality of template tables preliminarily determined to correspond to types of exchangeable data 1810 exchanged between the system controller $\alpha\_1126$ and the server n_1116-n. Data indicative of what type of table preliminarily determined as a template should be adopted are included in the exchangeable data 1810 as exchangeable data type identification data 1840. The exchangeable data (table) 1810 are shared between the system controller $\alpha\_1126$ and the server n_1116-n, and thus, data processing therebetween can be efficient. That is, application software including a process routine of the exchangeable data (table) 1810 is installed in both the system controller $\alpha\_1126$ and the server n_1116-n, and thus, advanced service can be provided with users.

On the other hand, data indicative of a use purpose of the exchangeable data (table) 1810 to be notified to a receiver are included in the exchangeable data (table) 1810 as the network access control data 1830. For example, the network access control data 1830 in E-format include codes corresponding to a write request, read request, notification request, write and read request, write response, notification, read response, notification response, write and read response, and the like, which are directed to the receiver. Furthermore, the network access control data 1830 in A-format include WRITEONLY (state configuration instruction to a receiver or notification of a sender state to a receiver), READONLY (a request of a reply to a current state of a receiver), READWRITE, and the like which are describable in the exchangeable data (table) 1810 in an extensible markup language (XML) format.

Although this is not depicted in FIG. 10B, as another data communication scheme through the out-system network line 1788, World Wide Web may be used. This scheme corresponds to W-format in FIG. 10A, and either the system controller $\alpha\_1126$ or the server n_1116-n functions as a Web server. In that case, a sender (either the system controller $\alpha\_1126$ or the server n_1116-n) of the communication data designates a receiver (whichever is not the sender between the system controller $\alpha\_1126$ and the server n_1116-n) based on a uniform resource location (URL), and automatically writes the communication data in a write column which is designated by a form format in a web site. After the data communication completes, the receiver stores reception data (or a result of the process) in the management data 1744 or 1748 in accordance with a program preliminarily determined by PHP (a recursive abbreviation of hypertext preprocessor) or Java applet. Here, by providing a plurality of write columns designated by the form format in one web site, data of different contents can be transferred (sent) at once, and the above advantages can be achieved in W-format. In the system of the present application, W-format includes any formats in which a sender writes data in a write column preliminarily designated by a receiver to perform data communication. W-format is not limited thereto, and any formats in which a tag unique to HTML or HTML5 is described may be classified as W-format.

As described above, the data communication between the system controller $\alpha\_1126$ and the server n_1116-n through the out-system network line 1788 is manipulated to reduce the number of data exchanges therebetween. On the other hand, the data communication through the in-system network line 1782 is managed and operated by the system controller α_1126, and there is not such a risk that the communication is slowed by busy network line. The communication data in the communication middleware layer APL02 with respect to the combination modules 1460 and 1470 are simplified to meet the cost-effective and miniaturization demands of the combination modules 1460 and 1470. Specifically, data communication in accordance with one of cases 1 to 3 shown in FIG. 10B can be performed. In case 1, the system controller α_1126 sends an instruction (command issuance) 1852 for a configuration status change (status control) of an actuator combination module and receives a response indicating a result of execution of the instruction 1852 from the actuator combination module. In case 2, the system controller α_1126 issues a response request (request) 1872 to collect sensing data (detection data) of the sensor combination module 1460 and receives the sensing data (detection data) as a reply (response) 1874 from the sensor combination module 1460. Furthermore, as in case 3, if such sensing data (detection data) are notified to the system controller α_1126 by the sensor combination module 1460 at optional times (or periodical times preliminarily determined), periodic/nonperiodic notification 1894 is performed.

Note that, in the system of the present embodiment, other data communication schemes can be used. For example, if the device controller 1240-1 and the device 1250-1 with memory 1242 therein are disposed in the system α_1132 as shown in FIG. 8A, the communication middleware layer APL06 and the expansion application layer EXL06 in accordance with A-format, E-format, or W-format as shown in FIG. 16 may be used for the data communication between the device 1250-1 and the system controller α_1126 on the in-system network line 1782. In that case, for example, application software which can use the expansion application layer EXL06 may be installed in the server n_1116-n in advance. Then, after approval of a user is acquired through the user interface 1234 (shown in FIG. 8A), the system controller α_1126 may automatically perform the install process of the application software in the system controller α_1126 itself and its corresponding device 1250. In the case, the system controller α_1126 accesses the server n_1116-n and transfers the application software preliminarily stored in the database 1118-n. Thereby, the out-system network line 1788 and the in-system network line 1782 are connected through the system controller α_1126 and the automatic install of application software in the corresponding device 1250 can be performed. Thus, an environment in which the expansion application layer EXL06 can be automatically structured without causing a work load to users, and the updated device 1250 with new extended function can be easily compatible and flexible in the network system. Note that, in the system of the present embodiment, communication data in accordance with C-format may be used in, for example, the data communication of the communication middleware layer APL06 between the system controller α_1126 and device 1250 in FIG. 16.

Note that, if the device 1250-1 and the server n_1116-n are directly connected to each other through the router (gateway) 1300 an in FIG. 9, the router (gateway) 1300 is disposed between the device 1250 and the server n_1116-n instead of the system controller α_1126 in FIG. 16. In that case, the same communication data are used for the expansion application layer EXL06 and the communication middleware layer APL06 in both the out-system network line 1788 and the in-system network line 1782. Furthermore, in that case, since an original IP address is set in each of the device 1250 and the server n_1116-n, the data communication can be performed directly between the device 1250 and the server n_1116-n using sender IP address data SIPADRS and receiver IP address data DIPADRS configured in the internet protocol version 6 layer (which will be described in Section 2.4 with reference to FIG. 13). In that case, the communication data in accordance with E-format or A-format are used in the data communication in the communication middleware layer APL06 between the device 1250 and the server n_1116-n. However, in the system of the present embodiment, C-format or W-format may be used instead. Since the same communication data are used in the out-system network line 1788 and the in-system network line 1782, a work load of a relaying process of the router (gateway) 1300 can be greatly reduced. Note that different formats may be used between the physical layers PHY02 and PHY06 and between the media access layers MAC02 and MAC06 (in the example of FIG. 16, Z-format is used in the in-system network line 1782 and L-format or G-format is used in the out-system network line 1788). In that case, the format conversion is performed in the router (gateway) 1300.

On the other hand, if data communication is performed between the system controllers α_1126 and β_1128 which are disposed in the same domain 2_1122-2 but in different systems α_1132 and β_1134, a communication scheme similar to that adopted between the system controller α_1126 and the server n_1116-n in the left of FIG. 10A may be used. In that case, the communication data on the out-system network line 1788 may be used in the entire layers from the physical layer PHY06 to the expansion application layer EXL06. In that case, as mentioned above, the automatic install of application software may be performed with respect to the system controller β_1134. Thus, the communication data in accordance with E-format or A-format are mainly used in the data communication in the communication middleware layer APL06. However, no limitation is intended thereby, and in the system of the present embodiment, C-format or W-format may be used. In that case, a format used in the physical layer PHY06 and the media access layer MAC02 may be:

L-format or G-format if a distance between the systems α_1132 and β_1134 is far; and Z-format is used if a distance between the systems α_1132 and β_1134 is close.

Here, characteristically, the data communication can be performed throughout the world with L-format or G-format while the communication requires relatively longer time, and the data communication area is restricted with Z-format while the communication requires relatively shorter time. Therefore, by switching formats to correspond to a distance between the systems, advantage of each format can be arbitrarily obtained.

Furthermore, as a variation of the system of the present embodiment, the structures of FIGS. 1 and 8B may be merged. In that case, the system controller β_1128 in the system β_1134 (FIG. 1) may directly access the combination modules 1460 and 1470 in the system α_1132. In that case, a communication scheme used will include the system controller β_1128 of FIG. 1 is disposed instead of the server n_1116-n of FIG. 10A, and an in-domain network line is disposed instead of the out-system network line of FIG. 10A. In that case, L-format, G-format, A-format, E-format, or W-format may be used for the communication data in the in-domain network line 2082. Furthermore, in the system of the present embodiment, Z-format or C-format may be used.

Furthermore, similarly to the above, Z-format and L/G-format may automatically be switched based on a distance between the combination module (in system α_1132) and the system controller β_1128. Note that the scheme using the Internet protocol version 6 layer IPv6 will be detailed in Section 2.8.

Section 2.2 Relationship Between Hierarchy of Communication Related Functions and Communication Data on Network Line FIG. 11 shows a relationship between the functional hierarchy of FIGS. 10A and 16 to 17B and specific communication data contents transferred on actual network lines. Even if network communication media are wired or wireless, communication data are transmitted intermittently in each packet on such physical communication media. The packet corresponds to a physical layer frame PPDU of FIG. 11 (f). If a single channel (single correspondent) is used, the packet occupies the network communication media (physical layer frame PPDU) and other communication data cannot be transferred thereon. If the packet (physical layer frame PPDU) has a large size, the occupation period of the network communication media becomes long, and other communication will be blocked. To solve this problem, in the system of the present embodiment, a data size of one physical layer frame PPDU is set to be 127 bytes or less. Thus, a risk that data communication other than the physical layer frame PPDU communication is blocked in the network system can be reduced. One physical layer frame PPDU includes, as shown in FIG. 11 (a), a physical header PHYHD, MAC layer header MACHD, IPv6 header IPv6HD, TCP header TCPHD, communication middleware data APLDT, expansion data EXDT, and cyclic redundancy code CRC in the order of data transference from a sender to a receiver (sequential order or order of data sending). From the standpoint of FIG. 11 (f), the above may be interpreted that the first in the physical layer frame PPDU is a physical layer header PHYHD, and the next is physical layer data or physical layer payload PSDU in which a MAC layer header MACHD, IPv6 header IPv6HD, TCP header TCPHD, communication middleware data APLDT, expansion data EXDT, and cyclic redundancy code CRC are stored.

Note that, in the physical layers PHY02 and PHY06 of FIGS. 10A and 16 to 17B, the physical layer frame PPDU is processed entirely. The physical layers PHY02 and PHY06 are an abstract concept of the functions corresponding to physical communication media. The actual process of each function of the physical layers PHY02 and PHY06 to the internet protocol version 6 layer IPv6 is executed in the communication modules 1768 and 1202-3 and the communication controller 1700 (FIG. 10A). Here, in this section, to simplify the explanation of a relationship between the functions of each level and communication data transferred on the network lines, a data handling order in each level will be explained in detail. However, no limitation is intended thereby and the communication data may be prepared while partially omitting the data handling of each level. For example, in the communication modules 1768 and 1202-3 and communication controller 1700 (FIG. 10A) during data sending, data (data structure) shown in FIG. 11 (a) may be directly prepared from the communication middleware data APLDT and expansion data EXDT (or the communication middleware data APLDT alone) from the communication middleware layers APL02 and APL06 (more specifically, from the processor 1230, 1738 or the interface in the communication module 1660 in FIG. 10A), and the data may be sent through the network lines 1782 and 1788. Furthermore, in the communication modules 1768 and 1202-3 and communication controller 1700 (FIG. 10A) during data reception, a necessary physical layer frame PPDU alone is selectively extracted from the network lines 1782 and 1788 and the communication middleware data APLDT and expansion data EXDT (or communication middleware data APLDT alone) are extracted, and they are handed to the communication middleware layers APL02 and APL06 (more specifically, to the processor 1230, 1738 or the interface in the communication module 1660 in FIG. 10A).

As a specific reception function performed by the physical layers PHY02 and PHY06, the contents of the physical header PHYHD in the first position of the received physical layer frame PPDU are identified and the physical layer data or physical layer payload PSDU in the subsequent position is entirely handed to the media access layers MAC02 and MAC06. Thus, from the standpoint of the media access layers MAC02 and MAC06, the entire physical layer data or physical layer payload PSDU corresponds to a MAC layer frame MPDU. On the other hand, as a specific sending function performed by the physical layers PHY02 and PHY06, the MAC layer frame MPDU received from the media access layers MAC02 and MAC06 is stored in the physical layer data or physical layer payload PSDU and the physical layer frame PPDU in which the physical header PHYPD is added to its first position is transferred through the network lines 1782 and 1788.

Note that, as shown in FIG. 11 (e), the MAC layer frame MPDU includes a MAC layer header MACHD, MAC layer data/payload MSDU, and cyclic redundancy code CRC in this order. In the media access layers MAC02 and MAC06 during the reception, access response control on the communication media is performed using the communication data stored in the MAC layer header MACHD in the MAC layer frame MPDU handed by the physical layers PHY02 and PHY06. Specifically, only the MAC layer data/payload MSDU related to the corresponding device 1250, combination modules 1460 and 1470, or the system controller α_1126 is extracted and handed to the internet protocol version 6 layer _IPv6. On the other hand, during the sending, data handed from the internet protocol version 6 layer _IPv6 are stored in the MAC layer data/payload MSDU, and the MAC layer frame MPDU to which the MAC layer header MACHD is added is structured and is handed to the MAC layer frame MPDU.

Using the cyclic redundancy code CRC added to the end position of the MAC layer frame MPDU (FIG. 11 (e)), whether or not there is a data error in the MAC layer frame MPDU can be checked (or a data error location can be extracted). In the present embodiment, the cyclic redundancy code CRC is used. The CRC is calculated as a redundancy (remainder) obtained by dividing the whole MAC layer header MACHD and MACH layer data/payload MSDU by a predetermined code in a binary notation (1s and 0s). In the data sending, the cyclic redundancy code CRC calculated as above is added to the end position of the MAC layer frame MPDU. In the data reception, a redundancy obtained by dividing the MAC layer header MACHD and MAC layer data/payload MSDU by the code is compared to the cyclic redundancy code CRC. If the redundancies match, it is recognized that there is no error. If there is an error, the location of error can be extracted through a reverse operation based on the cyclic redundancy code CRC obtained in the data reception. Here, an error correction performance (that is, a size of an error correctable area in the entirety of the error correction target data including the cyclic redundancy code CRC (the entirety of the MAC layer frame MPDU in this case)) is determined based on the data size of the cyclic redundancy code CRC. Thus, if the data size of the cyclic redundancy code CRC is fixed, the error correction performance is relatively improved because the data size of the entirety of the error correction target data including the cyclic redundancy code CRC (MAC layer frame MPDU) becomes smaller, and thus, the data reliability of the MAC layer frame MPDU (the error correction is taken into consideration) can be improved.

In consideration of the above, the cyclic redundancy code CRC is disposed in the end position of the MAC layer frame in the present embodiment as shown in FIG. 11 (*e*). As explained in Section 2.3 with reference to FIG. 12A, relatively highly robust data are contained a lot in the physical header PHYHD. That is, even if there are some error bits in the physical header PHYHD, they can be dealt with by automatic correction through some means. In contrast, vary high data accuracy is required for the data in the MAC layer frame MPDU handled in the media access layers MAC02 and MAC06 or above layers. Thus, by adding the error correction function to the MAC layer frame while excluding the physical header PHYHD which has relatively high robustness, the error correction performance is improved and the reliability of the whole communication data (physical layer frame PPDU) can be improved.

Then, as shown in FIG. 11 (*b*), the data in which the IPv6 header IPv6HD is disposed in the first and IPv6 data/payload IPv6DU is subsequently disposed are stored in the MAC layer data/payload MSDU. Then, in the internet protocol version 6 layer IPv6 during the data sending, a combination of the TCP header TCPHD, communication middleware data APLDT, and expansion data EXDT is stored in the IPv6 data/payload IPv6DU, the IPv6 header IPv6HD is added thereto and handed to the media access layers MAC02 and MAC06. Furthermore, during the data reception, the IPv6 header IPv6HD is extracted from the MAC layer data/payload MSDU handed by the media access layers MAC02 and MAC06, subjected to an original treatment, and the communication middleware data APLDT and expansion data EXDT (or the communication middleware data APLDT alone) are handed to the communication middleware layers APL02 and APL06.

Then, the communication middleware data APLDT and expansion data EXDT (or the communication middleware data APLDT alone) shown in FIG. 11 (*b*) are processed in the communication middleware layers APL02 and APL06. Here, various service functions provided through the network communication by the communication middleware layers APL02 and APL06 are achieved by various processes performed by the processors 1230, 1738, 2030, device controller 1240, or interface of the communication module 1660 which are shown in FIGS. 10A and 16 to 17B.

Section 2.3 Data Structure of Z-Format in Physical Layer and Media Access Layer

Figure 12A:
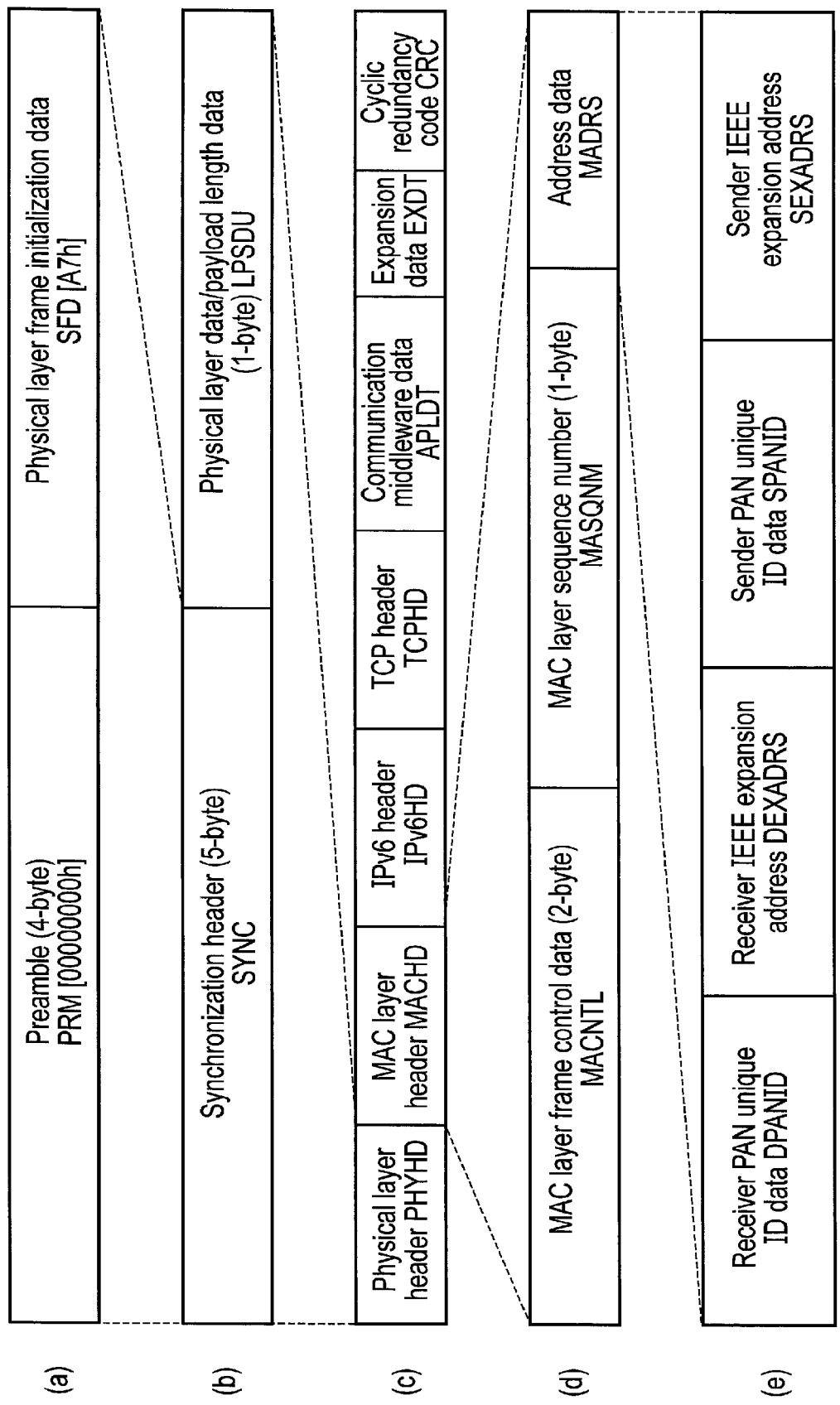
FIG. 12A shows a data structure in a physical layer header and a MAC layer header.

FIG. 12A shows a specific data structure of the physical header PHYHD and the MAC layer header MACHD based on Z-format which is applicable to the physical layer PHY02 and the media access layer MAC02 corresponding to the in-system network line 1782 (cf. FIGS. 10A and 16). Here, Z-format explained below is an example of the format used in the system of the present embodiment, and other formats which can correspond to the in-system network line 1782 may be used instead. Furthermore, data transferred on the in-system network line 1782 is not limited to those have a hierarchy in which the physical layer PHY02 and the media access layer MAC02 are included, and data without a hierarchy or data with a different hierarchy may be used instead.

Initially, the data structure of FIG. 12A (c) is an exact transcription of the contents of FIG. 11 (*a*). As shown in FIG. 12A (*b*), the physical header PHYHD includes a synchronization header SYNC disposed in the initial five bytes and length data of physical layer data/payload LPSDU disposed by one byte immediately after the synchronization header SYNC. Thus, the data size of the physical header PHYHD is six bytes (five plus one). Note that the length data of physical layer data/payload LPSDU indicate the data size of the physical layer data/payload PSDU of FIG. 11 (*f*) and are represented by bytes. As already explained in Section 2.2, the maximum data size of the physical layer frame PPDU is set to 127 bytes. Thus, the length data of physical layer data/payload LPSDU are set to be 121 bytes or less (127 minus 6).

Then, as shown in FIG. 12A (a), the synchronization header SYNC includes a preamble PRM of four bytes disposed initially and a physical layer frame initialization data SFD of one byte. As the preamble PRM, [00000000h] (where h is a hexadecimal value) is set. Here, a direction sequence spread spectrum scheme is used for the signal modulation, and thus, synchronization signals are obtained from 0s of the preamble PRM. Then, [A7h] is set within the area of the physical layer frame initialization data SFD. Here, [A7h] which is a hexadecimal value is converted to 10100111 in a binary notation.

The use of communication data within physical header PHYHD within the communication controller 1700 in the communication module 1660, or the communication modules 1768 and 1202-3 in FIG. 10A or within the communication module 1202-4 and 2002 in FIGS. 16 to 17B will be explained. Generally, the communication data within physical header PHYHD are used for chip synchronization and bit synchronization in the receiver side. That is, the above communication modules include an oscillator (phase lock loop (PLL) circuit) which can automatically synchronize the frequency and phase. The oscillator (PLL circuit) can automatically synchronize the frequency and phase to match the preamble PRM (chip synchronization). Then, the position of the physical layer frame initialization data SFD is detected by, for example, a pattern matching method, and (1) the oscillator recognizes the use of Z-format for the physical layer PHY02 and detects an initialization bit position of the MAC layer header MACHD from a series of binary bits 1/0 (bit synchronization).

As shown in FIG. 12A (d), the MAC layer header MACHD includes areas storing a MAC layer frame control data MACNTL, MAC layer sequence number MASQNM, and address data MADRS in the order of data transference from a sender to a receiver (sequential order or order of data sending).

In the first MAC layer frame control data MACNTL area, the control data of the whole MAC layer frame MPDU (FIG. 11 (*f*)) are stored in two bytes. Specifically, the MAC layer frame control data MACNTL include data indicative of types of the MAC layer frame MPDU in the first three bits. The types are identification data such as a beacon, data, ACK (acknowledgment), and command frame type. In the next one bit, data indicative of presence/absence of security are stored. In the following one bit, data indicative of presence/absence of pending data are stored, and in the following one bit, data indicative of presence/absence of acknowledgement message request are stored.

In the following one bit, data indicative that the data communication is limited within a private area network (PAN) or is performed across a plurality of PANS are stored. As already explained with reference to FIGS. 1 and 8A, in the system of the present embodiment, one PAN may be associated with one system α_1132, or may be associated with one section 1142. Thus, the setting of data may be changed depending on to which the PAN is associated. Note that, if Z-format is used in the data communication in the in-domain network line 2082, data indicative that the data communication is performed across a plurality of PANs may be stored in this area. This is because, as shown in FIG. 1, the system of the present embodiment allows a case where the system controllers α_1126 and β_1128 are separated greatly in the domain 2_1122-2 (and thus are not contained in a single PAN). In such a case, the data indicative that the data communication is performed across a plurality of PANs are stored in this area. On the other hand, if the system controller β_1128 is mobile and is moved toward the system controller α_1126 (and thus both the system controllers α_1126 and β_1128 are in the same PAN), the data indicative that the data communication is performed within a PAN are stored in this area.

Then, in the following two bits and the last two bits in the MAC layer frame control data MACNTL (two bytes), address mode data of each of the receiver and the sender are stored. In Z-format, IEEE extension addresses DEXADRS and SEXADRS may be set or shortened addresses may be set. Here, as shown in FIG. 12A (e), in the system of the present embodiment, the IEEE extension addresses DEXADRS and SEXADRS are used for the receiver and the sender, respectively, as address mode data. In the system of the present embodiment, the network communication is performed through not only the communication modules 1202-3-6 in the system controller α_1126 and the devices 1250-1-3 in FIG. 8A but also combination modules such as the sensor combination modules 1460-1-5 and the actuator combination modules 1470-1-2 in FIG. 8B. Thus, in the system of the present embodiment, the media access layer MAC02 easily identifies which modules are used for the network communication, the communication modules 1202-3-4 or the combination modules 1260-1-5 and 1470-1-2, using the IEEE extension addresses DEXADRS and SEXADRS in the address modes (which will be described later with reference to FIG. 12B (e)). Through this process, (1) rapid switching of the communication middleware layer APL02 (C-format or other format) in the receiver side can be performed, and (2) should any error occurs in the sender side (erroneous identification of communication modules 1202-3-4 or combination modules 1460-1-5 and 1470-1-2), such an error can easily be detected.

Now, the data storage area of the MAC layer sequence number MASQNM data size of which is one byte as shown in FIG. 12A (d) will be explained. As stated above, in the system of the present embodiment, the data size of the whole physical layer frame PPDU is set to 127 bytes or less. That is, if the data size of the communication middleware data APLDT and expansion data EXDT (cf. FIG. 11 (b)) becomes larger, a single physical layer frame PPDU becomes insufficient for the data communication (transfer). This risk increases especially when A-format or E-format is used in the communication middleware layer APL06. In consideration of this point, in the system of the present embodiment, the communication middleware data APLDT and the expansion data EXDT are divided into 256 ($2^8$) physical layer frames PPDU for the transference (communication). Specifically, the communication middleware data APLDT and the expansion data EXDT are divided into a plurality of pieces and sequentially transferred (sent) to the network line. In that case, the physical header PHYHD and IPv6 header IPv6HD (and TCP header TCPHD) shown in FIG. 11 (a) contain the same data contents. Then, in accordance with the data sending (communication) order on the network line, a value starting from 0 (an increment value) is added one by one to the area in the area of the MAC layer sequence number MASQNM. As a result, the divisional sending order of the communication middleware data APLDT and the expansion data EXDT is set, and thus, stable data communication can be performed even if the reception order of the physical layer frames PPDU changes by a network trouble or the like.

The data structure in FIG. 12A (e) is the same as that of FIG. 12B (c). Thus, the address data MADRS in the MAC header MACHD will be explained with reference to FIG. 12B. Note that, in the system of the present embodiment shown in FIG. 1, a single system α_1132 may be formed as a single PAN or as a combination of a plurality of PANs. Or, each of the sections 1142-1-m in the system α_1132 may be formed of one ore more PANs. If a system α_1132 includes a plurality of PANs, the system controller α_1126 needs to perform the management of the PANs. Thus, data are exchanged between different PANs in the system α_1132. To correspond such a situation, the system controller α_1126 allocates PAN-unique identification data to each PAN, and areas to store PAN-unique identification data DPANID and SPANID including receiver and sender nodes are set in a storage area of the address data MADRS as shown in FIG. 12B (c).

In both the receiver and sender IEEE extension addresses DEXADRS and SEXADRS, expanded IEEE extension address EXEXADRS of one byte and IEEE 802.15.4 conformable per-chip address ADRSIEEE of eight bytes are disposed to create each data storage area. Note that the IEEE 802.15.4 conformable per-chip address ADRSIEEE includes unique numbers preliminarily allocated to all the communication modules 1202-3-6, sensor combination modules 1460-1-5, and combination modules such as actuator combination modules 1470-1-2 which conform to the IEEE 802.15.4 standard. The unique numbers are not redundant between different communication modules and combination modules around the world. Note that, although the unique numbers are mainly assigned to the communication modules 1202-3-6 and combination modules during their factory stage, they may be assigned by a direct request to, for example, the IEEE. In the issuance of such unique numbers by the IEEE or a particular organization, individual performance and functions of a combination module and its corresponding communication data in accordance with C-format (categories and template types used in data communication) are acquired in such an organization. Thus, using the data of the IEEE 802.15.4 conformable per-chip address ADRSIEEE, the individual performance and functions of a target combination module can be recognized and the type of communication data using C-format can be officially estimated. Thus, the preparation of corresponding processes by the communication middleware layer APL02 can be accelerated and simplified.

FIG. 12B (e) shows an example of data structure in the expanded IEEE extension address EXEXADRS of the system of the present embodiment. The first one bit thereof is an area which stores module structure data MST. If the one bit is [0], it indicates the communication modules 1202-3-6 stored in the system controller α_1126 and the devices 1250-1-3. If the one bit is [1], it indicates that the corresponding node has a combination module structure. Furthermore, data stored in the next one bit area indicate combination module structure data CMST. If the one bit is [0], it indicates that the corresponding node is a sensor combination module, and if the one bit is [1], the corresponding node is an actuator combination module.

Note that, the data sent from a sensor combination module include various data items such as binary optical level (illumination on/off), multi-valued optical level (corresponding to the luminosity), human presence, and temperature. Furthermore, as explained in Section 1.5 with reference to FIGS. 6A to 6D, data used for the control of an actuator combination module include various data items such as binary on/off data, multivalued data, and remote control data of the device. Thus, the system of the present embodiment includes an area in which data identifying the types of the sensor combination modules 1460 and actuator combination module 1470 are stored as six bit combination module type identification data CMTID. Note that, while the data CMTID are set to identify the type of each of the combination modules 1460 and 1470, the type of the device 1250 is identified by using the number attribution in the <table> Element in A-format (cf. Section 2.7 and FIG. 15B), and is identified by using exchangeable data type identification data EPC in E-format (cf. Section 2.6 and FIG. 15A (f)). Thus, the combination module type identification data CMTID may be used as the exchangeable data identification data 1840 shown in FIG. 10B. As in A-format and E-format, the interpretation of data stored in multi-valued/binary transmission data units CTMDT and CTMDT (described in Section 2.5 with reference to FIG. 14 (d)) conforming to C-format can be facilitated. Furthermore, if the module structure data MST, combination module structure data CMST, and combination module type identification data CMTID are compared to target node functions estimated from the IEEE 802.15.4 conformable per-chip address ADRSIEEE, the accuracy and reliability of read of the address data MADRS can be improved. That is, if a sender should erroneously writes data in a storage area of the module structure data MST, combination module structure data CMST, or combination module type identification data CMTID, or if a receiver erroneously reads data with a bit shift (erroneous reading), such errors can be detected easily through the above comparison. In that case, an alarm notification is made from a receiver to a sender. Specifically, for example, [000] is set in the communication access control data 1830 of FIG. 14 (d), and [00011] is set by combining the multi-valued transmission data CTMDT and binary transmission data CTMDT. This will be further explained in Section 2.5.

Section 2.4 Data Structure of Internet Protocol Version 6 Layer

In Section 2.4, the data structure of the communication data corresponding to the Internet protocol version 6 layer IPv6 will be described with reference to FIG. 13. In this data structure, there are areas storing sender and receiver IP address data SIPADRS and DIPADRS each described in sixteen bytes as shown in FIG. 13 (b). An IP address is set uniquely and individually to every communication and combination module in the world. The IP addresses uniquely and individually set to the communication and combination modules in the world are not redundant. Therefore, in the system of the present embodiment in which data communication including IPv6 header IPv6HD (FIG. 13 (a)) is performable, data communication can be established with a particular communication module or a particular combination module from anywhere in the world by simply entering the domain 2_1122-2 (FIG. 1).

IP packet related data IPPKT are stored in the initial eight bytes of the IPv6 header IPv6HD shown in FIG. 13 (b). As can be understood from FIG. 13 (c), the IP packet related data IPPKT include areas storing first data SIPHD, IPv6 data/payload length data LIPv6DU, header type identification data NXHD immediately after the IPv6 header, and remaining passable node number data HPLMT in this order. The IPv6 data/payload length data LIPv6DU indicate the data size of the IPv6 data/payload IPv6DU shown in FIG. 11 (d) and the area storing the data has two bytes.

Now, the header type identification data NXHD immediately after the IPv6 header will be explained. As shown in FIG. 11 (a), various headers are sequentially stored in one physical layer frame PPDU. Then, the header type identification data NXHD immediately after the IPv6 header designate a header type immediately after the IPv6 header IPv6HD. Thus, in the example of FIG. 11 (a), TCP header TCPHD is designated as the header type identification data NXHD immediately after the IPv6 header. Then, the header type identification data NXHD immediately after the IPv6 header can designate a communication path setting method on a communication network (Internet). Note that, in the system of the present embodiment, data contents stored in the physical layer frame PPDU are not limited to that of FIG. 11 (a) and different data may be stored therein. For example, as another variation, a different type header data may be disposed immediately after the IPv6 header IPv6HD. For example, a user datagram protocol (UDP) header may be disposed instead of the transmission control protocol (TCP) header in FIG. 13. Or, as another variation, the communication middleware data APLDT may be disposed/stored immediately after the IPv6 header IPv6HD. For example, if E-format is used for the communication middleware data APLDT, data of E-format header E-HD are disposed/stored in the first area of the communication middleware data APLDT as described in Section 2.6 with reference to FIG. 15A (b). Thus, in that case, the header type identification data NXHD immediately after the IPv6 header designate the identification data of the E-format header E-HD.

Data communication between the server n_1116-n and the system controller α_1126 using the out-system network line 1788 shown in FIG. 10A or data communication between the system controller α_1126 and system controller β_1128 using the in-domain network line 2082 are rarely performed directly therebetween, and in many cases, data pass a plurality of relay points (relay nodes) through the out-system network line 1788 or the in-domain network line 2082. Here, the maximum number of the relay points (relay nodes) in the middle of the communication paths acceptable between the sender node and the receiver node is denoted by an integer (including zero) by the remaining passable node number data HPLMT in FIG. 13 (c). For example, if data communication is performed between a pair of the above relationship, the value of the remaining passable node number data HPLMT is initially set in the sender node. Then, every time when the communication data pass (are relayed by) the relay points (relay nodes) middle of the communication path, one is subtracted (decrements) from the remaining passable node number data HPLMT, that is, when the data pass one relay point (relay node), one is subtracted from the value of the remaining passable node number data HPLMT. Then, when the remaining passable node number data HPLMT become zero, the network data communication is discarded. Note that the remaining passable node number data HPLMT are described in one byte, and thus, 256 ($2^8$) relay points (relay nodes) can be set at the maximum.

However, when the number of relay points (relay nodes) increases, a communication time required until data from the sender reaches the receiver (time required for data transference) becomes longer. In an emergency data transference such as alarm notification, the communication time must be shortened. In consideration of the data transference time through the relay points (relay nodes), the number of the relay points (relay nodes) must be set 100 or less, and more preferably, 10 or less. Thus, in the system of the present embodiment, the remaining passable node number data HPLMT in the sender side is set to 100 or less or, more specifically, 10 or less in the data communication through the out-system network line 1788 or the in-domain network line 2082. Naturally, the value of the remaining passable node number data HPLMT which is reset (updated) at each of the relay points (relay nodes) on the out-system network line 1788 or the in-domain network line 2082 must be 100 or less, or more specifically, 10 or less. When the value of the remaining passable node number data HPLMT decreases, a router disposed in some relay point (relay node) on the out-system network line 1788 or the in-domain network line 2082 automatically finds the shortest path to the receiver node to prevent discard of data communication in progress. Thereby, the time required for the data communication between the server n_1116-n and the system controller α_1126 or between the system controller α_1126 and the system controller β_1128 can be shortened, and emergency data communication such as alarm notification can be performed promptly.

On the other hand, as a data communication mode using the in-system network line 1782 of the system of the present embodiment, the data communication between the system controller α_1126 and the combination modules 1460 and 1470 as in FIG. 10A, and the data communication between the system controller α_1126 and the devices 1260 as in FIG. 16 can be performed. Then, as in FIG. 1, if a plurality of sections 1142 structure a single system and each section 1142 has a unique PAN, a network communication connecting the PANs is required. In that case, a data transference process is required in a relay point (relay node) every time when communication data crosses adjacent PANs. Thus, in the system of the present embodiment, the maximum number of relay points (relay nodes) between the sender node and the receiver node must be set even in the data communication using the in-system network line 1782. Note that the combination modules used in the system of the present embodiment each include a battery charger module (battery) 1554 as shown in FIG. 5 for power supply. The power charged in the battery charger module (battery) 1554 is used every time when the data transference process is performed in the relay point (relay node). Thus, in the data communication using the in-system network line 1782, the number of the communication data transference at the relay points (relay nodes) must be kept as small as possible. Here, the power used for one communication data transference and the power chargeable in a battery charger module (battery) 1554 are taken into consideration, a suitable number of relay points (relay nodes) is 30 or less, or more specifically, 10 or less. Therefore, when data communication is performed on the in-system network line 1782 in the system of the present embodiment, the sender node sets the value of the remaining passable node number data HPLMT to 30 or less, or more specifically, 10 or less. Thereby, unnecessary power use of a battery charger module 1554 in a combination module can be prevented, and the network communication in the system of the present embodiment can be maintained stably for a long period.

As shown in FIG. 13 (d), the first data SIPHD area of the IPv6 header IPv6HD includes version data IPVRS, communication class data IPCLS, and communication type label data IPLBL, disposed in this order therein. The area storing the version data IPVRS is four bits area and 6 (0110 in the binary notation) as an internet protocol version.

The communication type label data IPLBL are stored in 2.5-byte area which is disposed immediately before the area where the IPv6 data/payload length data LIPv6DU are stored. Note that, if the data size of the communication middleware data APLDT and the expansion data EXDT (FIG. 11 (d)) become large, such data are divided and disposed (stored) separately in a plurality of physical layer frames PPDU as explained in Section 2.3. In this method, to clarify the transference order between the physical layer frames PPDU, incremented values are stored within the MAC number sequence number MASQNM area in the MAC layer header MACHD. In parallel, if the communication middleware data APLDT (and the expansion data EXDT) are scattered in different IPv6 data/payload IPv6DU areas (cf. FIG. 11 (d)), the communication type label data IPLBL is used to identify the entirety of the communication middleware data APLDT (and the expansion data EXDT) in the system of the present embodiment. Note that the contents of the communication type label data IPLBL are determined in the sender node in the first place (before the network communication begins). Thus, when gathered (a series of) communication data contents of the communication middleware data APLDT (and expansion data EXDT) related to particular service are scattered (stored) in a plurality of IPv6 data/payload IPv6DU areas for communication, common label data are stored in the entire storage areas of the corresponding communication type label data IPLBL. Note that, in the system of the present embodiment, the data communication between the server n_1116-n and the system controller α_1126 using the out-system network line 1788 as in FIG. 10A, the data communication between the system controller α_1126 and the devices 1250 using the in-system network line 1782 as in FIG. 16, and the data communication between the system controller α_1126 and the system controller β_1128 using the in-domain network line 2082 are performable. By changing the contents of the communication type label data IPLBL in communication middleware data APLDT (and expansion data EXDT) related to each service, the communication in the above relationships can be performed with the communication middleware data APLDT (and expansion data EXDT) related to different services. As a result, data communication related to different services can be performed at once between the server n_1116-n and the system controller α_1126 (or between the system controller α_1126 and the devices 1250, or between the system controller α_1126 and the system controller β_1128) to provide various services to users at once. In addition, by combining the communication type label data IPLBL and the MAC layer sequence number MASQNM in the MAC layer header MACHD, the accuracy of reliability confirmation of communication data at the receiver can be improved. Furthermore, as another variation, the common data stored in the communication type label data IPLBL may be used as a cryptographic key for the communication middleware data APLDT (and expansion data EXDT) related to the same service.

Note that the communication class data IPCLS of FIG. 13 (d) are used to indicate a communication class in the network communication. Specifically, the communication class data IPCLS are considered to be used mainly in a layer above the internet protocol version 6 layer IPv6 in FIG. 10A (that is, in communication middleware layers APL02 and APL06 and expansion application layer EXL06). As already explained in Section 2.3 with reference to FIG. 12B (d) and (e), the expanded IEEE extension address EXEXADRS is used. Thus, as a variation of the system of the present embodiment, discarding storage areas of the expanded IEEE extension address EXEXADRS in the receiver and sender IEEE extension addresses DEXADRS and SEXADRS;

storing only the IEEE 802.15.4 conformable per-chip address ADRIEEE in the storage areas of the receiver and sender IEEE extension address DEXADRS and SEXADRS (that is, conforming the receiver and sender IEEE extension addresses DEXADRS and SEXADRS to the IEEE 802.15.4 conformable per-chip address ADRSIEEE); and storing the IEEE 802.15.4 conformable per-chip address ADRSIEEE in the storage areas in the communication class data IPCLS (that is, conforming the communication class data IPCLS to the IEEE 802.15.4 conformable per-chip address ADRSIEEE).

As already explained in Section 2.2 with reference to FIG. 10A, the functions of the internet protocol version 6 layer IPv6 are performed by the communication module 1768 or 1202-3, or the communication controller 1700 in the communication module 1660. Then, service providing functions corresponding to the communication middleware layers APL02 and APL06 and the expansion application layer EXL06 are performed by the processor 1738 or 1230, or the interface 1710 of the communication module 1660. Thus, the data including IPv6 header IPv6HD which are disposed before the TCP header TCPHD in FIG. 11 are processed by the communication module 1768 or 1202-3 or the communication controller 1700 of the communication module 1660. Similarly, the communication middleware data APLDT (and expansion data EXDT) are processed by the processor 1738 or 1230, or the interface 1710 in the communication module 1660. Then, upon receipt of a physical layer frame PPDU, the communication class data IPCLS are initially processed in the communication module 1768 or 1202-3, or the communication controller 1700 in the communication module 1660, and the communication middleware data APLDT (and expansion data EXDT) are handed over to the processor 1738 or 1230, or the interface 1710 in the communication module 1660. Thus, by storing the expanded IEEE extension address EXEXADRS in (the storage area for the communication class data IPCLS) the IPv6 header IPv6HD, a preparation to correspond to combination modules can be made in the processor 1738 or 1230, or the communication module 1660 in advance to reception of the communication middleware data APLDT (and expansion data EXDT). Thereby, the speed of process performed by the system controller α_1126 in response to the communication data sent from the combination modules can be improved.

Section 2.5 Data Structure of C-Format in Communication Middleware Layer

In the system of the present embodiment, the main purpose of C-format is to be used in the communication middleware layer APL02 sent to the combination modules 1460 and 1470 on the in-system network line 1782 as explained in Section 2.1 with reference to FIG. 10A. Furthermore, apart from the above, C-format may be used in the data communication between devices in different systems, specifically, between the system controller β_1128 in the system β_1134 and the communication modules 1460 and 1470 in the system α_1132 as explained in the last section of Section 2.1. Alternatively, C-format may be used in data communication with devices 1250. Here, in C-format, the expansion application layer EXL06 (cf. FIG. 10A) is not defined and is only used in the communication middleware layer APL02.

The data structure of C-format is designed as simple as possible to reduce the work load of the communication modules 1460 and 1470 to a minimum. As one of the simplest designs of the data structure, data redundancy in the areas between the physical header PHYHD and the TCP header TCPHD in FIG. 11 (*a*) is prevented to a maximum (details and advantages thereof will be described later). For example, in this structure, the size data of the communication middleware data APLDT is not stored therein but is stored as IPv6 data/payload length data LIPv6DU in the IPv6 header IPv6HD. Here, the IPv6 data/payload length data LIPv6DU indicate the data size of the IPv6 data/payload IPv6DU in FIG. 11 (*d*). Since the data size of the TCP header TCPHD is preliminarily determined, and data size of the communication middleware data APLDT is automatically derived from the IPv6 data/payload length data LIPv6DU as shown in FIGS. 14 (*c*) and (*d*). The basic data size of the communication middleware data APLDT in C-format is defined to one byte; however, depending on the contents of communication data between the combination modules 1460 and 1470, the data size thereof may exceed one byte by adding expanded transference data CEDT to the last part of the communication middleware data APLDT as shown in FIG. 14 (*d*).

As already explained in Section 2.1 in FIG. 10B, exchangeable data (table) 1810 used in the data communication include network access control data 1830 in A-format or E-format. The network access control data 1830 can be stored in C-format in a three-bit format. Especially, by describing in the three-bit format (that is, describing 8 control data types), various network access control data 1830 types can be identified. As a specific control method, in a time of instruction (command issuance) 1852 described in case 1 of FIG. 10B, a reset instruction of [111] is set as the network access control data 1830. When sending a result report (status) 1854, a response reply of [010], or report notification, or acknowledgement notification of [001] is set as the network access control data 1830.

In the system of the present embodiment, when data communication is performed by converting signals detected through an analogue way by sensors in the sensor combination module 1460 in binary data, a threshold value (a reference level used for the binary signal conversion) can be set externally. To set the threshold value, a threshold level setting instruction of [110] is set as the network access control data 1830 to correspond to the instruction (command issuance) 1852 in case 1 of FIG. 10B.

On the other hand, a response (data) request of [011] is set as the network access control data 1830 to correspond to a response request (request) 1872 in case 2 of FIG. 10B. In a response 1874 thereto, a response reply/report notification of [010] is set as the network access control data 1830.

Furthermore, the response reply/report notification [010] is set as the network access control data 1830 to correspond to the periodic/nonperiodic notification 1894 voluntarily performed by the combination modules 1460 and 1470 as in case 3 of FIG. 10B. When an error is detected in the combination modules 1460 and 1470, the alarm notification is performed by setting [000] to the network access control data 1830 as the nonperiodic notification. Furthermore, when the periodic notification is performed voluntarily by the combination modules 1460 and 1470, a time interval between periodic notifications can be set by the system controller α_1126. In that case, an instruction of the intervals between the notifications can be performed by setting [101] to the network access control data 1830.

For example, a case where a smart meter 1124 of FIG. 8A reports used power (common goods) to the system controller α_1126, server n_1116-*n*, or wholesale firm A_1102 at the above time intervals will be considered. In such a case, the report may be prepared as instantaneous values of the user power (common goods) measured in moments, or an accumulation value of the used power measured at particular intervals. In consideration of this point, in the system of the present embodiment, data accumulation intervals are instructed by setting [100] to the network access control data 1830. Here, if [00000] is designated to an area storing transmission data immediately after the storage area of the network access control data 1830, the instantaneous values of usage of goods (used quantity of the common goods such as power) are reported from combination modules at designated time intervals.

As shown in FIG. 14 (*d*), four-bit storage area of multi-valued transmission data CTMDT set immediately after the storage area of the network access control data 1830 and one-bit storage area of binary transmission data CT2DT send transmission data of multi-values or binary. Here, in the present embodiment, a specific data storage area indicative of either binary or multi-values is not included in the transference data but the identification of binary/multi-values is performed by the transference data. That is, if the transference data are binary, values of four-bit multi-valued transmission data CTMDT are set to zero (that is, [0000]). To indicate an ON state or an OK state, [1] is set to the binary transmission data CT2DT. To indicate an OFF state or NG (No) state, [0] is set to the binary transmission data CT2DT. On the other hand, if an error occurs in the combination modules 1460 and 1470 and an alarm notification is sent to the system controller α_1126 ([000] is set in the network access control data 1830), the following transference data setting method is used. In that case, [0000] is set in the multi-valued transmission data CTMDT. Then, if the error in the combination modules 1460 and 1470 is a sensor detection error or an actuator error (actuator is uncontrollable or difficult to control), [1] is set to the binary transmission data CT2DT. Note that, as shown in FIG. 5, since a battery charger module (battery) 1554 is stored in each of the sensor combination module 1460 and the actuator combination module 1470, there is always a risk of low battery (shortage). When the battery charger module (battery) 1554 becomes low, [0] is set to the binary transmission data CT2DT to notify the low battery to the system controller α_1126.

On the other hand, if the transference data is multi-valued, the data are represented in five-bit signals as a combination of the multi-valued transmission data CTMDT and the binary transmission data CT2DT. For example, if 0 to 100% of multi-valued data are stored as the transference data, the multi-value data of 0 to 100% are divided into thirty portions and represented from [00010] (which corresponds to 0%) to [11111] (which corresponds to 100%). However, in the system of the present embodiment, the multi-valued data may be represented by other methods using the combination of the multi-valued transmission data CTMDT and the binary transmission data CT2DT. Furthermore, if the communication of sensor data or setting of threshold values or control values requires very high accuracy for, for example, detecting a temperature or humidity, or changing a luminosity of an illumination, thirty divided portions of the multi-value will be insufficient for the representation of the multi-value data. In such a case, a storage area of expanded transference data CEDT may be added to immediately after the area storing the binary transmission data CT2DT to increase the accuracy in the representation of the multi-valued data. The number of bits used for the representation of multi-value depends on the IPv6 data/payload length data LIPv6DU in the IPv6 header IPv6HD as mentioned above.

As above, binary data or multi-valued data are identified not by binary/multi-value identifiers but by the contents of transmission data, and thus, the data size of the communication middleware data APLDT can be reduced. As a result, data communication traffic (slowdown) on the in-system network line 1782 can be smoothed, and process in the combination modules 1460 and 1470 (especially, in the interface 1710 shown in FIG. 10A) is simplified, and costs of the combination modules 1460 and 1470 can be reduced.

Furthermore, data indicative of meaning of transference data represented in a multi-value are not stored in an area in the communication middleware data APLDT conforming to C-format. Instead, in the system of the present embodiment, the data of IEEE 802.15.4 conformable per-chip address ADRSIEEE of FIG. 12B are used as the data indicative of meaning of transference data represented in a multi-value. As already described in Section 2.3, an organization which issues the IEEE 802.15.4 conformable per-chip address ADRSIEEE grasps the functions and performances of the combination modules 1460 and 1470 corresponding to the address. By publishing the data on the internet, the meaning of the transference data corresponding to the combination modules corresponding to the IEEE 802.15.4 conformable per-chip address ADRSIEEE can be recognized. Furthermore, as can be understood from the explanation of Section 2.3 with reference to FIG. 12B and the explanation of Section 2.4 with reference to FIG. 13 (*d*), the combination module type identification data CMTID can be stored in the receiver or sender IEEE extension addresses DEXADRS or SEXADRS in the MAC layer header MACHD or in the communication class data IPCLS in the IPv6 header IPv6HD. Thus, by combining the IEEE 802.15.4 conformable per-chip address ADRSIEEE and the combination module type identification data CMTID, the meaning and interpretation method of transference data CTMDT, CT2DT, and CEDT (represented in multi-value data, for example) transferred between the combination modules 1460 and 1470 can be recognized accurately. The combination module type identification data CMTID are, since they can be used in the meaning and interpretation method of the transference data CTMDT, CT2DT, and CEDT, related to the exchangeable data type identification data 1840 (cf. FIG. 10B). That is, the combination module type identification data CMTID can be used for the same purpose as the number attribute (cf. FIG. 15B (b)) in <table> Element of A-format, which will be described in Section 2.7. On the other hand, the exchangeable data type identification data 1840 correspond to the exchangeable data type identification data EPC (cf. Section 2.6 using FIG. 15A (f)) of E-format. As to both E-format and A-format, the exchangeable data type identification data 1840 of FIG. 10B are stored in the communication middleware data APLDT.

As compared to E-format or A-format, data in the MAC layer header MACHD (combination module type identification data CMTID of FIG. 12B (e)) or data in the IPv6 header IPv6HD (data in communication class data of FIG. 13 (*d*) in Section 2.4 can be used in C-format as data related to the exchangeable data type identification data 1840 of FIG. 10B. As explained in Section 2.2, the process of communication data progresses from the lower level of the structure of FIG. 10A in a data reception. Thus, if which module is a target node, a sensor combination module 1460 or an actuator combination module 1470, and also what type of combination module is used are preliminarily determined at a relatively lower function level such as the media access layer MAC02 or the internet protocol version 6 layer IPv6, C-format conforming preparation can be performed in the interface 1710 before the communication middleware data APLDT are handed from the communication controller 1700 in the communication module 1660 (shown in FIG. 10A) to the interface 1710. Thereby, the communication data process in the receiver side can be accelerated.

Furthermore, as described above, C-format uses data defined in one level in the other levels to decrease the data size of the communication middleware data APLDT. Thus, the data communication traffic (slowdown) on the in-system network line 1782 can be smoothed, process in the combination modules 1460 and 1470 (especially, in the interface 1710 shown in FIG. 10A) can be simplified, and costs of the combination modules 1460 and 1470 can be reduced.

Now, a specific example of the communication middleware data APLDT in C-format in accordance with the above method will be explained. For example, if the system controller $\alpha\_1126$ performs an instruction (command issuance) 1852 (FIG. 10B) of operation stop with respect to the actuator combination module 1470, [111] reset instruction is set to the network access control data 1830, [0000] binary data instruction is set to the multi-valued transmission data CTMDT, and [0] off instruction is set to the binary transmission data CT2DT. Or, if the sensor combination module 1460 sends a notification (report) that 50% of common goods is currently used to the system controller $\alpha\_1126$, [010] report notification is set to the network access control data 1830, and [10001] 50% is set to the five-bit area which is a combination of the multi-valued transmission data CTMDT and the binary transmission data CT2DT.

Furthermore, another specific example of the communication middleware data APLDT will be explained. As described in Section 4.3;

an adult person with a relatively large finger can stably perform an input even if the sensitivity of a touchpad or a capacitance button is low; however a child or a female person with a relatively small finger cannot perform an input unless the sensitivity of the touchpad or the capacitance button is increased much. In relation to this point, the system controller $\alpha\_1126$ performs the following sensitivity setting with respect to the sensor combination module 1460 which corresponds to a touchpad or a capacitance button after estimating/determining a condition of a user (size of his/her finger) in accordance with Section 4.3. In that case, [110] threshold value level setting instruction is set to the network access control data 1830. Then, if the sensitivity of the touchpad or the capacitance button is increased from 25 to 73%, [11000] corresponding to 73% is set to the five-bit area which is a combination of the multi-valued transmission data CTMDT and the binary transmission data CT2DT.

In the above example, communication timing of binary data related to on/off state setting or the like is separated from communication timing of multi-value data related to user condition setting or the like, if the communication data are binary or multi-valued is identified by checking whether or not there is [0000] in the multi-valued transmission data CTMDT. However, no limitation is intended thereby. For example, the binary data related to on/off state setting or the like and the multi-valued data related to user condition setting or the like can be transferred at the same time. In that case, one-bit binary data may be set to the binary transmission data CT2DT and four-bit multi-valued data may be set to the multi-valued transmission data. If the binary data and multi-valued data are sent together such that both starting an operation and setting a condition setting value (such as temperature setting), the frequency of data communication between the system controller $\alpha\_1126$ and the combination modules 1460 and 1470 is decreased, and the data communication traffic in the in-system network line 1782 (FIG. 10A) can be smoothed.

As described above, the accuracy and stability of the communication can be improved when a combination of the IEEE 802.15.4 conformable per-chip address ADRSIEEE and the combination module type identification data CMTID. If an error should occur in the system controller $\alpha\_1126$, and the function of the combination modules 1460 and 1470 is mistaken, such an error can be detected by comparing the data of the system controller $\alpha\_1126$ and the data of the combination modules 1460 and 1470. If the combination modules 1460 and 1470 detect the error in the system controller $\alpha\_1126$, the system of the present embodiment supports the combination modules 1460 and 1470 to notify the error detection to the system controller $\alpha\_1126$. In that case, [000] alarm notification is set to the network access control data 1830 of FIG. 14 (d). Then, [00011] is set to the five-bit area of the combination of the multi-valued transmission data CTMDT and the binary transmission data CTMDT for a target erroneous identification notification. As above, in the system of the present embodiment, if an error occurs in the system controller $\alpha\_1126$, the combination modules 1460 and 1470 can notify the error to the system controller $\alpha\_1126$. Thus, the stability and reliability of the data communication on the in-system network line 1782 can be improved.

Section 2.6 Data Structure of E-Format in Communication Middleware Layer

The main purpose of E-format used in the system of the present embodiment is, as described in Section 2.1 with reference to FIG. 16, to be used in the communication middleware layer APL06 which is mainly transferred to the devices 1250 and the server n_1116-n. However, no limitation is intended thereby, and E-format may be used in the data communication between the system controller $\alpha\_1126$ and the system controller $\beta\_1128$, or may be used in the data communication with the combination modules 1460 and 1470. Furthermore, as described in Section 2.1 with reference to FIG. 10B, the data communication is basically performed exchanging the exchangeable data (table) 1810 between the sender node and the receiver node in E-format. Thus, the exchangeable data (table) 1810 (or a part thereof) are stored in the IPv6 data/payload IPv6DU as a part of the communication middleware data APLDT shown in FIG. 11 (a). As described in Section 2.7, A-format is described in a text format in a broad sense. In contrast, in E-format, data corresponding thereto are stored in a configuration code in a particular area set in advance. Thus, E-format is defined as a format which stores a configuration code in a particular area in the communication middleware data APLDT. Therefore, in the system of the present embodiment, E-format includes every format which stores configuration codes in series in a particular area set in advance.

In the first position of the communication middleware layer data APLDT of E-format, an E-format header E-HD shown in FIG. 15A (b) is stored in a two-byte area. Then, the value of E-format header E-HD is set to [1081h] (h is a hexadecimal value and this is [0001000010000001] in binary notation). In the subsequent two-byte area, request-response association identification data TID are stored. The request-response association identification data TID are a parameter to associate a preliminarily-sent response request with a received response when a sender sends a response request and receives the response. A sequence of receiving a response 1874 to a response request 1872 corresponds to the sequence of case 2 in FIG. 10B. The code stored in this area can be designated arbitrarily by the sender node of the response request. Then, when the receiver node makes the response to the response request, the same code as the code set by the sender node of one-previous request response is stored in the area of the receiver node. On the basis of a degree of match of the request-response association identification data TID, whether or not the reception data indicate a response to the one-previous request response is determined.

Then, as shown in FIG. 15A (b), E-format data E-DT stored in the area next to the request-response association identification data TID correspond to the exchangeable data 1810 explained in Chapter 2.1 with reference to FIG. 10B. As shown in FIG. 15A (c), the E-format data E-DT include three-byte sender device identification data SEOJ, three-byte receiver device identification data DEOJ, one-byte communication access control data ESV, control/process related data CMI, disposed in this order. Here, the one-byte communication access control data ESV correspond to the network access control data 1830 explained in Chapter 2.1 with reference to FIG. 10B.

Furthermore, as shown in FIG. 15A (d), both the sender device identification data SEOJ and the receiver device identification data DEOJ include one-byte device-type group code DTGC, one-byte device-type code DTC, one-byte same type device identification code DIDC, disposed in this order. The device-type group code DTGC indicates groups of device types to specify which group a target device is included, such as a sensor related device group, air conditioner related device group, residence/facility related device group, or cooking/housework related device group. The device-type code DTC indicates a type of device such as a television or an air conditioner. Note that, if there are a plurality of devices 1250 which are the same type of device in a single system α_1132 (for example, if there are several air conditioners disposed in one residence), the same type device identification code DIDC is set to identify each device 1250.

If each device 1250 is given as an air conditioner, a plurality of setting items such as a temperature, strength of air current, wind direction, and timer (automatic on/off) can be set and changed (condition change control). Thus, in the exchangeable data (table) 1810 shown in FIG. 10B, conditions related to a plurality of items or same time setting change instructions related to a plurality of items (condition change control data) are defined even for a single device, and such data can be described in a table format. Thus, the control/process related data of FIG. 15A (c) can perform condition change control such as condition data collection and setting change of a plurality of items at the same time, as shown in FIG. 15A (e). The number of items of the condition data to be collected at the same time, or the number of items conditions of which are changed at the same time (setting change is performed) is described in one byte as number of control/process NCM. By the number of items set by the number of control/process NCM, the first to nth control/process data CM-1-$n$ are disposed in this order.

As shown in FIG. 15A (f), exchangeable data type identification data EPC of one byte, data size PDC of individual exchangeable data of one byte, and individual exchangeable data EDT are disposed in each of the control/process data CM-1-$n$ in this order. The individual exchangeable data EDT include items such as condition data to be collected, condition data to be sent as a response, and condition change (setting change) control data corresponding to each device 1250. Furthermore, data size data of each of the individual exchangeable data EDT are stored as the data size PDC of individual exchangeable data.

Note that, depending on the type of device 1250 (that is, depending on contents of device-type code DTC), items indicative of conditions and items of targets of condition change control (setting change) differ. Thus, in E-format, items of data conditions of which should be collected and their data representation format are preliminarily determined depending on the type of the device 1250 (contents of the device-type code DTC), or items which should be subjected to the condition change control (setting change) and representation format of the control data are preliminarily determined depending on the type of device 1250, and templates and item codes (template codes) are prepared in accordance with the representation format of each item. The item code set to each type of device 1250 (contents of the device-type code DTC) is stored as the exchangeable data type identification data EPC. The exchangeable data type identification data EPC correspond to the exchangeable data type identification data 1840 shown in FIG. 10B.

Now, the E-format data E-DT corresponding to the exchangeable data (table) 1810 will be explained with reference to a case where a setting change (condition change control) of a home air conditioner is performed by the system controller α_1126. Note that an instruction (command issuance) of setting change (condition change control) in E-format corresponds to a write request explained in Section 2.1. Thus, as the communication access control data ESV (1830) of FIG. 15A (c), [60h] (=no response is required) or [61h] (=response is required) is set. Furthermore, as a setting code of the communication access control data ESV (1830), [62h] is set when the instruction corresponds to a read request, [73h] is set when the instruction corresponds to a notification, and [72h] is set when the instruction corresponds to a read response. The device-type group code DTGC of the home air conditioner is [01h] which is an air conditioner related device group. Furthermore, the device-type code DTC is [30h]. When the air conditioner is assigned as the first air conditioner in the system α_1132, the same type device identification code DIDC is [01h]. Thus, when the system controller α_1126 sends a command 1852 for the condition change control of the home air conditioner (this corresponds to case 1 of FIG. 10B), the identification data of the receiver in FIG. 15A (c) indicate [013001h]. When the air conditioner is activated by the system controller α_1126, the exchangeable data type identification data EPC are [80h], data size PDC of individual exchangeable data are [01h] (=one byte), and individual exchangeable data EDT are [30h]. When the above data are combined altogether, the initial control/process data CM-1 are [800130h]. Then, as nth control/process is set to 26° C., the exchangeable data type identification data EPC are [B3h], data size PDC of individual exchangeable data are [01h] (=one byte), and individual exchangeable data EDT are [1Ah] which indicates 26° C. As the above data combined altogether, nth control/process data CM-n are denoted as [B3011A].

Section 2.7 Data Structure of A-Format in Communication Middleware Layer

The main purpose of A-format used in the system of the present embodiment is, as explained in Chapter 2.1 with reference to FIG. 16, to be used in the communication middleware layer APL06 which is mainly exchanged with the device 1250 or the server n_1116-n. However, no limitation is intended thereby. A-format may be used in data communication between different system controllers α_1126 and β_1128, or may be used in data communication between combination modules 1460 and 1470. Furthermore, as explained in Section 2.1 with reference to FIG. 10B, the data communication is performed by exchanging the exchangeable data (table) 1810 between a sender node and a receiver node. Therefore, the exchangeable data (table) 1810 (or a part thereof) are stored in the IPv6 data/payload IPv6DU as a part of the communication middleware data APLDT shown in FIG. 11 (a).

As shown in FIG. 15B, A-format may be described in an extensible markup language (XML) format as the communication middleware data APLDT. In the present application, a text base description method such as XML or hypertext markup language (HTML) will be referred to as a text format in a broad sense. In HTML format, tags are used in the description. However, the text format in a broad sense does not necessarily include a tag and any description containing a text format can be interpreted as the text format in a broad sense. Thus, programs such as Java applet, Java script, and C language are included in the text format in a broad sense. By describing the communication middleware data APLDT in the text format in a broad sense, the versatility and extensibility of the communication middleware data APLDT can be secured. Thus, in the system of the present embodiment, A-format is defined as a forma described in a text format in a broad sense as the communication data related to the communication middleware layer APL. Any formats described in the text format in a broad sense are included in A-format. The exchangeable data (table) 1810 structured in a table format as in FIG. 10B may be interpreted as a <table> Element area (area defined by tags from <table –> to </table>) in FIG. 15B.

Furthermore, in A-format, <tdl> Element which is a Root Element may be set as a Parent Element of the <table> Element. Here, <tdl> is transferring data language. Furthermore, as in FIG. 15B (b), date of preparation of the <table> Element may be described using data attribution as the attribution data of the <tdl> Element. In the description of FIG. 15B (b), the date of preparation of the table is Dec. 25, 2014.

Then, as shown in FIG. 15B (b), the number attribution or the name attribution in the <table> Element corresponds to the exchangeable data type identification data 1840 shown in FIG. 10B. Note that, in the communication middleware data APLDT described in A-format, there is not an area to indicate data corresponding to the device type group code DTGC and the device type code DTC as in E-format explained in Section 2.6. Instead, templates of the table defining items to be collected for condition check and data representation format in the device 1250, or items of condition change control (setting change) and representation format of the control data of the device 1250 are finely set with respect to each device type. A table number and its table name are designated to each template of the table set finely with respect to each device type. Here, as described as number="02" in FIG. 15B (b), a template number of a table may be directly designated by the number designated by number attribution. Thus, by describing the number attribution or the name attribution in the <table> Element, description of the communication middleware data APLDT automatically matching the template of the table can be performed. Furthermore, in the system of the present embodiment, an additional text may be associated with the exchangeable data type identification data 1840 used for the selection of standard templates used in data exchange tables. Furthermore, similarly to the method of associating the template of the table with the type of device 1250 by designating the value with the number attribution, the combination module type identification data CMTID of FIG. 12B (e) may be used for standard template calling for the data exchange corresponding to the combination modules 1460 and 1470 (which will be described in detail in Section 2.5).

Here, as an example of the communication data description in the communication middleware data APLDT conforming to A-format, periodically-accumulated power value measured by the smart meter 1124 is notified as an accumulated current value (amperes) to a service provider B_1112-2 (server n_1116-n therein) which is a power supplier. Furthermore, as shown in FIG. 1, the smart meter 1124 is connected to the system controller α_1126 or the wholesale firm A1102 through the network, the communication data may be sent to the system controller α_1126 and the wholesale firm A1102. On the other hand, a voltage value to be supplied is preliminarily determined depending on the position of the smart meter 1124 (that is, a voltage value is determined to correspond to a house, building, or industrial factory), and an accumulated current value is notified instead of an accumulated power value. Aside from the example of description of FIG. 15B (b), data described in a text format in a broad sense can be used in the data communication between any devices 1250 and any combination modules 1460 and 1470.

As an example of the notification of the accumulated current value, a standard table (table template) including a table number of 2 and a table template name of Device Nameplate Table may be used in A-format. Furthermore, in A-format, table may be abbreviated to TEL. Therefore, the number attribution in the <table> Element will be described as number="02" and the name attribution will be described as name="DEVICE_NAMEPLATE_TEL".

As described in Section 1.7, a smart meter may notify use conditions of various kinds of common goods such as gas, clean water, and sewerage in addition to the power. In the example of the description in FIG. 15B (b), a type attribution is written type="E_ELECTRIC_DEVICE_RCD", in which RCD means Record of packedRecord. As described in Section 2.2, the communication middleware layer data APDLT (or a part thereof) described in FIG. 15B (b) are packed in the MAC layer data/payload MSDU for the communication. The communication with the communication middleware layer data APDLT (or a part thereof) packed and recorded in a physical layer frame PPDU is described as packedRecord. The same term is used in the number attribution in the <packedRecord> Element to be described as name="E_ELECTRIC_DEVICE_RCD".

As in Section 2.1 and FIG. 10B and in Section 2.6, A-format and E-format include the network access control data 1830 in the exchangeable data (table) 1810. Then, the network access control data 1830 are associated with the accessibility attribution in the <table> Element or the <set> Element. Using the accessibility attribution, a sender node can request any one of READWRITE, READONLY, and WRITEONLY to a receiver node. Here, READ is an instruction to read a condition of a receiver node (such as device 1250 and combination module 1460 and 1470) and to send data read therein (or notify sensor data), and it corresponds to a read request in E-format. Furthermore, WRITE is a data replay or an instruction of condition change setting to the receiver node, and it corresponds to the notification, read response, or write request in E-format. Then, READWRITE is used to instruct a sequence performance of response request 1872/response 1874 in case 2 of FIG. 10B to the receiver node. Or, in the system of the present embodiment, a different description text may be associated with the network access control data 1830. In the example of FIG. 15B (b), accessibility="WRITEONLY" is set because the accumulated current value (amperes) data measured by the smart meter 1124 are notified to the receiver node (such as server n_1116-n, controller α_1126, or wholesale firm A1102).

Furthermore, an element in the example of FIG. 15B (b) is an item such as sensing target data, detection target condition data, or condition data as control (setting change) target. The element is described in each <element> Element as to per item preliminarily designated in a template of a table selected to match the data contents (data contents designated by number attribution or name attribution in <table> Element) designated in the exchangeable data type identification data 1840 in FIG. 10B.

Here, in preliminarily set table templates with their table number being 2, the table template defined as type="E_ELECTRIC_DEVICE_RCD" preliminarily includes, as items defined in <packedRecord> Element, E_KH (periodically accumulated power), E_KT (test pulse output), E_INPUT_SCALAR (defining unit of communication data and indicating a compression rate of the value input by sensors), E_ELEEMNT (local number of smart meter), E_VOLTS (real time monitoring of instant voltage value/change in voltage in power transmission system), and E_AMPS (periodically accumulated current value). In the example of FIG. 15B (b), only E_KH and E_AMPS are defined using <element> Element.

Tag <element> Element defining E_KH in the name attribute states that the notification of power periodically accumulated by the communication data. As being standardized, what E_KH means can be interpreted from the description of <element name="E_KH">. However, <description> Element is set such that the contents of the exchangeable data (table) 1810 can be understood without referring to a standard specification. Since A-format can be described in a text format in a broad sense, auxiliary explanation can be added by such a broadly used text in A-format. Therefore, the contents of description can be interpreted without referring to a standard specification, and the exchangeable data (table) 1810 can be easily interpreted at the receiver node.

As an example of A-format, values are set using <set> Element. However, no limitation is intended thereby, and values may be set through a different description method. Furthermore, in advance to the use of <set> Element, a type of "E_AMPS_RCD" is defined in <element> Element in which E_KH is defined with the name attribution (thus, <element name="E_AMP" type="E_AMPS_RCD"/>) to indicate that the item of a periodically accumulated current value is packedRecord in the MAC layer data/payload MSDU and notified. Then, <set> Element is defined using the same E_AMPS_RCD.

The periodically accumulated current value measured by the smart meter 1124 is defined in the value attribute in <enum> Element (enum is an electrical numerator). Here, the smart meter 1124 automatically substitutes the measured value to $$$$ of value="$$$$". Furthermore, a variable identifier E_AMPS of the values set here is designated by the name attribution in <enumerator> Element.

As an auxiliary explanation function in A-format, <description> Element can be cited as aforementioned. However, no limitation is intended thereby, and such auxiliary explanation may be performed using label attribution or text attribution.

Section 2.8 Address Table Used in System of Present Embodiment and Example of Use Thereof The descriptions in Sections 2.3 to 2.7 indicate that addresses set in a module may be redundant in each level. FIG. 23 shows data structure of an address table indicating a list of various addresses set with respect to a sensor mule 1260-1 and an actuator module 1270-1 of FIG. 8A or an actuator combination module 1470-1 and a sensor combination module 1460-5 of FIG. 8B. As a method of using the address table, a method described in Section 4.2 may be used aside from the method described in this section.

In FIG. 23, vertical columns indicate the redundancy of various addresses of the actuator combination module 1470-2 and the sensor combination module 1460-5 in FIG. 8B, and also indicate the redundancy of various addresses set in the sensor module 1260-1 and the actuator module 1270-1 of the device 1250-1 of FIG. 8A. Note that IEEE extension address EXADRS which is one of the address items in the address table of FIG. 23 is given to the communication module chip 1202-4 (cf. Section 2.3). Therefore, the IEEE extension address EXADRS corresponding to the sensor module 1260-1 and the actuator module 1270-1 of FIG. 23 is associated with the communication module chip 1202-4 in the same device 1250-1.

Regarding the address items in the address table of FIG. 23, an IEEE extension address EXADRS is set individually in a media access layer MAC02, as explained in Section 2.3. Then, an IP address IPADRS (sender IP address data SIPADRS/receiver IP address data DIPADRS) is set individually in an Internet protocol version 6 layer IPv6, as explained in Section 2.4. A same type device identification code DIDC is set in a communication middleware layer APL056 to conform to E-format explained in Section 2.6.

In the system of the present embodiment, the system controller β_1128 and the memory 1232 of the system controller α_1126 include a list of FIG. 23 with the section data indicative of the current position of each module, and thereby:

(1) service can be provided efficiently and accurately;

(2) format conversion in the system controller β_1128 and in the system controller α_1126 can be performed easily; and (3) detection of error in the sender node or in nodes on a communication passage can be performed easily.

Thus, the credibility of data communication can be improved. As will be explained in Chapter 4, service can be provided with sections 1_1142-1 to m_1142-m individually. Thus, when conditions of devices 1250 and actuator combination modules 1470 are controlled (setting conditions are changed) in each section 1142 as a form of the service, the condition control (change of setting condition) of target devices 1250 and target actuator combination modules 1470 can be very easily performed using the data of FIG. 23.

Furthermore, as explained in Section 2.1, if the data communication is performed through different network lines (in-system network line 1782/out-system network line 1788/in-domain network line 2082), format may be changed during the data communication. Such a format change can be performed smoothly and accurately with the data of FIG. 23.

Now, a specific example of data communication will be given with a case where the data communication is performed between a device 1250 or combination modules 1460 and 1470 in the system α_1132 and a system controller β_1128 in the system β_1134. During the data communication, a format conversion is performed in the system controller α_1126 performing the data relay. However, in the system of the present embodiment, the data of FIG. 23 can be used in any type of network communications. As a precondition, a case where the data of FIG. 23 are preliminarily stored in the memory 1232 in both the system controllers α_1126 and β_1128 is given. Even if the location of the system controller β_1128 is greatly distant from the system α_1132, the system controller β_1128 can recognize what kind of data can be collected from the system α_1132 and what kind of condition control (change of condition setting) can be performed using the data of FIG. 23. Furthermore, since the internet protocol version 6 layer IPv6 can be used in the entire data communication, the IP address data IPADRS are set in advance in the system controller β_1128, devices 1250, and combination modules 1460 and 1470.

Now, a method of converting C-format to E-format in the communication middleware layers APL02 and APL06 in the system controller α_1126 during the data communication will be explained. As explained in Section 2.5, C-format does not include any address data, and thus data necessary for setting E-format cannot be obtained from C-format. However, data related to E-format are preliminarily recorded in the table of FIG. 23. Thus, data conforming to E-format are prepared in the system controller α_1126 (specifically, in the processor 1230 thereof) using the device type group code DTGC, device type code DTC, and same type device identification code DIDC in the table of FIG. 23.

In contrast, a case where A-format, E-format, or W-format is conversed into C-format will be explained. As explained in Section 2.5, when C-format is used in the combination modules 1460 and 1470, expanded IEEE extension address EXEXADRS of FIGS. 12B (d) and (e), which is defined by the levels other than the communication middleware layer APL02, is used. However, a C-format conforming process can be performed smoothly if IEEE extension address EXADRS of each of the combination modules 1460 and 1470 in the table of FIG. 23. If any format which does not include an expanded IEEE extension address EXEXADRS in the IEEE extension address EXADRS should be used, the attribution data of the combination modules 1460 and 1470 still can obtained through the internet using the IEEE 802.15.4 conformable per-chip address ADRSIEEE. Of course, no limitation is intended thereby, and any other method may be used instead. That is, since the internet protocol version 6 layer IPv6 is common in the entire data communication in the system of the present embodiment, data of the expanded IEEE extension address EXEXADRS of FIG. 12B (d) can be preliminarily stored in the communication class data IPCLS of FIG. 13 (d) as explained in Section 2.4 (even if the data communication is performed using a format other than C-format).

Now, a method of converting a format in the system controller α_1126 (specifically, in the processor 1230 thereof) in relation to the physical layers PHY02 and PHY06 and the media access layers MAC02 and MAC06 will be explained. In that case, only physical layers and media access layers are switched using the data of the table of FIG. 23 on the basis of the common IP address IPADRS designated by the Internet protocol version 6 layer IPv6. That is, sender IP address data SIPADRS and receiver IP address data DIPADRS (cf. FIG. 13 (b)) are stored in common in the IPv6 header IPV6HD in the system of the present embodiment, regardless of communication middle path. Thus, receiver PAN unique data PANID and receiver IEEE extension address EXEADRS used in Z-format can be extracted from the data in the table of FIG. 23 by referring to the receiver IP address data DIPADRS.

The reliability of the data communication through network lines can be improved using the data in the table of FIG. 23, and this point will be explained in this final part of this section. If an error should occur in the sender node or in data relaying nodes in the middle of the communication path (including the system controller α_1126), inappropriate data may be incorporated in a part of the communication data shown in FIGS. 12A to 15B, and this will block the data communication in the network system. However, such an error in the communication data and a position of error can be very easily specified by the verification of the communication data using the data in the table of FIG. 23 performed by the system controllers α_1126 and β_1128. As a result, the reliability of the data communication can be improved.

Chapter 3 Management/Display Method for Each Unit

Section 3.1 Outline of Basic Unit Management Method

As described in Section 1.1 with reference to FIGS. 1 and 2, the system of the present embodiment comprises a hierarchical structure of "domain/system/section/unit/device or combination module". That is, domain 2_1122-2 is composed of at least one system α_1132, and one system can be divided into the sections 1142. Then, unit 1290 is arranged for each of the sections 1142. Device 1250, combination module 1295 or a mixed system thereof is accepted as a specific form of unit 1290. Furthermore, system controller α_1126, which manages or controls network communication in system α_1132, or acquires data of the network communication, is present, and manages unit 1290. Here, alternative management/control/data acquisition of another system controller β_1128 can also be properly performed to handle an unexpected situation such as a power failure or a breakdown. Furthermore, "movable" or "arrangement of the outside of corresponding system α_1132 at least for a temporary period" is accepted for alternative system controller β_1128.

In the system of the present embodiment, units are managed for each of systems α_1132, as the management method of units based on the hierarchical structure. As described above, system controller α_1126 (or system controller β_1128) manages or controls the network communication for each system, or acquires data of the network communication. Thus, as described above, an advantage is found in that convenience concerning the management/control/data acquisition of the network communication of system controller α_1126 (or system controller β_1128) can be improved by collectively managing all units 1290 included in the same system α_1132 by the unit of system α_1132.

Alternatively, an advantage is also found in that a unit 1290 to be managed in system α_1132 is switched depending on units 1290 which enters or leaves system α_1132 using plug-in processing, plug-out processing or check-in processing to be described later in Section 4.2. That is, when a specific unit 1290 enters system α_1132, system controller α_1126 (or system controller β_1128) automatically detect it, and automatically registers specific unit 1290 as a unit 1290 to be managed of system controller α_1126 (or system controller β_1128). On the contrary, when another predetermined unit 1290 goes out of system α_1132, system controller α_1126 (or system controller β_1128) automatically detects it, and automatically deletes predetermined unit 1290 from unit 1290 to be managed of system controller α_1126 (or system controller β_1128).

This allows the network communication in specific system $\alpha\_1132$ to be managed with stability and high reliability kept, even if a plurality of units 1290 frequently enter or leave specific system $\alpha\_1132$.

For example, when an external hard disk device, an external optical disk device, a USB memory device, or the like is connected to a conventional computer system, it is automatically recognized (plug-in processing) as a new additional drive (for example, D drive or E drive), and managed as a drive. If the small number of units 1290 are included in the same system $\alpha\_1132$, each of units 1290 may be managed as an individual drive as described above. However, in the system of the present embodiment, a large number of units 1290 can be included in the same system $\alpha\_1132$. If units 1290 are successively added as drives in the same system $\alpha\_1132$, for example, a D drive, an E drive, . . . , as described above, the drive management will fail after a Z drive is added. Units 1290 managed using the conventional art in this manner comprises the following problem (A):

(A) It is impossible to handle increase of the number of units 1290 in the same system $\alpha\_1132$.

When port allocation for network communication control, etc., is also taken into consideration as well as the drive management, the following related problem (B) arises:

(B) As the number of units 1290 increases, corresponding port allocation fails.

When unique and novel measures are taken to avoid problems (A) and (B), the following problem further arises:

(C) Compatibility with management method in conventional computer system is lost.

To simultaneously solve problems (A) to (C), units are managed by a method similar to that of managing files through a computer network in the present embodiment. One unit 1290 is considered to be nearly equal to one pseudo file. The processing of predetermined data acquisition (for example, gathering of sensor data) from unit 1290 viewed from system controller $\alpha\_1126$ (or system controller $\beta\_1128$) which manages unit 1290 is managed as data reproduction (READ) processing from unit 1290. Similarly, the processing of changing (controlling) a setting condition to unit 1290 viewed from system controller $\alpha\_1126$ (or system controller $\beta\_1128$) which manages unit 1290 is managed as writing (WRITE) processing of setting condition data (content to be controlled) after change of unit 1290.

Here, a Uniform Resource Locator (URL) is often specified to specify a file storage position on the network when files are managed through a computer network. However, the position of unit 1290 is determined to be in the same system $\alpha\_1132$, and thus, system $\alpha\_1132$ to be managed is allocated as one drive, folder or directory, instead of specifying URL in the present embodiment. If an individual drive is allocated for each of units 1290 as in (A), it will be hard to handle the increase of the number of units 1290. However, if only a single drive, folder or directory is allocated to one system $\alpha\_1132$ as described above, the increase of the number of units 1290 can be flexibly handled. Further, a failure does not occur in the port allocation, producing an advantage of securing compatibility with the management method in the conventional computer world.

Next, a method of realizing the basic concept is described. There is a method of defining a new unit management-capable application interface (API) to apply the management method of unit 1290 by application software in which a computer network is used. Alternatively, a new unit management-capable built-in function or a subprogram which can be referred to or utilized may be defined. A program called a "subroutine" may be used as a subprogram which can be referred to or utilized from the other program. Furthermore, the built-in function may be a program called "function" or a predetermined program called "method" which is built in specific application software (specific class) and used using JavaScript.

Section 3.2 Unit Management Means

The basic concept of the unit management described in Section 3.1 is realized not only by the above application software but by hardware to be described below.

FIG. 18A shows a hardware configuration and a software hierarchical structure around the conventional computer system. Processor 3010 in a computer is connected to a communication controller 3028 and a recording medium controller 3024 through a busline 3012. Mutual communication of device drive (commonly called debadora)-capable command/status data is performed between processor 3010 and the recording medium controller 3024 through a connector 3018 directly connected to the busline 3012. The recording medium controller 3024 decodes it, and directly drives a recording medium (hardware) 3014. Here, a hard disk, an optical disk, a flash drive, etc., are cited as a specific example of the recording medium (hardware) 3014.

The data communication executor 3016 indicates a portion in which network communication is actually executed, and comprises communication means based on wired or wireless communication medium. The data communication executor 3016 is controlled by processor 3010 in the same manner as the above.

As conventional computer control by software, an operating system (OS) layer 3030 comprises a device driver area 3022 engaged in the control of the recording medium (hardware) 3014, and a communication driver area 3026 engaged in the control of the data communication executor 3016. On the other hand, an application software 3050 issues an application programming interface (API) command 3045 to the OS layer 3030, and executes the application software 3050.

System controller $\alpha\_1126$ (or system controller $\beta\_1128$) comprises a great advantage, in comparison with the conventional art, that both data communication control by use of the out-system network line 1788 and that by use of the in-system network line 1782 are used as shown in FIG. 10A. Then, both an out-system connection-capable data communication executor 3017 and an in-system connection-capable data communication executor 3015 are included as shown in FIG. 18B. In FIG. 18B, both of them are separately shown for convenience. However, no limitation is intended thereby, and the out-system connection-capable data communication executor 3017 and the in-system connection-capable data communication executor 3015 may be overlapped/shared, or one may be substantially included in the other, which is expressed as broad inclusion.

The out-system connection-capable data communication executor 3017 and the in-system connection-capable data communication executor 3015 in FIG. 18B mean a transceiver of a wireless radio wave (including detection) or a communication data transceiver of wire communication. Thus, an out-system connection-capable communication controller 3029 and an in-system connection-capable communication controller 3021 which control them are present. In the figure, a predetermined program area corresponding to an out-system connection-capable communication driver area 3027 and that corresponding to an in-system connection-capable communication driver area 3025 are present in the OS layer 3030 for convenience. However, an independent subprogram is not necessarily present. Both of them may be partially shared, or a program step of one of them may be overlapped/shared with a program area corresponding to a Basic Input/Output System (BIOS) control area 3020.

To realize the outline of operation described in Section 3.1, a management/control area of in-system unit 3034 corresponding to a virtual device driver area (the term "device driver" which corresponds to a recording device is used for management for each unit as a pseudo file) is (physically really or virtually) formed in the embodiment of FIG. 18B. The management/control area of in-system unit 3034 is composed of (at least part of) processor 3010 with a hardware structure comprising a control program corresponding to the in-system connection-capable communication driver area 3025, the in-system connection-capable communication controller 3021, and the busline 3012 (including the connector 3018) which connects both of them.

The structure in the management/control area of in-system unit 3034 corresponds to the processor combination module 1465 described with reference to FIG. 4D. That is, as has already been described in Section 1.3, a portion engaged with network communication by use of the in-system network line 1782 in system controller α_1126 (or system controller β_1128) forms combination module 1295 called the processor combination module 1465.

Even if a special line of the in-system network line 1782 is used, it is considered that the portion engaged with the network communication should be regarded as part of the communication controller 3028 or the communication driver area 3026 of FIG. 18A in the conventional art. However, as described in Section 3.1, if unit 1290 is managed by considering it to be nearly equal to one pseudo file, the management/control area of in-system unit 3034 is functionally close to the device driver area 3022 in FIG. 18A. Thus, at least part of the management/control area of in-system unit 3034 is included in a device drive area 3022 in the OS layer 3030 in the embodiment shown in FIG. 18B. As shown in FIG. 18B, part of a control program corresponding to an existing device driver area 3022 may be used to manage unit 1290. Alternatively, part of the control program corresponding to an existing BIOS control area 3020 may be used to manage unit 1290 (that is, part of the control program corresponding to the BIOS control area 3020 may be included in the management/control area of in-system unit 3034).

In the embodiment of FIG. 18B, a predetermined OS is used in system controller α_1126 (or system controller β_1128). However, no limitation is intended thereby, and system controller α_1126 (or system controller β_1128) may be executed without using any existing OS.

Figure 19A:
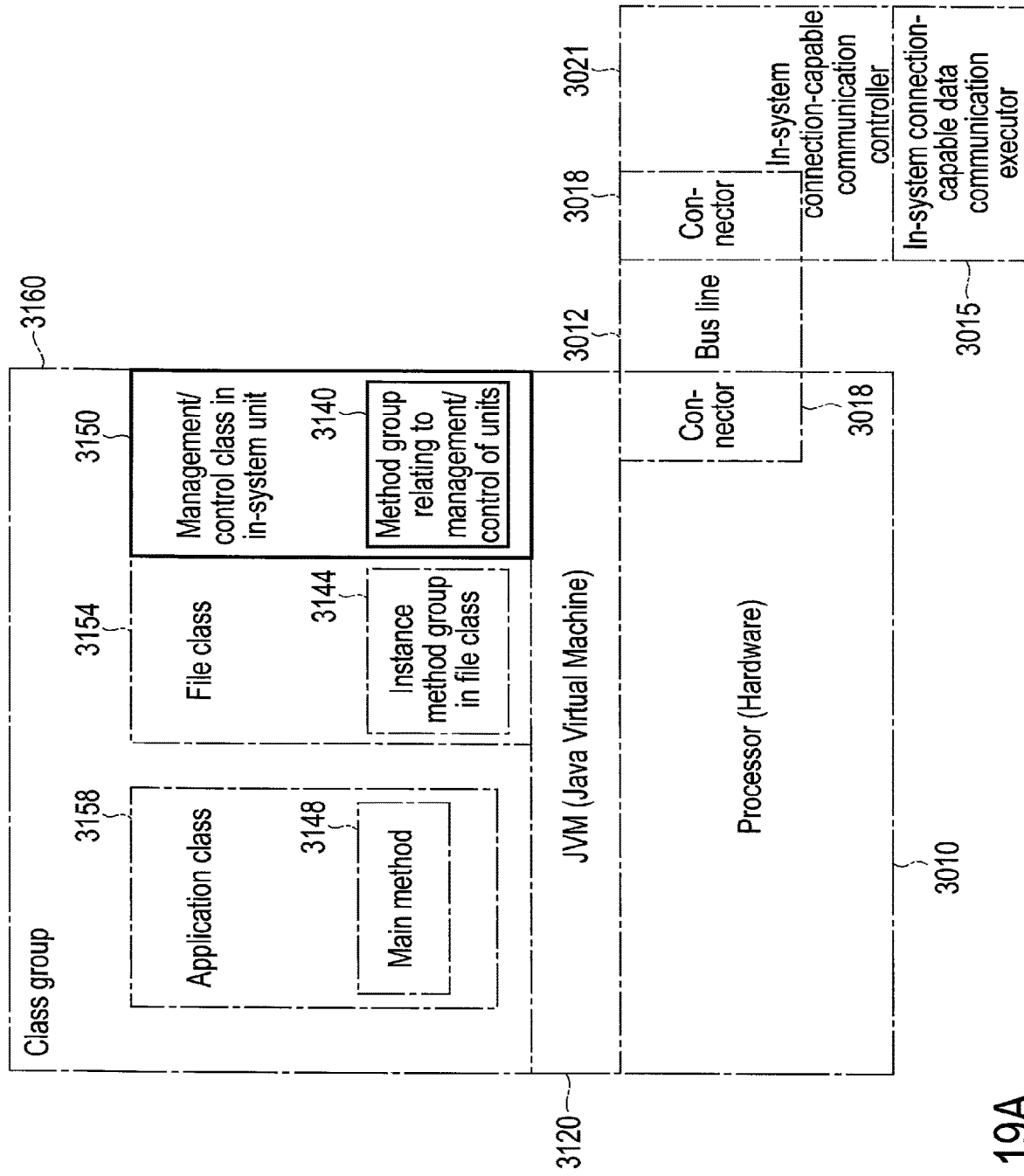
FIG. 19A shows another embodiment regarding a computer system constitution including a management/control area of in-system unit.

The applied example of the embodiment shown in FIGS. 19A and 19B indicates means for managing unit 1290 using JavaScript. A Java Virtual Machine (JVM) is placed in each of corresponding processors 3010 instead of using a predetermined OS in this JavaScript. The program environment executed herein is composed of a class group 3160, and, for example, a main method 3148 in an application class 3158 is executed in accordance with a user request. The class group 3160 comprises various programs written in JavaScript.

In FIG. 19A, processor 3010 and the in-system connection-capable data communication executor 3015 are hardware. The operation of the in-system connection-capable data communication executor 3015 is controlled by the in-system connection-capable communication controller 3021.

In the conventional art, a program engaged with file management in the class group 3160 is stored in a file class 3154 composed of a plurality of instance method groups in the file class 3144. On the other hand, in the applied example of the embodiment, a management/control class in the in-system unit 3150 for managing unit 1290 is newly set in the class group 3160. An area in which a method group relating to management/control of units 3140 is stored is present in the management/control class in the in-system unit 3150. A program for executing segmentalized operations related to management/control of unit 1290 is present as various methods. A group of these various methods is called a method group, and forms the method group relating to management/control of units 3140.

Next, the relationship between a program 3188 described in the main method 3148 in the application class 3158 and the method group relating to management/control of units 3140 is described with reference to FIG. 19B.

When the application class 3158 is started, import processings 3174 and 3170 (import processing) of a prespecified file class 3154 and the management/control class in the in-system unit 3150 newly suggested in the applied example of the present embodiment is performed. The instance method group in the file class 3144 included in the incorporated (imported) file class 3154 and the method group relating to management/control of units 3140 included in the management/control class in the in-system unit 3150 can be used in the application class 3158.

Next, a file system can be effectively executed with reference 3194 to a predetermined method in an instance method group in the file class 3144 from a program step 3188 described in the main method 3148. Similarly, management/control/data acquisition of unit 1290 can be effectively performed with reference 3190 to a specific method included in a method group relating to management/control of units 3140 from another program step 3188 described in the main method 3148.

In the applied example of the present embodiment, a predetermined organization different from the user creates a program compatible with the management/control class in the in-system unit 3150 in advance, and properly additionally installs it in system controller α_1126 (or system controller β_1128) over the Internet. Furthermore, since the program step 3188 which makes reference 3190 to a specific method in the method group relating to management/control of units 3140 in a main method 3148 comprises one line (several lines at most), the management/control/data acquisition of unit 1290 in the application class 3158 can be performed very easily. The use of the method produces an advantage that management/control/data acquisition means of unit 1290 can be easily incorporated without substantially placing a burden on a software developer of system controller α_1126 (or system controller β_1128).

FIG. 20 shows comparison between an existing file system and the unit management method in the present embodiment. Basic management data is stored in a storage medium in the existing file system, while being stored in memory 1232 of system controller α_1126 in the unit management method of the present embodiment. Next, a method of accessing content (predetermined file in file system, and predetermined unit in unit management) is described. In the existing file system, a file name (including URL where a file is stored) is specified, and a range in which predetermined data in the file is recorded is specified by a relative address range in the file. On the other hand, in the unit management method of the present embodiment, an address of a corresponding unit is specified. The specified address means an address described in the address table of FIG. 23 (for example, IP address IPADRS or IEEE extended address EXADRS). Since the size of data of unit 1290 (setting condition data and sensor data to be changed) is relatively small in the unit management method of the present embodiment, data is read/written as a whole unit 1290. This produces an advantage that the management/control/data acquisition is greatly simplified in comparison with the existing file system.

Management data for managing a whole file or the whole unit 1290 corresponds to file management data such as a file allocation table (FAT) and a universal disk format (UDF) in the existing file system, and corresponds to the address table in FIG. 23 in the unit management method of the present embodiment. Here, data to be read/changed corresponds to content (data) in a file in the existing file system, and corresponds to sensor data and various types of state data/setting status (to be changed) in the unit management method of the present embodiment. Alternatively, the exchangeable data (table) 1810 shown in FIG. 10B is also included in the data to be read/changed in the unit management method of the present embodiment.

The unit management method of the existing file system and that of the present embodiment are greatly different from each other in presence of a function of listing the whole content. That is, in the existing file system, a list of file names can be known by the file management data, but the whole file content cannot be easily known. Thus, it is necessary to open all the files one by one, and to newly summarize content in order to know all the file content, which requires much effort. On the other hand, since the unit management method of the present embodiment comprises the time-series data tracking table of FIG. 28, the whole content of unit 1290 can be instantly understood. The unit management method of the present embodiment comprises the means for uniquely understanding the whole content of unit 1290 as described above, producing an advantage that the management/control/data acquisition of the whole unit 1290 in system $\alpha\_1132$ can be quickly and easily performed.

Section 3.3 Specific Unit Management Example and Display Example

In many cases, system controller $\alpha\_1126$ (or system controller $\beta\_1128$) automatically acquires data from unit 1290 and controls unit 1290. However, the user sometimes wants to manually control specific unit 1290, and to acquire data from specific unit 1290. In that case, a display example of a management screen of unit 1290 displayed in the user interface 1234 of system controller $\alpha\_1126$ shown in FIG. 2 is described below. A display screen example is described below. However, a similar method may be used as a management method for each of units 1290 based on system controller $\alpha\_1126$ (or system controller $\beta\_1128$).

As has already been described in Section 3.1, only a single drive, folder or directory is allocated to one system $\alpha\_1132$ in the present embodiment. FIG. 21A shows the situation. A plurality of units 1290 in system $\alpha\_1132$ which comprise various hierarchical structures (hierarchical structures as a folder or those as a directory structure) ease management.

FIG. 21A (a) shows an example of unit 1290 hierarchized (folder/directory division) for content, and FIG. 21A (b) shows an example hierarchized (folder/directory division) for each of sections 1142 divided in the same system $\alpha\_1132$. However, no limitation is intended thereby. It can be properly hierarchized (folder/directory division) in accordance with convenience of the user.

Figure 21C:
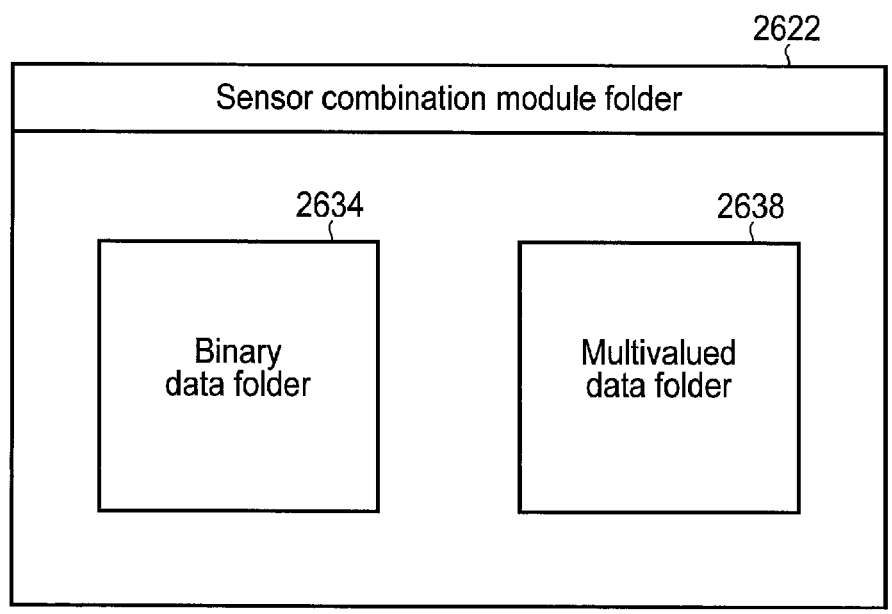
FIG. 21C shows a display example indicating an internal configuration of a sensor combination module folder.
Figure 21D:
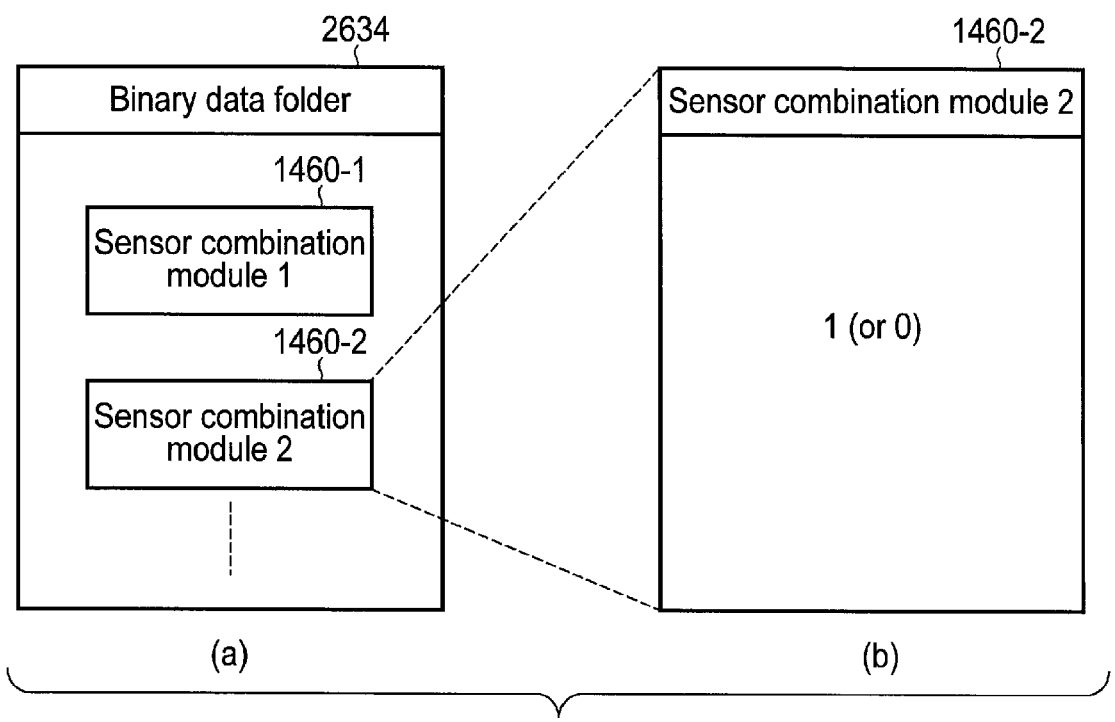
FIG. 21D shows a display example indicating sensor data in the sensor combination module.

FIGS. 21B to 21D show a display/management example when the folder moves to a low-level folder in accordance with the hierarchy (folder/directory division) of FIG. 21A (a). In the display/management example of FIG. 21A (a), a list data folder 2610 in which the address table in FIG. 23, the estimation/determination collating table in FIG. 27, and the time-series data tracking table in FIG. 28 are collectively stored, and folders divided for each form of unit 1290 are arranged in "T drive" corresponding to a unit management virtual drive. As has already been described in Section 1.2 with reference to FIG. 3A, the form of unit 1290 comprises device 1250, combination module 1295, a mixed form thereof, and others. In FIG. 21A (a), a device folder 2612 and a combination module folder 2614 are arranged based on it.

Next, of these folders, a display example (internal structure) of the folder corresponding to combination modules 2614 is shown in FIG. 21B. As has already been described in Section 1.3, a form such as the sensor combination module 1460, the actuator combination module 1470, the processor combination module 1465, the memory combination module 1475, or the display combination module 1478 is accepted as the form of combination module 1295. Thus, in FIG. 21B, a sensor combination module folder 2622, an actuator combination module folder 2624, a processor combination module folder 2626, a memory combination module folder 2628, and a folder corresponding to another functional combination module folder 2630 are correspondingly arranged, and managed in accordance with them.

Of these folders, a display example (internal structure) of the sensor combination module folder 2622 is shown in FIG. 21C. As has already been described in Section 2.5, two types of sensor data are detected by the sensor combination module 1460 and acquired, that is, in a case of binary data and a case of multivalued data. In FIG. 21C, a binary data folder 2634 and a multivalued data folder 2638 are correspondingly arranged and managed in accordance with them.

In FIG. 21D (a), all the sensor combination modules 1460 included in the binary data folder 2634 are arranged as pseudo files. The display/management made in this manner produces an advantage that management/control/data acquisition can be performed very easily by one unit 1290. Content of sensor data detected/acquired by the sensor combination module 2_1460-2 can be displayed to the user as in FIG. 21D (b) by, for example, clicking a conventional file to open it. Here, when the actuator combination module 1470 is opened, current setting status is displayed. Then, control (setting condition change) can be easily performed by pasting (inserting) another numerical value in a display area of FIG. 21D (b) concerning unit 1290 which can control (change a setting condition of) the actuator combination module 1470, etc. Applying such a display method and a management method produces an advantage of enabling the user to control (change the setting condition of) a specific unit 1290 very easily and quickly.

Chapter 4 Outline of Section in System of Present Embodiment

This part describes first the basic concept of a section in the system of the present embodiment. Then, it describes methods of collecting data and of offering services using the idea of the section. It finally describes a method of detecting a position of a source node using a radio wave generated from the source node, and services by use of it.

Section 4.1 Position of Section in System of Present Embodiment

The section in the system of the present embodiment is defined as at least one of a unit related to integration or management of data collected in a system, and a unit related to services offered in a system. Thus, a unit corresponding to the section may be used not only to integrate/manage the collected data but also to offer services. To carry out both purposes, services may be offered to the user in conjunction with (or based on) an integration/management result of the collected data.

The unit may be a collection related to a function concerning the data acquisition or the service offering in the same system. Alternatively, another form of the unit may be a collection related to predetermined space in the same system. The collection related to the space may be specifically predetermined continuous space in the same system. Alternatively, the collection related to the space may be specifically, for example, a predetermined group of collections of discretely-distributed continuous space (like stepping stones). In this case, dispersed distribution may be mixed between section 1_1122-1 and section 2_1122-2 which are different from each other in the same system α_1132.

As shown in FIG. 1, the same system α_1132 is composed of at least one section. Thus, the whole system α_1132 may spatially completely overlap one section 1_1122-1, and may be divided into a plurality of sections 1_1122-1 to m_1122-m. Alternatively, different sections 1_1122-1 to m_1122-m may be partially spatially overlap each other.

First, the position of the section is described with an example shown in FIGS. 25A and 25B. FIGS. 25A and 25B show a building divided into two rooms. Spatial units, section 1_1122-1 (left room) and section 2_1122-2 (right room) are added to the rooms. Suppose a light device is turned on in the left room (section 1_1122-1) and turned off in the right room (section 2_1122-2) as shown in FIG. 25A. Then, suppose a plurality of optical sensors are arranged in both sections 1_1122-1 and 2_1122-2 (sensor module 1260 comprising a light detection function may be included in device 1250 (FIG. 1), or sensor combination module 1460 may be formed as shown in FIG. 8B). When system controller α_1126 integrates/manages sensor data obtained from an optical sensor arranged in section 1_1122-1, large light amount detection data is obtained from all the sensor data. Conversely, small light amount detection data is merely obtained from all optical sensors arranged in section 2_1122-2. The sensor data obtained from sections 1_1122-1 and 2_1122-2 comprises a communality as described above. Various sensor data obtained from each of sections 1_1122-1 and 2_1122-2 is integrated or managed to estimate/determine conditions in each of sections 1_1122-1 and 2_1122-2 in the system of the present embodiment. The accuracy of the estimation/determination is improved using a result obtained by integrating or managing a plurality of data items acquired from section 1122 to estimate/determine the conditions in the same section 1122.

Next, a case where air conditioning is performed using only an air-conditioner provided in section 1_1122-1 as shown in FIG. 25B under very cold outdoor conditions is assumed. In this case, since the air conditioning is not performed in section 2_1122-2, services of warmth are not offered to the user in the right room. Conversely, the services of warmth are offered in common to the user in the left room wherever the user is. The same services are often offered in the same section 1122 in this manner. Controlling the service offering for each section 1122 to the user in the system of the present embodiment in this manner produces an advantage of easily managing services to the user in the same system α_1132. Further, detailed services can be offered to the user, in comparison with the services offered in the whole system α_1132, by carrying out the services by the unit of sections 1 to m_1142-1 to m, improving end-user satisfaction.

Although a room is used to describe the section, no limitation is intended thereby in the system of the present embodiment. Any spatial unit meeting the above definition may be applied to the section.

In the system of the present embodiment, system controller α_1126 configured to control or manage network communication in network system α_1132, or to acquire data of the network communication may partition system α_1132 into sections 1_1142-1 to m_1142-m. As described above, system controller α_1126 can automatically partition it into sections 1_1142-1 to m_1142-m by automatically detecting a range in which it is darkened at the same time, a range in which it is lightened at the same time, a range in which a temperature increases or decreases at the same time, or the like. Alternatively, it may be partitioned based on a result of a photo taken with a camera, etc. However, no limitation is intended thereby, and it may be partitioned into sections 1_1142-1 to m_1142-m by direct designation of the user.

Section 4.2 Method of Managing Position in Section of Various Modules or Devices As described in the above example, it is necessary to know in advance which of sections 1_1142-1 to m_1142-m comprises each of units 1290 (device 1250 and combination modules 1295, 1460 and 1470) in order to acquire data in system α_1132 corresponding to system controller α_1126, and to estimate/determine conditions for each of sections 1_1142-1 to m_1142-m. To realizing it, data of sections 1_1142-1 to m_1142-m arranged in at least one unit 1290 (device 1250 and combination modules 1295, 1460 and 1470) in the same system α_1132 is managed. This is differently expressed below. That is, system controller α_1126 (FIG. 1) configured to acquire and manage uniquely acquired and created data (corresponding to function of the different function module 1440 in FIG. 4A) from a plurality of units 1290 (FIG. 2) comprising a function of communicating the data (by communication module 1660 in FIG. 4A) partitions it into sections 1_1142-1 to m_1142-m for each of units 1290, manages it, and holds data concerning sections 1_1142-1 to m_1142-m to which each of units 1290 belongs.

From the perspective of system α_1132 (client system), this client system (system α_1132) comprises system controller α_1126 which is connectable to an external cloud (server n_1116-n) and configured to manage data, and unit 1290 comprising a function of acquiring or creating data provided to system controller α_1126 to transmit it, wherein the system controller α_1126 partitions unit 1290 into sections 1_1142-1 to m_1142-m, manages it, and holds data concerning the sections to which each of the units 1290 belongs.

The data concerning the sections of each of units 1290 corresponds to the address table in FIG. 23 to be described.

In Section 4.2, the management method for realizing the above is mainly described. The following description is premised on a system model in which system controller α_1126 placed in system α_1132 shown in FIGS. 2, 8A and 8B manages, operates or controls network communication system α_1132. Alternatively, the description may be applied to a system model in which system controller β_1128 or server n_1116-n placed outside system α_1132 in FIG. 9 manages, operates or controls network communication system α_1132 through the router (gateway) 1300. In this case, system controller α_1126 in the description can be replaced with system controller β_1128 or server n_1116-n.

The address table in FIG. 23 to be described later is pre-recorded in memory 1232 in system controller α_1126 shown in FIG. 2 (and in system controller β_1128 of FIG. 1) to manage unit 1290 (device 1250, or combination module 1295, 1460 or 1470) arranged in each of sections 1_1142-1 to m_1142-*m*. FIG. 23 shows an example of the address table in which sensor combination modules 1460-1 to 5 and actuator combination modules 1470-1 and 2 shown in FIG. 8B, and devices 1250-1 to 3 shown in FIG. 8A are mixed and arranged in the same system α_1132. In the system of the present embodiment, sensor modules 1260-1 and 2 can be in one device 1250-1, as shown in FIG. 8A. Different types of sensor data is obtained from sensor modules 1260-1 and 2. Thus, to acquire various types of data and to estimate/determine the conditions of each section 1142, data of sections 1_1142-1 to m_1142-*m* in which individual sensor modules 1260-1 to 5 or individual actuator module 1270-1 included in devices 1250-1 to 3 are placed is preferably managed, without managing a position of devices 1250-1 to 3 by the address table.

In the address table of FIG. 23, the section position in which sensor module 1260-1, actuator module 1270-1, actuator combination module 1470-2, and sensor combination module 1460-5 are arranged is collectively described in the row of the section data. It is understood from this that sensor module 1260-1 is arranged in section 2_1142-2. In the system of the present embodiment, various combination modules 1460 and 1470, each sensor module 1260 and each actuator module 1270 which are arranged in each section 1142 are managed in real time through the creation and maintenance of the address table. However, no limitation is intended thereby in the system of the present embodiment, and a management method of any position which can be managed by system controller α_1126 may be used.

Different systems (client systems) can be present at the same time in the system of the present embodiment. Combination of the above, a result comprising also content described in FIG. 2, and the address table (FIG. 23) produces the client system (system α_1132) which is a complex client system (corresponding to domain 2_1122-2 in FIG. 1) comprising a plurality of client systems α_1132 (client system α_1126 and client system β_1134) comprising unit 1290 which is connectable to an external cloud (server n_1116-*n*) and comprises a function (by communication module 1660 in FIG. 4A) of communicating uniquely acquired or created data, and system controller α_1126 configured to acquire and manage the data from unit 1290, and can transmit the uniquely acquired or created data to system controller α_1126, wherein system controller α_1126 configured to manage client system α_1132 included in the complex client system (domain 2_1122-2) partitions a plurality of units 1290-1 to -7 into sections (section 1_1142-1, section 2_1142-1, and section m_1142-*m* in FIG. 2), manages them, and holds data (address table in FIG. 23) concerning the sections to which each of the units belongs.

Figure 22:
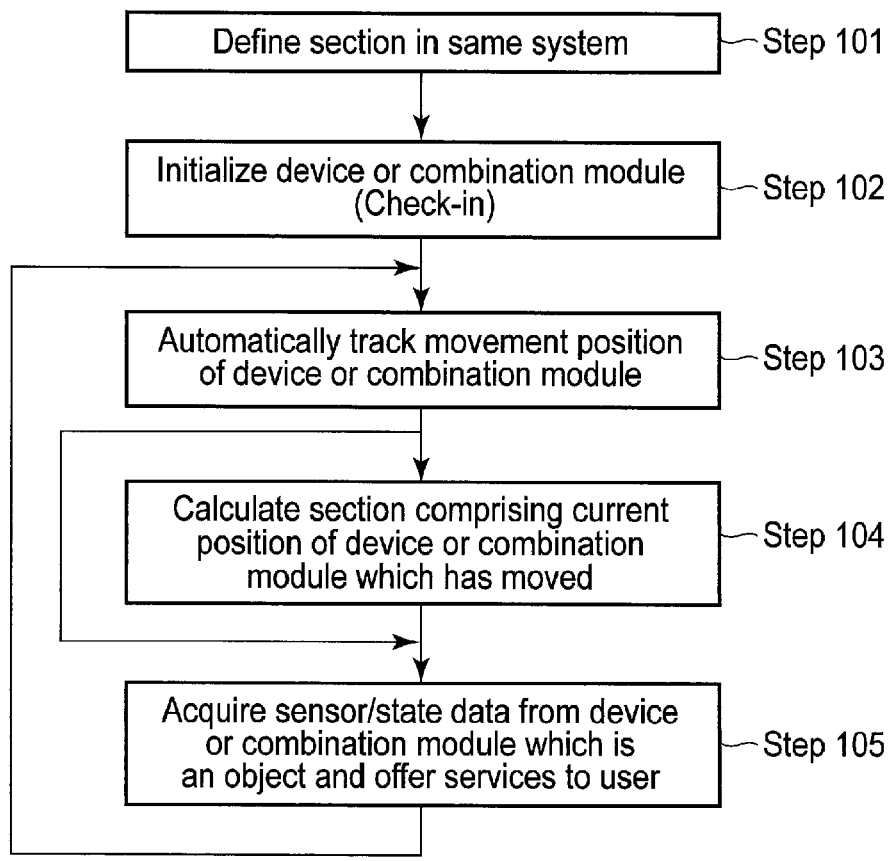
FIG. 22 shows a position management routine managing devices and/or various combination modules in each of sections.

Next, FIG. 22 shows methods of creating and maintaining the address table. In Step 101, sections 1_1142-1 to m_1142-*m* in the same system_1132 are defined. In the system of the present embodiment, the sections are defined first (Step 101), then positional data is set or managed for each section 1142 based on the definition (Step 102 or 103). Managing positions of various modules and devices in accordance with a section division state first defined in this manner produces an advantage that a state is easily estimated or determined for each section in real time. In addition, another advantage that positions of various modules or devices are easily managed is produced.

As described later in, especially, Section 5.2.3, different section definition methods can be present in the same area in the social infrastructure sector. That is, in the example of FIG. 35, a plurality of definition methods such as a method of dividing section 1142 along a water pipe, and a method of dividing section 1142 along a path of power supply lines can be present, instead of setting each section 1142 based on an address on a map. Thus, in the social infrastructure sector, the method of dividing section 1142 is preferably defined uniquely for each intended purpose based on any standard data such as map data.

Figure 24:
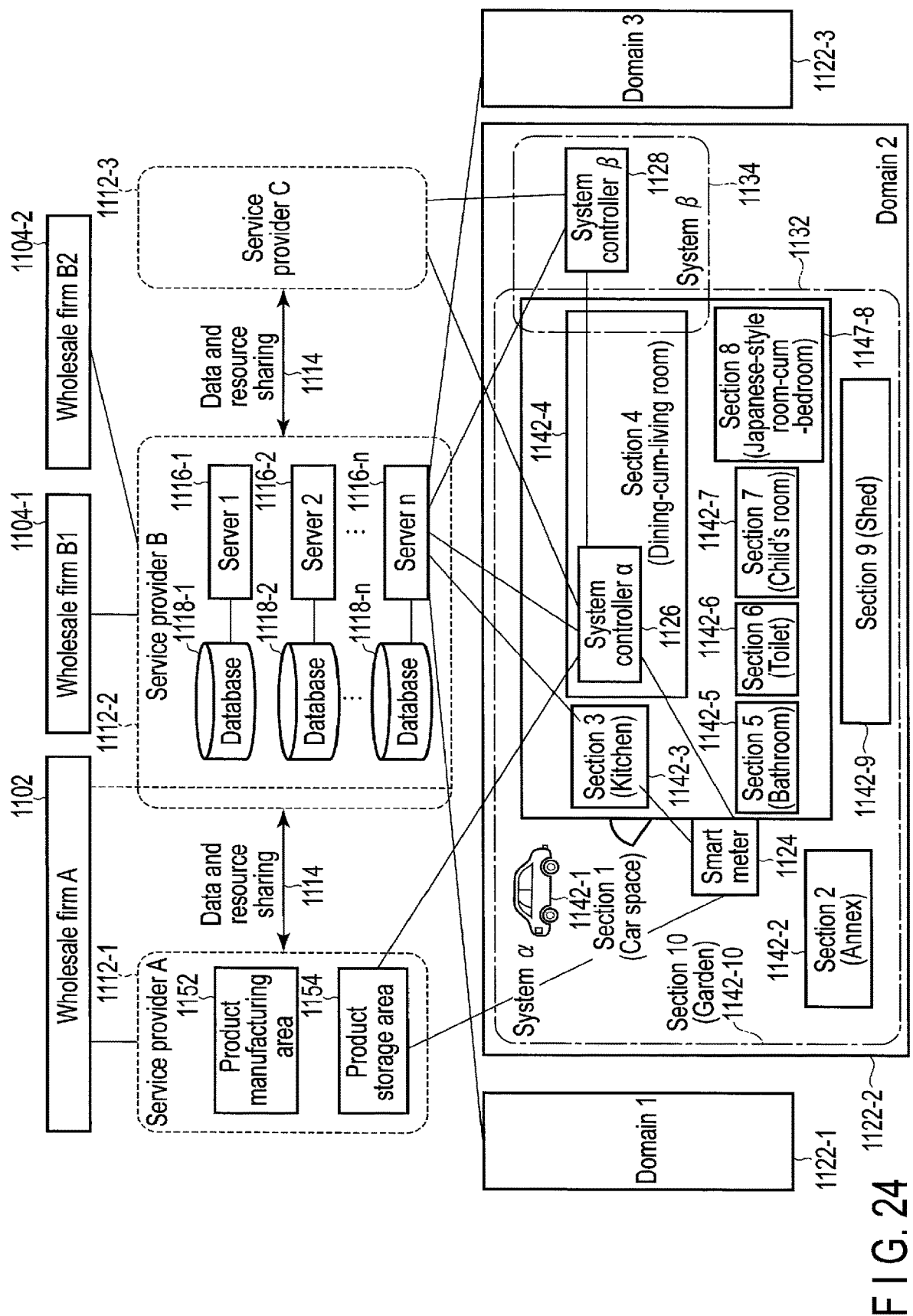
FIG. 24 shows an example method for setting sections separated each other in a system.

Conversely, in the consumer sector, a section may be automatically defined, as in a room assignment in a house, in accordance with the definition of the user as a definition method of section 1142. For example, the user makes a video inside his house with a video camera (or camera-equipped smartphone, tablet, or mobile phone) with a GPS function, and section 1142 is automatically defined as shown in FIG. 24 by automatically analyzing the video. In the above example, the user specifies the definition method of section 1142. However, no limitation is intended thereby in the present embodiment, and, for example, division of section 1142 may be predefined by room assignment by default. The default setting reduces the burden of the user in Step 101. Alternatively, the user may partially modify the section division method using the user interface 1234 in system controller α_1126 of FIG. 8A, after the section is automatically divided in accordance with the default section division method. Alternatively, central positional data of an individual room may be input using the GPS function to analyze the input result and automatically define a section. As well as the above method, physical spatial positional data of sections 1_1142-1 to m_1142-*m* may be obtained by any method in the present embodiment. For example, the above method requires any assistance of the user to define a section. However, physical spatial positional data of sections 1_1142-1 to m_1142-*m* may be obtained without any assistance of the user. As an example of the specific method, room assignment and positional data may be measured, while a robot cleaner with a camera and a GPS function cleans rooms (section 1142) in a predetermined house. This method allows the physical spatial positional data of sections 1_1142-1 to m_1142-*m* to be easily obtained without any assistance of the user.

Further, as another applied example of the present embodiment, the section may be automatically defined using data obtained from various units 1290 (combination modules 1295, 1460 and 1470, and device 1250) without defining the section first (Step 101). That is, at least part of various combination modules 1460 and 1470, and various devices 1250 which are arranged in system α_1132 are operated first, and then, section 1142 is divided. The user is not conscious of the section definition in the same system (Step 101), reducing a psychological burden of the user. The method is specifically described below. As will be described later, system controller α_1126 can ascertain positional data of various combination modules 1460 and 1470, and various devices 1250 in real time by initialization (Step 102) or automatic tracking of a moving position (Step 103). Further, as described in Section 4.1 with reference to FIG. 25 (*a*), when the user moves and the state in section 2_1142-2 changes, state change related data is obtained as a result of synchronization of combination modules 1460 and 1470 and devices 1250 arranged in it. Thus, relevance of the positions of various combination modules 1460 and 1470 and various devices 1250 can be expected by synchronism of change of data (such as sense data or state setting control data) obtained from units 1290 (combination modules 1295, 1460 and 1470, and devices 1250) arranged in system α_1132. A position relationship of units 1290 (combination modules 1295, 1460 and 1470, and devices 1250) arranged in the same section 1142 can be estimated/determined with accuracy by repeating the synchronism detection with time a plurality of times. System controller α_1126 enters the estimation/determination result in a section data field in the address table of FIG. 23.

Then, an initialization method (check-in method) of various units 1290 (combination modules 1295, 1460 and 1470, and devices 1250) corresponding to Step 102 in FIG. 22 is described. Sensor combination module 1460 of FIG. 5 may comprise the near-field communication module 1560 compatible with near-field radio such as TransferJet of the proximity radio transfer technique and FeliCa (coined word consisting of Felicity and Card) conforming to the contactless IC card standard. Although it is not shown, actuator combination module 1670 and device 1250 may comprise a similar near-field communication module 1560. Communication with the near-field communication module 1560 may be performed by moving a portable external device with the GPS function (not shown) close at the time of initialization in system α_1132 when combination module 1460 or 1470, or device 1250 according to one embodiment in the system of the present embodiment is newly placed. The portable external device comprises communication module 1202 which can communicate data with system controller α_1126 through the in-system network line 1782 (refer to description in Section 2.1 with reference to FIG. 10A), along with the near-field communication module 1560 compatible with the near-field radio. System controller α_1126 automatically registers the IP address data IPADRS of new combination module 1460 or 1470, or device 1250 (to be initialized) (refer to description in Section 2.4 with reference to FIG. 13 for details) at the time of initialization. When the near-field communication is performed, each of (1) the newly registered IP address data IPADRS, (2) the IP address data IPADRS on the side of system controller α_1126, (3) the identification data PANID specific to PAN of a position of the current portable external device (refer to description in Section 2.3 with reference to FIG. 12A), (4) the identification data PANID specific to PAN corresponding to a position where system controller α_1126 is placed, and (5) the IEEE extended address EXADRS of system controller α_1126 is transmitted from system controller α_1126 to new combination module 1460 or 1470, or device 1250. Further, (6) the IEEE extended address EXADRS of its own is transmitted from new combination module 1460 or 1470, or device 1250 (to be initialized) to system controller α_1126 using the near-field communication. As described above, data communication with the in-system network line 1782 is prepared by exchanging data between both of them using means such as the near-field communication at the time of initialization (Step 102). Although the near-field communication is used as an example of the data exchange method at the time of initialization, data may be exchanged in other ways at the time of initialization. Alternatively, provisional communication is first performed on the in-system network line 1782 using a provisional address, and a regular address may be exchanged, as will be described later as another initialization method. The portable external device with the GPS function may be moved close instead of the near-field communication. System controller α_1126 automatically recognizes the GPS positional data obtained from the portable external device as positional data of corresponding unit 1290 (combination module 1295, 1460 or 1470, or device 1250) at this moment. System controller α_1126 compares the GPS data with GPS range data for each of sections 1_1142-1 to m_1142-m obtained in advance at the time of section definition in Step 101. It automatically estimates/determines, based on the result of the comparison, which of sections 1_1142-1 to m_1142-m comprises newly arranged unit 1290 (combination module 1295, 1460 or 1470, or device 1250), and registers the result in a specific portion in the address table of FIG. 23. Further, it displays the result in the user interface 1234 of FIG. 8A to inform the user, causes him to confirm whether it is correct, and, if necessary, causes him to register correction.

In the above embodiment, an operation by the user is required for initializing unit 1290 (device 1250 or combination module 1295) (Step 102). However, no limitation is intended thereby in the present embodiment, and the initialization (Step 102) may be automatically performed. Its specific example is described. In the present embodiment, the user can estimate movement of the position of unit 1290 (combination module 1295, 1460 or 1470, or device 1250) halfway, and automatic tracking of unit 1290 (combination module 1295, 1460 or 1470, or device 1250) can be performed as in Step 103. The method to be described later in Section 4.4 is used for the automatic tracking. Thus, system controller α_1126 monitors the position of unit 1290 (combination module 1295, 1460 or 1470, or device 1250) to be initialized using the automatic tracking technique at the time of initialization. The obtained positional data is compared with the GPS range data for each of sections 1_1142-1 to m_1142-m, and section 1142 corresponding to unit 1290 to be newly set (combination module 1295, 1460 or 1470, or device 1250) is automatically estimated/determined to register it in the address table of FIG. 23.

If unit 1290 to be initialized (combination module 1295, 1460 or 1470, or device 1250) first performs provisional communication on the in-system network line 1782, each of data storage areas of α) the source PAN identifier SPANID, β) the destination PAN identifier DPANID, and γ) the destination IEEE extension address DEXADRS in FIG. 12A (e) (refer to Section 2.3 for details), and δ) the source IP address data SIPADRS, and ε) the destination IP address DIPADRS in FIG. 13 (b) (Section 2.4) may be blanked, or a default value preset by Z-format (refer to Section 2.1) may be stored in each area. The data communication from system controller α_1126 to unit 1290 (combination module 1295, 1460 or 1470, or device 1250) to be initialized can be started using this default value (or blank state) upon receipt of the first provisional communication from unit 1290 (combination module 1295, 1460 or 1470, or device 1250) to be initialized as described above. Then, α) the source PAN identifier SPANID to be initialized, and δ) the IP address data SIPADRS to be initialized, which are described above, of the communication data transmitted from system controller α_1126 may be stored in the communication middleware data APLDT storage area (refer to description in Section 2.2 with reference to FIG. 11) and be transmitted. Since it is understood, even in this case, that unit 1290 (combination module 1295, 1460 or 1470, or device 1250) to be initialized is arranged in system α_1132, the risk that the initialization is erroneously performed in another domain 1122 is eliminated. The above method does not involve the user at the time of initialization, producing an advantage of automatically performing the initialization operation without placing a burden on the user.

The position of an object to be initialized is detected at the time of initialization in the present embodiment as described above. It can be confirmed that it is arranged in corresponding system α_1132 in system controller α_1126, and domain 2_1122-2 related to it, producing an advantage of eliminating the risk of erroneously initializing (registering) the object to be initialized in another domain 1_1122-1 or another system β_1134. Further, the assistance of the user is not required depending on the initialization method, and human errors are prevented, producing an advantage of improving reliability of the initialization processing, as well as an advantage of being less troublesome for the user. Further, in the present embodiment, a section belonging state of the object to be initialized can also be defined at the time of initialization. This produces an advantage that services can be offered by the unit of the section using the object to be initialized, even immediately after the initialization.

The processing of enabling newly purchased unit 1290 (combination module 1295, 1460 or 1470, or device 1250) in domain 2_1122-2 is defined as initialization, which may also be called "check-in". The processing of temporarily taking unit 1290 (combination module 1295, 1460 or 1470, or device 1250) outside domain 2_1142-2 after the initialization, reentering the same domain 2_1142-2, and restoring it to be in a state where network communication is possible in system α_1132 or system β_1134 may be defined as plug-in.

Such unit 1290 (combination module 1295, 1460 or 1470, or device 1250) to be plugged in detects data of δ) the preset IP address data SIPADRS on the side of plug-in, and ε) the IP address data DIPADRS concerning any of system controllers α_1126 and β_1128 belonging to the same domain 2_1122-2, the IP address data DIPADRS being set in a system controller of the other party. Thus, as described in Section 2.1 with reference to FIG. 10A, the network communication can be performed in principle wherever unit 1290 (combination module 1295, 1460 or 1470, or device 1250) to be plugged in is in the world, as long as Internet Protocol version 6 IPv6 is used for the network communication.

Thus, in the system of the present embodiment, automatic plug-in processing may be performed depending on whether unit 1290 (combination module 1295, 1460 or 1470, or device 1250) to be plugged in is arranged in a physical area defined by any of systems α_1132 and β_1134 belonging to the same domain 2_1122-2. Specifically, systems α_1132 and β_1134 examine the position of unit 1290 (combination module 1295, 1460 or 1470, or device 1250) to be plugged in by the same method as the initialization. That is, system controllers α_1132 and β_1134 always monitor a data communication situation on the in-system network line 1782 (refer to description in Section 2.1 with reference to FIGS. 10A and 16), and always continue to confirm that there is no data communication from other than unit 1290 ([sensor module 1260 or actuator module 1270 in] device 1250, or combination module 1295, 1460 or 1470) registered in the address table of FIG. 23. When finding data communication from other than unit 1290 ([sensor module 1260 or actuator module 1270 in] device 1250 or combination module 1295, 1460 or 1470) registered in the address table of FIG. 23, they confirm content of the source IP address data SIPADRS. If the source IP address data SIPADRS is data which is previously used in systems α_1132 and β_1134, they start the plug-in processing. If the source IP address data SIPADRS is data other than that previously used in systems α_1132 and β_1134, they start the initialization processing. That is, system controllers α_1126 and β_1128 always manage the position of unit 1290 ([sensor module 1260 or actuator module 1270 in] device 1250 or combination module 1295, 1460 or 1470) in systems α_1132 and β_1134. They automatically detect that unit 1290 (combination module 1295, 1460 or 1470, or device 1250) to be plugged in enters a physical area defined by any of systems α_1132 and β_1134 belonging to the same domain 2_1122-2, and automatically performs the plug-in processing. They may cause the user to confirm whether plug-in is possible using the user interface 1234 during the plug-in processing. Then, they add data relevant to plugged-in unit 1290 (combination module 1295, 1460 or 1470, or device 1250) to the address table of FIG. 23 in the final stage of the plug-in processing. As described above, since system controllers α_1126 and β_1128 automatically starts the plug-in processing in accordance with the position of the object to be plugged in, no manual procedures by the user are necessary. This produces an advantage that the plug-in processing can be very easily performed without placing a burden on the user.

From the perspective of system α_1126 (client system) described in Chapter 1, the client system (system α_1126) in the system of the present embodiment comprises unit 1290 comprising a function of acquiring or creating data for communication, and system controller α_1126 configured to acquire and manage the data from the unit, wherein system controller α_1126 partitions each of a plurality of units 1290 into sections 1_1142-1 to m_1142-*m*, manages it, holds data (address table of FIG. 23) concerning sections 1_1142-1 to m_1142-*m* to which each unit 1290 belongs, and holds data (FIG. 21D) concerning the unit, and wherein when registering a new unit different from unit 1290 already registered in the data (address table of FIG. 23) concerning sections 1_1142-1 to m_1142-*m* to which each unit 1290 belongs, it (1) pre-checks whether the new unit necessary to be newly registered is already registered in the data (address table of FIG. 23), (2) confirms that the new unit is not registered in the data (address table of FIG. 23), (3) registers the new unit in the data (address table of FIG. 23), (4) checks which of sections 1_1142-1 to m_1142-*m* the new unit belongs to, and (5) adds to the data (address table of FIG. 23) concerning a section to which the new unit belongs.

Further, it comprises data concerning a first section (that is, data of unit 1290 belonging to the first section) and data concerning a second section (that is, data of unit 1290 belonging to the second section), especially, with respect to the plurality of units 1290 as the address table.

Further, the data is recorded as time-series data with respect to the address table.

As described above, the position of an object can be detected and the plug-in can be performed, especially, in the present embodiment. Moreover, when the plug-in is performed, a section belonging state of the object is also defined. The advantage obtained thereby corresponds to the advantage at the time of initialization.

Whether the plug-in processing corresponding to the present embodiment is performed can be easily determined by decoding change of content in the address table (FIG. 23) (stored in memory 1232 in system controller α_1126 shown in FIG. 2) managed by system controller α_1126.

As another confirmation method, change of communication data transmitted from unit 1290 to be newly registered when unit 1290 (combination module 1295, 1460 or 1470, or device 1250) to be newly registered is moved from the outside of system α_1132 to the inside of system α_1132 may be examined. That is, for example, unit 1290 (combination module 1295, 1460 or 1470, or device 1250) is first arranged in another domain 1_1122-1. Then, an address different from the destination IP address DIPADRS corresponding to system α_1132 is stored in the destination IP address DIPADRS (FIG. 13 (*b*), Section 2.4) in the communication data transmitted from unit 1290 to be newly registered arranged in domain 1_1122-1. Similarly, data different from that of system α_1132 is stored also in a destination address (FIGS. 10A, 16 and 11, Section 2.2 which is set in media access layers MAC02 and MAC06. Then, unit 1290 to be newly registered (combination module 1295, 1460 or 1470, or device 1250) is moved in system α_1132, and the corresponding address after the plug-in processing is confirmed. The destination IP address DIPADRS in the communication data transmitted from unit 1290 to be newly registered (combination module 1295, 1460 or 1470, or device 1250) after the completion of the plug-in processing corresponds to system α_1132 (or system controller β_1128 in the system of FIG. 9). Further, the destination address set in media access layers MAC02 and MAC06 (for example, the destination PAN identifier DPA-NID, and the destination IEEE extension address DEX-ADRS of FIG. 12A (e) related to Section 2.3 also corresponds to system α_1132 (or system controller β_1128 in the system of FIG. 9).

Change of address data in communication data during the plug-in processing is described below for reference. First, the description starts from a situation immediately after the position of unit 1290 to be newly registered (combination module 1295, 1460 or 1470, or device 1250) pre-connected to a network in another domain 1_1122-1 is moved. If unit 1290 to be newly registered is device 1250-1, the GPS function is included in unit 1290 to be newly registered. Thus, device 1250 can recognize movement of the position. If unit 1290 to be newly registered is arranged in system α_1132 (before current plug-in processing), an address set in the IP address data IPADRS and media access layers MAC02 and MAC06 in system controller α is stored in memory 1242 in corresponding device 1250-1. Thus, corresponding device 1250-1 performs data communication with system controller α using the data. Incidentally, the source IP address data SIPADRS and the destination IP address DIPADRS shown in FIG. 13 (b) are hereinafter collectively called simply IP address data IPADRS. Similarly, the destination IEEE extension address DEXADRS and the source IEEE extension address SEXADRS shown in FIG. 12A (e) are collectively called an IEEE extended address EXADRS.

Conversely, if corresponding device 1250-1 is not previously arranged in system α_1132, an address area set in media access layers MAC02 and MAC06 such as the source IP address data SIPADRS and the source IEEE extension address SEXADRS is blanked. Alternatively, predetermined dummy data is stored, and data is communicated in system α_1132 to urge system controller α_1126 to perform the initialization processing (Step 102 in FIG. 22).

If unit 1290 to be newly registered is combination module 1295, 1460 or 1470, it does not comprise the GPS function basically. Thus, in this case, unit 1290 to be newly registered (combination module 1295, 1460 or 1470) does not detect that the position is moved. Thus, unit 1290 to be newly registered (combination module 1295, 1460 or 1470) transmits, in system α_1132, communication data similar to that when it is arranged in another domain 1_1122-1, even after the position is moved.

System controller α_1126 (or system controller β_1128) always monitors communication data in system α_1132. Thus, when detecting that unexpected address data set in media access layers MAC02 and MAC06 such as the IP address data IPADRS and the IEEE extended address EXADRS is stored in the physical layer frame PPDU (FIG. 11 (f)) communicated on the in-system network line 1782 (FIGS. 10A and 16), it confirms the position of the transmission source of the physical layer frame PPDU by a method to be described in Section 4.4 (with FIGS. 31 to 34).

If the position of the transmission source which is an object is in an area of system controller α_1126 (based on the section definition result in Step 101 of FIG. 22), it starts the initialization processing (Step 102) or the plug-in processing.

In both of the initialization and plug-in processing, data is communicated (transmitted) from system controller α_1126 (or system controller β_1128) to unit 1290 to be newly registered (combination module 1295, 1460 or 1470) using a source address (source IEEE extension address SEXADRS, etc.) set in media access layers MAC02 and MAC06, and stored in the physical layer frame PPDU. Receiving the data, unit 1290 to be newly registered on the reception side (combination module 1295, 1460 or 1470) detects the IP address IPADRS of system controller α_1126 (or system controller β_1128) and a destination address in media access layers MAC02 and MAC06 (and the IP address IPADRS set at the time of initialization).

In the next step, unit 1290 to be newly registered (to be initialized/plugged in) (combination module 1295, 1460 or 1470, or device 1250-1) performs transmission to system controller α_1126 (or system controller β_1128) using the received data. As a result, unit 1290 to be initialized/plugged in (combination module 1295, 1460 or 1470, or device 1250-1) can confirm that correct address data has been acquired. Then, system controller α_1126 (or system controller β_1128) performs regular registration processing in the address table of FIG. 23, after confirming the content of the communication data transmitted from unit 1290 to be newly registered (to be initialized/plugged in) (combination module 1295, 1460 or 1470, or device 1250-1), and confirming that the initialization or plug-in processing has been correctly performed.

As described in Section 1.8 with reference to FIG. 8B, combination module 1295 such as sensor combination module 1460-5 can be independently present in the present embodiment. Alternatively, it may be inserted into or mixed in a specific product or component. Thus, combination module 1295 can be carried and moved by the user. Specific combination module 1295, 1460 or 1470 (or device 1250) carried by the user can also be moved between sections 1142 after initialization. That is, a section to which the current position after movement belongs as in Step 104 of FIG. 22 can be repeatedly calculated by automatically tracking the movement position of combination module 1295, 1460 or 1470 (or device 1250), as in Step 103 of FIG. 22, which can be moved together with the user, and can be present independently, or inserted into or mixed in a product or component. State ascertaining accuracy for each of sections 1_1142-1 to m_1142-m is improved by acquiring sense data and state data from combination modules 1460 and 1470 and device 1250 for each of sections 1_1142-1 to m_1142-m based on the latest positional data to offer services to the user (Step 105), producing an advantage of improving user satisfaction.

Next, a method of automatically tracking a movement position of unit 1290 (device 1250, or combination module 1295, 1460 or 1470) described in Step 103 of FIG. 22 is described in detail. In step 103, a technique of detecting a position of a transmission source of a radio wave transmitted from unit 1290 (device 1250, or combination module 1295, 1460 or 1470) which is an object may be used as described later in Section 4.4. That is, if radio is used as a physical medium (communication medium) of the network line 1782 (FIG. 10A or 16) in system α_1132, a radio wave is transmitted from unit 1290 (device 1250, or combination module 1295, 1460 or 1470), and data is communicated to system controller α_1126. Which unit 1290 (device 1250, or combination module 1295, 1460 or 1470) in system α_1132 the radio wave is transmitted from can be determined in real time for each of the physical layer frames PPDU (FIG. 11) by analyzing communication data in system controller α_1126 (for example, by extracting the source IP address data and the source IEEE extension address SEXADRS in FIG. 13 (b) and referring to the address table of FIG. 23 as will be described later). At the same time, physical positional data of the transmission source of the radio wave can be obtained for each of the physical layer frames PPDU in real time using the position detection technique of the transmission source of the radio wave to be described in Section 4.4. When both the data is compared with each other for each of the physical layer frames PPDU, physical positional data is identified for each unit 1290 (each device 1250 or combination module 1295, 1460 or 1470).

In this manner, system controller α_1126 identifies sections 1_1142-1 to m_1142-m to which individual units 1290 (device 1250, and combination modules 1295, 1460 and 1470) belong (arranged therein) (in the same manner as the above initialization) every time it receives the physical layer frame PPDU. The result of identification is compared with content of the address table of FIG. 23 one by one. If they are not different from each other as a result of the comparison, it is considered that none of corresponding device 1250 and combination modules 1460 and 1470 has moved beyond section 1142, and the address table is not rewritten. Conversely, if they are different from each other as a result of the comparison, it is considered that specific device 1250 or specific combination module 1460 or 1470 has moved beyond section 1142, and the address table is rewritten, then the processing may proceed to Step 104. As described above, data (such as an address table) related to section 1142 is included in the present embodiment. Whether movement beyond section 1142 is present is determined using the data related to section 1142 in the movement position automatic tracking step (Step 103) of unit 1290 (device or combination module). In Step 103, to perform position management for each of units 1290 (device 1250, and combination modules 1295, 1460 and 1470) by the unit of section 1142, even if, for example, unit 1290 (device 1250, or combination module 1295, 1460 or 1470) slightly moves in the same section 1142, it is considered that it has not moved beyond section 1142, and predetermined processing such as rewriting of the address table is not performed. This produces an advantage of effectively acquiring data and offering services to the user. To describe this advantage, the method is compared with a method of successively performing feedback in response to slight movement of unit 1290 (device or combination module). For example, if the user wears a specific portable combination module, he frequently moves in the same section 1142. If the feedback processing (such as update of the address table or shift processing to Step 104) is performed every time the user slightly moves, the processing in system controller α_1126 will be very complicated. Conversely, even if unit 1290 (device or combination module) slightly moves in the same section 1142, content of obtained sensor data does not often change, as described in Section 4.1 with reference to FIG. 25A. Further, services are often offered to the user by the unit of section 1142, as described with reference to FIG. 25B. Thus, even if the feedback is performed every time the user slightly moves, the quality of services offered to the user is not improved much.

If unit 1290 (device 1250, or combination module 1295, 1460 or 1470) moves beyond section 1142 as a result of automatic tracking of the movement position of unit 1290 (device or combination module) in Step 103 of FIG. 22, the processing proceeds to Step 104. Thus, if it does not move beyond section 1142, Step 104 may be omitted and the processing may proceed to Step 105. The processing of calculating a section comprising a current position of unit 1290 (device or combination module) which has moved in Step 104 specifically means the processing of correcting the address table, and the processing of rearranging units 1290 (device 1250, and combination modules 1295, 1460 and 1470) arranged for each of sections 1_1142-1 to m_1142-m in system controller α_1126.

The address table is corrected only in a predetermined frame (cell), and rearrangement by the unit of vertical row is not performed. To increase efficiency of state management and sensor data acquisition in sections 1_1142-1 to m_1142-m, the address table is copied in a temporary storage area in processor 1230 of system controller α_1126, and the processing of rearranging units 1290 (device 1250, and combination modules 1295, 1460 and 1470) arranged for each of sections 1_1142-1 to m_1142-m (rearrangement by the unit of vertical row) is performed.

Further, in Step 105 of FIG. 22, sensor/state data is acquired from unit 1290 (device or combination module) which is an object, or services are offered to the user for each of sections 1_1142-1 to m_1142-m. Specifically, the method described in Section 4.2 with reference to FIGS. 26A to 30 is used.

Then, automatic tracking of the movement position of unit 1290 (device or combination module) is properly performed (Step 103), and the series of processing are repeated.

In the system of the present embodiment, "plug-out" processing may be automatically performed on specific unit 1290 (device 1250, or combination module 1295, 1460 or 1470) using the automatic tracking of the movement position. That is, if unit 1290 (device 1250, or combination module 1295, 1460 or 1470) which is outside the range of a physical area of each of sections 1_1142-1 to m_1142-m defined in Step 101 is detected, it is considered that unit 1290 is no longer an object to be managed by network communication system α_1132, and a corresponding item (the whole corresponding vertical row) is provisionally deleted from the address table. The data of the IP address IPADRS and the IEEE extended address EXADRS of unit 1290 (device 1250 or combination module 1295, 1460 or 1470) which is provisionally deleted is recorded in memory 1232 (in system controller α_1126 in FIG. 8A) to flexibly handle re-plug-in processing which will be performed later. Inquiry concerning whether the plug-out processing should be performed may be displayed to the user in the user interface 1234 (in system controller α_1126 of FIG. 8A) immediately before the plug-out processing is performed.

From the perspective of system α_1132 (client system), a client system, which is the system of the present embodiment, comprises unit 1290 comprising a function of acquiring or creating data for communication, and system controller α_1126 configured to acquire and manage the data from unit 1290, wherein system controller α_1126 partitions each of a plurality of units 1290 into sections 1_1142-1 to m_1142-m, manages them, holds data (address table of FIG. 23) concerning the section to which each unit belongs, and holds data (FIG. 21D) concerning the unit. If the data cannot be reacquired from the unit, system controller α_1126 is temporarily removed from an object of management of the data (address table of FIG. 23) concerning the section to which each unit belongs.

Further, in the re-plug-in processing, if the data can be reacquired from the unit in addition to the above, system controller α_1126 is the management object of the data (address table of FIG. 23) concerning the section to which each unit belongs.

Further, regarding also the plug-out processing, the address table comprises the data concerning the first section (that is, data of unit 1290 belonging to the first section) and the data concerning the second section (that is, data of unit 1290 belonging to the second section) with respect to the plurality of units 1290.

Further, regarding the plug-out processing, the data is recorded in the address table as time-series data.

Whether the plug-out processing can be executed is understood by examining a communication history from system controller α_1126 (or system controller β_1128) after unit 1290 (combination module 1295, 1460 or 1470, or device 1250) pre-arranged in system α_1132 is moved to the outside of system α_1132. That is, if the plug-out processing is performed, the communication history does not comprise data communication from system controller α_1126 (or system controller β_1128) to unit 1290 (combination module 1295, 1460 or 1470, or device 1250) a predetermined period after unit 1290 (combination module 1295, 1460 or 1470, or device 1250) is moved to the outside of system α_1132.

That is, system controller α_1126 (or system controller β_1128) configured to manage, operate and control network communication system α_1132 monitors the position of the transmission source by the unit of the physical layer frame PPDU of FIG. 11 (f) with respect to the communication data on the in-system network line 1782. If the physical layer frame PPDU is transmitted from the outside of system α_1132, corresponding unit 1290 (combination module 1295, 1460 or 1470, or device 1250) is deleted from the address table of FIG. 23 immediately after (it is confirmed with the user), and the plug-out processing ends. Once the plug-out processing ends, no data is communicated from system controller α_1126 (or system controller β_1128) to corresponding unit 1290 (combination module 1295, 1460 or 1470, or device 1250) until the plug-in processing is re-performed.

System controller α_1126 (or system controller β_1128) does not sometimes recognize that specific unit 1290 (combination module 1295, 1460 or 1470, or device 1250) has moved to the outside of system controller α_1126 in terms of timing. In this case, data is communicated from system controller α_1126 (or system controller β_1128) to corresponding unit 1290 (combination module 1295, 1460 or 1470, or device 1250). However, in this case, a response to system controller α_1126 (or system controller β_1128) is not received. If no response is received, data is re-communicated. If no response is received for the second time in a row, a corresponding portion in the address table of FIG. 23 is deleted, and the plug-out processing ends. Inquiry to the user may be made through the user interface 1234 (FIGS. 8A and 8B) in system controller α_1126 during the plug-out processing.

If a time required from when specific unit 1290 (combination module 1295, 1460 or 1470, or device 1250) is moved to the outside of system controller α_1126 and to when the plug-out processing is completed is too long, the accuracy of estimation/determination of action/request of system α_1132 or the user is decreased as will be described in Section 4.3. An ordinary user accepts a delay of approximately five to ten minutes regarding a delay in a service offering corresponding to a state change. A patient user accepts a delay of approximately 15 minutes. However, if the delay exceeds an hour, almost all users feel dissatisfied.

Thus, in the system of the present embodiment, the time required from when specific unit 1290 (combination module 1295, 1460 or 1470, or device 1250) is moved to the outside of system controller α_1126 to when the plug-out processing is completed is less than or equal to 15 minutes, preferably, less than or equal to five minutes. The time is less than or equal to an hour at the longest for the above reason.

As described above, unit 1290 (combination module 1295, 1460 or 1470, or device 1250) outside the physical range of system α_1132 is plugged out. Using the position of unit 1290 (combination module 1295, 1460 or 1470, or device 1250) for the plug-out determination in this manner produces an advantage of keeping high reliability and of providing an easy plug-in operation without placing a burden on the user. That is, if radio is used for a physical communication medium (communication media) of the in-system network line 1782 (FIG. 16), a personal information protection function may be deteriorated by the line erroneously crossed with a network communication line in adjacent domain 1122. To avoid such risk, complicated initialization processing or plug-in/plug-out processing is necessary for the user. Conversely, as described above, the initialization processing or plug-in/plug-out processing can be performed without placing a burden on the user using automatically detected positional data, producing another advantage of avoiding the crossed line with the adjacent network communication line, of ensuring security, and of securing the personal information protection function.

Although system controller α_1126 arranged in system α_1132 performs the series of processing as shown in FIG. 22 in the above description, no limitation is intended thereby. System controller β_1128 or server n_1116-n arranged outside system α_1132 on spatial arrangement may perform the operation of FIG. 22 using, for example, the form in which FIGS. 8A and 8B are mixed, which is described in Section 1.8.

Section 4.3 Processing Method from Data Acquisition to Service Offering for Each Section In Section 4.3, specific processing from acquisition of sensor/state data to service offering to the user, which is related to Step 105 in FIG. 22 is described. From the perspective of, especially, system α_1132 (client system), in Section 4.3, a client system, which is the system of the present embodiment, comprises unit 1290 comprising a function of acquiring or creating data for communication, and system controller α_1126 configured to acquire and manage the data from the unit, wherein system controller α_1126 partitions each of a plurality of units 1290 into sections 1_1142-1 to m_1142-m, manages it, and holds data (address table of FIG. 23) concerning the section to which each unit belongs. State change data from one unit 1290 is communicated to system controller α_1126, and other units 1290 in the same section 1142 are controlled based on the state change data. Further, system controller α_1126 controls the other units in the same section using the state change for each predetermined time from one unit 1290.

Alternatively, from the perspective of the relationship with server n_1116-n (cloud) shown in FIG. 1, system controller α_1126 is connected to an external cloud (server n_1116-n) as a client/server system, and system controller α_1126 communicates the state change from one unit 1290 to system controller α_1126, and transmits it to the cloud (server n_1116-n). Other units 1290 in the same section are controlled based on data from the cloud (server n_1116-n).

That is, as described in Section 4.3, services are offered based on a plurality of acquired data items. For example, since the accuracy of estimation/determination of a current state or action or a request of the user is decreased if the services are offered based on merely an acquired single data item, the services satisfying the user are hard to offer. However, as described herein, the accuracy of estimation/determination increases using the plurality of data items, producing an advantage of improving the user satisfaction by the services offered.

Further, state change control (change of setting condition) is carried out a plurality of times in cooperation during service offering. When the state change control (change of setting condition) is performed a plurality of times in the same system α_1132 as a service offering form corresponding to action or a request of the user, a detailed change state can be offered to the user, producing an advantage of improving user satisfaction.

FIG. 26A shows the processing in system controller α_1126 from acquisition of various data from system α_1132 to service offering. The processing of FIG. 26A is premised on the system of the embodiment shown in FIG. 2, 8A or 8B. Alternatively, system controller β_1128 arranged outside system α_1132 as shown in FIG. 9 may acquire data or offer services. In this case, system controller α_1126 needs to be replaced with system controller β_1128 in the following description.

First, upon receipt of a service execution request from server n_1116-n or system controller β_1128 (Step 110), system controller α_1126 starts data acquisition from system α_1132 (Step 111). The data to be acquired comprises not only sensor data from sensor combination module 1460, but also sensor data from various sensor modules 1260 in device 1250, current setting condition data in actuator combination module 1470, and current setting condition data for (mainly actuator module 1270 in) device 1250. Moreover, system controller α_1126 may acquire data from server n_1116-n or system controller β_1128 as shown in Step 112. When a series of data acquisition ends in this manner, all the data acquired in system controller α_1126 is integrated and arranged, and necessary data is stored in internal memory 1232 (Step 113).

In the next step, the state in the same system α_1132 is estimated and determined (Step 114). Further, current action of the user is estimated and determined based on the estimated/determined state (Step 115). When the state is estimated/determined in Step 114, or when the current action of the user is estimated/determined in Step 115, the state of the individual user such as the height of the user and a color of clothes or accessories of the user is also estimated/determined. Sensitivity setting of a touchpad or a capacitive button is cited as an example in which the estimation/determination result of the state of the user affects service offering to the user (Step 119). A stable user input is possible, for example, for a large man having thick fingers even if sensitivity of a touchpad or a capacitive button is low. Conversely, the input is not sometimes possible for a child or a woman having thin fingers unless the sensitivity of the touchpad or capacitive button is increased. Thus, an estimation/determination result of the user state affects service offering to the user. To change sensitivity setting of the touchpad or capacitive button after the finger thickness of the user is estimated/determined, the communication data described in Section 2.5 needs to be changed.

Action prediction of the user (Step 116) and estimation/prediction of a request of the user (Step 117) are performed based on the result of estimation/determination of a state in system α_1132 (Step 114) and the result of estimation/determination of current action of the user (Step 115).

Then, results of the series of estimation/prediction are displayed in the user interface 1234 (FIGS. 8A and 8B), and inquiry and confirmation to the user are made (Step 118). If the results of the series of estimation/prediction are incorrect, the processing returns to the estimation/prediction in system α_1132 of Step 114. If the confirmation content to the user is correct, services are offered to the user in Step 119. The series of processing up to the service offering to the user are properly repeated. The service offering is indicated to server n_1116-n or system controller β_1128 at necessary timing (Step 109).

Figure 26B:
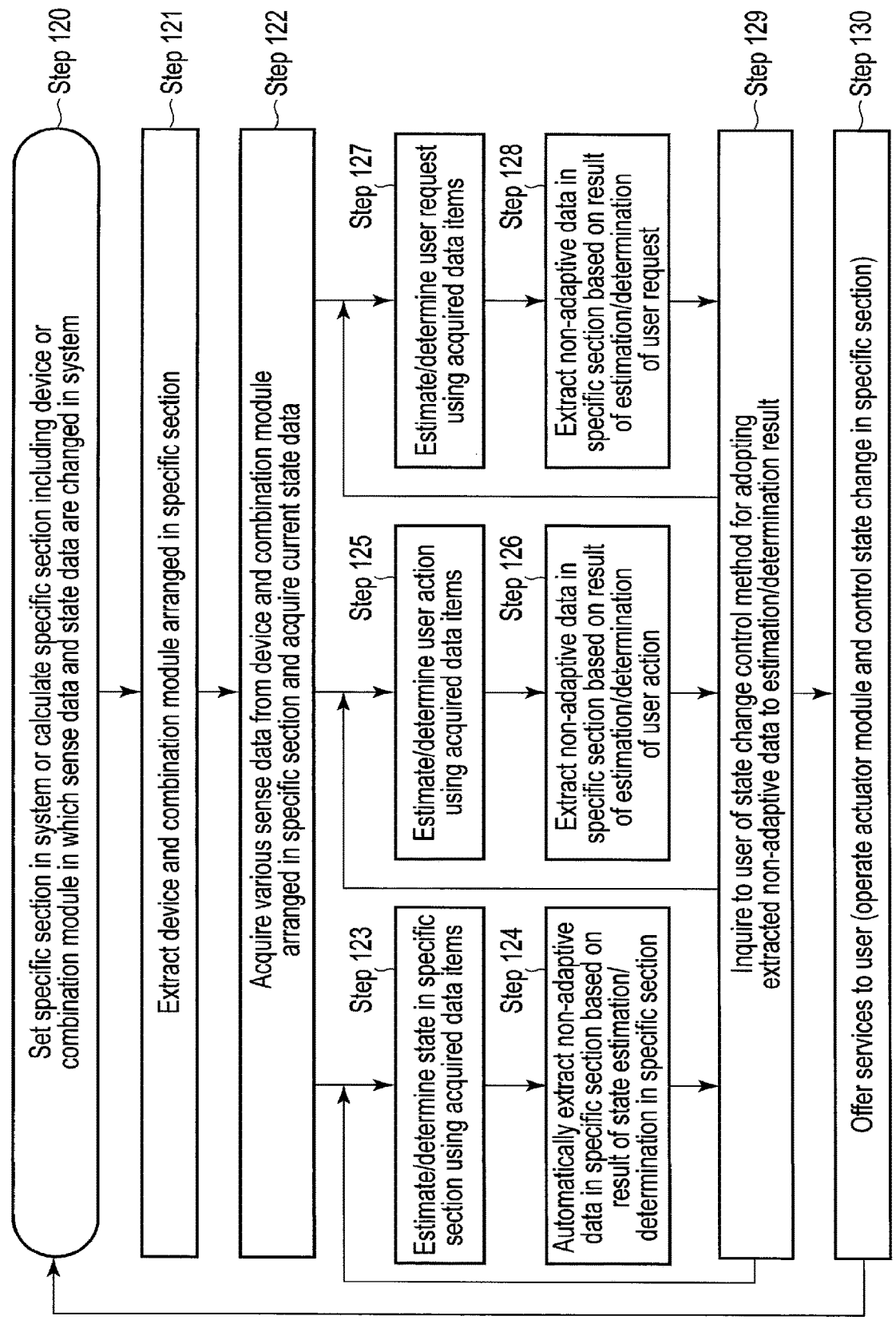
FIG. 26B shows data collection from devices and combination modules located in sections and a data estimation/determination method.

A plurality of data items acquired in Step 111 or 112 are used in various estimation/determination processing executed in Steps 114 to 117 of FIG. 26A. The estimation/determination accuracy is increased using the plurality of data items in comparison with the case where only a single data item is used, which is an advantage. This situation is described in detail with reference to FIG. 26B.

If a state changes or the user acts in system α_1132, a situation where any of units 1290 (device 1250, and combination modules 1295, 1460 and 1470) moves across section 1142, or a situation where various data obtained from units 1290 (device 1250, and combination modules 1295, 1460 and 1470) changes often occurs. Thus, if only corresponding section 1142 is selected in system α_1132, and the series of estimation/determination processing are performed only in section 1142, the processing efficiency increases in system controller α_1126. The processing of finding section 1142 in which any of the two situations occurs corresponds to Step 120 in FIG. 26B. An operation of extracting units 1290 (device 1250, and combination modules 1295, 1460 and 1470) arranged in corresponding section 1142 corresponds to Step 121. In Step 121, the address table of FIG. 23 is used.

Data is acquired from sensor module 1260, actuator module 1270, sensor combination module 1460 and actuator combination module 1470 described in this address table to a plurality of modules arranged in the same section 1142. As a specific example, response requests (requests) 1872 are transmitted from system controller α_1126 to a plurality of object modules, and corresponding responses 1874 are obtained, as shown in case 2 of FIG. 10B.

As a method of offering services to the user shown, especially, in FIG. 26B, a state not adaptive to the estimation/determination result performed for each of corresponding sections 1142 is automatically extracted, and adaptation processing is performed by performing state change control or setting condition change instructions on the non-adaptive portion. One example of the service offering method is described below. For example, when the user turns off a light and a television in a room and attempts to go out, the state where an air-conditioner in the room is in operation is automatically extracted as a non-adaptive state, and the operation state of the air-conditioner is automatically controlled as the adaptive processing. It is especially important that only the single data item of the television turned off in the room is insufficient to estimate the next action of the user. The accuracy of estimation/determination is increased by further acquiring another data item of the light turned off in the room, the data item being included in the same section 1142. An advantage of effectively offering services to the user is produced by extracting a state not adapted to an estimated/determined result in the present embodiment as shown above.

The example of turning off the television in the room and that of turning off the light in the room corresponds to acquisition of various sense data and that of current state data from units 1290 (device 1250, and combination modules 1295, 1460 and 1470) arranged in a specific section (Step 122). After a plurality of data items in the same section 1142 are acquired (Step 122), a state in a corresponding section is estimated/determined (Step 123), the user action is estimated/determined (Step 125), and a user request is estimated/determined (Step 127). Data not adapted to each estimation/determination result is extracted (Steps 124, 126 and 128), and a state change control method (changing method of setting condition) for adopting the extracted non-adaptive data to the estimation/determination result is inquired of the user (Step 129). The inquiry to the user may be displayed in the user interface 1234 in system controller α_1126. If it is denied by the user, estimation/determination (Steps 123, 125 and 127) is re-performed using the plurality of acquired data items.

When permission is obtained from the user as a result of the inquiry to the user, the command 1852 (case 1 in FIG. 10B) is provided to actuator module 1270 included in a device or actuator module 1270 in actuator combination module 1470, and state change in corresponding section 1142 is controlled (state setting is changed) to offer services to the user (Step 130).

Regarding Step 120 in FIG. 26B, unit 1290 (device 1250, or combination module 1295, 1460 or 1470) moving across section 1142, or data obtained from unit 1290 (device 1250, or combination module 1295, 1460 or 1470), content of which is changed, may be extracted using the left side of the time-series data tracking table in FIGS. 27 and 28. The time-series data tracking table is data in which a history of various data acquired by system controller α_1126, and a history of various types of estimation/determination performed based on it are recorded in a list form in chronological order along an elapsed time 2310. It is added in a timely manner, and stored in memory 1232 in system controller α_1126. In FIGS. 27 and 28, various sensor data obtained from sensor modules 1260-1 and 1260-2 in device 1250-1 in FIG. 8A or a state (setting value) set for actuator module 1270-1 are all described as, for example, state A. Section numbers of sections in which device 1250-1 is arranged are also described. Sense data of sensor combination module 1460-5 obtained as binary sense data is also described on the left side of the time-series data tracking table. Further, the section numbers of the sections in which sensor combination module 1460-5 is arranged are also described, the section numbers being obtained by detecting a position by the method to be described in Section 4.4.

Suppose a light detection sensor module is included in sensor combination module 1460-5, and the user wearing sensor combination module 1460-5 moves from section 2_1142-2 where a light is turned on to section 5_1142-5 where a light is turned off. In this case, sensor combination module 1460-5 is arranged in section 2_1142-2 at the elapsed time 2310 of t3. Light data detected by sensor combination module 1460-5 is "present". When the user moves from t3 to t4 with respect to the elapsed time 2310, sensor combination module 1460-5 after the movement is arranged in section 5_1142-5. The light data detected at this moment changes to "absent". The movement across section 1142 of device 1250 or combination module 1460 or 1470 and change of acquired data content can be easily extracted using the time-series data tracking table in this manner.

The estimation/determination collating table in FIGS. 27 and 28 is used for the estimation/determination processing performed in Steps 114 to 117 of FIG. 26A and in Steps 123, 125 and 127 of FIG. 26B. First, candidates for an estimation/determination result of a state item 2320 for each section 1142 such as "predetermined section being used" are preset as state α, state β, . . . , and are sequentially described in the horizontal row direction of this estimation/determination collating table. For example, a state collected from device 1250-1 as data such as "air-conditioner being in operation" and "timer setting time of air-conditioner" is set as state A, state B, . . . , and is sequentially described in the vertical row direction of this estimation/determination collating table. Further, for example, sensor data detected from sensor combination module 1460-5 configured to detect the presence of light, and a state setting value indicating a current state in actuator combination module 1470-2 are sequentially described in the vertical row direction of this estimation/determination collating table. A correlation coefficient value between both of them is described in a corresponding cell in this estimation/determination collating table. For example, if state A of "an air-conditioner being in operation" positively correlates with state α of "the predetermined section being used" in the state item 2320, "80" is described in a corresponding cell as a correlation coefficient value. Furthermore, if data of "light being present" in the same section 1142 obtained from sensor combination module 1460-5 positively correlates with state α of "predetermined section being used" in the state item 2320, "57" is described in a corresponding cell as the correlation coefficient value. Conversely, if there is a negative correlation (inverse correlation), a negative value is sometimes described in a corresponding cell as a correlation coefficient.

During state estimation/determination in section 1142, the sum of correlation coefficients of the same row is calculated for each of states α, β, . . . , and corresponds to a value of state probability 2330. When states α, β, . . . , comprising the largest total value indicate a state in the corresponding section 1142, estimation/determination is performed. Not an acquired single data item but a plurality of acquired data items in the same section 1142 can be used by calculating a total value of correlation coefficients in the same row in this manner. The use of the plurality of acquired data not only allows multidirectional estimation/determination, but also produces an advantage of increasing accuracy of the estimation/determination.

Similarly, candidates for an estimation/determination result of a user action item 2340 are preset as action α, action β, . . . , and are sequentially described in the horizontal row direction of this estimation/determination collating table. Further, candidates for an estimation/determination result of a user request item 2360 are also preset as request α, request β, . . . , and are sequentially described in the horizontal row direction of this estimation/determination collating table. Further, each correlation coefficient value is entered in a corresponding cell in a manner similar to that described above.

A total value of correlation coefficients is calculated for each of rows of actions α and β and rows of requests α and β at each of t1, t2, t3, . . . , as the elapsed time 2310, and is successively entered in corresponding portions on the side of the time-series data tracking table in FIGS. 27 and 28 as values of an action probability 2350 and a request probability 2370.

A state in section 1142, and an action and a request of the user can be estimated/determined in real time using the time-series data tracking table. An example of the service offering method using this time-series data tracking table is described based on the examples shown in, for example, FIGS. 27 and 28. Suppose the user carrying sensor combination module 1460-5 moves from section 2_1142-2 where a light is turned on to section 5_1142-5 where a light is turned off. In this case, since the light in section 2_1142-2 remains turned on, a value of the state probability 2330 of state α indicating "corresponding section being used" in section 2_1142-2 does not change much. Conversely, the action probability 2350 of action α corresponding to the movement of the user rises suddenly between t3 and t4 from 4 to 87%. As a result, it is estimated/determined that the user has moved between t3 and t4. Moreover, the request probability of request α corresponding to the request to turn on the light in section 5_1142-5 also rises suddenly between t3 and t4 from 4 to 98%.

A result of estimation/determination of the user request, for example, to turn on the light in section 5_1142-5, which is shown in Step 127 of FIG. 26B, is obtained using this time-series data tracking table. Data indicating absence of light in section 5_1142-5 is obtained from sensor combination module 1460-5 as data not adapted to this user request. Then, services are offered to the user in Step 130. Specifically, the command (issuance of command) 1852 to change setting conditions (refer to FIG. 10B) is provided from system controller α_1126 to actuator combination module 1470-2 configured to turn on the light in section 5_1142-5.

The estimation/determination of the state in each section 1142, that of the user action based on data acquired for each section 1142, and that of the user request are mainly described above. Alternatively, for example, the state of the whole system α_1132 may be estimated or determined, or the user action or user request may be estimated or determined based on data acquired from the whole system α_1132.

Next, the method of offering services to the user described in Step 119 of FIG. 26A or in Step 130 of FIG. 26B is described with reference to FIG. 29. First, a state change control candidate is extracted in unit 1290 (device 1250, or combination module 1295, 1460 or 1470) in corresponding section 1142 based on the result of extraction of non-adaptive data performed in Step 124, 126 and 128 of FIG. 26B (Step 141). After inquiry to the user is made (Step 129), change of setting conditions (state change control) is sequentially executed as in Steps 142 and 143.

As an example of the above, if a light is turned off in section 5_1142-5 to which the user moves, an air-conditioner and a television are also sometimes in an off state. Thus, if the non-adaptive data is extracted in Steps 124, 126 and 128 of FIG. 26B, the change of the setting conditions (state change control) needs to be performed for a plurality of items in the same section 5_1142-5. In that case, the change of the setting conditions (state change control) is sequentially performed for the plurality of items, or the change of the setting conditions (state change control) is simultaneously performed for part of the items, as shown in Steps 142 and 143 of FIG. 29. This produces an advantage of reducing a time required for optimal environmental setting in the same section 5_1142-5.

If the change of setting conditions (state change control) is sequentially or simultaneously performed for the plurality of items in this manner, data communication corresponding to a plurality of commands (issuance of commands) 1852 is sequentially or simultaneously performed from the same system controller α_1126 to a plurality of units 1290 (actuator combination modules 1470 or devices 1250) as in case 1 of FIG. 10B. All content of the source IP address data SIPADRS (FIG. 13 (*b*)) conforms to a source address data in communication middleware layers APL02 and APL06 (for example, content of source PAN identifier SPANID and source IEEE extension address SEXADRS in FIG. 12A (*e*)) in each physical layer frame PPDU (FIG. 11 (*f*)) indicating communication data corresponding to each of the commands (issuance of commands) 1852. Furthermore, part of destination date such as the destination PAN identifier DPANID in FIG. 12A (*e*) sometimes conforms to it.

Thus, when the change of the setting conditions (state change control) is sequentially or simultaneously performed for the plurality of items, the data communication corresponding to the commands (issuance of commands) 1852 is preferably collectively performed without performing other processing halfway in system controller α_1126 (or system controller β_1128 in system shown in FIG. 9). When the data communication is collectively performed in this manner, different communication data items can be created by the above processing of copying common data. The use of the above method produces an advantage of increasing processing efficiency of system controller α_1126 (or system controller β_1128 in system shown in FIG. 9).

As has already been described in Section 4.2, an ordinary user accepts a delay of approximately five to ten minutes regarding a delay in a service offering corresponding to a state change. A patient user accepts delay of approximately 15 minutes. However, if the delay exceeds an hour, almost all users feel dissatisfied. Thus, if services are sequentially offered for a plurality of items in the system of the present embodiment, a difference in time between services continuously offered is less than or equal to 15 minutes, preferably, less than or equal to five minutes. The time is less than or equal to an hour at the longest. This produces an advantage of keeping stress of the user to a minimum.

The service offering for each section 1142 is mainly described above. Alternatively, for example, services may be collectively offered in the whole system α_1132.

The service offering method has been described based on the example in which the user carrying sensor combination module 1460-5 moves from section 2_1142-2 where a light is turned on to section 5_1142-5 where a light is turned off. The processing method when specific unit 1290 (device 1250, or combination module 1295, 1460 or 1470) moves across different sections 1142 is additionally described.

Figure 30:
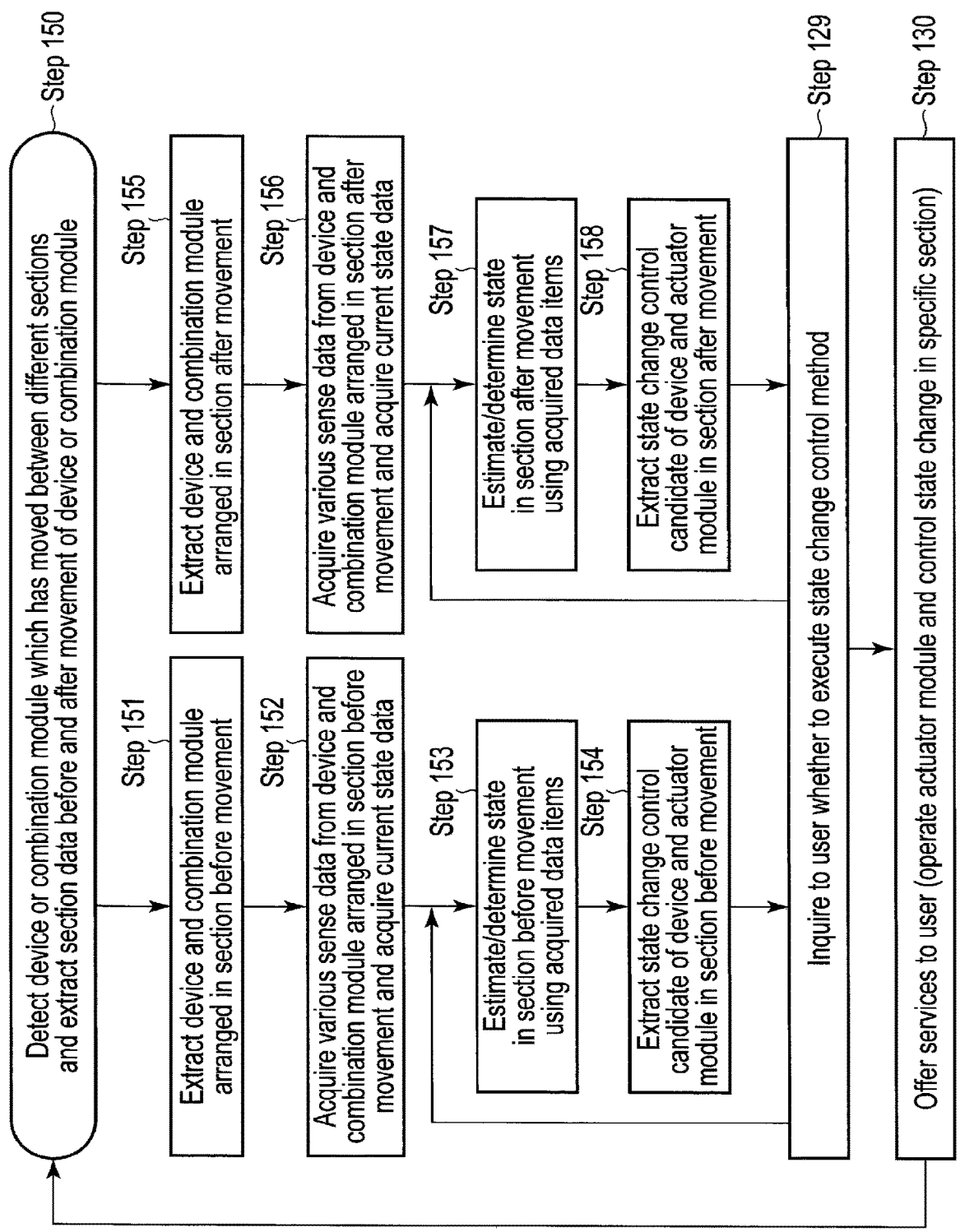
FIG. 30 shows data collection from devices and combination modules movable across different sections and a data estimation/determination method.

In this case, section data before and after movement of unit 1290 (device 1250, or combination module 1295, 1460 or 1470) needs to be extracted as shown in the steps of FIG. 30. The time-series data tracking table described with reference to FIGS. 27 and 28 is useful for this extraction. The section of sensor combination module 1460-5 in FIGS. 27 and 28 changes between t3 and t4 of the elapsed time 2310 from 2 to 5. The section data before and after movement can be easily extracted by seeking a position of change. In this case, services are often offered, especially, for the section before and after movement. Thus, in the system of the present embodiment, services are simultaneously or sequentially offered in both of section 2_1122-2 and section 5_1122-5 from and to which specific unit 1290 (device 1250, or combination module 1295, 1460 or 1470) moves. Services can be efficiently offered to the user in system controller α_1126 (or system controller β_1128 corresponding to system in FIG. 9) by intensively performing service offering in section 2_1122-2 and section 5_1122-5 before and after movement. The series of processes from Step 155 to Step 158 in FIG. 30 correspond to the processing in FIG. 26B. Further, unit 1290 (device 1250, or combination module 1295, 1460 or 1470) arranged in section 2_1122-2 before movement is extracted as in Step 151 of FIG. 30. Services are offered to the user also in section 2_1122-2 before movement through similar processing (Step 130). As has already been described above, change of setting conditions (state change control) may be sequentially or simultaneously performed for a plurality of items also in section 2_1122-2 before movement.

The data communication corresponding to the commands (issuance of commands) 1852 is preferably collectively performed without performing other processing halfway in system controller α_1126 (or system controller β_1128 in system shown in FIG. 9) as described above, even when services are simultaneously or sequentially offered in both of section 2_1122-2 and section 5_1122-5. When the data communication is collectively performed in this manner, different communication data items can be created by the above processing of copying common data. The use of the above method produces an advantage of increasing processing efficiency of system controller α_1126 (or system controller β_1128 in system shown in FIG. 9).

Section 4.4 Method of Tracking Movement Between Sections in Various Modules or Devices Section 4.4 describes a method of detecting a position in which communication module 1202 included in device 1250 or communication module 1660 included in a combination module is arranged.

If radio is used for physical communication medium (communication media) used on the in-system network line 1782 in FIG. 10A, a radio wave is emitted from communication modules 1202 and 1660 at a certain time. A position of communication module 1202 or 1660, a device comprising it, or a combination module is detected from the position of emission of the radio wave using this timing in the present embodiment. The GPS technology is known as a conventional method of detecting the position of a device. However, only GPS-related components mounted in a device are expensive if this technology is applied. Conversely, additional components are not necessary to detect a position in the above method, producing an advantage of allowing communication module 1202 or 1660 (or a device comprising it, or a combination module) to be less expensive and smaller.

The technology of a beacon is also known as well as the GPS technology which is used to know positional data. A radio wave emitted from an artificial satellite is used in the GPS technology. Conversely, for example, a ground radio wave conforming to the short range radio standard called Bluetooth is used in the beacon technology. That is, a plurality of devices configured to transmit a short range radio wave are placed in a plurality of ground portions, and a short range radio wave transmitted from each device is received to calculate a relative position of reception. However, a circuit for calculating a position is necessary on the reception side. Thus, a circuit of a receiver increases in size, causing the receiver to be larger and more expensive even in this method. On the other hand, active position detection in combination module 1295 (or unit 1290) requiring position detection is unnecessary in the system of the present embodiment, allowing combination module 1295 (or unit 1290) to be less expensive and smaller.

FIG. 31 shows a principle of position detection in the present embodiment. Each of system controller α_1126, device 1250-1 and device 1250-4 configured to receive the radio wave and to detect a position of a transmission source comprises a GPS function. Thus, positions of system controller α_1126, device 1250-1 and device 1250-4 are known in advance. An emission position of the radio wave is measured using a characteristic of the radio wave received by system controller α_1126, device 1250-1 and device 1250-4.

A received time (received timing) of a radio wave on the reception side engaged with the detection of the position (system controller α_1126, device 1250-1 and device 1250-4) is used to detect a position. A transmission source is identified in a network communication system comprising a plurality of radio wave transmission sources using a received time (received timing) of a radio wave. Alternatively, it may be said that the transmission source is identified in the network communication system comprising the plurality of radio wave transmission sources using content of communication data. For example, emission timing of the radio wave is different between sensor combination module 1460-5 and actuator combination module 1470-3 in FIG. 31. Thus, which of sensor combination module 1460-5 and actuator combination module 1470-3 the radio wave is emitted from can be identified from the received timing. Using the received timing of the radio wave for position detection in this manner produces an advantage of detecting different positions at the same time, and of improving efficiency of position detection. The position detecting method of the present embodiment is not limited to the above, and a signal from a beacon (conforming to the Bluetooth Smart standard) may be used.

A specific method of identifying a transmission source of a radio wave is described. Data is communicated on the same system network line 1782 by the group of the physical layer frame PPDU shown in FIG. 11 (f). System controller α_1126 controls or manages system network line 1782 to prevent the physical layer frames PPDU transmitted from different transmission sources from overlapping each other at the same time.

Address data indicating a transmission source is stored in one physical layer frame PPDU. Specifically, the source IP address data SIPADRS in FIG. 13 (b) described in Section 2.4 can be used to identify the transmission source. Alternatively, for example, the source IEEE extension address SEXADRS in FIG. 12A (e) described in Section 2.3 may be used to identify the transmission source as data stored in the MAC layer header MACHD (FIG. 11 (a)). Thus, a radio wave characteristic at the time of reception is measured on the reception side of the radio wave, and transmission source address data described in a corresponding physical layer frame PPDU is decoded. This allows a radio wave characteristic to be acquired for each radio wave transmission source.

Further, simultaneously received radio wave characteristics in a plurality of portions are compared to calculate positional data of a transmission source. Using the radio wave characteristics in the plurality of portions in this manner produces an advantage of increasing accuracy of position detection. There is a method of using radio field strength as a radio wave characteristic used to detect a position of the transmission source. That is, the radio field strength in a position of reception is inversely proportional to a square of a distance to the transmission source in an ideal state. Thus, relative positional data of sensor combination module 1460-5 and actuator combination module 1470-3 can be estimated by comparing reception radio field strength of system controller α_1126, device 1250-1 and device 1250-4.

Further, a radio wave phase may be used as another radio wave characteristic used to detect a position of the transmission source. That is, since a phase of a received radio wave differs depending on the distance between a transmission source and a destination, this phenomenon is used to detect the position. The relative positional data of sensor combination module 1460-5 and actuator combination module 1470-3 can be estimated by comparing a phase of a radio wave simultaneously received by system controller α_1126, device 1250-1 and device 1250-4.

Alternatively, a traveling direction of the radio wave may be used as another radio wave characteristic used to detect a position of the transmission source. To detect the traveling direction of the radio wave, the traveling direction of the radio wave is measured by comparing each of detection signals obtained from a plurality of receivers comprising different detection sensitivity with respect to the traveling direction of the radio wave. The position is detected from a traveling direction of the radio wave emitted from the obtained transmission source using trigonometry. This embodiment produces an advantage of accurately detecting the position of the transmission source with very inexpensive equipment. The radio wave characteristic used for the position detection in the present embodiment is not limited merely to the traveling direction of radio wave. It may be combined with reception strength, a phase at the time of reception, or other radio wave characteristics.

The position of the transmission source can be easily and accurately detected using trigonometry if, for example, system controller α_1126 and device 1250-1 in FIG. 31 can individually detect the traveling direction of the radio wave transmitted from sensor combination module 1460-5. The position can be detected using the trigonometry based on at least two receiving points of the radio wave. System controller α_1126 preferably covers one of the radio wave receiving points for the reasons (1) system controller α_1126 manages/operates/controls data communication on system network line 1782, (2) system controller α_1126 always analyzes data in the physical layer frame PPDU, and (3) the detection position of the radio wave characteristic should be physically close to the calculation position of the transmission source in terms of efficiency. As another radio wave receiving point, general device 1250 comprising the GPS function may be used, or a dedicated device for detecting a position of a transmission source may be provided.

Next, a principle of a method of measuring the traveling direction of the radio wave is described with reference to FIG. 32 (*b*). Detection sensitivity of a parabolic antenna 2760 used, for example, to receive a ground wave comprises directional dependency of a received radio wave. For example, the parabolic antenna 2760 configured to obtain detection signal α comprises the highest detection sensitivity when the received radio wave comes from the direction of A, and low detection sensitivity when it comes from the direction of B or C. As described above, the parabolic antenna 2760 comprises a characteristic that detection sensitivity differs depending on the traveling direction of the radio wave. Conversely, the parabolic antenna 2760 configured to obtain detection signal β comprises the highest detection sensitivity when the received radio wave comes from the direction of B, and the parabolic antenna 2760 configured to obtain detection signal γ comprises the highest detection sensitivity when it comes from the direction of C. Thus, the traveling direction of the received radio wave can be estimated in principle by simultaneously receiving the received radio wave from an arbitrary direction using the three parabolic antennas 2760, and comparing the strength between detection signals α, β, and γ. The process of estimating the traveling direction of the received radio wave corresponds to the method of comparing each of detection signals obtained from a plurality of receivers and measuring the traveling direction of the radio wave.

Figure 32:
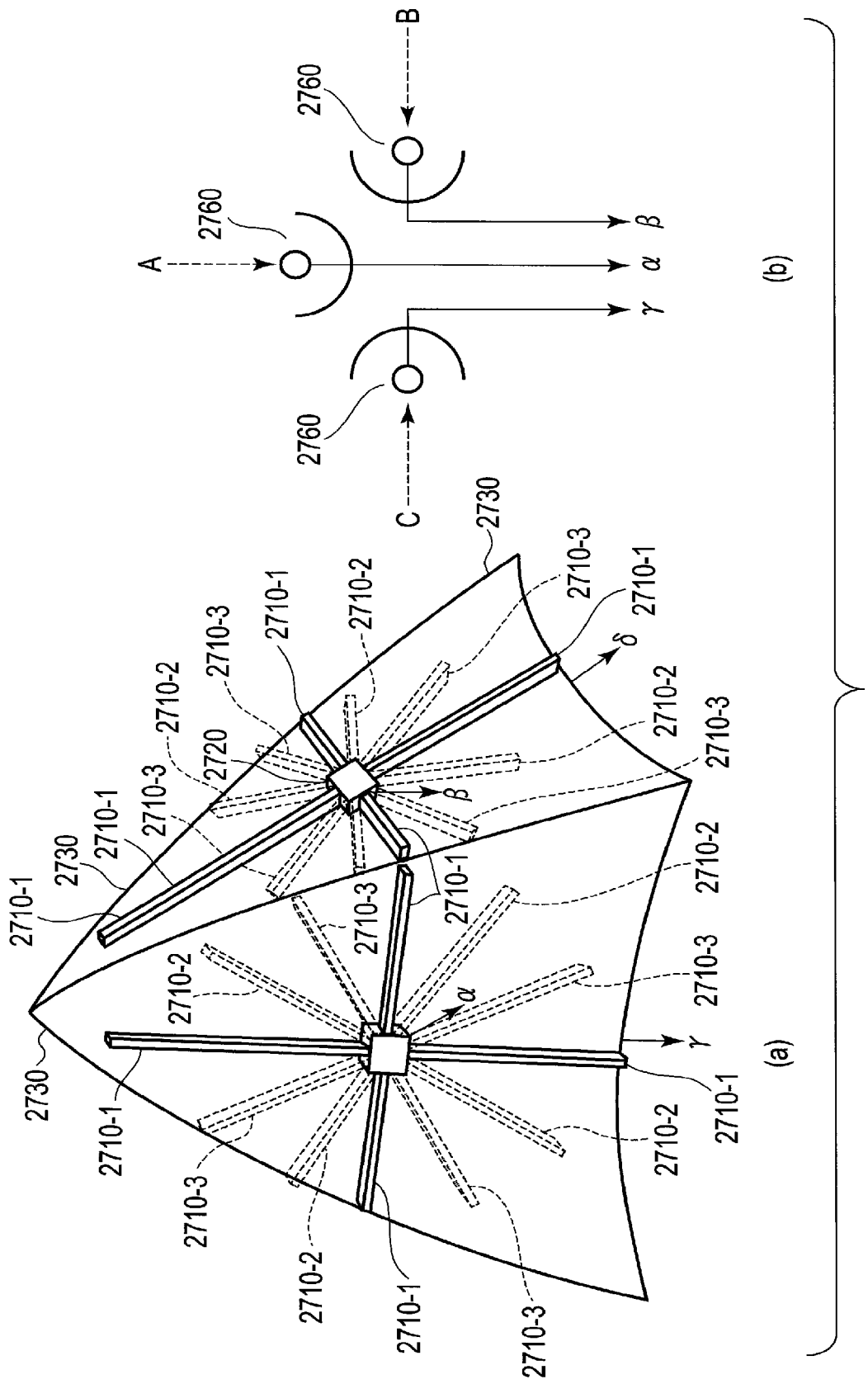
FIG. 32 shows the structure of a detector for searching a radio wave source direction of the present embodiment.

FIG. 32 (*a*) shows a structure of an antenna for directional detection with higher directional accuracy. The basic structure thereof is composed of a stealth plate 2730 formed to be substantially a triangular pyramid or quadrangular pyramid. Antenna 2710-1 is arranged in a cross shape on the side of the substantially triangular pyramid or substantially quadrangular pyramid. Antenna 2710-1 is composed of a pair of antennas orthogonal to each other. Only one pair of antennas 2710-1 orthogonal to each other in a cross shape may be arranged on one surface of the stealth plate 2730, as indicated by the solid lines in FIG. 32 (*a*). Alternatively, pairs of antennas 2710-1 to 2710-3 orthogonal to each other in a cross shape may be arranged on one surface of the stealth plate 2730, as indicated by the broken lines in FIG. 32 (*a*). Each pair of antennas 2710-2 and 2710-3 indicated by the broken lines in FIG. 32 (*a*) is attached to be rotated 30 degrees relative to antennas 2710-1 orthogonal to each other in a cross shape. Both of A) reception of communication data on the in-system network line 1782, and B) position detection of the transmission source are performed using antennas 2710-1 orthogonal to each other in a cross shape. An amplifier and signal processing circuit 2720 is arranged in each of antennas 2710-1 to 2710-3 arranged in a cross shape. Detection signals α, β, γ and δ are individually obtained from each amplifier and signal processing circuit 2720. The structure is not necessarily formed to be accurately a triangular pyramid or a quadrangular pyramid. It suffices that the surfaces of the stealth plates 2730 face in different directions.

The detection sensitivity of cross-shaped antenna 2710 arranged on the surface of the stealth plate 2730 in FIG. 32 (*a*) comprises reception direction dependency. Thus, the pair of cross-shaped antennas 2710 correspond to a receiver comprising different detection sensitivities depending on the traveling direction of the radio wave. The comparison between individual detection signals α, β, γ and δ obtained from each amplifier and signal processing circuit 2720 corresponds to the comparison of each detection signal.

Figure 33:
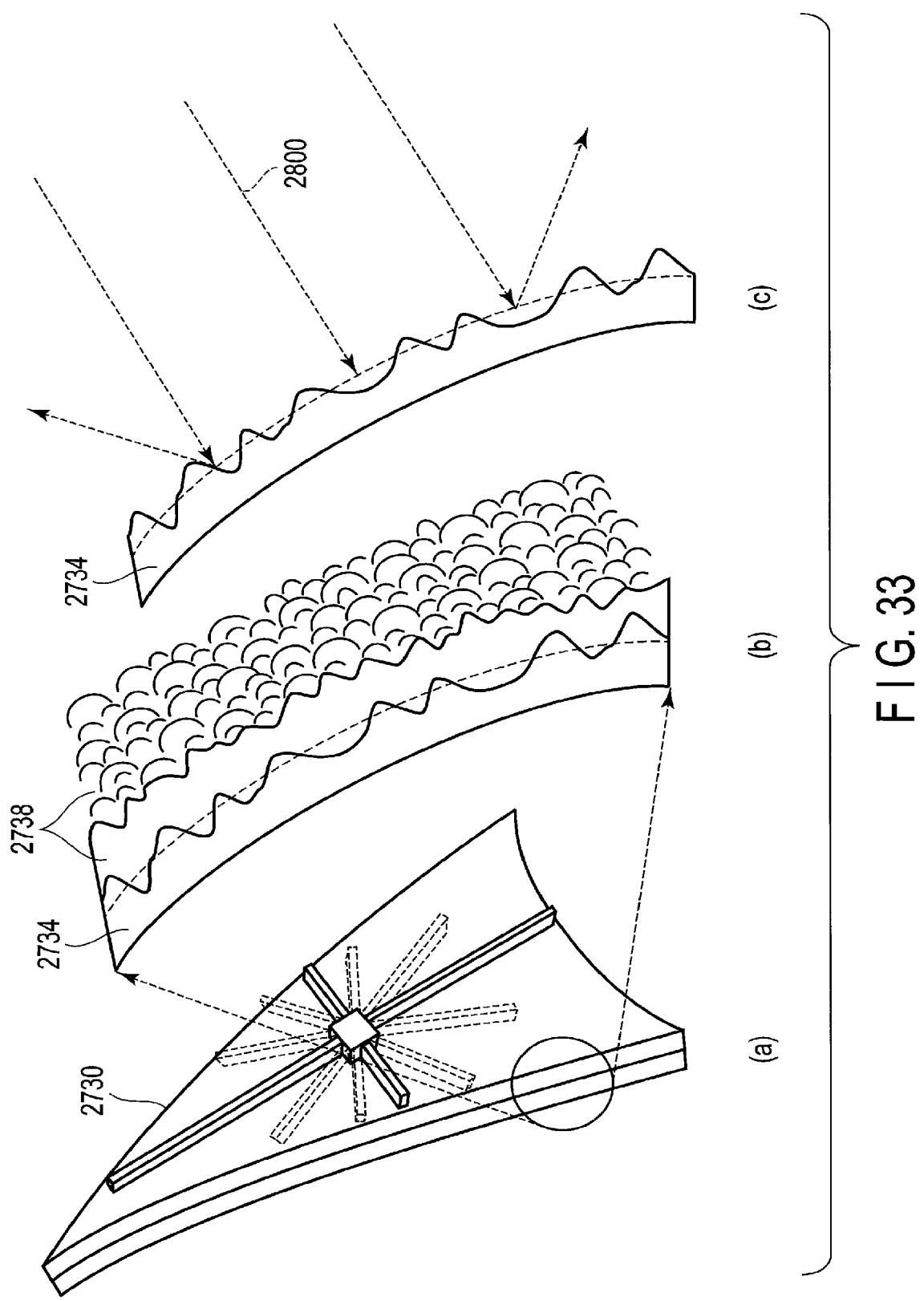
FIG. 33 shows the structure of a stealth plate of the present embodiment.

FIG. 33 (*a*) is an enlarged view of one surface in FIG. 32 (*a*). The stealth plate 2730 arranged on the back side of cross-shaped antennas 2710 plays roles of (1) preventing a radio wave from entering cross-shaped antennas 2710 from the back side, and (2) absorbing a radio wave passing through cross-shaped antennas 2710. Arranging the stealth plate 2730 on the back side of antennas 2710 configured to detect the traveling direction of the radio wave in this manner produces an advantage of controlling reflection of an unnecessary radio wave which decreases the accuracy of detection, and of increasing the position detection accuracy of the transmission source. To exert this advantage, the stealth plate 2730 comprises a two-layer structure as shown in FIG. 33 (*b*). The layer in the back is composed of a metal plate layer 2734 with the minutely uneven front side. The arrangement of the metal plate layer in the back solidly prevents the radio wave from penetrating, and also prevents it from entering cross-shaped antennas 2710 from the back side.

However, the radio wave is reflected on the front side of the metal plate layer 2734. Thus, the structure is devised in various ways in order for the reflected radio wave not to enter cross-shaped antenna 2710. One of the devices is found in that the surface of the substantially triangular pyramid or substantially quadrangular pyramid is curved as shown in FIG. 33 (*c*). The curved surface changes the traveling direction of an incident radio wave 2800, which is made incident substantially in parallel, at an incident position. Further, the metal plate layer 2734 with the minutely uneven front side is intended to irregularly reflect the incident radio wave 2800 which is made incident substantially in parallel.

Original purpose (2) of the stealth plate 2730 is not to reflect the radio wave but to absorb the radio wave. To realize function (2), a weak conductive organic layer 2738 with the minutely uneven front and back sides is arranged on the upper side of the metal plate layer 2734 with the minutely uneven front side in the stealth plate 2730. Specifically, the weak conductive organic layer 2738 with the minutely uneven front and back sides may be formed by hardening metallic powder on an organic layer, or entirely formed of a weak conductive organic matter. The incident radio wave 2800 is absorbed in the weak conductive organic layer 2738. Since the incident radio wave 2800 cannot be completely absorbed only in the weak conductive organic layer 2738, the incident radio wave 2800 is irregularly reflected on the uneven front side. This allows irregular reflection efficiency to be improved between the weak conductive organic layer 2738 with the minutely uneven front and back sides and the metal plate layer 2734 with the minutely uneven front side, and causes the irregularly reflected radio wave to be absorbed in the weak conductive organic layer 2738, preventing the radio wave from reaching cross-shaped antennas 2710.

Figure 34:
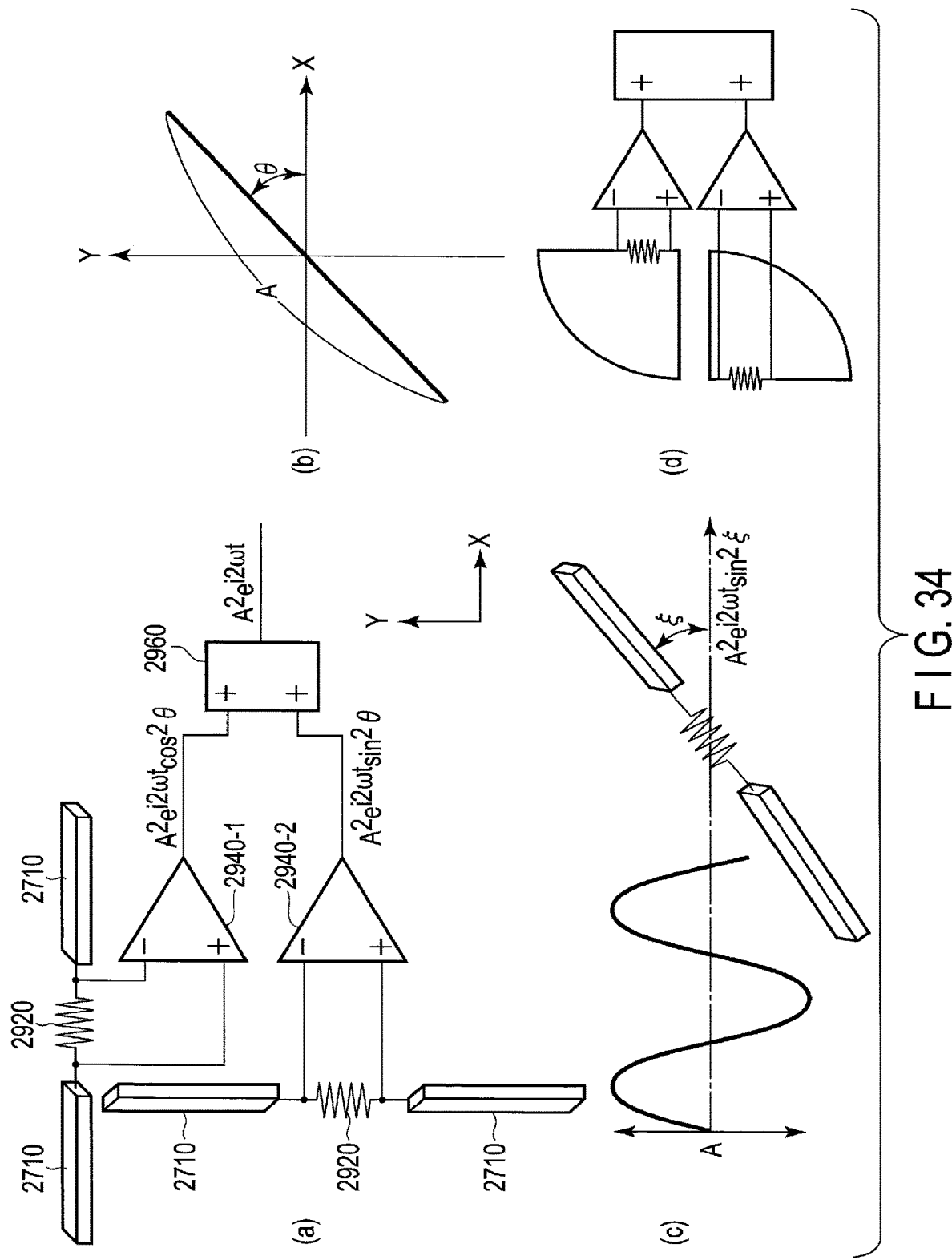
FIG. 34 shows a detection principle for searching the radio wave source direction of the present embodiment.

The detailed structure of cross-shaped antennas 2710-1 shown in FIG. 32 (*a*) and the principle of the detection signal characteristic are described with reference to FIG. 34. The internal structure of the cross-shaped antennas 2710 is achieved by combining a structure in which two antennas 2710 arranged in a lateral direction (X-direction) are connected to each other through a resistor 2920 and a structure in which two antennas 2710 arranged in a lengthwise direction (Y-direction) are connected to each other through the resistor 2920, as shown in FIG. 34 (*a*). A capacitor or an inductance as well as the resistor 2920 may be properly arranged for the connection between the two antennas 2710 to improve a frequency characteristic of signal detection. The amplifier and signal processing circuit 2720 is composed of voltage differentiators 2940-1 and 2940-2 configured to detect a difference in voltage generated between the resistors 2920, and an accumulator 2960 configured to add signals obtained from each of them.

If, for example, the plane of polarization is tilted by θ relative to the horizontal axis (X-axis) as shown in FIG. 32 (*b*), and a radio wave having electric field amplitude A passes in a direction perpendicular to the cross-shaped antennas 2710, a signal of $$A^2 e^{i2\omega t} \cos^2 \theta \qquad (1)$$

is obtained from voltage differentiator 2940-1, and a signal of $$A^2 e^{i2\omega t} \cos^2 \theta \qquad (2)$$

is obtained from voltage differentiator 2940-2. In formulae (1) and (2), a phase term of a detection signal is expressed by a complex number. Thus, an output signal from the accumulator 2960 which adds each signal is given by $$A^2 e^{i2\omega t}. \qquad (3)$$

Tilt angle θ of the plane of polarization is not present in formula (3). That is, a fixed characteristic of the obtained detection signal is obtained without depending on tilt angle θ of the plane of polarization, as long as the radio wave passes in the direction perpendicular to cross-shaped antenna 2710.

If a radio wave passes the cross-shaped antennas 2710 at an angle ξ relative to the direction perpendicular thereto as shown in FIG. 34 (*c*), an output signal from the accumulator 2960 is given $$A^2 e^{i2\omega t} \sin^2 \xi. \qquad (4)$$

Above formula (4) indicates that the output signal of the accumulator 2960 changes depending on the traveling direction of the radio wave with respect to the cross-shaped antennas 2710 (depending on an angle tilted relative to the direction perpendicular to the cross-shaped antennas 2710).

Thus, the traveling direction of the radio wave can be calculated by comparing output signals α, β, γ and δ (of the accumulator 2960) obtained from each of the cross-shaped antennas 2710 disposed on stealth plates 2710 facing opposite directions as in FIG. 32 (*a*) using above formula (4).

If tilt angle ξ is especially small in FIG. 34 (*c*), the amount of output signals tends to greatly depend on a vibrating surface of the radio wave. To reduce the harmful influence, the pairs of cross-shaped antennas 2710-2 and 2710-3 which are indicated by the broken lines in FIG. 32 (*a*), and comprise a rotation angle are arranged. Detection signal errors caused when tilt angle ξ is small can be reduced by cancelling merely the most different output signal of output signals obtained by cross-shaped antennas 2710-1 to 2710-3, and averaging the other two output signals.

The traveling direction of the radio wave can be efficiently measured (without being affected by the plane of polarization) by arranging antenna 2710 to make a right angle as in formula (3). Alternatively, antenna 2710 may be arranged at an arbitrary angle (if any correction is made when the traveling direction of the radio wave is calculated). Further, antenna 2710 is not necessarily linear as described above. It may be in other shapes, for example, in a leaf shape as shown in FIG. 34 (*d*).

The detection accuracy is sometimes reduced due to reflection on a wall and the ceiling during the progress of a radio wave if the position of the transmission source is detected from the traveling direction of the radio wave. To prevent it, radio waves comprising different frequencies may be used for the position detection. For example, frequency bands of 2.4 GHz, 915 MHz, 950 MHz and 868 MHz can be used depending on areas as a reference frequency used for short range radio communication. Thus, for example, wireless communication based on the above different reference frequencies may be simultaneously performed. A reflection characteristic during the progress of the radio wave on the wall and ceiling changes depending on a reference frequency to be used. Thus, the accuracy of detecting the position of the transmission source is improved by comparing the results of the position detection for which the wireless communication comprising each of the different reference frequencies is used.

As described above, if the trigonometry is used for the position detection, the position of the transmission source can be detected merely by measuring the traveling direction of the radio wave basically at two positions. However, the traveling direction of the radio wave may be measured at least three receiving points to prevent the position detection accuracy from being reduced due to the reflection during the progress of the radio wave. The comparison of measurement results at least three receiving points improves the accuracy and reliability for the position detection of the transmission source. The method is not limited to either of them. A method of increasing receiving points for position detection and increasing reference frequencies to be used may be combined. This produces an advantage of improving the position detection accuracy of the transmission source.

Section 4.5 Adaptability Between Different Systems in Unit (Combination Module or Device)

System α_1132 in the system of the present embodiment can be applied to a network communication system widely ranging from a consumer sector, a healthcare field to a social infrastructure sector. As described in Section 4.2, initialization (check-in), plugging-in and plugging-out of unit 1290 (device 1250, or combination module 1295, 1460 or 1470) in system α_1132 can be performed very easily in the system of the present embodiment. The combination of the above allows unit 1290 (device 1250, or combination module 1295, 1460 or 1470) to be easily incorporated into a plurality of different types of systems and to be used in the system of the present embodiment. Furthermore, the same unit 1290 (device 1250, or combination module 1295, 1460 or 1470) can be used in different systems.

Thus, the use of the system of the present embodiment produces an advantage that universality of unit 1290 (device 1250, or combination module 1295, 1460 or 1470) can be secured in a very wide area. If, especially, combination modules 1295, 1460 and 1470 comprise universality in the very wide area, they can be easily less expensive because of mass production. Furthermore, since combination modules 1295, 1460 and 1470 which are less expensive can be used in different systems, the usability of combination modules 1295, 1460 and 1470 is greatly improved.

The relationship between system α_1132 and system β_1134 across which the same unit 1290 (device 1250, or combination module 1295, 1460 or 1470) is used may be included in the same domain 2_1122-2 as shown in FIG. 1. Alternatively, system α_1132 and system β_1134 may belong to domain 1_1122-1 and domain 2_1122-2, respectively.

The initialization (check-in), plug-in, and plug-out methods of unit 1290 (device 1250, or combination module 1295, 1460 or 1470) between system α_1132 and system β_1134 are described in Section 4.5.

First, a case where system α_1132 and system β_1134 comprise different functions is described. In this case, system controller α_1126 in system α_1132 and system controller β_1128 in system β_1134 individually perform identification processing of an adaptive/non-adaptive system on unit 1290 (device 1250, or combination module 1295, 1460 or 1470). If the adaptive/non-adaptive system is identified regarding device 1250, exchangeable data 1810 (refer to FIG. 10B) is exchanged on communication middleware layer APL06 for identification, as described in Section 2.1 with reference to FIG. 16 or 17B. Conversely, the adaptive/non-adaptive system is identified regarding combination module 1295, 1460 or 1470 using communication data in media access layer MAC02, as described in Section 2.1 with reference to FIG. 10A. For example, as described in Section 2.3 using FIG. 12A (e), the source IEEE extension address SEXADRS included in communication data transmitted from combination module 1295, 1460 or 1470 may be used. In this case, server n_1116-*n* may be accessed from data of the obtained IEEE extended address SEXADRS through the Internet, and identity data of combination module 1295, 1460 or 1470 may be acquired to identify the adaptive/non-adaptive system.

As a result of the processing, if corresponding unit 1290 (device 1250, or combination module 1295, 1460 or 1470) is determined to be an adaptive system, whether it is incorporated into a corresponding system is confirmed to the end-user through the user interface 1234 (FIG. 2, 8A, 8B or 9).

First, if system α_1132 and system β_1134 comprise the same function, the adaptive/non-adaptive system is identified using data of a position in which unit 1290 (device 1250, or combination module 1295, 1460 or 1470) is arranged, as described in Section 4.2.

Next, a situation occurring when the same unit 1290 (device 1250, or combination module 1295, 1460 or 1470) is used across system α_1132, system β_1134, etc., and a method of handling it are described. As an example of unit 1290, C-format may be used, as shown in FIG. 17A, as communication middleware layer APL02 used when combination module 1295 communicates data with system controller β_1128. Alternatively, another format may be used for data communication with combination module 1295 as communication middleware layer APL02. As another example of unit 1290, not only A-, E- and W-formats but also the extension application layer EXL06 may be used, as shown in FIG. 17B, for communication middleware layer APL06 used when device 1250 communicates data with system controller β_1128. As shown above, different formats may be used on communication middleware layers APL02 and APL06 depending on unit 1290 (device 1250, combination module 1295 or 3583) to be used.

FIG. 36A shows a configuration example of system controller 3581 configured to mutually communicate with various units 1290 (combination modules 3583). FIG. 36A shows various processing executers by connections of hardware forms for ease of description. The structure of system controller 3581 may be composed of the connections of hardware forms in this manner. Alternatively, if system controller α_1126 is composed of processor 1230 and memory 1232 as shown in FIG. 2, the Internet connector 3581*a* to the Internet matching data output unit 3581*g* shown in FIG. 36A correspond to a processing flow executed in processor 1230.

A plurality of combination modules 3583 developed by different makers are present as a unit or combination module 3583 which is an example of the unit. Further, different formats (standards) may be used on communication middleware layer APL02 for each combination module 3583. Thus, different formats (first to n$^{th}$ communication standards) are available on communication middleware layer APL02 such that the same system controller 3581 can mutually communicate with various combination modules. Accordingly, different communication standards are identified in the communication standard recognition unit 3581*c* in system controller 3581, and processing is properly performed in accordance with the communication standards based on the identification result. Then, the universality of system controller 3581 is improved, producing an advantage of communicating data with different combination modules 3583 developed by different makers.

Various formats which are used in communication middleware layers APL02 and APL06, and described in Section 2.1 comprise:

A-format written in text format in a broad sense;
C-format in "command/request/response/status" form;
E-format in which a setting code is stored in a predetermined area; and
W-format in which the transmission side is entered in a specific field, or in which a tag specific to HTML/HTML5 is described. Thus, data described in communication middleware layers APL02 and APL06 (data described in the communication middleware data APLDT of FIG. 11) is analyzed, and the corresponding communication standard can be identified by determining which format the data corresponds to.

Figure 17A:
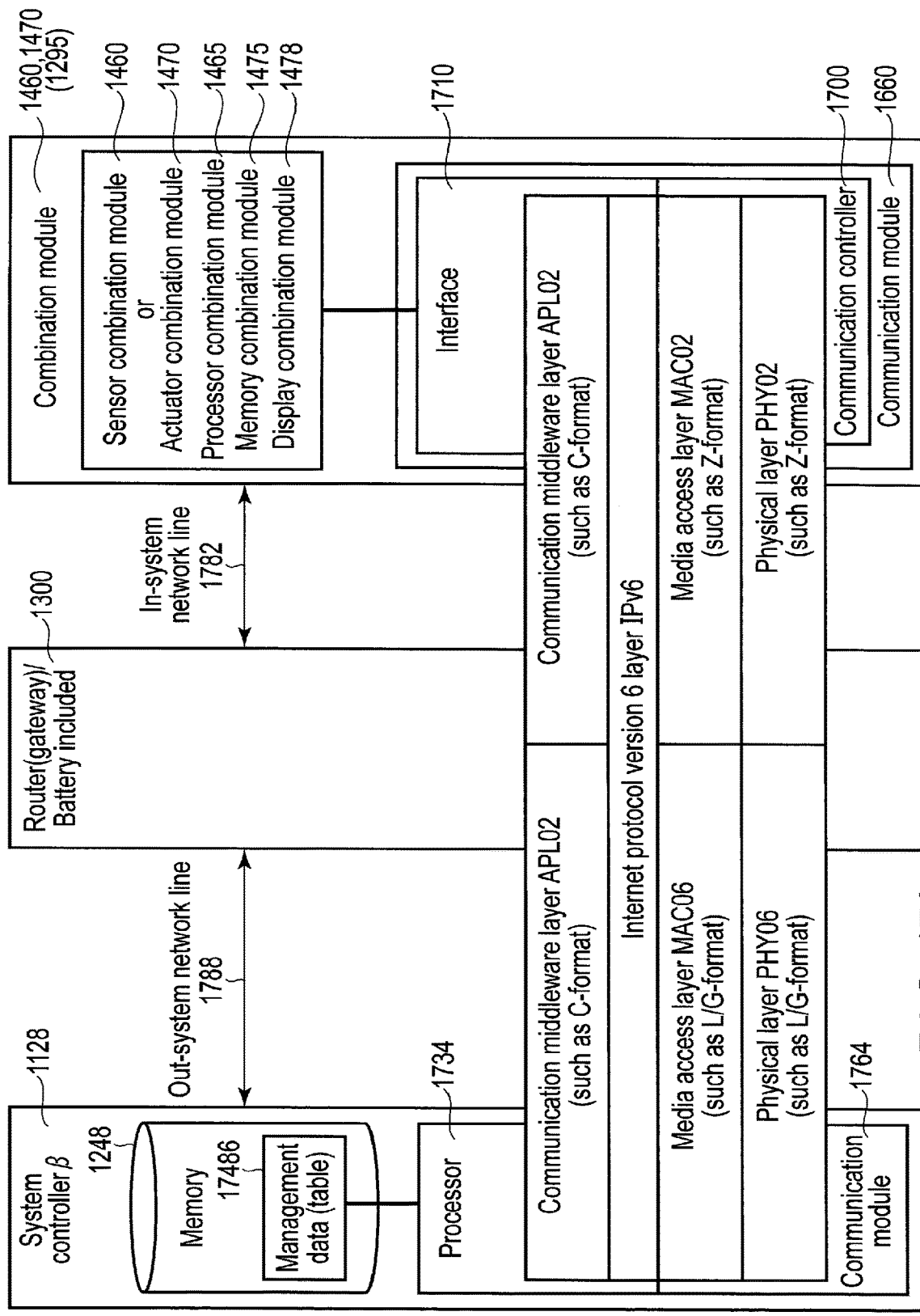
FIG. 17A shows another example (1) of the structure of application/communication layer.

Combination module 3583 is connected to the Internet 3585 through an access point 3584A and/or a base station 3584B, as shown in the embodiment of FIG. 17A. The Internet 3585 in FIG. 36A corresponds to the out-system network line 1788 in FIG. 17A. Although it is omitted in FIG. 37A, the battery built-in router (gateway) 1300 in FIG. 17A is placed between the Internet 3585 and the Internet connector 3581a in system controller 3581.

Combination module 3583 may comprise sensor module 1260 as shown in, for example, FIG. 4B (a) or (b), and transmit a detection signal from sensor module 1260. Alternatively, identification data may be stored in the self-attribute data storage area 1793 (FIG. 7B) of communication module 1660 in combination module 3583, and may be accessed from outside through the Internet 3585 and the base station 3584B using the data (or address of combination module 3583 [for example, IP addresses SIPADRS and DIPADRS in FIG. 13]).

As described in Section 1.6, communication module 1660 with the structure of FIG. 7A or 7B is used also in part of communication module 1202-3 (FIG. 2) in system controller 3581 and system controller $\alpha\_1126$. Thus, the Internet connector 3581a in FIG. 36A corresponds to the data communication executor 3016 in FIG. 7A. Similarly, a protocol recognition unit 3581b in FIG. 36A corresponds to the physical layer frame analyzer 1918 in FIG. 7A, and a data detector 3581d in FIG. 36A corresponds to the content extraction unit 1938 in FIG. 7A. The Internet matching data output unit 3581g in FIG. 36A corresponds to the physical layer frame generator 1914 in FIG. 7A. Both of the communication standard recognition unit 3581c and a communication standard matching format setting unit 3581f in FIG. 36A correspond to the combination of the signal processor 1780 and processor 1736 in FIG. 7B. The processing performed in a data processor 3581e of FIG. 36A is executed in processor 1230 in FIG. 2.

As shown in FIG. 17A, combination modules 3583 and 1295 can be connected to system controller 3581 (system controller $\beta\_1128$) through the Internet 3585. Communication data used at this moment comprises a structure shown in FIG. 11. The source IP address data SIPADRS and the destination IP address data DIPADRS are stored in it, as shown in FIG. 13.

A signal received in the Internet connector 3581a is analyzed in the protocol recognition unit 3581b. The IPv6 header IPv6HD and the communication middleware data APLDT (and the extension data EXDT) in FIG. 11 are individually extracted in the protocol recognition unit 3581b. Then, the extracted communication middleware data APLDT (and extension data EXDT) is analyzed in the communication standard recognition unit 3581c.

The communication standard recognition unit 3581c comprises a data processing routine for analyzing formats of various communication standards in advance. Thus, the communication standard recognition unit 3581c can easily determine which of A-, E-, and W-formats (FIG. 17B) a combination module adopts, or whether C-format (FIG. 17A) is adopted. After a corresponding communication standard is recognized, it is input to the content (for example, sensor detection data) data processor 3581e extracted in the data detector 3581d.

In the present embodiment, after a communication standard to which the communication middleware data APLDT (and the extension data EXDT) in received communication data conforms is automatically determined, the communication middleware data APLDT (and the extension data EXDT) is generated based on the format conforming to the communication standard, and a response is transmitted to destination unit 1290. Specifically, the communication middleware data APLDT (and the extension data EXDT) is generated in the communication standard matching format setting unit 3581f based on data of the communication standard (formats of communication middleware layers APL02 and APL06) identified in the communication standard recognition unit 3581c. This produces an advantage of allowing system controller 3581 to stably communicate data with a plurality of units 1290 (or combination modules 1295) developed by other makers.

That is, as described above, the communication standard on communication middleware layers APL02 and APL06 (and the extension application layer EXL06) used by corresponding unit 1290 (or combination module 3583) is already recognized in the communication standard recognition unit 3581c. Thus, the data transmitted from the data processor 3581e is converted into the communication middleware data APLDT (FIG. 11) and, if necessary, the extension data EXDT based on the data in the communication standard matching format setting unit 3581f. As a result, destination unit 1290 of transmission (reply) (or combination module 3583) can recognize the communication middleware data APLDT (and the extension data EXDT). Transmission data of a predetermined data format is input to the Internet matching data output unit 3581g.

FIG. 36B shows an example of combination module 3583 (or unit 1290) moving to different areas. Network system $\alpha\_1132$ and network system $\beta\_1134$ are present in each area. Thus, system controllers 3581-1, 3581-2 and 3581-3 which are configured to control and manage network communication, and to acquire data in a network system are placed in each area. System controllers 3581-1, 3581-2 and 3581-3 arranged in each area comprise the same structure as system controller 3581 in FIG. 36A.

As described above, all of system controller 3581-1, 3581-2 and 3581-3 flexibly conform to different formats (communication standards) on communication middleware layers APL02 and APL06 (and the extension application layer EXL06). Thus, combination module 3583 (or unit 1290) can mutually communicate with system controllers 3581-1, 3581-2 and 3581-3 regardless of the area it may move to.

Chapter 5 Examples of Various Applicable Fields

Section 5.1 Examples of Application to Consumer Electronics Technology

Section 5.1.1 Example of Application of Wide Area Network System to Consumer Electronics Technology As an example of application of a wide area network system shown in FIG. 1 to the consumer electronics technology, "specific information" may be related to the goods to be circulated among a wholesale firm B1_1104-1, a service provider B_1112-2 and system $\alpha\_1132$. For example, the service provider B_1112-2 collects materials from the wholesale firm B1_1104-1, such as wide-area weather information from such the Meteorological Agency, accident information from the police stations or road congestion information from the road traffic information center, and processes the information into useful form for each area, to be published on the Internet. A general end user may operate a personal computer (system controller $\alpha\_1126$) on hand to receive browsing service of such information.

Further, as an example of application to the consumer electronics technology, each of domains 1_1122-1 to 3_1122-3 shown in FIG. 1 may be related to a predetermined activity area on the network, of a member or members who constitutes a specific group relating to a family (for a single person, the person is counted as one family) or a business, or hobby/community. Moreover, a specific member on a social network service (SNS) may form a specific one of domains 1_1122-1 to 3_1122-3 as the above-described specific group.

Furthermore, as another specific example, in which when system $\alpha\_1132$ shown in FIG. 1 is related to PAN constituted at home of an individual user, system $\beta\_1134$ may be related to the network environment (the specific PAN environment or LAN environment) in a place from home. In this case, the personal digital assistant in hand of the user at the place from home, such as a smart phone and a tablet, is related to a system controller $\beta\_1128$. Here, the system $\beta\_1134$ may be related to, not only one set of the personal digital assistant, but also the entire local network space (constructed within physically or geographically close specific area) to where the system controller $\beta\_1128$ is connected may be related to the entire system $\beta\_1134$. Examples which show the relationship between the system $\alpha\_1132$ and the system $\beta\_1134$ in the domain 2_1122-2 are as follows. That is, there is such a method that a user operates the above-mentioned personal digital assistant (system controller $\beta\_1128$) out of the system $\beta\_1134$ of the place from home, to enter the domain 2_1122-2 with identification information ID and its own password specific to the domain, and controls a specific equipment in system $\alpha\_1132$ constructed in the house. There is also another method to receive an original service based on the information from a predetermined sensor module in the house (system $\alpha\_1132$) (for example, to obtain in a place from home a suggestion of a dinner recipe from the foods material information stored in the refrigerator of the house).

Section 5.1.2 Examples of Application of Combination Module to Consumer Electronics Technology As an example of application to the consumer electronics technology, the sensor combination module 1460 or actuator combination module 1470 may be attached to a commercially-available small-size household appliance such as an alarm clock, a flashlight, a toothbrush or a drier, to drastically improve the function of the household appliance at low cost as an advantageous effect. Here, as the method of attaching the sensor combination module 1460 and the actuator combination module 1470 to the commercially-available small-size household appliance, it is not always necessary to fix it with a screw, but, for example, it may be attached temporarily using a double-stick tape or adhesive. By merely attaching (adhering) a sensor combination module 1460, for example, of one of various kinds, to one of these household appliances, various types of sensor functions can be added to these household appliances very easily. Various types of information detected by these sensor combination modules 1460 are collected in the system controller $\alpha\_1126$. Further, by merely attaching (adhering) an actuator combination module 1470 which generates sound or light, for example, to these small-size household appliances, a new additional function can be provided to these small-size household appliances very easily. These addition functions are controlled by the system controller $\alpha\_1126$ in an integral manner. Thus, the household appliances with the new additional functions are able to provide the optimal service for a user's action or status. For example, if a user has a problem of waking on time in the morning, such a service can be provided that an alarm clock outputs the notification by a loud human voice. Or if a user left a specific small-size household appliance at home, or nowhere to find it in the house, such a service can be provided that the small-size household appliance itself tells the user where to find.

Other examples of application will be described below. That is, for example, sensor combination modules 1460 with such a function as a temperature sensor, a wind sensor, a sound sensor, a photo-sensor or a short-range human presence sensor are installed in numerous places in the section 2_1142-2 (room), to enable communications within the system $\alpha\_1132$ with respect to the system controller $\alpha\_1126$. Simultaneously, a actuator combination module 1470 is build in the remote controller for controlling device such as an air-conditioner, television or a lighting device, to enable the system controller $\alpha\_1126$ to control device such as the air-conditioner, television, lighting device via the remote control. In this manner, the system controller $\alpha\_1126$ is able to ascertain the distribution characteristics in the temperature, wind, sound, brightness (luminance) and the motion of people in the section 2_1142-2 in detail. Then, based on the result of ascertaining, the device is controlled at the optimal conditions for the user.

Especially, in a large room, the air conditioning effect greatly deviates, and therefore the difference in temperature or wind force tends to be large from one place to another. In such a situation, by way of the above-described service, the level of satisfaction of users using a large room can be significantly improved. With this method, the level of satisfaction of many users can be advantageously and efficiently improved by merely replacing the commercially-available remote control with the above-described remote controller with the built-in actuator combination module 1470 without a necessity of replacing the already installed main body of the commercially-available device (such an air-conditioner, television or lighting device).

Here, in the communications where the remote control with the built-in actuator combination module 1470 is used as the device 1450-4 with the built-in actuator combination module 1470-2 shown in FIG. 8B, C-format, which is capable of communicating much simplified communication information described in Chapter 2 using FIG. 25, may be used. Not only this, it is also possible to improve the configuration of the remote controller to the level of the device 1250-1 with the built-in actuator module 1270-1, the communication module 1202-4 and the device controller 1240-1 as shown in FIG. 8A. In this case, A-format or E-format, which will be described later, may be used for the communications within the system $\alpha\_1132$ with respect to the system controller $\alpha\_1126$.

Next, a further application example will be provided. That is, FIG. 37B shows a state in which milk 3506 purchased by a purchaser is stored in a refrigerator 3521. The container of the milk 3506 is equipped with a combination module 3523. The combination module 3523 is attached the outer surface of the milk container and covered with a seal. Meanwhile, a system controller 3522 is installed inside the refrigerator 3521, and the system controller 3522 can communicate with the combination module 3523.

It should be noted here that the combination module 3523 contains an antenna-equipped communication module 1666 (FIG. 4A (b)) so as to be able to store self-attribute data 1793 in the communication module 1666. The system controller 3522 can request a reply of contents of the self-attribute data 1793 from the combination module 3523. As the result, the system controller 3522 can check the "best-before-date data" contained in the self-attribute data. Since the system controller 3522 has the present date data therein, the best-before-date data obtained and the date data are compared to measure the degree of how close to the end of the best-before date of the milk. That is, for example, the system controller 3522 can detect the cases of, for example, within one week, within four days, within two days, within one day or the expiration of the best-before date.

Not only that, moreover, but also the system controller 3522 can receive the self-attribute data 1793 from the combination module 3523 provided on each of the articles, foods, etc., in the refrigerator 3521. Thus, the system controller 3522 can display the list data of the foods, articles, etc., stored in the refrigerator on a display 3525 provided on the refrigerator 3521 using the communication line in the network. The user, as viewing the display 3525 of the refrigerator 3521, can confirm the status of the best-before date of the milk 3506. Then, under the control of the system controller 3522, the status of the best-before date of the milk 3506 can be displayed by changing the color on the display 3525. For example, when the status of the best-before date of the milk 3506 is within one week, green may be indicated, and blue for the status within four days, yellow for the status within two days, pink for the status within one day and red for the status of the expiration of the best-before date. In place of changing the color, this display method may use various indicating modes, for example, a bar indication and a warning message display. Moreover, when the self-attribute data 1793 contains data of purchase date and store identification data, these data may be indicated on the display 3525.

Figure 37A:
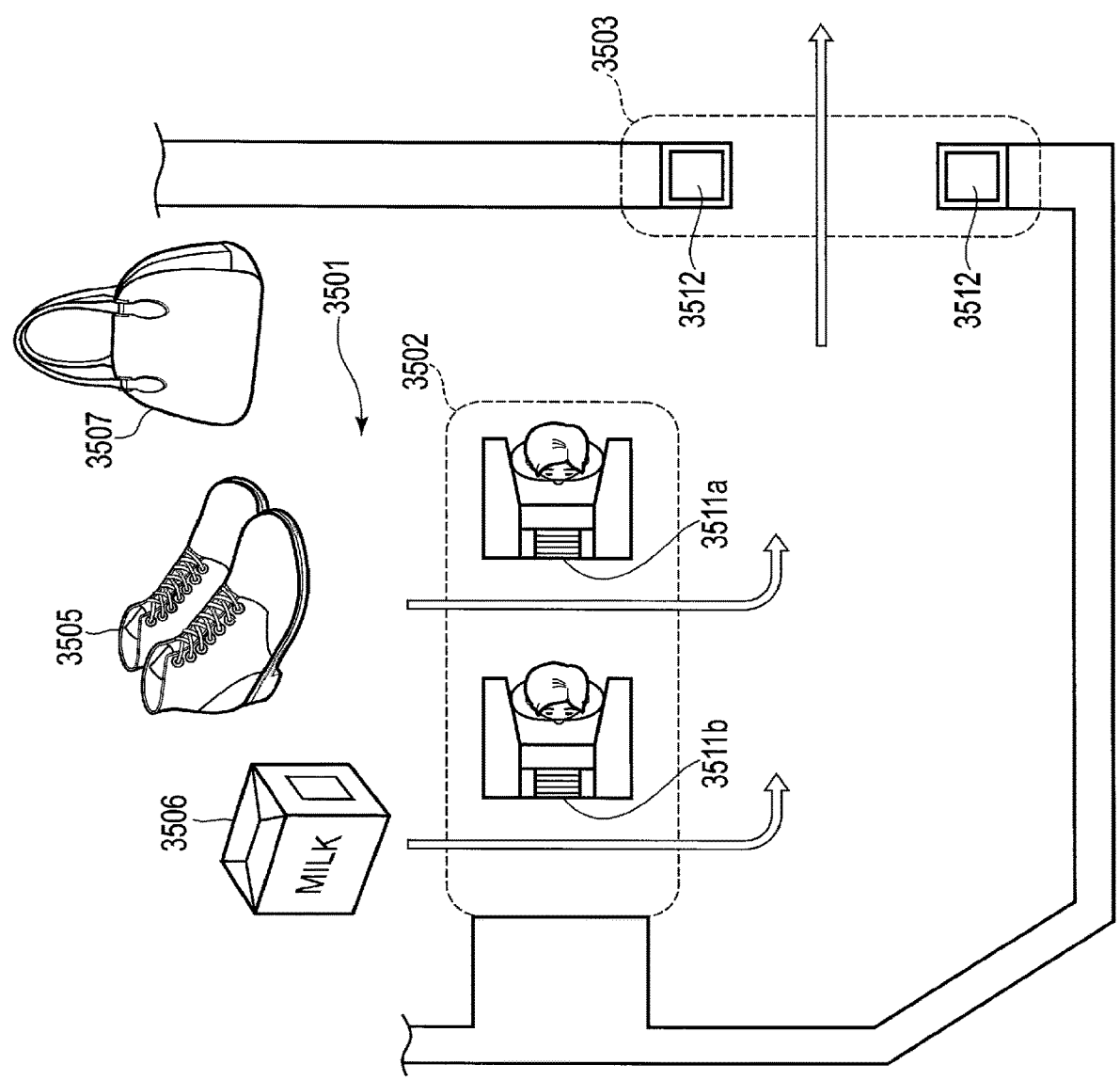
FIG. 37A shows an example of application of a combination module.
Figure 37B:
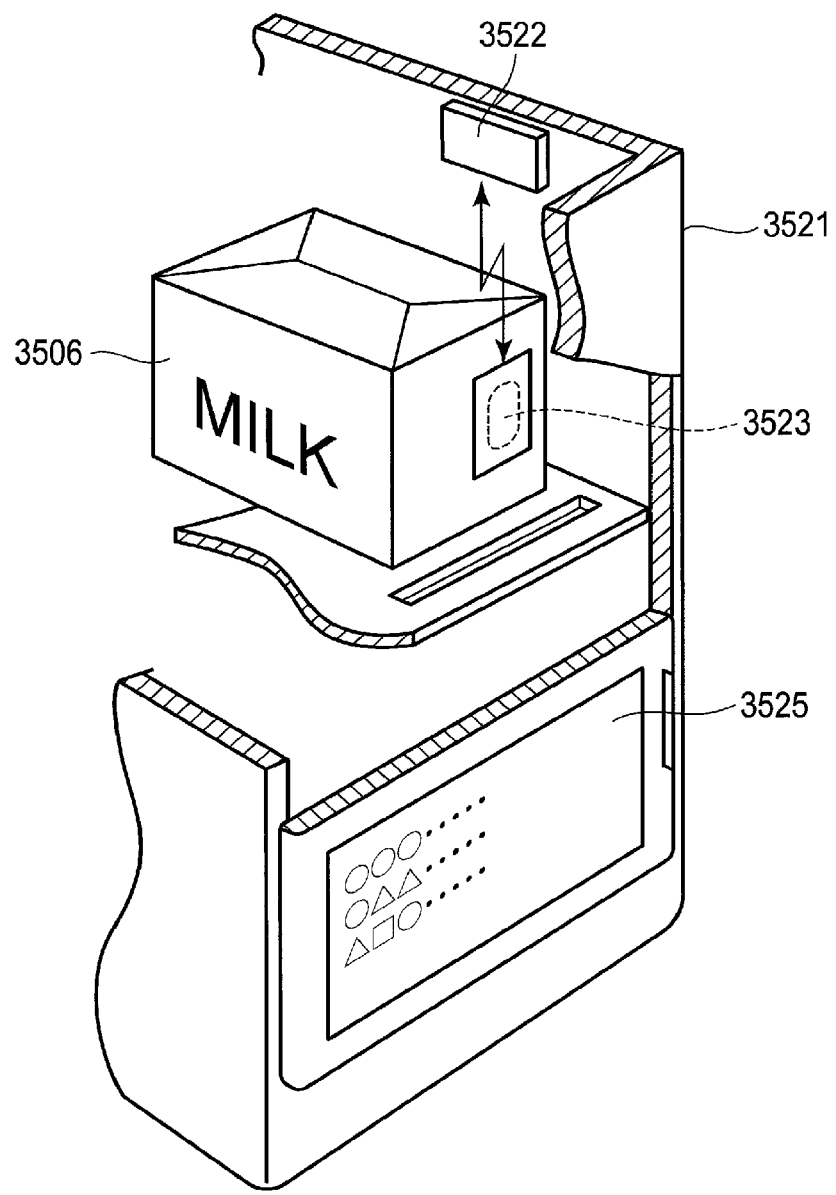
FIG. 37B shows another example of application of the combination module.
Figure 37C:
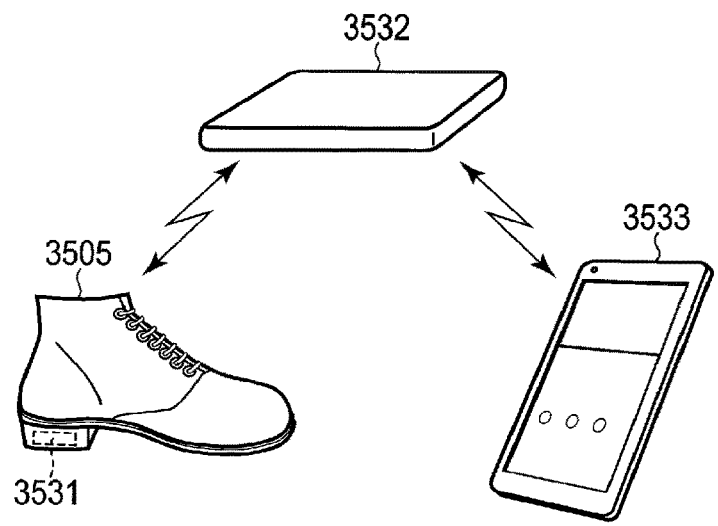
FIG. 37C shows still another example of application of the combination module.

An example where the combination module 3531 is buried in the heel portion of a shoe 3505 is shown in FIG. 37C. The combination module 3531 contains a pressure sensor, a moisture sensor, etc., built thereinto. When the user goes home, the combination module 3531 and the system controller 3532 at home mutual communicate to read from the system controller 3532 the number-of-walking-steps data and humidity data previously recorded in the combination module 3531. Thus, the system controller 3532 can calculate the number of walking steps by the user for the day. Not only that, moreover, but also the present humidity data in the shoes 3505 can be obtained. Using the results, the number of walking steps made by the user for the day and the humidity of the shoe can be displayed on the smart phone 3533, for example.

Section 5.1.3 Example of Application of Section Division Method to Consumer Electronics Technology In Section 5.1.3, examples of the application of the section division method to the consumer electronics technology will be described. FIG. 24 shows an example of division of one entire housing site into sections 1_1142-1 to m_1142-*m* when the housing site is related to the system $\alpha\_1132$. For FIG. 25, the description was made by relating the sections 1_1142-1-*m*-1142-*m* to every room. By comparison, FIG. 24 is directed to a slightly wider concept, in which also the yard in the housing site is related to one section 10_1142-10. Further, as in FIG. 8A to FIG. 8B, the space in the car is related to one section 1_1142-1 in FIG. 24. Also, as in FIG. 8A to FIG. 8B, the place where the smart meter 1124 is placed is withdrawn from the objects of the sections in FIG. 24, but the configuration is not limited to this. The place where the smart meter 1124 is placed may be defined as a specific independent section. Moreover, sections 3_1142-3 to 8_1142-8 are assigned to respective rooms including a toilet or a bathroom. In the system of this embodiment, the section division is not necessarily carried out for each room, but an "entire detached house", which is partitioned into a plurality of rooms within itself, may be assigned to one section 2_1142-2. Moreover, for example, a storeroom, which is a space where the user is not often present may be related to section 9_1142-9.

Moreover, an example in which the results of integration and management of data collected for each section 1142 are actually used is as follows. That is, the system controller $\alpha\_1126$ (or the processor 1230 thereof) may estimate or judge in units of sections 1_1142-1 to m_1142-*m*, the presence/absence of the end user and action/state (, which is whether the end user is awake or asleep, or he or she is an adult or child, etc.). Moreover, the integration or management of collected data may be performed not only in units of sections 1_1142-1 to m_1142-*m* as described above, but also in units of, for example, systems $\alpha$-$\beta\_1132$-1134 (for example, it is estimated/judged how many users are at home in one housing site).

An example of the method of providing services to users will be described. That is, the setting of temperature of the air-conditioner, the ON/OFF or brightness control of lighting, the output volume control of TV, radio, audio deck, etc., may be performed in units of sections 1_1142-1 to m_1142-*m*. In this manner, such fine services can be provided in units of sections 1142, and thus there is also an advantageous effect of saving power consumption within systems $\alpha$-$\beta\_1132$-1134 (energy-saving measures).

Section 5.2 Example of Application to Social Infrastructure Field

Section 5.2.1 Example of Application 1 of Wide-Area Network System to Social Infrastructure Field When the wide-area network system shown in FIG. 1 is applied to the social infrastructure field (Social Infrastructure Technology), a state, a local government and a public institution such as a public corporation or a charitable corporation, are also related to wholesale firms A_1102, B1_1104-1, and B2_1104-2. Here, the information (merchandise) to be handled by the wholesale firms A_1102, B1_1104-1, and B2_1104-2, may be related to the personal information of a citizen of a nation, prefecture, a city, a metropolis, such as a domicile or resident card, a tax-payment history and the like. Or the information (merchandise) to be handled by the Public Roads Administration and the Housing Corporation may be related to the road congestion information and accident information, land cost (land price) for each region, and housing data. When applied to the social infrastructure field, in particular, the infrastructure owned, managed or run by the wholesale firms A_1102, B1_1104-1, and B2_1104-2 (for example, power lines, water-and-sewage pipes, utility gas pipes), or the delivery systems (delivery means using trains, trucks, etc.) can be utilized.

First, an example of services of a railroad or traffic infrastructure to be provided under a commission from the public organization of a state, a local government and a public corporation, a charitable corporation, etc., will be described. Here, information of deterioration of a road, an iron bridge, a tunnel, a railroad track for each area are periodically notified from the system controller $\alpha\_1126$ to the server n_1116-*n*. The information of all the servers 1_1116-1 to n_1116-*n* in the service provider B_1112-2 are integrated for planning for a future road reconstruction or issuing a warning of abnormality, and reported (notified) to the commissioning agency, that is, the state, the local government or the public organization (, which corresponds to wholesale firms A/B_1102/1104). Another example of integrative management of systems for a railroad, traffic, postal, transportation and air-traffic control will be described. Various types of service situations and accident information periodically notified from the system controller α_1126 to the server n_1116-*n* are managed in an integrative manner, and service change instructions as needed are notified to the system controller α_1126 or system controller β_1128 from the service provider B_1112-2. The service provider B_1112-2 which provides these services is specifically related to a particular social infrastructure management organization and a social system management organization (a business corporation or a charitable corporation). Not only the above, moreover, but also, for example, an NPO corporation and an NPO may be related to the service provider B_1112-2.

The above-described examples are directed to the methods in which only the single service provider 1112 provides services. The system of this embodiment is not limited to this, but also, two or more service providers A/B_1112/1114 may cooperate with each other to provide services. That is, as explained in the above-provided description of Section 1.7 using FIG. 1, data-and-resource sharing 1114 is carried out between the service provider A_1112-1 and the service provider B_1112-2 or between the service provider B_1112-2 and the service provider C_1112-3, thus making it possible to improve the efficiency and the advancement of the service. When this structure is combined with the information acquired by the smart meter 1124, such an advantageous effect can be obtained, that new effective use and diversion of public consumption items can be obtained. As an example thereof, let us consider a case where the electric power supply is received using the infrastructure and distribution system of the wholesale firm A_1102, and the payment for the power amount is made to the service provider A_1112-1 of the power retailer, and the waterworks supply is received using the infrastructure and distribution system of the wholesale firm B-2_1104-2 and the sewage disposal service is obtained using the infrastructure and delivery system of the wholesale firm B1_1104-1, and the payment for the amount of the water and sewage used is made to the service provider B_1112-2 of the water-and-sewage retailer. Database 1118-*n* corresponding to server n_1116-*n* in the service provider B stores the collected information acquired from the smart meter 1124, which include, for example, the amount of water reserved in the system α 1132 in real time (the difference in the amount of water supplied via the waterworks and the amount of water discharged via the sewer), and the water pressure information in the waterworks. Here, if "information of momentary sudden rise in the power consumption fee" and "a request to limit the power consumption" in a specific time zone are received from the service provider A_1112-1 of the power retailer, the server n_1116-*n* in the service provider B_1112-2 of the water-and-sewage retailer reads the stored data in the database 1118-*n* and determines whether or not the water-power generation is possible based on the amount of water stored in the target system α_1132, or the water pressure in the waterworks. When the water-power generation within the target system α_1132 is possible as a result of the determination, the server n_1116-*n* makes a proposal to the system controller α_1126*a* to "switch to the water-power generation" in the system α_1132. Thus, such an advantageous effect can be obtained that not only to decrease the power rates in the system α_1132, but also the risk of an excessive amount of power used in the respective area can be avoided.

Next, another service form different from the contents described above will be described. The system of this embodiment is described in Section 1.7 in connection with the case where there are a plurality of commodity supply courses from the wholesale firm A_1102 towards the smart meter 1124 which serves as a sales window for supplying a specific commodity into the domain 2_1122-2 or the system α_1132 (the direct course indicated by "dashed lines" from the wholesale firm A_1102 into the smart meter 1124 and the course via the service provider A_1112-1 in FIG. 1). A specific example of the method of providing services carried out by the service provider A_1112-1 in the domain 2_1122-2 or the system α_1132 based on the advantage of the above-described feature, and its unique effect obtained thereby will be described below. Here, as examples of the commodity related to the service, public consumption items such as electric power, gas, water service, gasoline, etc., whose charges change depending on the region where or time when they are utilized, will be discussed. Naturally, not only those, but also other services or commodities (for example, general consumer goods, trading of fixed assets, etc., using networks, circulation of specific information, and the like) may be subjects of the application. For example, when a public consumption item is used in the domain 2_1122-2 or the system α_1132 during the winter and summer seasons and daytimes, in which the cost of the utility becomes high, the quantity equivalent to the amount of use in the wholesale firm A_1102 measured with the smart meter 1124 is returned from a predetermined commodity storage 1154 (for example, a storage battery or a water or gas tank) to the wholesale firm A_1102. On the other hand, when the cost of utility is low, such as nighttime and the time when the use of an air-conditioning equipment is not needed, the public consumption item is purchased from the wholesaler A1102 and stored in the predetermined commodity storage 1154. Thus, the substantial cost of utility to be paid by the end user (the user in the domain 2_1122-2 or the system α_1132) for the public consumption item can be reduced. Simultaneously, the service provider A_1112-1 can receive part of the reduction amount of the cost of use of the public consumption item (that is, profit margin) as remuneration. Furthermore, with the above-described method, such a new advantageous effect can be obtained that the amount of use of the public consumption items as viewed over a very wide area (the amount of the commodities supplied by the wholesale firm A_1102 [the public consumption items]) can be smoothed (that is, the temporary increase and decrease in the amount of use of the public consumption items caused by a season or time can be reduced).

In the case of returning the quantity equivalent to the amount of use in the wholesale firm A_1102 measured with the smart meter 1124 from the predetermined commodity storage 1154 to the wholesale firm A_1102, as described above, a high control accuracy is required in the charge/discharge controller or storage/outflow controller. In order to achieve a high control accuracy, the system of this embodiment performs a real-time feedback of the charge/discharge or storage/outflow amount in the charge/discharge controller or storage/outflow controller (and similarly the portions corresponding to the inflow controller 1214 and the outflow controller 1212) based on detected information (detection signal) from a charge/discharge monitor or storage/outflow monitor (, which is a portion corresponding to the inflow monitor 1218 or outflow monitor controller 1216, which will be described later using FIG. 8A and FIG. 9, present in the predetermined commodity storage 1154, but omitted from the illustration in FIG. 1). Not only that, as needed, the total cumulative amount of charge/discharge or storage/outflow for a predetermined period may be calculated out and compared with a predetermined target value to use the amount corresponding to the differential value with respect to the target value as a feedback on the amount of charge/ discharge or the storage/outflow in the next predetermined period. Thus, with the implementation of the above-described control method, such an advantageous effect can be obtained that the accuracy in the control of the total cumulative amount for each predetermined period is improved to become able to suppress the loss (the amount of deviation in the gains, caused by the shortage of controllable amount) in the dealing of public consumption items to the minimum.

Incidentally, when applying the wide-area network system to the social infrastructure field, one of the domains 1_1122-1 to 3_1122-3 shown in FIG. 1 may be related to an entire specific social infrastructure or an entire specific social system. For example, a unit of administration or status observation of a railroad, traffic, postal, air-traffic control, transportation and public consumption item production business, etc., for a predetermined group (a specific corporation or specific corporation group), or a unit of administration or status observation of any other social infrastructures and social systems may be related to a respective one of the domains 1_1122-1 to 3_1122-3. Furthermore, a large group of administrations or observations of statues of an activity of a specific community, a predetermined organization or a predetermined corporation whose dispersed activities for each area are integrated by a network, may be related to one of the domains 1_1122-1 to 3_1122-3.

On the other hand, one of the systems $\alpha/\beta\_1132/1134$ shown in FIG. 1 may be related to one building or area. That is, the objects of the power saving system (energy management system) are called as Home Energy Management System (HEMS), Building Energy Management System (BEMS) or Community Energy Management System (CEMS), depending on the scale or size. Here, one of the systems $\alpha/\beta\_1132/1134$ in this embodiment may be related to one management unit of the HEMS, BEMS or CEMS.

Moreover, an example of relationship between the domain 1122 and the systems $\alpha/\beta\_1132/1134$ as a specific relating method other than the above will be described. For example, when the domain 1122 is related to the operation management or status observation of a specific railroad company, an automatic ticket gate system, a ticket issuing system, a commuter pass issuing system, an operation situation management system for each train, an automatic breakage state management system for a railroad track, a train breakage state management system, a platform degradation management system, a power supply state management system for each train, a malfunctional warning system in a train/on a platform, an in-train system for arresting a molester, a management system for managing duty and salary payment for train crews and station officers, a salary payment/accounting system or the like may be related to one of the systems 1132-4. Moreover, when the domain 1122 is related to the administration and state management of a traffic or transportation business, a degradation management system for a road, an iron bridge or a tunnel, a road accident information management system, a traffic congestion management system, a breakage state management system for transportation means (truck, etc.), a gate management system (for a highway, etc.) (including an ETC management system), a check-in-and-out office management system for employees, a salary payment accounting system, or the like may be related to one of the systems 1132-4.

On the other hand, in Section 1.7, it is discussed that in the case where one system $\alpha\_1132$ is related to a physically or geographically close specific area, one domain 2_1122-2 can be related to a region on a network which transcends the physical or geographical space. When, accordingly, an entire management system for degradation of a road, an iron bridge and a tunnel is related to one domain 2_1122-2, the degradation management unit of the road, iron bridge and tunnel set up for each area may be related the respective one of the systems $\alpha/\beta\_1132/1134$.

Section 5.2.2 Examples of Application of Combination Module to Social Infrastructure Field When the system of this embodiment is applied to the social system or Social infrastructure, the sensor combination modules 1460 may be placed on part of or in the vicinity of a signal, a road, entrance or exit gate of a highway or the like, or a public bulletin board (including an electronic bulletin board) for the system controller $\alpha\_1126$ to ascertain the traffic situation and traffic congestion situation of pedestrians and vehicles, and notify only necessary information to the server n_1116-$n$. In this case, the device 1450 may be related to the signal, electronic gate, electronic bulletin board or the like. Further, in relation to this case, the section later described in Chapter 4 may be related to a predetermined region in the vicinity of the signal, electronic gate or electronic bulletin board, or within a specific zone of a road.

Especially, the sensor combination modules 1460 described above have a feature of easily adaptable to light weight/small size/power saving (an external power supply being unnecessary). Therefore, taking advantage of this merit, various and numerous sensor combination modules 1460 may be installed in roads, bridge beams and tunnels or piping parts (of water and sewage etc.), and thus the roads, bridge beams and tunnels or the insides of the piping parts can be easily monitored for degradation for a long period. With respect to the various sensed information acquired here, only the necessary information can be extracted, that is, for example, the detection of changed components, in the system controller $\alpha\_1126$, and thus the analysis or data processing by the server n_1116-$n$ side is facilitated.

Another example of the application of the above-described sensor combination modules 1460 to the social infrastructure field is as follows. That is, the sensor combination modules 1460 may be attached to carts in stores, such as a supermarket, a convenience store and a department store, to collect the information on the behavioral history of customers in the store. From the collected behavioral histories of the customers, for example, a "counter where customers stay long" and an "order of counters in which customers visit" can be extracted, which may be reflected in the marketing (market research), such as commodity exhibition in store. Thus, there is an effect of contributing to the enhancement of sales of the store.

Incidentally, in a large space, especially, for example, such as an office, a hospital, a large-sized store, the air conditioning effect is significantly uneven, and thus there is a high tendency that the temperature and wind force significantly differ from one place to another. Here, as in Section 5.1.2, by installing the sensor combination modules 1460 with functions, such as a temperature sensor, a wind sensor, a sound sensor, a photo-sensor and or a short-range human presence to numerous places in an office, hospital, large-sized store building and the like, the bias in the air conditioning effect in a large space can be significantly reduced, and thus such an advantageous effect of enhancing the degree of satisfaction of many customers.

Another embodiment which practically utilizes the combination module 1295 will be described. As shown in FIG. 4A (a) or (b), all the combination modules 1295 contain communication modules 1660. Moreover, as described in Section 1.6 using FIG. 7B, there is a self-attribute data storage region 1793 in each communication module 1660. In each product, commodity, part or the like, provided with the combination module 1295, the contents of the self-attribute data 1793 are changed or switched according to the situation of use. The term "situation of use" used here covers a change of the area where the product, commodity, part or the like is located (that is, the change of the system in which the combination module 1295 is placed as shown in FIG. 37B), or a change of lapsed time, or a change of conditions. When the combination module 1295 is used as the sensor combination module 1460, the circumferential state in various operating environments can be monitored in combination with sensors.

FIG. 37A schematically shows, for example, an inside area 3501 of a supermarket, a cash register area 3502 and an exit area 3503 of the supermarket. Here, the inside area of the supermarket corresponds to one independent system $\alpha\_1132$ (see FIG. 1). Cash registers 3511a and 2511b shown in FIG. 37A each operate as the system controller $\alpha\_1126$. Let us suppose here that in the system $\alpha\_1132$, a pair of shoes 3505, milk 3506, and a bag 3507 are sold as commodities.

Each of the shoes 3505, milk 3506 and bag 3507 is provided with the sensor combination module 1460 as the combination module 1295. A specific example of the attaching method is that a sheet-like sensor combination module 1460 (combination module 1295) is adhered to each respective commodity with adhesive. Not only that, it may be inserted (or mixed) to the shoes 3505, milk 3506 and bag 3507. Here, it is assumed that part of the self-attribute data 1793 contains an antitheft flag (for example, "1"). When the purchaser finishes payment, the information of the antitheft flag is erased under the control of the cash register 3511a or 2511b of the cash register area 3502. More specifically, for example, when the cash register 3511a reads the bar code in which the price of the commodity is indicated, a read completion signal is transmitted to the combination module 1295 (or the sensor combination module 1460 or unit 1290) in the commodity. Then, the corresponding combination module 1295 (or sensor combination module 1460 or unit 1290) determines that the payment is completed at the time of reception of the reading completion signal and erases the antitheft flag to be "0". Furthermore, the cash register 3511a or 2511b can add the identification data of the supermarket and the date data of the payment to the self-attribute data storage region 1793.

If a commodity is passed through the exit area 3503 of the supermarket while the antitheft flag has not been erased (the payment has not been made), an alarm will be output automatically. That is, the monitoring device 3512 which can output an alarm is installed in the exit area 3503 of the supermarket. As described in Section 4.4, according to the system of this embodiment, the locations of all the combination modules 1295 (or sensor combination modules 1460) can be detected in real time. Therefore, when the combination module 1295 (or sensor combination module 1460) passes through the exit area 3503 of the supermarket, communications of information are automatically made with respect to the system controller $\alpha\_1126$ (cash register 3511a or 2511b). If the antitheft flag is "1", the alarm is output from the monitoring device. On the other hand, if the antitheft flag is "0", the alarm is not output from the monitoring device 3512.

The above-provided example of the system of the embodiment describes the case where store clerks are placed at the cash registers 3511a and 3511b and the antitheft flag is stored in the self-attribute data storage region 1793. Not only that, however, but also the selling price of a target commodity may be recorded in advance in the self-attribute data storage region 1793. When the combination modules 1295 (or sensor combination modules 1460 or units 1290), which store the selling prices in advance, pass through the exit area 3503 of the supermarket, the total amount of the payment to be paid by the purchaser is displayed automatically. Also, the combination module 1295 (or sensor combination module 1460 or unit 1290) is mounted similarly in the wearing articles (a tiepin, a necklace, etc.) which the purchaser has put on, and as the purchaser passes through the unattended cash registers 3511a and 3511b, the total amount of payment will be charged directly to the bank account of the purchaser automatically. In addition, in order to make it possible, the bank account number and password of the purchaser are recorded in advance in the self-attribute data storage region 1793 in the combination module 1295 (or sensor combination module 1460 or unit 1290) mounted in the purchaser's worn articles.

Instead of mounting the combination module 1295 (or sensor combination module 1460 or unit 1290) on which the accounting information of the purchaser is recorded in a worn article as described above, the module may be placed in the purchaser's body by, for example, swallowing as described later in Section 5.3.2.

As described above, the use of the combination module 1295 (or sensor combination module 1460), not only the prevention of theft, but also the automatic charging, which does not require the presence of a clerk, can be achieved. Thus, such an advantageous effect can be obtained that the labor cost can be significantly cut down to help the enhancement of the profit of the supermarket.

Figure 37D:
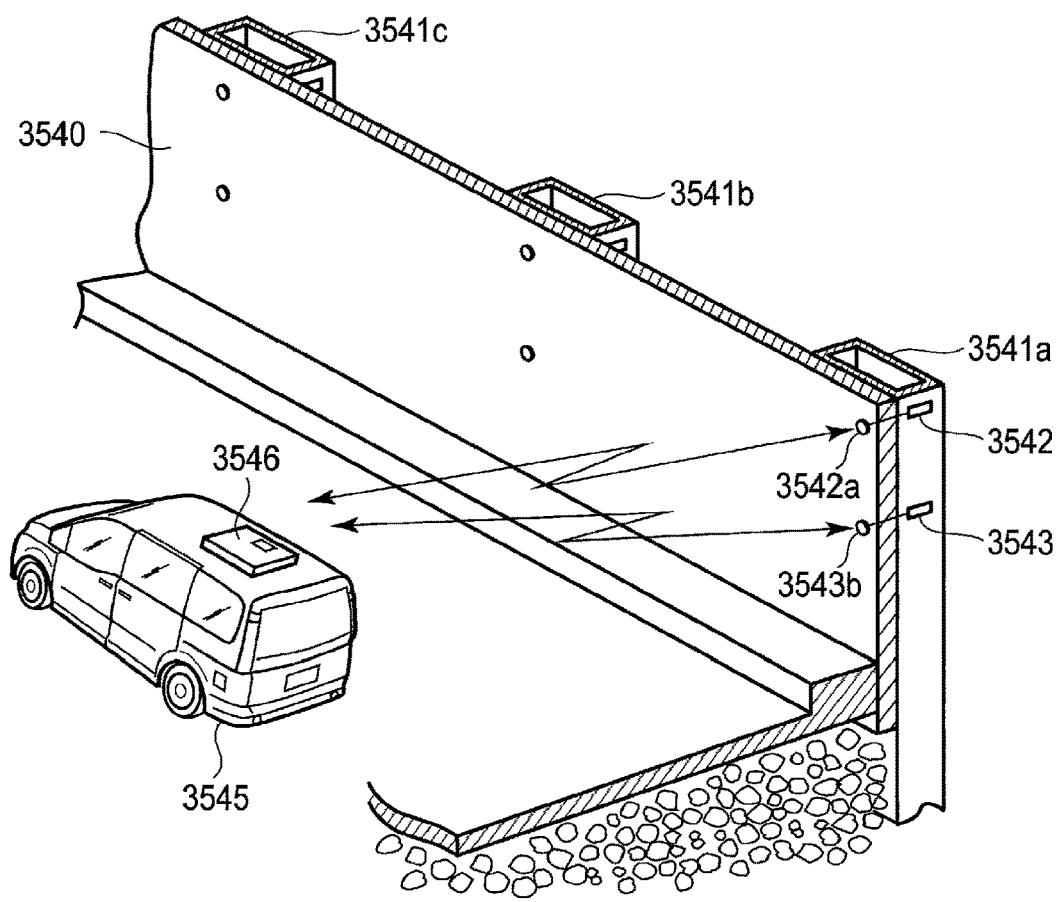
FIG. 37D shows still another example of application of the combination module.

FIG. 37D shows an example which uses the combination module for, for example, a system which inspects the corrosion state of the steel frame supporting a wall of a building, the wall of a tunnel, a bridge, etc. For example, steel frames 3541a, 3541b, 3541c and so on support the back side of a wall 3540 of a tunnel to be inspected. The combination modules 3542 and 3543 are attached to the surface of each of the steel frames 3541a, 3541b, and 3541c. In FIG. 37D, the communication modules 3542 and 3543 attached to the steel frame 3541a appear on the drawing. When the wall 3540 to be inspected has a shielding effect on the radio wave, an antenna 1480 is externally installed to the communication module 1660 in the combination module 1295 (FIG. 4A (a)). The external antenna 1480 is set at a position where the radio waves which can be transmitted and received. That is, in the example of FIG. 37D, antennas 3542a and 3543b of the combination modules 3542 and 3543 are guided out on the outer surface of the wall 3540 to be inspected through the lead lines which penetrate the wall 3540 to be inspected.

Here, the sensor modules 1260 (FIG. 4B (a)) in the combination modules (sensor/communication modules) 3542 and 3543 are tightly attached to the surfaces of the steel frames 3541a, 3541b and 3541c via an insulating film. If the surface of any of the steel frames 3541a, 3541b and 3541c rusts and rises, the adhesion film will be torn and the sensor module 1260 will come into direct contact with the rust. When the sensor module 1260 contacts the rust, the resistance in the sensor module 1260 will fall. Therefore, by detecting the resistance in the sensor module 1260, the surface rusting state of the steel frames 3541a, 3541b and 3541c can be ascertained.

In many cases of the examples of the system of this embodiment described so far, the system controllers 1126 and 3546 are installed in the fixed system, whereas the units 1290 (or combination module 1295) are movable. By comparison, the feature in the example of the system of the embodiment shown in FIG. 37D (or FIG. 37E to be described later) is that the units 1290 (or combination modules 1295) are fixed and the system controllers 1126 and 3546 are movable. For example, there are some cases where the sensor information of a very wide area region need to be obtained at once or the situation of the system does not allow the system controller α_1126 to be installed easily. In such cases, the units 1290 (or combination modules 1295) are installed in the fixed system, and the system controllers 1126 and 3546 are moved as described above to collect the sensor information of each unit 1290 (or combination module 1295). Thus, such an advantageous effect can be obtained that the sensor information of a very wide area can be easily acquired.

In the system of this embodiment, the identical units 1290 (or combination module 1295) are adaptable to several different systems as described in Section 4.5. Therefore, even in this case, each time different system controllers 1126 and 3546 are used for different usages, the fixed units 1290 (or combination module 1295) can operate appropriately for each respective usage.

In the example of the system of this embodiment shown in FIG. 37D, the system controller 3546 is installed in a part of a inspection vehicle 3545 (in FIG. 37D, the roof part of the inspection vehicle 3545) and it passes through the vicinities of the antennas 3542a and 3543b of the combination module. Each time it passes through the vicinities of the antennas 3542a and 3543b of the combination module, a command request of "respond of the resistance in the sensor module 1260" is transmitted from the system controller 3546 to each of the combination modules (units) 3542 and 3543. Then, in reply to the request command, a response of "the resistance in the sensor module 1260" is made from each of the combination modules (units) 3542 and 3543 to the system controller 3546 as requested. Thus, the system controller 3546 can inspect the rusting state of all the steel frames 3541a, 3541b and 3541c. In this manner, the periodical rust inspection can be carried out easily at high accuracy. Note that the above-described rust detection method is only an example and it is also possible to detect rust using other detection means.

Thus, when an intolerable range of fall of the resistance is detected in the sensor module 1260 as a result of the rust inspection, the information on the specific steel frame 3541 degraded by rust is notified to the server n_1116-n of FIG. 1 from the system controllers 3546 and 1126 via the Internet. In this case, the wholesale firm B1_1104-1 of FIG. 1 corresponds to the government or the Public Roads Administration. The contractor of the maintenance of the walls under a commission of the government or Public Roads Administration corresponds to the service provider B_1112-2. The contractor of the maintenance the walls formulates a repair plan on the basis of the information on the steel frame 3541 degraded by rust, which is stored in the server n_1116-n and applies for the repair budget to the Public Roads Administration (wholesale firm B1_1104-1).

FIG. 37E shows an example of application of the system of this embodiment in which, for example, the combination module 1295 or unit 1290 is used for leak detection of a gas pipe, a water pipe, a hydrant pipe or the like. The gas pipes, water pipes, hydrant pipes, etc., are arranged underground along roads in many cases. Therefore, the combination module (unit) 3549 is attached on the surfaces of a pipe 3548, such as gas pipe, a water pipe or a hydrant pipe. As the sensor module 1260 built into the combination module (unit) 3549 and used for leak detection of a gas pipe, a water pipe, a hydrant pipe, etc., a composite sensor in which a gas sensor, a humidity (water) sensor, a sound sensor, a vibration sensor, etc., are combined may be incorporated.

As in FIG. 37D, FIG. 37E shows that the system controller 3546 is mounted in the inspection vehicle 3545 (in FIG. 37E, the system controller 3546 is mounted on the bottom of the inspection vehicle 3545) and leaking is checked periodically. In reply to the request command of the system controller 3546, the detection data from the sensor module 1260 is returned to the system controller 3546 as in FIG. 37D. The system controller 3546 collects and analyzes the sensor information from each combination module (unit) 3549 to determine the location of gas leak, water leak or the like. Moreover, as in the case of FIG. 37D, the system of the embodiment shown in FIG. 37E has such an advantageous effect that the abnormal site can be detected in a wide area by a very simple method. In addition, the system controllers 3546 may be provided by fixation along the line of the pipes installed, instead of being mounted in the inspection vehicle 3545.

FIG. 37F show an example in which the combination module (unit) is applied to a greenhouse cultivation device. The greenhouse cultivation device may be called, for example, a greenhouse or a plastic greenhouse. A greenhouse 3550 is provided with a system controller 3551 and a monitoring camera 3552, for example. The monitoring camera 3552 can pick up the image of the state of plants in the greenhouse house 3550, and transmit the visual signal thus picked up to a monitor display of the grower (owner).

Let us suppose that in the greenhouse house 2550, vegetables such as carrots, Japanese radishes or burdocks are grown, for example. In the case of such vegetables, it is not possible to determine the growth condition under the surface of the ground only by viewing from the outside. The system of the embodiment shown in FIG. 37F is provided with bar-like monitoring devices 3553a, 3553b, 3553c, . . . , set in the ground, in each of which a plurality of combination modules (units) are built.

The right-hand side of FIG. 37F shows an enlarged view of the bar-like monitoring device 3553c. Here, the pentagonal portion indicated the bar-like monitoring device 3553c is an attachment plate of the monitoring device 3553c and has such a shape that the tip is sharpened to be easily inserted into the ground. Combination modules (units) FC1 to FC5 and FD1 to FD5 are equipped in the longitudinal direction of the attachment plate. Moreover, each of the combination modules (units) FC1 to FC5 contains within itself a sensor module 1260 which can measure the size of a material in its vicinity by, for example, transmission and reception of an ultrasonic wave. The combination modules (unit) FD1 to FD5 are each equipped with a sensor module 1260 containing a moisture sensor which can measure humidity, for example. From the results of the measurement obtained from the combination modules (units) FC1 to FC5, the growth (length) information on near-by vegetables (carrots or Japanese radishes) are collected. The method of collecting the growth (length) information on the near-by vegetables (carrots or Japanese radishes) is not limited to the imaging by ultrasonic wave, but, for example, the near-infrared rays having a wavelength within a range of 700 to 2500 nm may be used for the imaging. Moreover, the measurement data of the humidity obtained from the combination modules (units) FD1 to FD5 are useful to monitor the underground moisture condition. The measurement data obtained by the combination modules (units) FC1 to FC5 and FD1 to FD5 are transmitted to the system controller 3551 through an antenna ANT.

The output data of the combination modules (units) FC1 to FC5 and FD1 to FD5 are compiled by the system controller 3551. The compiled results are indicated as needed on the display for the user to be able to easily determine the harvest time. Not only that, moreover, but also, by monitoring the compiled results of the measurement data of the humidity obtained from the combination modules (units) FD1 to FD5, the user can see the appropriate time for watering. Thus, an excellent growth of vegetables can be monitored.

Furthermore, inside the greenhouse house 3550, a combination module (unit) 3554 containing a built-in infrared sensor and/or high-frequency high-sensitivity microphone is provided. The combination module (unit) 3554 is operated periodically to monitor, for example, pests and insects on the vegetables.

As other examples of the application of the system of the embodiment, FIGS. 37G and 37H show that different types of combination modules (units) are used in combination for monitoring. In particular, FIG. 37G shows such a feature of the "detection of a usually impermissible combination". Based on this, such an advantageous effect can be obtained that the abnormality can be detected with high efficiency and accuracy. Further, FIG. 37H shows such a feature of the "detection of correlation between a plurality of different identification data". Based on this, such an advantageous effect can be obtained that that the accuracy of the detection of the state can be improved. Thus, by obtaining sensor information from a plurality of different types of combination modules (units) simultaneously as described above, such an advantageous effect can be obtained that the accuracy of detection of a change in state can be improved.

First, a method of "detection of a usually impermissible combination" will be described using FIG. 37G. For example, when a weapon is located around a hospital, a school (an elementary, a junior high, a high school or a university), a police station, or the Imperial Palace, the system computer can detected such a situation as an impossible combination of objects (specifically, the detection of a metal using a metal detector, etc.). FIG. 37G shows one concrete example of a room in a hospital. The room is provided with, for example, a bed 3560 for patients and a box 3561 for medical instruments. Here, a combination module (unit) 3560a is attached inside the bed 3560 for patients. Also, a combination module (unit) 3561a is attached to the medical-instruments box 3561. The identification data of the bed 3560 is stored as self-attribute data 1793 (FIG. 7B) in the combination module (unit) 3560a. Here, the identification data of the bed 3560 is ready to be transmitted as needed in reply to a request from the system controller 3562 installed outside. On the other hand, the identification data of the medical-instruments box 3561 is stored as self-attribute data 1793 (FIG. 7B) in the combination module (unit) 3561a. Here, the identification data of the medical-instruments box 3561 is ready to be transmitted as needed in reply to a request from the system controller 3562 installed outside. In this manner, the system controller 3562 can ascertain the combination of items always present in the room. Thus, the system controller 3562 comprises the database of various items which may be present in the room.

Let us suppose here that a weapon 3565, such as a knife, is brought into the room. The combination module (unit) 3565a is also built into the weapons 3565, such as a knife. As the combination module (unit) 3565a transmits the self-attribute data 1793 (identification data of the product) stored in advance, the system controller 3562 recognizes that a product which is allowed to be present in the room has appeared. As a result, the system controller 3562 can quickly notify an abnormal condition to the security guards room, the monitoring room, or the security company.

The above-provided example is described in connection with a room in a hospital, but, not only that, the same concept can be applied to various areas and facilities, such as the security regions around the Imperial Palace, the presidential residence, and the Prime Minister's official residence, schools (elementary, junior high, high schools and universities, etc.), and police stations.

FIG. 37H shows another example of monitoring by combinations of a plurality of types of sense information acquired from several different types of combination modules 1295 (or units 1290). Here, the example shows a case where a passenger 3570 moves from an airport 3567 to an airport 3568 by an airplane 3569. Here, the combination module (unit) 3570a is built into each of the passenger's personal effects such as the passport, a bag, a hat and shoes, and the applicable identification data are stored in advance in the self-attribute data storage region 1793 (see FIG. 7B) in the combination module (unit) 3570a. Similarly, the combination module (unit) 3573a is attached to the passenger's carrier bag 3573 as well. The identification data of the carrier bag is also stored in advance in the self-attribute data storage region 1793 in the combination module (unit) 3573a.

While the passenger 3570 is boarding on the airplane 3569, the system controller 3571 collects the identification data of the passenger's personal effects (baggage) 3572 and the carrier bag 3573. Then, these plurality of identification data (the identification data of the passenger's personal effects 3572 and that of the carrier bag 3573) are associated with each other, and are recognized by the system controller 3571 as an essential combination identification data for the passenger 3570.

On the other hand, another system controller 3572 is also installed in advance in the airport 3568, which is a destination of the passenger. When the passenger 3570 arrives at the airport 3568 of the destination, the plurality of identification data associated with the passenger 3570 (that is, the identification data of the passenger's personal effects 3572 and that of the carrier bag 3573) are transmitted automatically to the system controller 3572 installed at the destination from the system controller 3571 of the departure origin via the Internet. Then, the system controller 3572, on it's side, accesses the combination modules (unit) 3570a built into the personal effects such as passport, bag, hat and shoes and the combination module (unit) 3573a built into the carrier bag 3573 to acquire the identification data (the identification data of the passenger's personal effects 3572 and that of the carrier bag 3573).

Next, the plurality of identification data acquired from the combination modules (unit) 3570a and 3573a and the plurality of identification data (the identification data of the passenger's personal effects 3572 and that of the carrier bag 3573) obtained from the system controller 3571 of the departure origin are compared. Thus, the system controller 3572 of the destination can judge whether the passenger's effects 3570 have been normally carried to the airport 3568 from the airport 3567.

Section 5.2.3 Example of Application of Section Division Method to Social Infrastructure Field Section 5.2.3 describes an example of section division in the case where the section division method is adapted in the social infrastructure field. The section division units in the social infrastructure field are tend to be larger than the scale described in Section 5.1.3.

For example, in the case where each section 1142 is related to each partition (room) or each floor in a building, the average size of the rooms of a private house is larger than that of the partitioned area in a building. Or each section 1142 may be assigned to each respective unit in collective housing.

In the case where the section division is adapted to the social infrastructure field, the sectional structure to divide may be made to have hierarchy. For example, in the case of the above-described collective housing, a higher-level section division may be assigned to each unit individually as the first high-level hierarchy, and a lower-level section division may be further assigned to partitioned rooms in each housing unit. Similarly, hierarchical sections may be assigned to predetermined regions for each dividing scale. That is, for example, the country of Japan is divided in units of prefectures including a capital (the higher-level sections are assigned according to these units), and a capital of Tokyo is further divided into a plurality of wards and cities. Some of the prefectures are divided into a plurality of cities and counties. According to this division, a middle-level section may be assigned, and further a low-level section may be assigned to each address.

Figure 35:
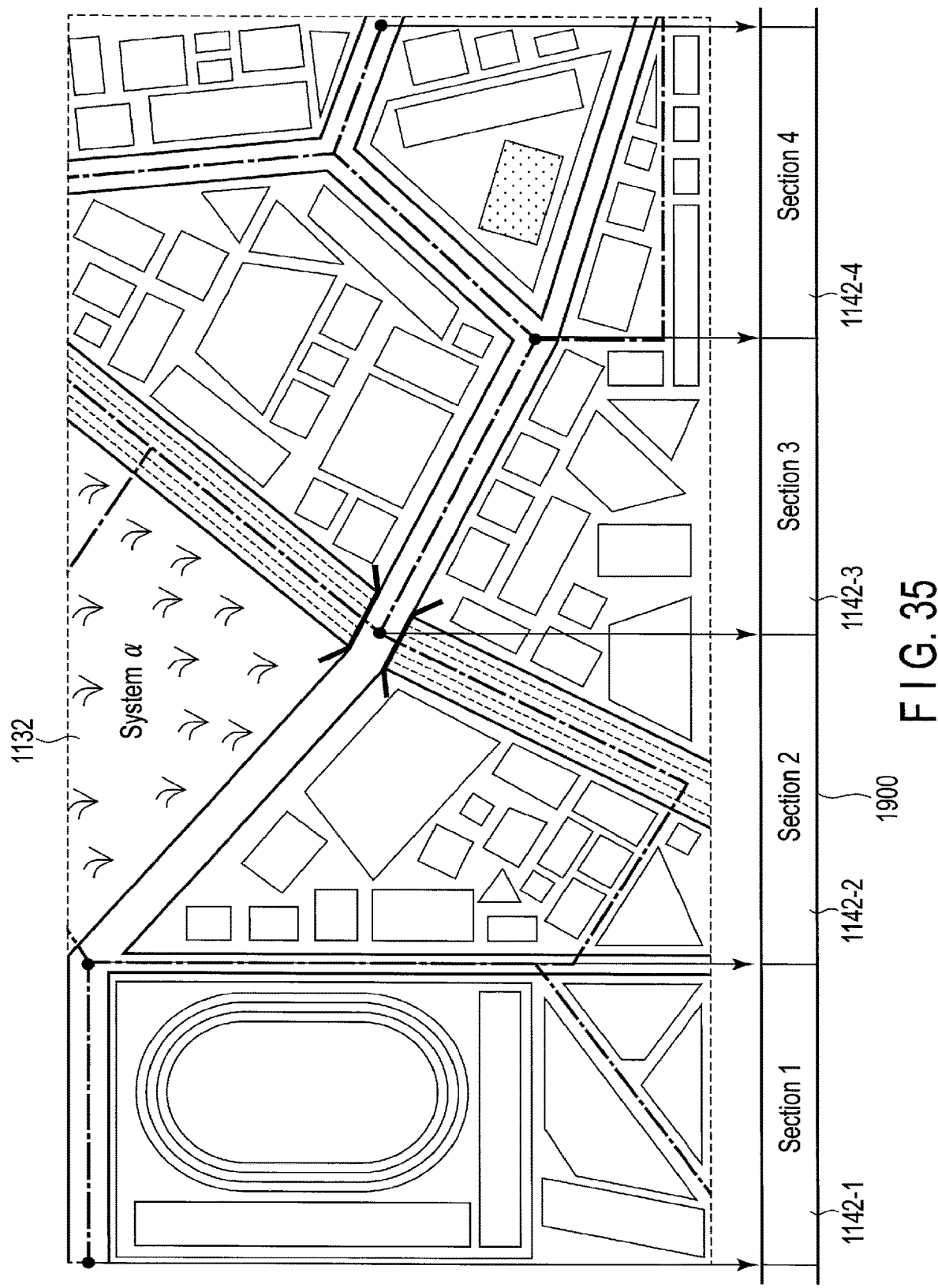
FIG. 35 shows an example method for setting sections separated each other in a social infrastructure field.

FIG. 35 is a schematic drawing of a map of a specific area. As shown, each section 1142 may be assigned to each respective address. Not only that, but also the division of the sections 1142 may be based on the predetermined functions. An example thereof will be described. In Japan, some water pipes and cables for communication lines (telephone wires, optical fibers, etc.) are installed directly underground along main roads. Further, some power supply lines are installed above the ground along main roads. Therefore, a division 1900 of the sections 1_1142-1 to 4_1142-4 may be carried out for each area or by a predetermined interval along main roads, piping of water and sewage, power distribution lines or communication cable lines. Moreover, with the system of this embodiment, a plurality of sensor modules 1260 or sensor combination modules 1460 may be provided in the sections 1142 and the sensor information acquired therefrom may be integrated and managed for each section 1142, and thus it becomes possible to extract a damaged site on the road, search a leakage site in a water and sewage pipe, or disconnected part of a power distribution line or a communication cable line in units of sections 1142. As a result, it is further facilitated to extract a damaged site on the road, search a leakage site in a water and sewage pipe, or disconnected part of a power distribution line or a communication cable line in more detail.

Similarly, the division 1900 of the sections 1_1142-1 to 4_1142-4 may be carried out for each area or by a predetermined interval along main roads for ascertaining the traffic congestion state of main roads including highways. When the traffic congestion state for each section 1142 is displayed, the traffic congestion state can be easily and exactly ascertained. As relatively similar contents, the division technique of the sections 1142 may be used for ascertaining the congestion state within a predetermined area. More specifically, when such an event as a soccer or baseball game, or a concert is held, the area around the event hall is divided into a plurality of sections 1142. Thus, the congestion state of the crowd can be ascertained in units of these sections. Then, the guidance to the crowd and the arrangement of security persons can be done more efficiently.

As described above, the system of this embodiment integrates and manages the results of collected information in units of sections 1142 to facilitate the assessment of the status of a wide area in its entirety. Not only that, such an advantageous effect can be obtained that the convenience of the maintenance of the social infrastructure system can be improved.

An example of application in the social infrastructure field, which is slightly similar to the assessment of the situation of traffic congestion on main roads, described above, the management of physical distribution may be raised. For example, in order to carry fish and shellfishes to a remote place while keeping the freshness thereof, the air transport method may be used to shorten the transit time. At the same time, from the viewpoint of saving the cost for transportation, such a method of keeping the freshness for a long period while transporting to a remote place by a vehicle is also examined. As a result of the examination, it has been found important to manage the temperature during the transportation for keeping the freshness of fish, shellfishes, vegetables or fruits.

More specifically, the oxidation reaction rate and rotting rate inside fish and shellfishes, vegetables, or fruits are dependent on the ambient temperature, and therefore, from this viewpoint, the storage temperature of fish and shellfishes, vegetables or fruits should desirably be set low. On the other hand, if a fish is placed in an environment below freezing point, blood in the fish body freezes and expands, which causes distinctive degradation in freshness. As well in vegetables and fruits, the water contents on the surface and the inside are frozen to expand the volume, which causes distinctive degradation in freshness. For this reason, in the transportation to a remote place by a vehicle, it is essential to maintain the temperature of the fish, shellfishes, vegetables or fruits in the refrigerator car within a range of "0±1".

Therefore, the temperature sensors are installed in the packing containers of the fish, shellfishes, vegetables or fruits to control the air-conditioning in the refrigerator car based on the temperature information acquired from each packing container. The temperature sensors in this case correspond to the sensor combination modules 1460. The section 1142 corresponds to the "environment in each refrigerator car".

In the system of this embodiment, not only the above, but also some other section division method may be adopted. As described in Section 4.4, the system of this embodiment is configured to detect the location of the origin of radio transmission from individual sensor combination modules 1460. With this structure, by utilizing the location detection technology for the sensor combination modules 1460 to detect temperature, the current location of each packing container of fish, shellfishes, vegetables or fruits can be tracked in real time. Furthermore, from the contents of Section 2.3, each packing container can be identified by using sender IEEE extension address SEXADRS in FIG. 12A (e) (or sender IP address SIPADRS described in Section 2.4. Therefore, when the above-described techniques are combined, not only the transportation routes and time can be managed for each packing container of fish, shellfishes, vegetables or fruits, but also the transportation delay by the traffic congestion in the transportation routes for the refrigerator car storing a particular packing container, etc., can be managed in real time. As a result, an instruction as to whether to avoid traffic congestion may be given to the refrigerator car in consideration of the reserve time of the packing container prior to this vehicle transportation.

When this embodiment system is adapted to the above-mentioned physical distribution management, it is important to select appropriate physical communication media to be used for the network line 1782 in the same system of FIG.

10A, which will be described later. For example, with the standard 802.11n of the institute of electrical and electronics engineers (IEEE), compliant to medium-range radio, the effective radius of cell is said to be several hundreds meters. Therefore, when the medium-range radio is adopted as the physical communication media, it is necessary to set the physical size of each of the systems $\alpha\_1132$ and $\beta\_1134$ to 1 km or less. On the other hand, the cell radius of IEEE 802.16e-2005 compliant to the long-range radio is 1 to 3 km. Therefore, when the medium-range radio is adopted as the physical communication media, it is desirable to set the physical size of each of the systems $\alpha\_1132$ and $\beta\_1134$ to appropriately 3 km.

In each of the systems $\alpha\_1132$ and $\beta\_1134$ of the above-described size, the transportation route (for example, the main roads of FIG. 35) may be spatially divided into multiple to define the sections $1\_1142-1$ to $m\_1142-m$. Thus, when the current location during the transportation for each packing container of fish, shellfishes, vegetables, or fruits is managed in each of the section $1\_1142-1$ to $m\_1142-m$, such an advantageous effect can be obtained that the location where the delay in delivery caused by traffic congestion on the transportation route can be ascertained in detail, for example. Then, when the result is notified to other delivery vehicles to instruct to avoid the traffic congested site, the other delivery vehicles can achieve smooth transportation.

Another example of application of the method adopting the system of this embodiment to the physical distribution management will be described. In this application, the "simple plug-in/plug-out method utilizing the position detection of the combination module" described in Section 4.2 is utilized. In this case, the short-range radio is adopted as the physical communication media of the network line 1782 (FIG. 10A) within the same system.

Here, the inside of a large-sized refrigerator for storing the packing container of the fish, shellfishes, vegetables or fruits which contain the built-in sensor combination modules 1460 for detects temperature is assigned as the system $\alpha\_1132$. Since the space inside is divided finely into the section $1\_1142-1$ to $m\_1142-m$ as so defined, the storage place of the packing container in the large-sized refrigerator is managed automatically. When the packing container is to be shipped, it will be taken out of the large-sized refrigerator. Thus, it is automatically plugged out from the system $\alpha\_1132$, and also the date and time of the shipment is managed within the system controller $\alpha\_1126$.

Next, the inside of the truck space in the refrigerator car which transports the packing container is assigned to the system $\beta\_1134$. The space inside is also defined finely as the sections 1142. The system controller $\beta\_1128$ installed therein collects temperature information from the sensor combination module 1460 and controls the air-conditioning in the refrigerator car.

Note here that with the method of Section 4.4, only the location of the placement of the communication module 1202 compliant to radio communications is detected, and the position of the sensor module 1260 in the sensor combination module 1460 or the position of the actuator module 1270 in the actuator combination module 1470 is not detected. Therefore, when the accuracy in temperature management in the refrigerator car is so high that the temperature management for each packing container is not necessarily required, a single communication module 1202 compliant to short-range radio communications may be used in place of the sensor combination module 1460.

Then, the inside of the warehouse (large-sized refrigerator) of the destination of delivery for the refrigerator car is assigned to a system $\gamma$. A system controller $\gamma$ mounted in the system $\gamma$ share the information with the system controllers $\alpha\_1126$ and $\beta\_1128$, the freshness of the fish, shellfishes, vegetables or fruits in the packing container can be predicted from the information including the delivery delay information, the prior storage time in the warehouse prior to shipment, and the internal temperature during transportation. Since the freshness after delivery can be thus predicted, it becomes easy to price the fish, shellfishes, vegetables or fruits, and also to select the destination of delivery thereafter, as an advantageous effect.

Furthermore, as another example of application which utilizes the "simple plug-in/plug-out method utilizing the position detection of the combination module" described above, an "automatic settlement of accounts at the time of passing gate or purchasing commodity" may be considered. Here, as a combination module used in this application example, a sensor combination module 1460 compliant to audio input may be used. For example, now in Japan, a near-field radio of the standard of a noncontact IC card such as FeliCa (coined word which combined Felicity and Card) is used in the check-in/out management at a door of a predetermined room, the checking process of, for example, a ticket-examining device (gate) while commuters pass therethrough in a railroad station, or the automatic settlement of accounts at the time of purchasing commodity. But, since the near-field radio communication is used for the communication of the noncontact IC card, every time the user should use the noncontact IC card, he or she must take it out from the place where it is carried, which takes time and effort.

In contrast, if the near-field radio communication is changed to the short-range radio communications (or middle-range radio communications), it is a merit for the user since he or she no longer take it out from the carried (stored) place, such as a bag or a pocket to use it, which can save time and effort. Here, the physical form of the package in which the sensor combination module 1460-5 is mounted is not necessarily a card, but a form easy to carry, for example, a tiepin or a necklace may be allowed. Then, the area for the system $\alpha\_1132$ is set only in the vicinity of the front of the entrance door of a predetermined room, the ticket-examining gate for passing in a railroad station, a vending machine or the sales counter of a store. It should be noted that with the method of Section 4.4, only the location of the placement of the communication module 1202 compliant to radio communications is detected, and the position of the sensor module 1260 in the sensor combination module 1460 or the position of the actuator module 1270 in the actuator combination module 1470 is not detected. Therefore, for the check-in/out management at a door of a predetermined room, or the checking process of a ticket-examining device (gate) in a railroad station, a single communication module 1202 compliant to radio communications may be used in place of the sensor combination module 1460-5.

When the user proceeds to the front of a predetermined entrance door, or just before the passing zone of a ticket examining machine (gate), or approaches the vending machine or sales counter of a store, the "plug-in process" (Section 4.2 is automatically carried out. Thereafter, when the user leaves the place, the "plug-out process" is automatically carried out, but the system controller $\alpha\_1126$ still manages the gate passage history (in the entrance door or ticket-examining device) or the purchase settlement history of the user. Furthermore, by using the position detection (refer to Section 4.2 of the sensor combination module 1460-5, a state of emergency such as the user falling by accident from a platform onto a rail track, can also be automatically recognized.

In front of a predetermined entrance door or a ticket-examining device (gate), in particular, the passengers or users may hold a hand over or place a finger on a predetermined place for authentication of the individuals. The individual authentication method in this case is not limited to the collation of lines of a palm or a fingerprint, but also the image of a venous line pattern picked up by using the near-infrared light reflecting near the palm or finger surface may be used for the authentication of individuals. Furthermore, the authentication of individuals may be by the facial recognition without through a hand or a finger. Here, prior to the authentication of a user, the plug-in processing is carried out in the stage where the user proceeds to the front of a predetermined entrance door or just before the passing zone of a ticket-examining device (gate). Then, immediately after the plug-in process, the system controller $\alpha\_1126$ (refer to FIG. 8A or FIG. 8B) uses the particular identification information (for example, IEEE extension address EXADRS of FIG. 12A (e) or the like) of the sensor combination module 1460-5 or the communication module 1202, to access the server n_1116-$n$ and obtain the information for authentication (identification) of an individual (such as the lines on the palm/fingerprints/venous line pattern/facial pattern, etc.) in advance. Then, the information for authentication (identification) of the individual obtained in advance, and the information obtained at the front of the predetermined entrance door or the passing zone of thee ticket-examining device (gate) are collated. Only the passengers who match the collation information are allowed to pass the entrance door or the ticket-examining device (gate), and the collation information are canceled. Thus, the system controller $\alpha\_1126$ obtains the information for authentication (identification) of the individual in advance immediately after plug-in, such an effect can be obtained that the authentication (identification) of individuals can be quickly performed.

Meanwhile, when a user needs to be authenticated for electronic settlement of accounts, he or she is requested to utter a speech (such as a keyword) which is assigned to the user. Thus, the system controller $\alpha\_1126$ of FIG. 8B receives the voice (or utterance word) information from the sensor combination module 1460-5, and performs the "user's voiceprint collation" using the information from the server n_1116-$n$. Then, the individual is authenticated by checking the collation between the voiceprint and the IP address data (FIG. 13 ($b$)) stored in the sensor combination module 1460-5 or the information corresponding to IEEE extension address EXADRS. As a next step, the word uttered by the user may be estimated/determined by the system controller $\alpha\_1126$ using the speech recognition technology as to whether the word indicates the "intention to agree with electronic settlement of accounts". Here, when all the collations are completed, the communication between the system controller $\alpha\_1126$ and the server n_1116-$n$ relating to the banking management of the user will be established, thereby completing the electronic settlement of the accounts.

When the system of this embodiment is applied to any of the "physical distribution management", "gate pass management" and "electronic banking for purchasing commodities" described above, such an effect can be obtained that the sensor combination modules 1460-5 corresponding to these examples can be manufactured at very low cost, thereby making it possible to circulate them in great number. Note that the global positioning system (GPS) used for position detection involves expensive parts, and therefore a circulation in great number is conventionally difficult. By contrast, usually, in this embodiment, the position detection is carried out using the radio wave transmitted by the sensor combination modules 1460-5, and therefore no extra cost will be added for the position detection of the sensor combination modules 1460-5. Thus, the sensor combination module 1460-5 can be manufactured at very low cost.

The examples of application in the social infrastructure field are mainly described by focusing on the use of the sensor combination modules 1460. The use is not limited to these, but the actuator combination module 1470 may be used for the remote control of a mobile robot built into a movement controller. For example, the section 1_1142-1 to m_1142-$m$ are defined for the respective rooms of a hotel or collective housing. Then, with use of the position detection technology of the actuator combination modules 1470, the system controller $\alpha\_1126$ controls the mobile robot to move to the entrance of a predetermined room. The mobile robot may be used to clean the predetermined room or to carry a predetermined load.

In addition to the above-described examples of application, the embodiment is also applicable to agriculture. More specifically, in production of plants, for example, the systems $\alpha\_1132$ and $\beta\_1134$ may be assigned to different types of plants to be cultured, respectively, and thus these plants are grown under different growth conditions. Further, the sections 1142 may be respectively assigned to growth sites of the plants of the same kind to control the amount of lighting, the amount of supply/refill of water, the temperature and humidity for each section, and also to manage the states of culture of the vegetables.

Section 5.3 Example of Application to Health Care Field

Section 5.3.1 Example of Application of Wide Area Network System to Health Care Field An example of application of the wide area network system shown in FIG. 1 to the health care field would be as follows. That is, under a commission from a wholesale firm B1_1104-1, which corresponds to a state, a service provider B_1112-2, equivalent to a specific public institution, collects the names of diseases of patients and their conditions, and the genetic information of each individual patient from the system $\alpha\_1132$, equivalent to a hospital or a medical institution of an area, and can provide a method of collecting and organizing information of diseases on a nationwide scale. In this case, the public institution (the service provider B_1112-2) accesses the system controller $\alpha\_1126$ which manages the database in the medical institution (the system $\alpha\_1132$) of the area via a network to collect required data automatically. The result of the analysis obtained as a result is reported to the state (the wholesale firm B1_1104-1) and is published to the people via the Internet or by media reports such as newspapers/magazines.

Section 5.3.2 Example of Application of Combination Module to Health Care Field

Each sensor combination module 1460 having the structure shown in FIG. 5 has a number of merits including a light-weight, small-size, power saving (an external power being unnecessary), and low-cost. Therefore, taking advantage of these merits, the sensor combination modules 1460 can be mounted directly on the bodies of the users in motion. As a specific mounting method, the sensor combination modules 1460 may be mounted directly on the body, by way of using a worn item such as a wrist watch, glasses or tiepin, or it may be pinned to the clothes. Thus, the sensor combination modules 1460 each combined with a temperature sensor, a pulse sensor, a respiratory sensor (accelerometer), a blood oxygen concentration sensor and the like, are mounted on patients and/or healthy persons. In this manner, such an effect can be obtained the health conditions can be traced in real time. Further, with the system controllers α_1126 installed in units of hospital rooms or housing rooms of individuals, the results detected are analyzed in real time and abnormalities, if any, are notified to a doctor or a nurse. Such an effect can be obtained that efficient care can be realized for patients and healthy persons. Furthermore, only the necessary information can be sorted out and transmitted to the server n_1116-n (FIG. 1) installed in each hospital, such an effect can be obtained that the efficiencies of the data management and data processing in the server n_1116-n are improved.

The method described above is related to the case where the combination module is attached directly to a human body. The method is not limited to this, but the combination module (for example, the combination module 7_1295-7 of FIG. 2) may be directly inserted/input or embedded into the body. In this case, instead of the form that the combination module 7_1295-7 is singly installed in the network system α_1132, it is incorporated in the body (specific user) to be moved together with the human body (specific user). Here, the method of mounting the combination module on the body described above may be troublesome when putting on or taking off the combination module (the user may feel it troublesome). In contrast, by directly inserting/inputting or embedding (incorporating) the combination module in the body in advance, such an effect can be obtained that the user-related information can be appropriately obtained by the system controller α_1126 side without causing any trouble of wearing or removing the module to the user.

First, a method of embedding the combination module into the body will be described. For example, immediately after a surgical operation on a patient, the combination module 1295 shown in FIG. 4A (b) is embedded near the sutured part. Here, there is a risk after the operation that the incised part or the part where the affected portion has been extracted (cut) may suppurate, or that it may bleed internally. Therefore, it is important for a postoperative care to find the occurrence of suppuration or internal bleeding, if any, of the part where the affected portion has been extracted (cut) as early as possible. When bacteria enter the incised part or the part where the affected portion has been extracted (cut) to cause suppuration, the pH value (hydrogen ion exponent) of the suppurating part changes. Here, as the combination module 1295 to be embedded in the sutured part, the sensor combination module 1460 containing a built-in pH sensor module which detects a pH value and a built-in blood sensor module, may be used.

In this case, it is not necessary to take such a long time to follow up the postoperative condition. Therefore, as described in Section 1.6, the life management data 1794 or the operation period management data 1795 shown in FIG. 7B may be used to operate the sensor combination module 1460 only for the postoperative follow-up period. Not only that, moreover, the durable period (battery life) of the battery charger module (battery) 1554 in the sensor combination module 1460 shown in FIG. 5 may be set short in advance to disable the sensor combination module 1460 by battery life when the postoperative follow-up period has elapsed. In this manner, it becomes possible to prevent unnecessary radio transmission from the combination module 1295 (sensor combination module 1460) after the postoperative follow-up period. Thus, such an effect can be obtained that the load on the system controller α_1126 which controls/manages the network communications in the network system α_1132 can be lightened.

Next, a method of inserting the combination module into the body will be described. In this case, the combination module 1295 in the form shown in FIG. 4A (b) is enclosed in a capsule for the user to be able to swallow the capsule with water, a soft drink or the like. For example, when the soft drink containing the capsule mixed thereinto is produced at low price, the combination module 1295 can be inserted to the body without a burden to users. Not only that, moreover, but also, for example, when the user, who has a disease, take a medicine periodically, he or she may swallow the capsule together with the medicine. The capsule of the built-in combination module 1295 stays inside the user's body until it is excreted in a toilet or the like, thus making it possible for the module to continuously transmit the user information until then. Further, as described above, the life management data 1794, the operation maturity control data 1795, or the battery life of the battery charger module (battery) 1554 may be utilized to prevent unnecessary radio transmission from the combination module 1295 after excreted.

As examples of use of this method are the management of the user's health care, the early detection of the onset/development of a disease, and the daily management of the exercising state of the user. First, the application to the management of the user's health care or the early detection of the onset/development of a disease will be described. In this case, the sensor module 1260 shown in FIG. 4B (b) is used as the different function module 1440 which has functions other than the communication function shown in FIG. 4A (b). As an example of the sensor module 1260, the temperature sensor module which measures the body temperature in the living body may be used.

As a conventional early detection method for a patient who has influenza, there is a technique of installing a sensor which measures the temperature of the body surface of the user by means of infrared rays, for example, at a gate in an airport or the like. But, if the user passes through the installed temperature sensor before his or her body temperature rises by the onset of influenza (that is, just before the development of symptoms), there is a risk of overlooking the patient with influenza. By contrast, by tracking the change in body temperature along with time with the capsule containing the built-in temperature sensor module 1260, it becomes possible to improve the accuracy of detection of patients with influenza.

As another example of the sensor module 1260 to be built into the capsule, a sensor module configured to measure blood sugar level may be used. According to this method, the sugar content in blood is measured from a near-infrared light spectral pattern obtained from blood. A diabetic patent tends to have a blood sugar level (sugar content in blood) higher than that of a healthy person. When the blood sugar level of the diabetic exceeds tolerance level, the prompt action of medication, or the like is required. Under these circumferences, by monitoring the blood sugar level in the patient's body with the capsule containing the blood sugar sensor module, it becomes possible to quickly find the abnormalities in the blood sugar level and therefore the therapeutic effect for the diabetic patients can be improved.

Conventionally, in hospitals or institutions, a nurse measures the body temperature and blood sugar level of inpatients periodically. By contrast, if the inpatients can take the capsule containing the built-in combination module 1295 periodically, it becomes possible to take immediate measures to a sudden change of the patient's condition. Not only that, but also such an effect can be obtained that the personnel expenses for the measurement of body temperature or blood sugar level can be saved, thereby making it possible to improve the administration of the hospital or institution. Furthermore, by combining the position detection of the combination module 1295 by the method described in Section 4.4 with reference to FIG. 31 to FIG. 34, there is also an effect that it is possible to detect a dementia patient if he or she wanders around in the hospital or institution.

Moreover, the "name of the person who took the medicine" may be recorded with the "name of the medicine" as a part of the self-attribute data 1793 in the combination module 1295 (see the corresponding part in Section 1.6. Here, the inpatients and tenants are monitored with a camera installed in the hospital or institution at all times, to manage the timing when they take specified medicines. When the inpatients and tenants take the specified medicine, the system controller $\alpha\_1126$ records such information in the combination module 1295. Thus, the compliance of the medicine for each inpatient or tenant can be always managed, and therefore such an effect can be obtained that it can help to prevent them from forgetting to take the specified medicine.

Next, an example of use in the daily management of the exercising state of the user will be described. In this case, an accelerometer may be used as the sensor module 1260 build in the capsule. Here, by combining the output of the accelerometer incorporated inside the body and the position detection information of the combination module 1295 described, the exercising state of the user can be always monitored in real time. Here, when the amount of daily exercise for the user to be managed is less than a predetermined target value, the I/F unit 1234 in the system controller $\alpha\_1126$ or the display in the system controller $\beta\_1128$ indicates to the user a suggestion for the measures to be taken.

Moreover, an example of the system of this embodiment, in which the "detection of a usually impermissible combination" described using FIG. 37G is utilized for the determination whether or not a combination of medicines is possible, will be described. Generally, two or more medicines are prescribed in combination for patients in many cases. In such cases, it is possible to automatically determine whether a combination of certain different types of medicines is safe or not. For example, the combination module 1295 (unit 1290) is contained in each of medicine tablets. As described before, each combination module 1295 (unit 1290) is enclosed in a capsule comprising a harmless material to the body. When the patients excrete the capsules when they go to a toilet, the capsule is removed from the body to the outside. Thus, the combination modules 1295 (units 1290) will not affect the body. Here, the capsules containing the built-in combination modules 1295 (units 1290) mixed into the medicine tablets are configured by the same method described above to stop radio transmission when discharged from the body to the outside.

It should be noted here that the combination module 1295 (unit 1290) contains communication module 1660 as shown in FIG. 4A. Further, the self-attribute data 1793 is stored in advance in the communication module 1660 as shown in FIG. 7B. Here, in the example of the system of this embodiment, the identification data of medicine is stored in the self-attribute data 1793.

Incidentally, as shown in FIG. 2, the memory 1232 of the system controller $\alpha\_1126$ exclusively used for checking a plurality of medicines of a prescription, stores in advance a data table of the medicines which can be combined in a prescription, or a data table of the medicines which may cause a problem for health when combined. When a patient or pharmacist who prepared prescribed medicines passes through the system controller $\alpha\_1126$ for checking medicines, while carrying the medicines, whether or not the combination of the medicine is possible can be determined quickly and easily.

In the system of this embodiment, as described in Section 4.4, the locations of all of the units 1290 or combination modules 1295 can be detected in real time. Therefore, when a combination module 1295 (unit 1290) mixed into in a medicine passes through a predetermined place, the system controller $\alpha\_1126$ for checking medicine can detect the situation as needed. Then, the system controller $\alpha\_1126$ for checking medicine requests a reply of the self-attribute data 1793 (medicine identification data) from the combination module 1295 (unit 1290) mixed into the medicine, and thus the system controller $\alpha\_1126$ for checking medicine can appropriately monitor the contents of the plurality of prescribed medicines. The medicine information collected by the system controller $\alpha\_1126$ for checking medicine are referred to with the above-described data tables, an inappropriate combination of medicines to be taken, can be extracted easily. When an inappropriate combination of medicines is detected, warning is output by voice or display to the user or pharmacist.

Conventionally, such data tables indicating the combinations of medicines which may cause problems to health are managed by each pharmacy or medical office of hospitals. In Japan, a "medicine notebook" is exclusively issued for each patient, which indicates the medicinal history taken by the patient in the past. With this system, as the patient shows the medicine notebook, the pharmacist can easily detect an inappropriate combination of medicines to be taken. However, if there are a great number of patients waiting for medication in a pharmacy or the medical office of a hospital, the pharmacist is not allowed to have a sufficient time to refer to the medicine notebook with the data table each time. Here, in some cases, the pharmacist determines whether or not a prescription involves an inappropriate combination of medicines based on his or her memory. As a result, there may be a risk of prescribing a inappropriate combination of medicines unwillingly due to a lapse of memory of the pharmacist.

When the above-described example of application of the system of this embodiment is used, the pharmacist no longer needs to refer to the data table manually. As a result, the efficiency of pharmaceutical preparation in the pharmacy can be improved significantly, and also such an effect can be obtained that an appropriate combination of medicines to be taken can be checked automatically at high speed and high efficiency. In the meantime, at a pharmacy or the medical office of a hospital, the prescribed medicines are prepared manually (by a pharmacist), and therefore there is always a risk of preparation error. By contrast, with the example of the application of the system of this embodiment here, it is possible to detect a pharmaceutical preparation error at high precision. As a result, the reliability of medication, on which the patients depend, can be significantly improved.

In addition, Section 5.3.2 discusses the technique in which the combination module 1295 (or unit 1290) is built into a capsule in order to set the combination module 1295 (or unit 1290) into the body. The method is not limited to this, but other means may be used as well. For example, the combination module 1295 (or unit 1290) comprising a single chip (or a hybrid chip) may be laminated (or coated) with a material harmless to the body instead of putting it in a capsule.

Section 5.3.3 Example of Application of Section Division Method to Health Care Field As an example of application of the section division method to the health care field, the section 1142 may be divided in units of floors or rooms of a hospital ward, or the section 1142 may be partitioned in units of medical departments of a hospital ward as in the case discussed in Section 5.2.3. In the system of this embodiment, various types of sensor information thus acquired may be integrated and/or managed for each divisions of the section 1142. Thus, the situation can be ascertained for each section level of a hierarchy, or, for example, the frequency of nurse calls and the frequency of occurrence of sudden change in the patient's condition to the worse can be ascertained. When the results thus ascertained are reflected in the planning of the arrangement of staff, such as nurses, such an effect can be obtained that the quality of the care service for the patients in the hospital can be improved.

On the other hand, the sections 1_1142-1 to m_1142-*m* may be assigned to the respective parts of the body as an example of application to the health care field. Here, as the sense information regarding the body, various types of sense information such as a regional body temperature, a regional perspiration, a strain rate of regional skeletal muscle, a regional change in oxygen concentration in blood vessel and a regional pulse state are acquired. When such various types of sense information are integrated and/or managed for each division of the section 1142, it becomes easy to ascertain an abnormal part in real time. Thus, such an effect can be obtained that it becomes easy to extract a part where the condition is quickly aggravated and to grasp the condition of disease for the patient.

Chapter 6 Java/JavaScript

In this specification we optionally use a word "Java/JavaScript" to represent Java and/or JavaScript. More specifically, the "Java/JavaScript" may be used to represent Java only, or JavaScript only, or a combination of Java and JavaScript. If we use the "Java/JavaScript" to represent the combination, the "Java/JavaScript" can employ not only the function (or library) of Java but also that of JavaScript.

In the following explanation the equivalent or corresponding portions are referred to by the same or common reference signs (or numerals) used in the embodiments of FIGS. 1 to 37H. Thus, the portions referred to by the same or common reference signs may be configured similarly. For instance, the reference signs (2600, 2614, 2622, 2634, etc.) used in the embodiment of FIGS. 21A-21D are used in the embodiment of FIG. 38B. Although the figures are different, the portions with the same reference signs can be configured similarly, or can be exchanged. Further, reference sign 2600 in FIG. 21A and reference sign 2600*a* in FIG. 38B include a common portion (2600) of the reference sign (reference numeral). This suggests that the unit management pseudo-drive (2600) corresponds to (or relates to) the unit management pseudo-drive file a (2600*a*).

Figure 38A:
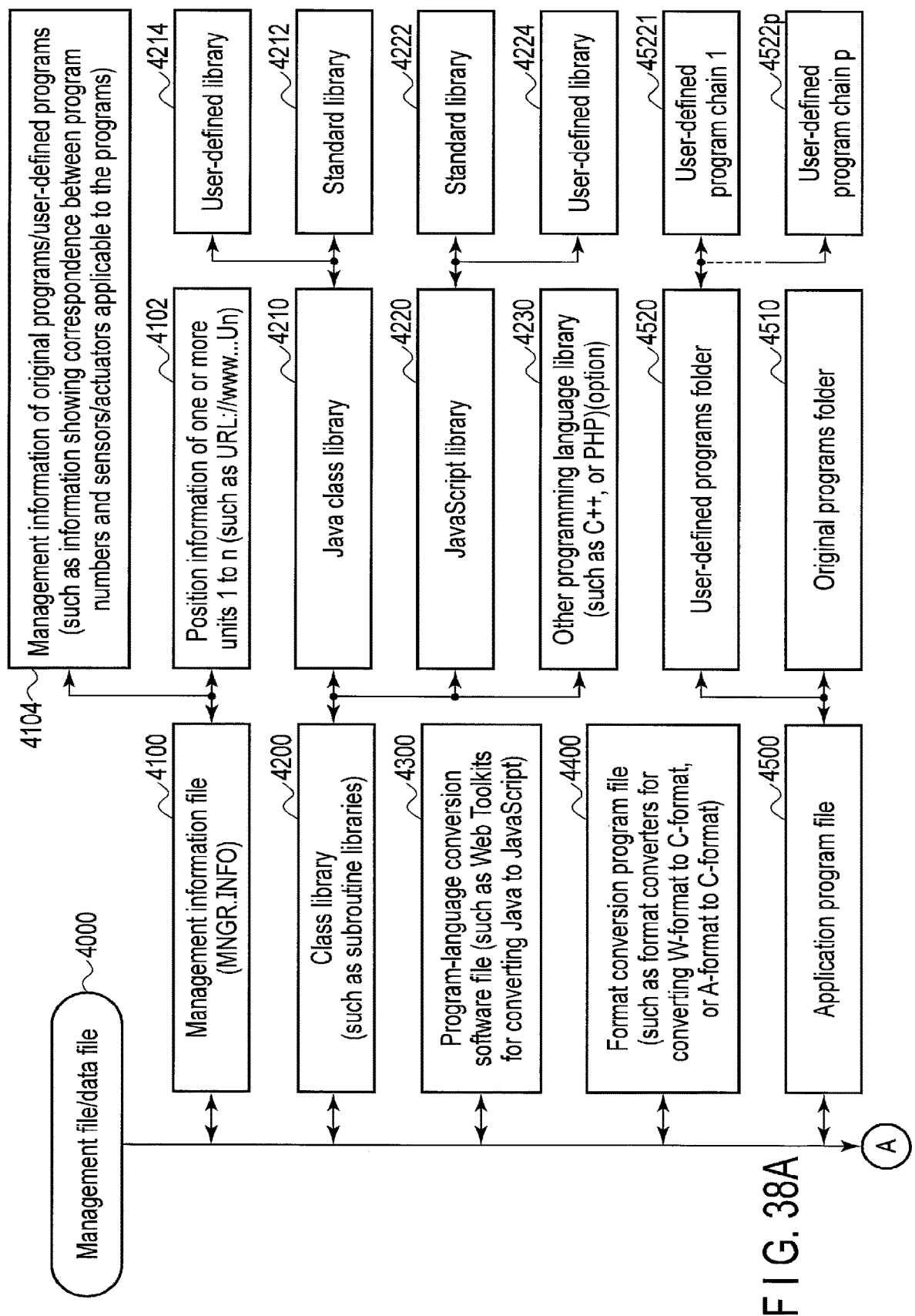
FIG. 38A shows a file management configuration for management files and data files used in one embodiment.

Server 1116-*n* and/or system controller 1126 of the embodiments of FIG. 2 etc. may perform a file management of units (devices, combination modules or complex modules, etc.) connected to system controller 1126, directly or indirectly. Server 1116-*n* and/or system controller 1126 may also perform a file management of computer programs to be used (or may be used). An example of management file/data file 4000 for the file management is shown by FIGS. 38A and 38B. The server and/or the system controller may have the management file/data file (or a copy thereof).

FIGS. 38A and 38B exemplify a file management configuration for management files and data files used in one embodiment. As shown in FIG. 38A, the root directory of management file/data file 4000 may include management information file (MNGR.IFO) 4100, class library (libraries of subroutines, macros, algorithms, etc.) 4200, program-language conversion software file 4300, format conversion program file 4400, application program file 4500, and so on.

Management information file 4100 includes folders 4102 and 4104.

Folder 4102 includes information on positions of one or more units (1 to n). Folder 4104 includes management information of programs for controlling part or whole of the one or more units. If one or more units exist in Internet, folder 4102 may include URLs of the units as their positional information. (cf. the unit shown in FIG. 2, FIG. 39, etc. as a concrete example of the unit; or, the combination/complex module shown in FIG. 10A, etc. as a concrete example of the unit. As for the correspondence among various modules and various information items/codes, see FIG. 23, etc.)

The program management information in folder 4104 may include correspondence information of various programs and/or program numbers to identify the various programs, where the correspondence information may indicate the affinity or congeniality in the program(s) and the sensor(s)/actuator(s) to be used with the program(s).

More specifically, the program management information in folder 4104 may include a correspondence table comprising program numbers (program IDs) of one or more programs being managed and specific sensor(s)/actuator(s) to be matched with the program(s). For instance, assume that the programs contain a temperature control program (program number=a), that the sensors contain a temperature sensor (device ID=b), and that the actuators contain a heater (device ID=c). Under this assumption a specific row of the correspondence table for program number a describes device ID b and device ID c. If the programs contain a lighting control program (program number=x), the sensors contain a photodiode (device ID=y), and the actuators contain an LED (device ID=z), then another specific row of the correspondence table for program number x describes device ID y and device ID z. By such a description, the correspondence information (correspondence table) may indicate that the photodiode of ID y and the LED of ID z are congenial to the program of number x. Or, the correspondence information (correspondence table) may indicate that the program of number x can use the photodiode of ID y and the LED of ID z.

Programs managed by the program management information of folder 4104 may include prepared original program(s) and user-defined program(s) (optional) made according to desired use. For instance, if a Java application (applet) obtained by down loading from Internet is prepared by someone and is not a user-made program, that application may be optionally classified as an original program even if that application will be obtained after preparing other original program(s). On the other hand, if the Java application (applet) is made by a user according to desired use, that application may be classified as a user-defined program.

Incidentally, an applet may belong to a complete Java environment and highly-functional applications can be made by the applet based on object-oriented programming. Highly-functional applications may be web-distributed by embedding the applet in HTML.

As a technique other than the applet-embedded HTML, there is Java Server Page (abbreviated as JSP). According to JSP, web pages can be dynamically created in a web server and the created web pages can be returned to a client. The JSP may be one of functions of a servlet. However, unsimilar to the servlet, the JSP may be described in HTML. According to the servlet, Java program codes may contain HTML codes. However, according to the JSP, the program codes are separated from the HTML codes to the utmost. More specifically, according to the JSP, Java codes are described between signs "<%" and "%>" to thereby separate the Java codes from HTML codes. (Thus, the Java codes can be embedded without changing the description of the HTML.) The scripts of the separated portion may be seen in the HTML, and such a description may be called "JSP scriptlets." It is possible to embed the Java codes based on a predefined custom library, by using unique tags without using the scriptlet. Thus, not only JavaScript™ but also Java codes can be embedded in HTML.

User-defined program(s) can be made by using existing library(s). When the user defined program is made by using Java, Java class library 4210 in class library 4200 may be used. Java has rich class libraries (may be called, standard library, regular library, or default library) hereinafter referred to as standard library 4212. If standard library 4212 does not contain a desired class library, a user can made or create the desired class library (including subroutines, macros, global variables, etc.) by using Java, and the created library can be entered in user-defined library 4214 (option). Or, two or more classes may be arbitrarily selected from standard library 4212 and the contents (methods or functions) of the selected classes may be combined. The combination of the selected class contents can be entered in user-defined library 4214. User-defined program(s) can be suitably made according to Java class library 4210 comprising standard library 4212 and user-defined library 4214 mentioned above. For instance, two or more math classes in a class library may be combined to make a user-defined program for performing a prescribed math operation.

Next, brief description will be given to the class of Java. The class represents a set of data (attribute) and procedure (manner or method). The class may be regarded as a basic unit of Java programs. In Java, an object created by using the class as a model pattern may be called "instance."

The Java class includes an abstract class, final class, and public class. The abstract class is an incomplete class wherein a common function is provided but individual functions are defined in general terms. The final class is a class having no subclass. The public class can be accessed from other packages.

The method of Java may be static or nonstatic. The static method does not require an instance when called. The nonstatic method (not statically modified) requires an instance when called. Since the static method is a "method belonging to a class", not to an instance, the static method can be directly called without creating an instance. The static method is independent of an instance. Therefore, the static method cannot access to a conventional nonstatic field in the instance of the class. Also, the static method cannot call a conventional nonstatic method. In short, "static" can access "static" only.

JavaScript may have library (a library of subroutines, etc. for performing various processing) 4220 which is different from class library 4210 of Java. Similar to Java class library 4210, JavaScript library 4220 may comprise standard library (regular library or default library) 4222 and user-defined library 4224 (option) created by a user. Further, class library 4200 may optionally comprise library 4230 of other programming languages (C++, PHP, etc.).

Programming language conversion software file 4300 may store one or more conversion software. The conversion software is configured to convert codes of a programming language to codes of another programming language. When a plurality of conversion software are stored in file 4300, unique names or unique IDs may be assigned to the stored software, respectively. By using the unique name or unique ID, a prescribed (or desired) conversion software can be obtained from file 4300 and the obtained software can be used for the prescribed (or desired) conversion.

GOOGLE Web Toolkit (abbreviated as GWT) may be an example of the above-mentioned conversion software. (Recent version 2.7 of GWT may be obtained from Internet. GWT2.7 can handle recent version 8 of Java.) By using the cross-compiler of GWT, a Java program can be converted into JavaScript or the like. More specifically, by using GWT, codes of Java (source codes or byte codes of Java) can be converted into codes of HTML (HTML5+JavaScript+CSS3) or codes of Ajax (Asynchronous JavaScript+XML). GWT may operate in a hosted mode or a web mode. In the hosted mode, the program runs as Java byte codes (abbreviated as JBC) on a Java Virtual Machine (abbreviated as JVM). In the web mode, the program runs as HTML+JavaScript (which may be obtained by converting the source codes of Java). Such a conversion software (GWT) may be stored in programming language conversion software file 4300.

JavaScript Native Interface (abbreviated as JSNI) of GWT may be used by Java. By using the JSNI of GWT, JavaScript can be created in parallel to the class (or classes) of Java. Then, Java can be equipped with the method of a web application (or the method of a client side). In other words, via JavaScript (or via the native language of a web browser), information exchange can be made between the codes of Java and the codes of JavaScript. Or, JavaScript can bridge the gap between a programming language (such as Java) using Java byte codes and an application (such as Ajax) using codes other than Java byte codes. (This suggests that JavaScript and Java byte codes can be mutually or independently used in an HTML document) Note that existing JavaScript can be lapped by Java, or JavaScript can use rich Java library 4210.

Java Native Interface (abbreviated as JNI) may also be used by Java. The JNI is a specification of interface to cooperate, in a Java platform, a program of the Java language with native codes of a language (such as C or C++) other than Java, where the native codes may run on an actual CPU/MPU. The JNI has an interface to use the native codes by the Java language, and another interface to use JVM for operating the Java byte codes by the native codes. By using the JNI and C++, a specific part (e.g., the encode/decode part of a video requiring high-speed processing) of the Java byte codes may be replaced by the native codes. Then, a total processing speed can be enhanced compared to a case wherein only Java byte codes or a combination of JavaScript and Java byte codes are used.

Incidentally, part or all of the libraries contained in Java class library 4210 may be converted into libraries of JavaScript by using a conversion program such as GWT already mentioned. The converted libraries may be entered in user-defined library 4224 of JavaScript library 4220.

One embodiment may use the following formats:
(01) A-format written in text format;
(02) C-format in "command/request/response/status" form;

(03) E-format in which a setting code is stored in a predetermined area; and

(04) W-format in which information is entered in a specific field at the transmission side, or in which "tags" specific to a mark-up language (HTML/HTML5) are described.

Format conversion program file 4400 is arranged in the root directory of management file/data file 4000. There is a prior art internet transmission technique wherein data transmitted/received by USB or Bluetooth is converted into an IP format for internet transmission, for example. Similarly, the C-format (using command/request/response/status) may be converted into the W-format (describing the processing contents of the C-format by JavaScript using start/end tags for marking-up) and vice versa. If it is true that the contents of conversion source and conversion result are clear, it is possible for a skilled person in the art to make a conversion software by which data of a format (provided that the structure of data to be converted is clear) is converted into the corresponding data of another format (provided that the structure of the converted data is clear). (Such a conversion software can be made by using an existing programming language such as Java, JavaScript, C++, etc.)

One or more format conversion programs can be stored in format conversion program file 4400 according to the number of format conversion types. For instance, format conversion program file 4400 may store a conversion program that can be read from file 4400 to use of conversion by which W-format information (descriptions marked-up by start and end tags) contains C-format information (descriptions of commands, requests, responses, statuses, etc.). Or, another conversion program can be read from file 4400 to use of conversion by which part (part of information of marked-up descriptions that part can be converted into C-format) of W-format information is converted into C-format.

Application program file 4500 is arranged in the root directory of management file/data file 4000. Application program file 4500 includes folder 4510 configured to store one or more original programs, and folder 4520 configured to store one or more user-defined programs. Original program(s) and user-defined program(s) can be managed by management information stored in folder 4104 of management information file 4100.

The original programs in original program folder 4510 may contain not only pre-installed system program(s) but also various applications (such as applets) post-obtained by down-loading from Network. (The original programs may also contain scripts prepared by using JavaScript.)

The user-defined programs in user-defined program folder 4520 may contain one or more user programs created or prepared by user(s), the user programs being different from the original programs. More specifically, user-defined program chain 45221 (one of user-defined program chains 4522p) may be created or prepared by connecting or combining one or more suitable classes (in which desired methods and/or required functions are described) obtained from standard library (regular library or default library) 4212 of Java and/or from user-defined library 4214. (Even when the obtained class is only one, if the contents of the obtained one class are changed or modified, the changed/modified one class may be used to create or prepare a new user-defined program chain.)

Suppose a case wherein, for example, n-pieces of larger sensor outputs are to be picked up from m-pieces of sensor outputs. In this case, class C1 and class C2 may be used (provided that C1 and C2 can be obtained from standard library 4212 and/or user-defined library 4214). Class C1 describes a method of sorting the m-pieces of sensor outputs in descending (or ascending) order. Class C2 describes a method of picking-up the n-pieces of larger sensor outputs from the sorted m-pieces of sensor outputs. Then, Java source codes are prepared to include descriptions of C1+C2 in the body of Java program. Information on the "connection or combination of C1 and C2" may be represented by first user-defined program chain UD_PGCI 1. (Or, UD_PGCI 1 may be created or prepared by modifying the contents of class C1 such that m-pieces of sensor outputs are sorted in descending or ascending order and that n-pieces of larger sensor outputs are selected from the sorted m-sensor outputs.)

Similarly, p-th user-defined program chain UD-PGCp can be created or prepared according to the sequence (including meaning of connections and/or combinations) of one or more classes Ci corresponding to the contents of required processing. Here, the suffix "i" of class Ci may serve as an ID to identify the specific class. The specific class (Ci) can be derived from Java class library 4210 (4212 or 4214) by specifying the particular value of "i".

Suppose that user-defined program chain UD_PGCi corresponds to "C3+C4+JSk." If user-defined program chain UD_PGCi ("C3+C4+JSk") includes not only Java classes (C3, C4) but also part (JSk) of the library of JavaScript, the JavaScript library (JSk) can be derived from JavaScript library 4220 (4222 or 4224) by specifying the particular value of "k". (As mentioned previously regarding the GWT, it is possible to bridge the gap between the program language creating Java bytecodes and application(s) using codes other than the Java bytecodes.)

The created p-pieces of user-defined program chains (UD_PGC1 to UD_PGCp) 45221 to 4522p are stored in user-defined program folder 4520. Any user-defined program chain UD_PGCj (j=1 to p) stored in folder 4520 can be obtained from user-defined program folder 4520 by specifying the value of suffix "j". If the obtained user-defined program chain UD_PGCj is a Java program, that Java program can be converted into JavaScript (of HTML, Ajax, etc.) by properly using the conversion software (such as GWT) in programming language conversion software file 4300. A unique program name may be assigned to the converted JavaScript etc. and the name-assigned program may be stored, together with related information to be used in that program, in user-defined program folder 4520.

For instance, the process of FIG. 22 may be described by JavaScript (or, the process may be described by Java and the Java description may be converted into JavaScript by using GWT or the like). Then, a program name (or ID) is assigned to that JavaScript and the named JavaScript may be stored, together with related information (e.g., information of FIG. 23, FIG. 27, FIG. 28, etc.), in user-defined program folder 4520.

Otherwise, user-defined program folder 4520 may store another JavaScript having another program name (or another ID) together with related information (e.g., information of FIG. 23, FIG. 27, FIG. 28, etc.) where the stored JavaScript may describe the processing of FIGS. 26A and 26B (or the stored JavaScript may be obtained by converting the corresponding Java by using GWT or the like).

Figure 29:
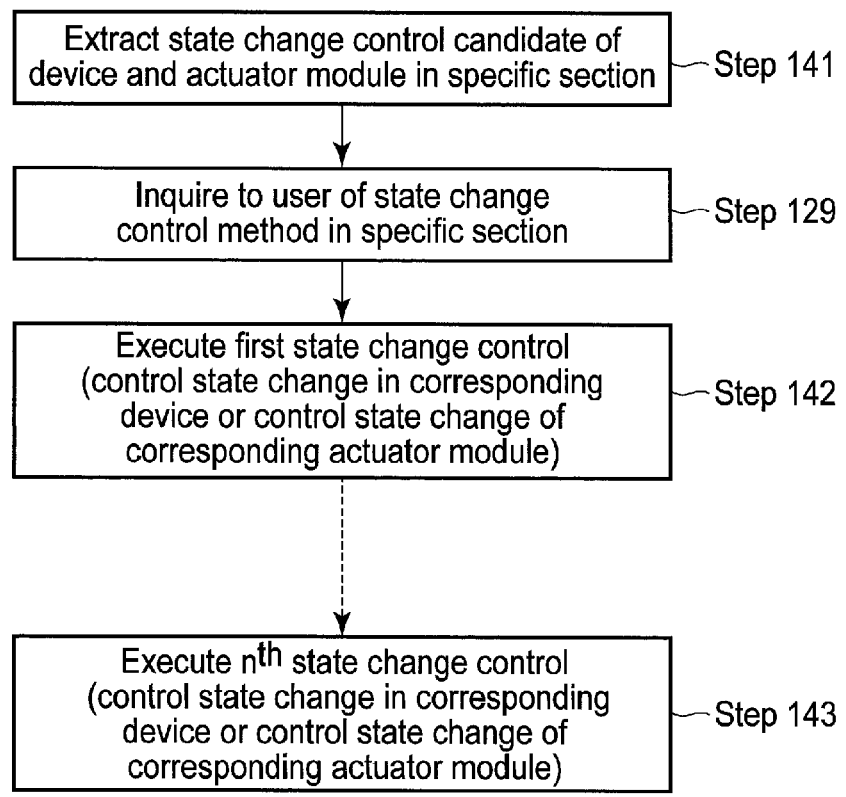
FIG. 29 shows an example of service providing method in each section.

Similarly, user-defined program folder 4520 may store different JavaScripts having different program names (or different IDs) where any of the different JavaScripts may describe the processing of FIGS. 29 and 30 (or any of the different JavaScripts may be obtained by converting the corresponding Java by using GWT or the like).

As shown by FIG. 38B, unit file 4600, unit management pseudo-drive file a 2600a, unit management pseudo-drive file b 2600b, and so on may be arranged in the root directory of management file/data file 4000.

Unit file 4600 may comprise n-pieces of unit folders 4610-1 to 4610-n. Unit folders 4610-1 to 4610-n may have, as pseudo-files, respective sensors 4612-1 to 4612-N and/or respective actuators 4614-1 to 4614-N. (It does not necessarily follow that all of the unit folders should have both of the sensor and actuator. Part or all of the unit folders may have either of the sensor and actuator. Thus, the number n of the unit folders is not always equal to the number N of the sensor or actuator being managed by unit file 4600.)

Sensors 4612-1 to 4612-N and/or actuators 4614-1 to 4614-N logically exist in management file/data file 4000, but they may be physically exist in distant places (the physical distance between the place of file 4000 and that of the sensors and/or actuators is free.) Each of the unit folders (e.g., 4610-n) can be accessed via a network by using a unique URL (such as "://www,.........,Un"). Then, it is possible to read information from sensor 4612-N (pseudo-file) connected to the network, or to write information (such as operation instructions) in actuator 4614-N (pseudo-file) connected to the network. The unique URL of each of the unit folders may be managed by positional information (4102) in management information file 4100.

Unit management pseudo-drive file a 2600a and unit management pseudo-drive file b 2600b are arranged in the root directory of management file/data file 4000. Files 2600a and 2600b are pseudo-files to manage the unit management pseudo-drives shown b (a) and (b) OF FIG. 21a. Programs (Java and/or JavaScript) in application program file 4500 may use the information on files 2600a and 2600b if appropriate.

Unit management pseudo-drive file 2600a includes list data folder 2610, device folder 2612, and combination/complex module folder 2614. Combination/complex module folder 2614 includes sensor/communication module 2622, drive/communication module 2624, memory/communication module 2628, and function/communication module 2630 (cf. FIG. 21B). Sensor/communication module 2622 includes binary data folder 2634 and multivalued data folder 2638 (cf. FIG. 21C). Unit management pseudo-drive file 2600b includes folder 2616 for managing units in sections 1 to m.

Except for management information file 4100 in the root directory of FIGS. 38A and 38B, part or all of information files (4200 to 4500, 2600a, 2600b) may be arranged under subdirectories of management information file 4100.

In the following items related to the configuration of FIGS. 38A and 38B will be summarized. Management information file 4100 includes position information 4102 of one or more units 1 to n, and program management information 4104. If units 1 to n are located on a network (such as Internet) existing in the outside of a system, position information 4102 of units 1 to n may be represented by URLs. If units 1 to n exist within the system, logical addresses (such as IP addresses) and/or physical addresses (such as MAC addresses) may be used for the position information.

Programs to be managed by management information 4104 include original programs prepared in default, and user-defined programs defined (or created) by user, originally. Original programs and user-defined programs can be stored in application program file 4500.

The root directory of management file/data file 4000 may have class library 4200 to handle individual processing. Class library 4200 includes various libraries which can be used by calling from application programs. In the example of FIG. 38A, Java class library 4210, JavaScript library 4220, and option library 4230 are provided. Option library 4230 may include libraries for languages (C++, PHP, etc.) other than Java and JavaScript.

Java class library (JCL) 4210 includes dynamically loadable libraries which can be called from a Java application being executed. Since the Java platform does not depend on any operating system (OS), the Java application cannot use the libraries of OS. In place, the Java platform regularly provides standard (or default) class libraries having various functions supplied by modern operating systems. Such class libraries are stored in standard library (regular library or default library) 4212 so that any of the class libraries can be used freely.

If a particular function (or method) not provided by the standard (default) class libraries is demanded, a user can originally create (or define) the user's demanded class by using the Java language. Or, a user can newly create a user-defined class by combining existing classes obtained from the standard (default) class libraries. The classes created (or defined) by user(s) are stored in user-defined library 4214 so that any of the stored classes can be used freely.

In the Java platform, Java class library (JCL) 4210 serves:

(1) to provide "functions of container classes and that of regular expression processings" to programmers; and (2) to provide "abstract classes and interfaces" to tasks (such as network access and file access) depending on the hardware or OS;

(3) to provide "consistent methods" to a platform incompletely having particular functions to be expected by Java applications, wherein the consistent methods may include a method of emulating the particular functions by using JCL, or may include a method of checking the existence of the particular functions by using JCL.

JavaScript does not have a language specification of "class" but has another language specification (such as "function", "this", "call", "new", "prototype chain", "property: prototype") necessary to realize the class. Thus, JavaScript may substantially have a library similar to the class library of Java. Standard library 4222 and user-defined library 4224 may be provided for JavaScript library 4220, where the standard library corresponds to an existing library prepared in default, and the user-defined library corresponds to a library originally prepared by a user.

JavaScript defines "function." In JavaScript, when a function is called, an object storing the function is indicated by "this." According to JavaScript, all functions have "call" properties, and the "call" can be called as the function. If the "call" is called, an object given as the first argument of the "call" is set to "this", and then the original function is called (where the second argument of the "call" is given as the argument of the original function). According to JavaScript, "new" may be called together with an arbitrary function. When "new" is called with a function, an empty object is created first, and the function is called next. In this case, the "this" in the called function indicates the created object. An object created after executing the function is returned as a result of execution of the "new."

In JavaScript if an object does not have a property referred to by "prototype chain", another property of another object may be referred to. In other words, if an object itself does not hold a property when the property of that object is referred to, a property of the prototype's object may be referred to, in place. If the prototype's object does not hold it's prototype, a prototype of that prototype may be further referred to.

Thus, such a reference may be called "prototype chain" since objects are chained as prototypes and the chained prototypes are sequentially referred to. According to JavaScript a prototype may also be set by using the "prototype" property of a function. By using the "prototype" property, in place of the direct prototype of an object, the prototype of a "new object to be created when the object is utilized as a constructor" can be determined. If a method is to be defined by JavaScript, a function may be defined for the prototype object of a constructor function. If another method is to be called from the inside of a method, a description style "this, <method name> (argument)" may be used.

In the explanation of embodiments, the term "JavaScript" is used to have broad meaning including various ECMA Script equipages. Within that meaning, all script languages used by major Web browsers may be represented by JavaScript. Unless otherwise noted, in the explanation of embodiments, all script languages used by Web browsers are represented by JavaScript.

A Web browser may execute a process described by HTML (HTML5+JavaScript+CSS) containing JavaScript and Cascading Stype Sheet (CSS), or a process described by Ajax (Asynchronous JavaScript+XML). The browser can recognize the JavaScript code sandwiched between <script> and </script> to execute that JavaScript code.

The code of "HTML5+JavaScript" can be directly described by using the code style of "HTML5+JavaScript." Or, the code of "HTML5+JavaScript" may be obtained by converting the corresponding source code of Java language (or corresponding Java byte code). The Google Web Toolkit (GWT) may be used for that code conversion, for example.

Incidentally, the CSS is classified into several levels. Level 3 (CSS3) is currently active. Level 4 or more high level CSS (whose functions are expanded from level 3) will be issued in the future. According to current CSS3 used by HTML5, 2D/3D animations are available.

Unit management pseudo-drive file 2600*a* and unit management pseudo-drive file 2600*b* are pseudo-files to manage unit management pseudo-drives as shown by (a) and (b) of FIG. 21A. Programs (Java, JavaScript, etc.) in application program file 4500 can utilize the information in files 2600*a* and 2600*b* at need.

In the following an example of creating a user-defined program (control program) will be given, in case where a desired program cannot be obtained from application program file 4500. (In the following example Java is used to create the control program. However, JavaScript may be used to create the control program. Or, a proper Java program may be converted into a desired JavaScript by using GWT or the like.)

The control program may be used in the system of FIG. 2, for example. In FIG. 2, one or more devices (one or more sensors 1260 and/or one or more actuators 1270) are respectively connected, at need, via given interfaces by using cables or radiowaves, to one or more units 1290-*n* being managed by system controller 1126. (Here "n" is an arbitrary integer number, and "n" may be 1 to 7 in the example of FIG. 2. In the following the sign "–n" of the arbitrary integer number will be omitted.)

Each unit 1290 employs a system supporting an UPnP (Universal Plug and Play). The system of device controller 1240 for each unit 1290 automatically fetches newly connected devices (sensors and/or actuators) by using the plug-and-play of UPnP. The system supporting UPnP may provide various services (e.g., services of a central controller or a gateway) in a new device network. A small-scale UPnP network may be created by each unit and one or more devices connected to the unit.

(01) Assume that there is unit 1290 freely moved on a floor in various directions, for example. Unit 1290 is pre-equipped with positional sensor S0 (not shown) as sensor 1260 and whole-directional ball wheel actuator A0 (not shown) as actuator 1270. Assume further that image sensor S1 (color camera; not shown) and illumination actuator A1 (LED lamps with independent drive of RGB; not shown) are newly connected by UPnP.

(02) If the existing control program to be running on unit 1290 does not consider the newly connected sensor S1 and actuator A1, that control program controls nothing based on S1 and A1. If S1 and A1 are detected by UPnP, the system of unit 1290 searches candidates of the control program configured to use S1 and A1 from application program file 4500 of system controller 1126. That search is performed to be consistent with the functions (position detecting function, camera function, illumination function, free moving function on a floor in any direction) of the unit. (The correspondence information of management information folder 4104 shown in FIG. 38A may be used to search the candidates of the control program configured to use S1 and A1.) For instance, the candidates of the control program may include a desired control program configured to illuminate by LED up to predetermined brightness when it becomes dark, and to control the driving ratios of RGB to keep white balance if the white balance becomes deteriorated by that LED illumination.

If no candidate of the desired control program is found in application program file 4600 of system controller 1126, a similar control program may be searched for in the area of server 1116 connected to system controller 1126. (For instance, using the character train "illumination control, white balance control" as keywords, the similar control program can be searched for like a Web searching engine.) If any candidates of the desired control program are not found yet, the similar control program may be further searched for in the area of another server 1116. (If the URL of a cloud server including libraries with many various programs is known, the cloud server including the program libraries may be accessed by using the URL.)

(04) If a single control program configured "to illuminate by LED up to predetermined brightness when it becomes dark, and to control the driving ratios of RGB to keep white balance if the white balance becomes deteriorated by that LED illumination" is found, that single control program will be adopted.

(05) Assume that a single control program configured "to illuminate by LED up to predetermined brightness when it becomes dark, and to control the driving ratios of RGB to keep white balance if the white balance becomes deteriorated by that LED illumination" is not found, but two small programs are found from one or more existing libraries (e.g., user-defined library 4214 in FIG. 38A). Here, the first one of the two small programs is a control program configured "to illuminate by LED up to predetermined brightness when it becomes dark", and the second one of the two small programs is another control program configured "to control the driving ratios of RGB to keep white balance if the white balance becomes deteriorated by the LED illumination."

If the two small programs are found, a new control program can be created by a combination of the found small programs (subroutines or classes). More specifically, in a new class of the new control program, a class describing "illumination control to obtain a predetermined brightness" and another class describing "RGB light-sources driving ratio control to obtain a proper white balance" are imported from one or more libraries. Then, in the new class, a method or function is described to create the new control program wherein the LED illumination is performed until a predetermined brightness is obtained (if becomes dark) and RGB driving ratio control is performed until a proper white balance is obtained (for a predetermined color temperature). (The creation of the new control program can be assisted by using a user-selection of methods or functions based on a wizard style)

The description of the above-mentioned new control program may have the following style (concrete coding is omitted):

public class NewControlProgram{
   public static void main(String[ ]args)
   {
   //to detect the brightness of circumstances, and to uniformly drive the 3 LEDs of RGB until the predetermined brightness is obtained if the detected brightness is less than the predetermined value (contents of processing of a class)
   //to independently drive the R-LED, G-LED, and B-LED to converge the white balance to a proper level if the white balance by the illumination of the 3 LEDs is deviated from the proper level (contents of processing of another class)
   }
   }

After the new control program is created, that program is compiled to the corresponding Java byte code (JBC) so that the compiled code can be executed by Java virtual machine (JVM). If the compile is successfully completed (no error occurs) and the JVM of the unit performs intended operation according to the compiled JBC, the compiled JBC (and/or the source code before compiling) may be handled as one of normal control programs of the unit. The compiled JBC (and/or the source code before compiling) may be entered with its program name and/or program ID to the program library (e.g., user-defined program folder 4520 of application program file 4500 in FIG. 38A) of the unit. The compiled JBC of the new control program may be used by JVMs other than the JVM of the said unit. In this case the compiled JBC (and/or the source code before compiling) is uploaded to system controller (fog server) 1126 and/or server (cloud server) 1116, and the uploaded JBC is entered with its program name and/or program ID to the program libraries of the system controller and/or the server. After confirming the proper operation of the created control program, the uploading and entering of the compiled JBC may be performed automatically, or may be performed by a user manually.

If the created control program does not perform the intended operation due to bugs, a user (or programmer) can manually correct the source code of the program by using proper means. As the proper means, Java IDE (Integrated Development Environment) may be installed in system controller (fog server) 1126, for example. The source code including bugs may be rewritten/corrected/debugged by using the Java IDE. Various functions can be added to the Java IDE as plug-in. According to the plug-in, many languages (not only Java but C++, PHP, JavaScript, etc.) can be used. As an example of the IDE, there is "Eclipse." (Eclipse 4.4 (Luna) adapting the Java8 can be freely obtained from Internet.)

FIG. 39 shows an example of remote-controlling via Internet a specific unit under file management. In this example, smart phone 5000 with a Web browser is assumed to be a communication terminal of connection sources. The URL (such as "://www...........U04") of a connection destination may be input by using the browser of smart phone 5000. If the URL is transmitted, smart phone 5000 is connected to, e.g., fourth unit 4611-4, via server (or system controller) 6000. (In this connection, an application interface such as "Web Socket" may be utilized. According to a connection of the Web Socket, bi-directional communication may be established between a server and a browser.) The aforementioned W-format may be used for the information communication between smart phone 5000 and server 6000. The aforementioned C-format may be used for the information communication between server 6000 and fourth unit 4611-4.

Server 6000 is provided with large-capacity storage 6100 for a database. All data items used by management file/data file 4000 may be stored in the database. The database of storage 6100 can be accessed by using a SQL language from the HTML5 Web browser of smart phone 5000.

Server 6000 may correspond to the system controller (1126, 1128) or servers n (1116-1 to 1116-n) shown in FIG. 1, etc. Server 6000 may be configured to be mutually used with the system controller and/or the servers. For instance, the configuration of system controller 1126 shown in FIG. 2 may be applied to server 6000 of FIG. 39 (In this case, memory 1232 of FIG. 2 may be used for management file/data file 4000 and/or database storage 6100 of FIG. 39).

If the aforementioned Web Socket connection is established, a specific program (Java or JavaScript) may be obtained from application program file 4500 in management file/data file 4000 of server 6000, wherein the specific program is suitable for the sensor (image sensor IS1, photo sensors LS1 to LS4) and the actuator (stepping motor TA1 for a turn table) of fourth unit 4611-4. (If the obtained program does not satisfy the user's demand, the user may search for another application program from application program file 4500.)

Suppose that the obtained specific program is a Web application of Ajax described by using JavaScript in HTML5. If the Web application starts to run, window 5100 and window 5200 are displayed on the Web page of the browser of smart phone 5000. Here, window 5100 includes camera image PLI of the control target (e.g., a foliage plant placed on a turn table) of connected destination unit 4, and window 5200 includes a touch-operation screen for operating the control target of destination unit 4 from the connection source side.

By the Web application, image PLI of foliage plant PL captured by image sensor IS1 of unit 4 may be displayed in window 5100 of smart phone 5000. At the same time, virtual dial VD may be displayed in window 5200 of smart phone 5000, wherein virtual dial VD is provided for touch-panel-controlling the rotation direction of turn table TT1 on which foliage plant PL is placed. Icon LD and/or auto-button icon BTN may also be displayed in window 5200. Here, icon LD may indicate the light-coming direction presumed from the detection results of photo sensors LS1 to LS4, and icon BTN may be used to issue a command by which turn table TT1 is automatically rotated so that a part of turn table TT1 faces the light coming direction.

The command (indicating how the virtual dial is rotated in clockwise or counter clockwise direction) corresponding to the operation amount of virtual dial VD is sent to local control computer (MPU with memories) LC1 installed in unit 4. According to the sent command, computer LC1 rotates stepping motor TA1 of the turn table by the given degrees in the instructed rotational direction.

If auto-button icon BTN is tapped by the user, the corresponding command (a command for facing the specific portion of turn table TT1 to the light-coming direction) is sent to local control computer LC1 in unit 4. According to the sent command, computer LC1 starts an automatic control by which stepping motor TA1 is driven so that the direction of the specific portion of turn table TT1 is converged to the light-coming direction.

In the above automatic control, assume that the detected brightness value of photo sensor LS2 is largest, and that of photo sensor LS1 is second. Under this assumption, the light-coming direction may be presumed to be an intermediate between the sensor LS2 direction and the sensor LS1 direction respectively measured from the rotation axis of turn table TT1. Next, the relative ratio between the detected brightness values of sensors LS2 and LS1 is calculated, and the angle of the light-coming direction between the sensor LS2 direction and the sensor LS1 direction is presumed from the calculated ratio. More specifically, if the calculated ratio (LS2/LS1) of the detected brightness values is about "1", the light-coming direction measured from the rotation axis of turn table TT1 is presumed to be the center between the sensor LS2 direction and the sensor LS1 direction respectively measured from the rotation axis of turn table TT1. In this case, the specific portion of turn table TT1 is moved by rotation to the center of the LS2 direction and the LS1 direction, wherein the specific portion corresponds to the most-favorite light-receiving direction of foliage plant PL. On the other hand, if the calculated ratio (LS2/LS1) of the detected brightness values is "Nx" which is more than "1", the light-coming direction measured from the rotation axis of turn table TT1 is deviated from the center to the LS2 direction side. In this case, the specific portion of turn table TT1 is moved by rotation to the particular angular direction between the LS2 direction and the LS1 direction, wherein the specific portion corresponds to the most-favorite light-receiving direction of foliage plant PL, and the particular angular direction corresponds to the value of "Nx." So long as the above automatic control is active, even if the light-coming direction varies over time, the specific portion of turn table TT1 can automatically follow the varied light-coming direction.

The above-mentioned automatic control may be programmed by using the Java language, for example. (The programmed Java codes may be converted into codes of Ajax by GWT, for example, and the converted codes may be used by Web applications.) Such an automatic control program may be pre-installed in computer LC1 of unit 4. Otherwise, such an automatic control program may be down-loaded from application program file 4500 in FIG. 38 to computer LC1 of unit 4. Or, such an automatic control program may be executed by a computer (not shown) of server 6000 and the result of execution may be sent to computer of unit 4, so that stepping motor TA1 of unit 4 is controlled accordingly, wherein the sent execution result may correspond to an instruction specifying the rotational direction of turn table TT1 and indicating the rotation amount thereof.

FIG. 40 shows an example of Web page 5100*a* including an image of the object (foliage plant PL) to be remote-controlled. (Window 5100 in FIG. 39 exemplifies a part of Web page 5100*a* in FIG. 40.) The Web page may be described by the HTML document as:

```
<article id="post-0">
<header>
  <hgroup>
    <h1> Remote Control by Smart Phone
</h1>
    <h2> Foliage Plant </h2>
  </hgroup>
</header>
<section>
  <p> Foliage Plant in my Home <br />
Direct to Position of Good Sunlight </p>
  <figure>
    <img class="alignleft size-medium
wp-image-20"
    title="my plant"
src="http://examples.com/blog/images/pl.jpg"
    alt="" width="300" height="225" />
    <figcaption>
      Adjusting Direction <br />
    </figcaption>
  </figure>
</section>
<footer>
  <p>Posted by <address><a
href="profile.html">A-man</a></addreess></p>
</footer>
</article>
```

FIG. 41 shows an example of an operation screen for remote-controlling the operation target by using Web page 5200*a*. (Window 5200 in FIG. 39 exemplifies a part of Web page 5200*a* in FIG. 41.) The Web page may be described by the following HTML document:

```
<article id="post-1">
<header>
  <hgroup>
    <h1> Remote Control by Smart Phone
</h1><h2> Foliage Plant </h2>
  </hgroup>
</header>
<section>
  <p> Rotating Turn Table on which Foliage
Plant is placed </p>
  <figure>
    <img class="alignleft size-medium
wp-image-20"
    title="my plant"
src="http://examples.com/blog/images/pc.jpg"
    alt="" width="300" height="225" />
    <figcaption>
      Operating Dial <br />
    </figcaption>
  </figure>
</section>
<programcode type="bytecode/java">
// Processing using Java Codes
</programcode>
<script type="text/javascript">
function {
  // Obtaining 4 Photo Sensor Outputs and
Presuming Light-coming Direction from Positions of 2
Photo Sensors Providing Largest/Larger Outputs
}
function {
  // Outputting Instruction Relating to
Rotation Direction and Rotation Amount of Dial
Operation
}
function {
  // Based on Output Instruction, Rotating
Stepping Motor so that Specific Position of Turn Table
faces Presumed Light-coming Direction
}
```

```
</script>
<footer>
    <p>Posted by <address><a
href="profile.html">A-man</a></addreess></p>
</footer>
</article>
```

In the above example, although a concrete sample of Java codes to be sandwiched between <programcode> and </programcode> is omitted for convenience' sake, a skilled person in the art can describe suitable source codes by using the Java language or the like. The described source codes may be compiled to the corresponding Java bytecode (abbreviated as JBC) by using the integrated developing environment of Java (such as "Eclips"). Incidentally, if a browser cannot execute the JBC sandwiched between <programcode> and </programcode> (e.g., no Java Virtual Machine JVM runs), the description between <programcode> and </programcode> is ignored. (The words or symbols of tags <programcode> and </programcode> are mere examples. Other words or symbols may be used for the tags for sandwiching the Java codes or JBC.)

In the above example, although a concrete sample of JavaScript to be sandwiched between <script> and </script> is omitted for convenience' sake, a skilled person in the art can also describe suitable JavaScript. (Or, suitable source codes may be described by using Java language and the described source codes may be cross-compiled to the corresponding JavaScript by using GWT, for example.)

Figure 42:
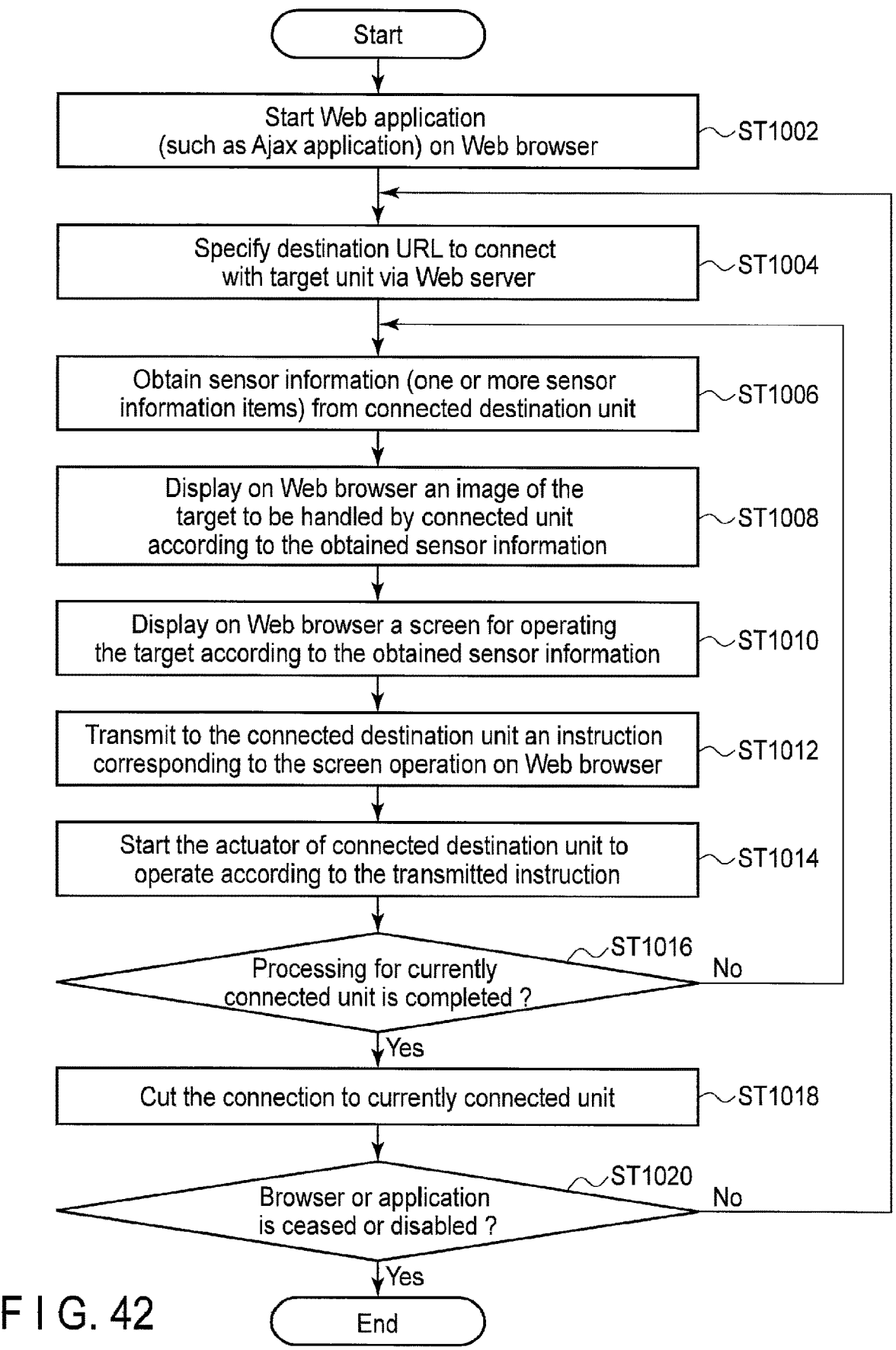
FIG. 42 exemplifies a method of remote-controlling the operation target via Internet.

FIG. 42 exemplifies a method of remote-controlling the operation target via Internet. FIGS. 43A and 43B show an example of remote-controlling a specific operation target within a plurality of operation targets connected to a receiver-side network, wherein a communication terminasu such as a smart phone is used for the transmitter-side information control.

In the home screen of smart phone 5000 shown in FIG. 43A, home button (icon) 5000h serves as a start button. If a user doubly taps home button 5000h, the system of the smart phone starts. Soon after, a fingerprint sensor area (not shown) is displayed on the screen of smart phone 5000. If the ball of the user's right-hand thumb touches the fingerprint sensor area, the fingerprint of the thumb may be certified according to the FIDO (Fast IDentity Online) standard, for example. (The FIDO is only an example, and the certification is not limited to the FIDO only. The fingerprint certification may be skipped if the certification is not required.) Smart phone 5000 is equipped with a virtual machine (such as JVM). As one of Java applications to be executed by the JVM, a fingerprint certification program may be stored in application program file 4500 in FIG. 38A. If it is confirmed by the fingerprint certification that a formal user handles smart phone 5000 (or if the fingerprint certification is skipped), various icons as shown by the left side illustration of FIG. 43A are displayed on the screen.

Suppose that the user doubly taps Web browser icon 5000b. Then, the display screen is switched to a screen of the Web browser (or a home screen of the provider) installed in smart phone 5000, as shown by the right-side illustration of FIG. 43A. From the home screen an application using, e.g., Ajax or HTML5 can be started by the user's manipulation (ST1002 in FIG. 42).

Displayed on the home screen shown by the right side of FIG. 43A are search keyword input frame 5320, "thumbnail image (e.g., an image of the pets in a home) of registered URL1" 5304, "thumbnail image (e.g., an image of the EPG reserving table for a video recorder) of registered URL2" 5306, "thumbnail image (e.g., an image of the grandmother under medical care) of registered URL3" 5308, software keyboard icon 5410, and so on.

If the finger of a user touches, e.g., thumbnail picture (pets in home) 5304 of registered URL1, smart phone 5000 is connected via the Web server (6200 or 6300) to one of the units (6610 to 6630) configured to manage home/personal thing(s) including the home pets as exemplified by the right side of FIG. 43B (ST1004 in FIG. 42). Under this connection, smart phone 5000 may obtain one or more sensor information items (such as information items of a camera image and microphone sound) from the connected unit (e.g., 6610) (ST1006 in FIG. 42).

According to the obtained sensor information items (camera image and microphone sound), the image of the target to be handled by the connected unit may be displayed on the screen (the site screen shown by the left side of FIG. 43B) of the Web browser (ST1008 in FIG. 42). More specifically, if the user's finger touches thumbnail icon 5410 indicating his/her pet dog on the Web browser screen (left side of FIG. 43B), pet dog management unit 6610 is selected to be the connected unit, and image 6612 of a flatware for the pet dog, captured by the camera of the connected pet dog management unit 6610, may be displayed on screen 5400 of smart phone 5000. Live sound (captured by a microphone of unit 6610) near the flatware may be output from a speaker assembled in smart phone 5000, if it is better to do so.

According to the information (e.g., information indicating actuators operable for the connected unit) obtained from connected pet dog management unit 6610, a screen for operating the connected unit may be displayed on screen 5400 of smart phone 5000 (ST1010 in FIG. 42). The user can know that no feed remains on the pet dog flatware from, e.g., a camera-image of the flatware. If no feed remains, the user may send a suitable instruction to the actuator (e.g., an automatic feeder for automatically supplying given feed to the pet dog flatware) of unit 6610. The suitable instruction may be derived from, e.g., the user's voice such as "feeding xxx (something)" by using a known voice recognition processing. (If the voice recognition processing is successfully done, the character string corresponding to the recognized voice may be displayed on screen 5400 of smart phone 5000.) Or, if the no feed state is detected from the camera-image of the pet dog flatware, a registered script (instruction) for feeding xxx (something) may be automatically selected and executed.

The instruction (or script) thus obtained may be transmitted from smart phone 5000 to unit 6610 by double-tapping the area of icon 5440 configured to transmit the instruction to displayed unit 6610 (ST1012 in FIG. 42). According to the transmitted instruction, actuator 6614 of connected unit 6610 starts to operate so that given feed is supplied to the pet dog flatware (ST1014 in FIG. 42). The user may confirm from pet dog flatware image 6612 displayed on screen 5400 of smart phone 5000 that a suitable amount of the given feed has been supplied to the pet dog flatware.

The processes of ST1006 to ST1014 may be repeated, if the processing for the currently connected unit 6610 is not completed (e.g., if the user becomes aware from the displayed image that the amount of the supplied feed may be insufficient) (NO at ST1016 in FIG. 42). If the processing for the currently connected unit 6610 is completed (YES at ST1016 in FIG. 42), the connection to that unit 6610 is cut (ST1018 in FIG. 42).

If "water-supplying" or "feeding/water-cleaning" has to be performed for another unit (e.g., little-bird management unit 6620 or goldfish management unit 6630) (NO at ST1020 in FIG. 42), other processings similar to the processing for unit 6610 may be performed accordingly. The connection change for the target units may be done by double-tapping the corresponding icon (e.g., "parakeet thumbnail image" icon 5420 or "goldfish thumbnail image" icon 5430 shown in the left side of FIG. 43B). If the processings for the target unit(s) (any of 6610 to 6630) are completed, the browser or the application program may be closed (YES at ST1020 in FIG. 42).

A first format (aforementioned C-format) may be used for the short distance communication between server 6300 and each of management units 6610 to 6630 (which may be operated automatically by using computer programs). (USB or Bluetooth may be used for the short distance communication.) A second format (aforementioned A-, E-, or W-format) may be used for the long distance communication between smart phone 5000 and cloud server 6200 to which management units 6610 to 6630 are indirectly connected, (4G-LTE, for example, may be used for the long distance communication.) Further, the second format (aforementioned A-, E-, or W-format) may be used for the short distance communication between smart phone 5000 and home-network server (fog server) 6300 to which management units 6610 to 6630 are directly connected, (Wi-Fi or ZigBee can be used for the short distance communication.) If the second format is used, HTML5, Ajax, WebSocket connection, etc. may be adapted.

Each of management units 6610 to 6630 may have image sensors (such as CCD cameras) 6612 to 6632 configured to supply image information to the side of smart phone 5000, actuators 6614 to 6634 configured to be controlled from the side of smart phone 5000, memories 6616 to 6636, microcomputers (MPU/CPU) 6618 to 6638 configured to constitute a virtual machine (JVM), and so on, as the case may be.

Home-network server (fog server or system controller/format converter) 6300 may have management information memory 6306 configured to store various information including information of FIGS. 38A and 38B, virtual machine (JVM) 6308 configured to execute various processings by using information stored in memory 6306, etc., as the case may be.

FIGS. 44A and 44B show an example of remote-controlling a specific operation target, using communication terminals such as smart phones at the operation information transmitter-side and at the operation information receiver-side. Similar to the case of FIG. 43A, if home button 5000*h* on the home screen of smart phone 5000 shown in FIG. 44A is tapped, the system of smart phone 5000 starts to operate. By using, e.g., a fingerprint recognition processing, if it is detected that a formal user manipulates smart phone 5000 (or if the fingerprint recognition processing is properly skipped), various application icons appear on the screen as shown by the left side of FIG. 44A.

If the user doubly taps remote-control icon 5000*a*, the corresponding remote-control application (Java application or applet) installed in smart phone 5000 starts. Then, the display screen of smart phone 5000 is changed to another screen to select the destination of connection, as exemplified on the right side of FIG. 44A. Displayed on the selection screen may be an input frame to newly input a telephone number, one or more registered telephone number lists L1, L2, . . . , transmitted telephone number list T1, received telephone number list R1, etc. A target to be remote-controlled may be selected by using the displayed new telephone number input frame, or one of the displayed registered telephone number lists.

Assume that the target to be remote-controlled is foliage plant 4611 (cf. the right side of FIG. 44B) coupled to smart phone 5600 which may be specified by the telephone number (or by information to designate the connection destination) registered on telephone number list L1. Further, each of smart phones 5000 and 5600 is equipped with a virtual machine (such as Java Virtual Machine JVM; Android™ RunTime ART) and necessary memories.

If smart phone 5600 (right side of FIG. 44B) is specified by using registered telephone number list L1 (right side of FIG. 44A), smart phone 5000 is wirelessly connected to smart phone 5600 via server 6400. In this connection, the aforementioned second format (A-, E-, or W-format) may be used, and HTML5, Ajax, WebSocket connection, etc. may be adapted. Otherwise, a telephone line of, e.g., IP-TV, may be used for the connection (for a long distance communication).

Server 6400 may be a service provider who can provide various services including a remote-control service to one or more users, or may be a base station of communication. Server 6400 may have various functions similar to or equivalent to the functions of system controller/format converter 6300 shown in FIG. 43B.

If the connection between smart phones 5000 and 5600 is established, a foliage plant control application installed in smart phone 5600 may be activated. (The foliage plant control application may be a Java application which can be executed by JVM or ART.) If the foliage plant control application is activated, information on foliage plant 4611 (control target) is transmitted from smart phone 5600 (connection destination) to smart phone 5000 (connection source). The transmitted information may include information on the image of foliage plant 4611, and/or information on the current status of foliage plant 4611 wherein the current status may indicate the rotational position of the turn table, the light coming direction, etc. Then, the image of foliage plant 4611 may be displayed on window 5100 of smart phone 5000 (connection source), and a touch-operation screen to operate the turn table on which foliage plant 4611 is placed may be displayed on window 5200 of smart phone 5000, The contents displayed on windows 5100 and 5200 may be similar to or equivalent to those shown by FIG. 39.

The aforementioned first format (C-format) may be applied to the short distance connection between smart phone 5000 and the turn table unit on which foliage plant 4611 is placed. USB or Bluetooth may be used for that short distance connection.

Window 5700 of smart phone 5600 (connection destination) may display the live video and the name (or abbreviation) of the user who manipulates smart phone 5000 (connection source), and/or the live voice of the user may be output from a speaker of smart phone 5600. (The user's video and/or voice can be provided at the side of smart phone 5600 as the case may be.)

Window 5800 of smart phone 5600 (connection destination) may display an image (just before the control) of foliage plant 4611 and another image (just after the control by using the operation screen of smart phone 5000) thereof. Thus, the just-before-control image and the just-after-control image can be displayed freely or optionally. By so doing, a user (e.g., a wife at home) of connection destination smart phone 5600, who takes the phone at rare intervals, can know how foliage plant 4611 is rotated by the remote-control performed by another user (e.g., a husband outside the home) of connection source smart phone 5000. In other words, even if the user of the connection destination does not know whether remote-control is performed by the other user of the connection source, the connection destination user can confirm the result of the remote-control.

As the control target, pet dog management unit 6610 of FIG. 43B may be taken in place of foliage plant 4611 of FIG. 44B. Suppose that the husband outside the home performs remote-control of feeding by using smart phone 5000, and the pet dog eats all of the fed meat soon after the remote-control feeding. In this case the wife coming back from shopping could erroneously re-feed the pet dog on meat. Such erroneous double feeding can be avoided by looking the current dog's flatware and the images (views around the flatware before and after feeding) on window 5800 of FIG. 44B.

In the following explanation will be given for various embodiments.

<Re: Automatic Connection of Devices on Network>

Device connection on a network (including Internet) can be automated by using known technique such as Universal Plug & Play (abbreviated as UPnP). The UPnP is a protocol by which a merely connected device can enter for the network. According to the UPnP, the connected device can properly set the network parameters. Further, according to the UPnP, the connected device can detect what devices exist in the network, and can know what functions are owned by other existing devices. (As examples of UPnP-automatically enterable devices on the network, there are system controller α and one or more units in FIG. 2, or the device controller and one or more sensors/actuator modules in each of the units.)

Here a brief description will be given to the device architecture of UPnP. According to the UPnP, devices having various functions and control points for controlling the devices are defined. The device discloses its own functions in the form of XML. The control point is configured to use the required function(s) by referring to the disclosed device functions.

According to the specification of UPnP, (1) addressing, (2) discovery, (3) description, (4) control, (5) event notification, and (6) presentation are generously defined. (1) The addressing specifies a method of obtaining an address when the device enters the network. (2) In the discovery, a specific protocol is used to detect the device(s) on the network. More specifically, the device being entered to the network sends a multicast packet (by NOTIFY method), and the control point receives the multicast packet to detect that device. If the control point sends an inquiry by using a multicast packet (by M_SEARCH method), the device responds to the inquiry. (3) The description is an XML file in which described are functions and information obtainable from the device. There are two types of the description: a device description and a service description. The device description describes the service, etc. owned by the device. The service description describes the action, etc. owned by each service. (4) In the control, an action (message) to call the function of service and a query (message) to inquire the state variable of the device are used. The action/query messages are described by XML. (5) If a particular state variable is specified for the device to require an event subscription, the event notification is issued each time the state variable changes. (6) In the presentation, the state of the device can be confirmed from a Web browser, or the state confirmation can be controlled from the Web browser.

<Re: Disclosed Major Formats>

According to the disclosed embodiments, the A-format may cover a "broad text style", the C-format may cover "command/request/response/status styles", the E-format may cover a "style to store setting codes in a given area", the W-format may cover a "style to describe the transmission side in a given space" or a "style to describe tags peculiar to HTML/HTML5." These formats may be classified to the first or second data format.

<Re: Format Conversion>

According to the embodiment of FIGS. 1 and 2, for example, system controller β1128 uses the first data format (such as the C-format) to perform communication (internal communication of the system) among a plurality of units 1290 via system controller α1126. The second data format (such as the A-/E-/W-format in FIG. 17B) may be used for the communication (external communication of the system) among system controller β1128 and the cloud (e.g., server n 1116-*n*). To achieve such communication using the different formats, system controller α1126 or system controller β1128 may be equipped with a format converter for converting the first format information to the second format information (or converting the second format information to the first format information). By using the format converter, data of the first format and other data of the second format corresponding to the first format data can be transmitted by different communication methods. (For instance, data having contents corresponding to the data sent in a Bluetooth format may be transmitted in a ZigBee format. Or, data having contents corresponding to the data sent in the ZigBee format may be transmitted in the Bluetooth format.)

Note that the C-format (an example of the first data format) may be a format (cf. FIG. 14 and section 2.5, etc.) in which the communication information is simplified and the format is used in communication middleware layer APL02 in FIG. 10A, for example. The information communication protocol in the C-format is simple and may be reduced to practice by using the "command/request/response/status style" as in the cases 1 to 3 of FIG. 10B, for example.

The A-format (an example of the second data format) may be a format (cf. FIG. 15B and section 2.7, etc.) in which a plurality of information items can be transmitted simultaneously and the format is used in communication middleware layer APL06 in FIG. 10A, for example. Incidentally, the E-format (cf. FIG. 15A and section 2.6, etc.) or the W-format (cf. FIG. 10A) may be used for the second data format. In the second data format, the communication information of extended application layer EXL06 in FIG. 10A can also be used.

If World Wide Web (often abbreviated as Web) is used for the information communication via out-system network line 1788 as shown in FIG. 10A, the W-format is suitable for the second data format. If the W-format is used, server n 116-*n* or system controller α1126 shown in FIG. 1 may have the function of a Web server. In this case, the transmitter side (e.g., server n in FIG. 10A) of communication information designates the receiver side (e.g., a specific complex module to be connected to system controller α) by using URL, and the communication information is automatically written in a write column/write frame/write space (for the specific complex module) specified according to the form style in the Web page. If the communication of write information is completed, the receiver side (e.g., system controller α in FIG. 10A) stores the received information (or the result of processing the received information) as management information (e.g., at 1744 in FIG. 10A) according to a given program (e.g., PHP or Java program). (If the transmitter side is system controller α, then the receiver side may be server n, and the received information or the processing result of the received information can be stored as management information 1748.)

One or more write columns/write frames/write spaces specified by the form style may be provided in the same Web page (or, each of one or more complex modules may have one or more write columns/write frames/write spaces, for example.) By so doing a setting of "bulk communication (transmission)" of plural information contents becomes possible by using the W-format. Or, the W-format disclosed by the embodiment may cover various formats of information communication wherein the transmitter side writes given information in one or more write columns/write frames/ write spaces pre-specified by the receiver side. Further, the disclosed W-format may cover various formats wherein "tag(s)" peculiar to HTML or HTML5 is(are) used.

If such a format in which bulk communication of information items including various contents is possible is adopted, frequencies of communication between transmitter and receiver sides can be reduced, to thereby lessen a risk of communication stagnation. Asynchronous communication technique of Ajax (Asynchronous JavaScript+XML) may be used for the bulk communication. If the Ajax communication is used, so long as changes in information items of the bulk communication stay at part of a Web page, it is not necessary to rewrite the whole Web page each time the bulk communication is done. In this case it is necessary to rewrite only the part required to be changed according to given write information. Then, not only the frequencies of communication are reduced by the bulk communication, but also the amount of information in each communication is reduced, to thereby further lessen a risk of communication stagnation.

According to HTML5, contents of information in the bulk communication may include information items relating to a video element for moving pictures, an audio element for voices, and a canvas element for 2D/3D graphics. Since the amount of information on the video element is large, the W-format (wherein frequencies of communication can be reduced by using bulk communication, and asynchronous communication of Ajax can be used) would be worthy in the world of a Web communication including communications of moving pictures.

For instance, USB wired communication, Bluetooth wireless communication, or ZigBee wireless communication may be used for the information communication (chiefly short distance communication) of the first data format. Further, for the information communication (chiefly medium to long distance communication) of the second data format, Wi-Fi (suitable for the medium distance wireless communication) or WiMAX (applicable to the long distance wireless communication) may be used, for instance. Otherwise, wireless communication technique (such as 4G-LTE) of a cell phone (smart phone) or optical cable communication technique may be used for information communication of the second data format.

If the W-format is used as the second data format, HTML5 or Ajax may be adapted. (In this case a Web browser for HTML5 is used.) In the information communication of HTML5, an information protection element (e.g., keygen element by which a secure key (private/secret key) and a public key (open key) are issued when the form is transmitted) may be used. For instance, personal information sent with the C-format (first data format) from a client device (such as a complex module) can be protected by using the information protection element, and the protected personal information can be transmitted with the W-format (second data format) to the server side via Internet.

Although both the first data format (such as C-format) and the second data format (such as W-format) can be used to transmit common information contents, the format type of the former differs from that of the latter. For this reason, in the embodiment, the first data format (such as C-format) is converted into the second data format (such as W-format) and vice versa, as the case may be. This format conversion would be similar to the format conversion between an MPEG-2 signal and an MPEG-4 signal, or the format conversion between a DVD-VR signal and a BD-AV signal. In such format conversions, although common signal contents (e.g., video programs) may be converted unchangedly, their attributes, etc. (e. g., a copyright protection method, a transmission packet configuration, an average transmission rate, and the like) may be changed.

<Re: Programming Languages>

[1] The first example of the programming languages in the embodiment may be Java language (the newest version on 2015 is Java8) having rich libraries (class libraries). Source codes written in the Java language may be compiled into the corresponding Java Byte Codes (JBC), and the compiled JBC may be executed by a Java Virtual Machine (JVM).

The JBC can be created by using a programming language other than Java. For instance, Scalable language (Scala) may be used to create JBC. Further, the JBC can be executed by a virtual machine other than JVM. For instance, Android RunTime (ART) may be used to execute JBC. Unless otherwise noted, in the explanation of the embodiment, all virtual machines for executing JBC may be represented by the JVM.

[2] The second example of the programming languages in the embodiment may be JavaScript. The program codes written in the JavaScript may chiefly be executed in a Web browser. The Web browser may execute program codes (such as JBC fetched by the Web browser and executed by JVM) other than the JavaScript. If JVM is activated, various applications such as Java applets can also be executed.

In the explanation of the embodiment, the term "JavaScript" is used to cover various cases including a case wherein an ECMA Script is used. In that sense, the script languages used by major browsers are all JavaScripts, substantially. In the explanation of the embodiment, unless otherwise noted, the script languages used by browsers are all represented by JavaScript.

A Web browser may execute various processings described by Ajax (Asynchronous JavaScript+XML) or by HTML (HTML5+JavaScript+CSS) in which JavaScript and CSS (Cascading Style Sheets) are embedded. The Web browser can recognize as JavaScript codes the part between <script> and </script> to execute the recognized codes.

[3] Hypertext Preprocessor or PHP (Personal Home Page) may be another example of programming languages usable in the embodiment. The PHP may be used to execute PHP scripts on a Web server and to send the execution result to a Web browser. The PHP can recognize as PHP codes the part between "<?PHP" and "?>" to execute the recognized codes. The PHP may output as HTML codes all of other remaining parts as it is.

[4] Java Servlet may be still another example of programming languages usable in the embodiment. The Java Servlet is provided with JSP (Java Server Pages) as one of its functions. The JSP may be used to make the JVM of a Web server to execute the Java codes embedded in HTML and to dynamically create a Web page(s) at the Web server side. The created Web page(s) may be sent to a client(s).

[5] C language (C, C++, etc.) may be yet another example of programming languages usable in the embodiment. High-speed native codes to be executed by actual computer devices (CPU/MPU) may be described by using the C language. If JNI (Java Native Interface) is adapted, the native codes of C++ may be utilized from Java language, for example.

[6] Codes of a certain programming language may be converted into the corresponding codes of another programming language. For instance, Java codes (its source codes or Byte codes) may be converted into Ajax (Asynchronous JavaScript+XML) or HTML (HTML5+JavaScript+CSS3) by using GWT (Google Web Toolkit). Thus, the codes of HTML5+JavaScript can be obtained not only by directly describing in the code form of HTML5+JavaScript but also by converting the corresponding source codes (or Byte codes) of Java language by using a conversion software such as GWT.

<Re: Java Class Library (JCL)>

JCL (Java Class Library) indicates a group of dynamically loadable libraries which can be called from Java application(s) being executed. Since a Java platform does not depend on a particular OS (operating system), the Java application(s) cannot use the libraries of OS. In place, the Java platform generally supplies us with standard libraries including various functions conventionally provided by recent operating systems.

Although almost all parts of JCL are written in Java, some parts thereof (configured to directly access hardware or OS; e.g., Input/Output part, bitmap graphics part) may be written in a programming language other than Java. Some class of Java configured to directly access the hardware or OS may use JNI (Java Native Interface) as a "lapper" for API (Application Programming Interface) of OS.

Almost all JCL is stored in a single Java archival file "rt.jar" and the JCL is distributed as a part of JRE (Java Runtime Environment) or JDK (Java Development Kit). The JCL (in "rt.jar") may be located on a default bootstrap class pass, so that each application may omit a designation to the class pass. According to Java Runtime, a bootstrap class loader may be used to search for the JCL.

The function of JCL may be accessed through a group of classes being capsuled in a package. The capsuled package may be as follows:

The package of Java.lang may include a group of interfaces and basic classes closely related to the language and the runtime system.

The function of accessing a file system or a network may be supplied through packages of Java.io, Java.nio, and Java.net. In the network, SCTP (Stream Control Transmission Protocol) may be provided by using com, sun, nio, and sctp, The package of java.math may provide integer/decimal operation with arbitrary minuteness (or precision).

The package of collection and utility may provide an incorporated (or integrated) collection data structure and utility classes. This package may be used for formal expression, parallel calculation, logging, data compression, and so on.

In the packages of GUI and 2D graphics, an AWT (Abstract Window Toolkit) package (java.awt) may provide API of the 2D graphics and the GUI depending on a native OS. A Swing package (javax.swing) may provide, based on the AWT, a look-and-feel and a widget toolkit being independent of OS. Further, editable and non-editable text components may also be provided.

The package of sound may provide a group of interfaces and classes for reading sound data and/or reproducing/synthesizing sound data.

In the package of text, java.text may handle text, date, numerical values, and messages.

In the package of images, java.awt.image and javax.imageio may provide APIs for reading/writing and correcting images.

The package of XML may provide a Web service of SOAP (Simple Object Access Protocol) and JAX-WS (Java API for XML Web Services), by using the API of SAX (Simple API for XML), DOM (Document Object Model), StAX (Streaming API for XML), XSLT (XML Stylesheet Language Transformations), XPath (XML Path Language), etc.

Further provided are the packages of CORBA (Common Object Request Broker Architecture) and RMI-API (Remote Method Invocation API, including an incorporated Object Request Broker).

Further provided are the packages of java.security (providing a security function) and javax.crypto (providing an encryption service).

In the package of database, an SQL (Structured English Query Language) database may be accessed by using java.sql.

In the access to a script engine, an arbitrary script language can be accessed by using the package of javax.script.

In the package of applet, an application may be downloaded via a network by using java.applet to operate in a protected sandbox.

In the package of JavaBeans, java.beans may provide a means for operating a re-usable component-group.

In the packages of introspection and reflection, java.lang.Class may indicate a class, and another class such as Method or Constructor may be located at java.lang.reflect.

<Simple Example of Formal Expression Processing Using Java>

If a formal expression is used, a check pattern is created to define what is the target to be matched. Then, it is checked whether the target character(s) is(are) matched to the created check pattern.

(Program Example: RegexSample)

```
import java.util.regex.Pattern; // import
"Pattern" class from "java.util.regex" package.
import java.util.regex.Matcher; // import
"Matcher" class from "java.util.regex" package.
public class RegexSample{
    public static void main(String args[ ]) {
        String str = "12A3B5"; // target
character string to be checked.
        Pattern p = Pattern.compile("^[0-
9]*$"); // check pattern to define what is the target
of matching (to determine, e.g., whether the target
character string comprises only one-byte numeric
characters or half-width numeric characters).
        Matcher m = p.matcher(str); // to
determine whether the target character string matches
the check pattern.
        System.out.println(m.find( )); //
    }
}
```

(Result of Executing RegexSample)

Output "false" because the target character string comprises characters (e.g., "A", "B" and "5") which are not the one-byte numeric characters. If the the target character string comprises "12346789" (all one-byte numeric characters), then the result of executing RegexSample will be "true."

<Examples of Math Class Usable in Embodiments>

The JCL (Java Class Library) includes libraries of various classes. The JCL will be explained in detail using part of the math class as an example. The math class is a class library provided for executing basic mathematical operations such as exponential function, logarithmic function, square root function, trigonometrical function, and so on. (Similar functional libraries are provided for JavaScript.)

Since the math class is contained in the java.lang package, no import description is required to use the math class. Further, since all methods of the math class are static methods, the math class can be used even if no object of the math class is created. (Namely, it is possible to use a static method of the math class even if no instance is provided.)

The math class includes the following methods (functions):

```
[Function "abs" for obtaining an absolute
value]
    public static double abs (double a) // return
the absolute value of doubule-type argument a.
    public static float abs(float a) // return
the absolute value of float-type argument a.
    public static int abs(int a) // return the
absolute value of int-type argument a.
    public static long abs(long a) // return the
absolute value of long-type argument a.
    (Program example: mathabs)
    class mathabs{
        public static void main(String args[ ]) {
            for (int i = −1 ; i < 2 ; i++){
                System.out.println("the absolute value
of" + i + "is" + Math.abs(i) + ".");
            }
        }
    }
```

(Result of Executing Mathabs)
Output "the absolute value of −1 is 1."
Output "the absolute value of 0 is 0."
Output "the absolute value of 1 is 1."

[Function "max" for obtaining the larger one of values (the compared two values are the same type)]
public static double max(double a, double b) // return the larger value (closer to the positive infinite) of double-type arguments a and b. If the two arguments have the same value, return the same value.
public static double max(float a, float b) // return the larger value (closer to the positive infinite) of float-type arguments a and b. If the two arguments have the same value, return the same value.
public static double max(int a, int b) // return the larger value (closer to the positive infinite) of int-type arguments a and b. If the two arguments have the same value, return the same value.
public static double max(long a, long b) // return the larger value (closer to the positive infinite) of long-type arguments a and b. If the two arguments have the same value, return the same value.
(Program Example: Mathmax)

```
class mathmax{
    public static void main(String args[ ]){
        int a = 7;
        int b = 5;
        System.out.println("as for [" + a + "]
and [" + b + "],");
        System.out.println("[" + Math.max(a, b) +
"] is larger.");
    }
}
```

(Result of Executing Mathmax)
Output "as for [7] and [5],"
Output "[7] is larger."

[Function "min" for obtaining the smaller one of values (the compared two values are the same type)]
public static double min(double a, double b) // return the smaller value (closer to the negative infinite) of double-type arguments a and b. If the two arguments have the same value, return the same value.
public static double min(float a, float b) // return the smaller value (closer to the negative infinite) of float-type arguments a and b. If the two arguments have the same value, return the same value.
public static double min(int a, int b) // return the smaller value (closer to the negative infinite) of int-type arguments a and b. If the two arguments have the same value, return the same value.
public static double min(long a, long b) // return the smaller value (closer to the negative infinite) of long-type arguments a and b. If the two arguments have the same value, return the same value.
(Program Example: Mathmin)

```
class mathmin{
    public static void main(String args[ ]){
        int a = 7;
        int b = 5;
        System.out.println("as for [" + a + "]
and [" + b + "],");
        System.out.println("[" + Math.min(a, b) +
"] is smaller.");
    }
}
```

(Result of Executing Mathmax)
Output "as for [7] and [5],"
Output "[5] is smaller."

[Functions "sqrt, cbrt" for obtaining square root and cube root]
public static double sqrt(double a) // return the square root of double-type argument a.
public static double cbrt(double a) // return the cube root of double-type argument a.
(Program Example: Mathsqrtcbrt)

```
class mathsqrtcbrt{
    public static void main(String args[ ]){
        double a = 9d;
        double b = 216d;
        System.out.println("the square root of
["+ a + "] is");
        System.out.println("[" + Math.sqrt(a) +
"].");
        System.out.println("the cube root of ["+
b + "] is");
        System.out.println("[" + Math.cbrt(b) +
"].");
    }
}
```

(Result of Executing Mathsqrtcbrt)
Output "the square root of [9.0] is"
Output "[3.0]."
Output "the cube root of [216.0] is"
Output "[6.0]."
[Function "pow" for obtaining an involution value]
public static double pow (double a, double b) // return the continued product obtained by involving the double-type first argument (radix) a with the double-type second argument (index or exponent) b.
(Program Example: Mathpow)

```
class mathpow{
    public static void main(String args[ ]){
        double a = 2d;
        double b = 3d;
        System.out.println("continued product of
[" + a + "] with exponent of [" + b + "] is");
        System.out.println("[" + Math.pow(a, b) +
"].");
    }
}
```

(Result of Executing Mathpow)
Output "continued product of [2.0] with exponent of [3.0] is"
Output "[8.0]."
[log functions "log, log 10, log 1p"]
public static double log(double a) // return the natural log value of double-type argument a with the base of "e" (return the value X=ln(a) for a=e^ (X)).
public static double log 10(double b) // return the log value of double-type argument b with the base of "10" (return the value X=log 10(b) for b=10^ (X)).
public static double log 1p(double c) // return the natural log value of double-type argument c plus "1" with the base of "e" (return the value X=ln(1+c) for (1+c)=e^(X)).
(Program Example: Mathlog)

```
class mathlog{
    public static void main(String args[ ]){
        double a = 39d;
        double b = 1000d;
        double c = 0.1d;
        System.out.println("the natural logarithm
of [" + a + " is");
        System.out.println("[" + Math.log(a) +
"].");
        System.out.println("the logarithm with
the radical of [" + b + "] is");
        System.out.println("[" + Math.log10(b) +
"].");
        System.out.println("the antilogarithm of
[" + c + "+1] is");
        System.out.println("[" + Math.log1p(c) +
"].");
    }
}
```

(Result of Executing Mathlog)
Output "the natural logarithm of [39.0] is"
Output "[3.6635616461296463]."
Output "the logarithm with the radical of [1000] is"
Output "[3.0]."
Output "the antilogarithm of [0.1+1] is"
Output "[0.09531017980432487]."
[functions "cell, floor, round" (in "round" method, type of argument differs form type of return value)]
public static double ceil(double a) // return the minimum (closest to the negative infinite) double value which is equal to or more than the value of double-type argument a and equal to the calculated integer (raising to a unit).
public static double floor(double a) // return the maximum (closest to the positive infinite) double value which is equal to or less than the value of double-type argument a and equal to the calculated integer (discarding fractions).
public static long round(double a) // return the long value closest to the value of double-type argument a (counting fractions of 0.5 and over as a whole number and discarding the rest).
public static long round(float a) // return the int value closest to the value of double-type argument a (counting fractions of 0.5 and over as a whole number and discarding the rest).
(Program Example: Mathceilfloorround)

```
class mathround{
    public static void main(String args[ ]){
        double a = 1.23d;
        double b = 3.78d;
        double c = -0.34d;
        double d = -3.78d;
        System.out.println("for ["+ a +"]"):
        System.out.println("ceiling is ["+
Math.ceil(a) +"]"):
        System.out.println("flooring is ["+
Math.floor(a) +"]"):
        System.out.println("rounding is ["+
Math.round(a) +"]"):
        System.out.println("for ["+ b +"]"):
        System.out.println("ceiling is ["+
Math.cell(b) +"]"):
        System.out.println("flooring is ["+
Math.floor(b) +"]"):
        System.out.println("rounding is ["+
Math.round(b) +"]"):
        System.out.println("for ["+ c +"]"):
        System.out.println("ceiling is ["+
Math.ceil(c) +"]"):
        System.out.println("flooring is ["+
Math.floor(c) +"]"):
        System.out.println("rounding is ["+
Math.round(c) +"]"):
        System.out.println("for ["+ d +"]"):
        System.out.println("ceiling is ["+
Math.ceil(d) +"]"):
        System.out.println("flooring is ["+
Math.floor(d) +"]"):
        System.out.println("rounding is ["+
Math.round(d) +"]"):
    }
}
```

(Result of Executing Mathceilfloorround)
For [1.23]
ceiling is [2.0]
flooring is [1.0]
rounding is [1]
For [3.78]
ceiling is [4.0]
flooring is [3.0]
rounding is [4]
For [−0.34]
ceiling is [−0.0]
flooring is [−1.0]
rounding is [0]
For [−3.78]
ceiling is [−3.0]
flooring is [−4.0]
rounding is [−4]-

<Summary of Typical Functions of Math Class Constituting Part of Java Class Library>

Exemplified function 01: static double abs(double a): return the absolute value of double value;

Exemplified function 02:static float abs(float a):return the absolute value of float value;

Exemplified function 03:static int abs(int a): return the absolute value of int value;

Exemplified function 04:static long abs(long a): return the absolute value of long value;

Exemplified function 05:static double max(double a, double b): return the larger value of two double values;

Exemplified function 06:static float max(float a, float b): return the larger value of two float values;

Exemplified function 07:static int max(int a, int b): return the larger value of two int values;

Exemplified function 08:static long max(long a, long b): return the larger value of two long values;

Exemplified function 09:static double min(double a, double b): return the smaller value of two double values;

Exemplified function 10:static float min(float a, float b): return the smaller value of two float values;

Exemplified function 11:static int min(int a, int b): return the smaller value of two int values;

Exemplified function 12:static long min(long a, long b): return the smaller value of two long values;

Exemplified function 13:static double sqrt(double a): return the square root of double value;

Exemplified function 14:static double cbrt(double a): return the cube root of double value;

Exemplified function 15:static double pow(double a, double b): return the value for which first argument a is involved by second argument b (or, a to the power of b is the returned value);

Exemplified function 16:static double log(double a): return the natural logarithm (base is e) of double value a;

Exemplified function 17:static double log 10(double b): return the logarithm (base is 10) of double value b;

Exemplified function 18:static double log 1p(double c): return the natural logarithm (base is e) of double value c+1;

Exemplified function 19:static double exp(double a): return the value for which the Eular Number e is exponentially processed by double value a (or, e to the power of a is the returned value);

Exemplified function 20:static double ceil(double a); return the minimum (closest to the negative infinite) double value which is equal to or more than the value of argument a and equal to the calculated integer (raising to a unit).

Exemplified function 21:static double floor(double a): return the maximum (closest to the positive infinite) double value which is equal to or less than the value of argument a and equal to the calculated integer (discarding fractions).

Exemplified function 22:static double rint(double a): return the double value closest to the value of argument a and equal to the calculated integer (counting fractions of 0.5 and over as a whole number and discarding the rest).

Exemplified function 23:static long round(double a): return the long closest to argument a (counting fractions of 0.5 and over as a whole number and discarding the rest).

Exemplified function 24:static int round(float a): return the int closest to argument a (counting fractions of 0.5 and over as a whole number and discarding the rest).

Exemplified function 25:static double IEEEremainder (double f1, double f2): calculate the remainder of two arguments according to the IEEE 754 standard.

Exemplified function 26:static double random( ): return the double value with the positive sign being equal to or more than 0.0 and being less than 1.0.

Exemplified function 27:static double toDegrees(double angrad): convert the angle of radians to the corresponding angle of degrees.

Exemplified function 28:static double toRadians(double angdeg): convert the angle of degrees to the corresponding angle of radians.

Exemplified function 29:static double sin(double a): return the sine of the specified angle.

Exemplified function 30:static double cos(double a): return the cosine of the specified angle.

Exemplified function 31:static double tan(double a): return the tangent of the specified angle.

Exemplified function 32:static double a sin(double a): return the arc sine of the specified angle, within the range between $-\pi/2$ and $\pi/2$.

Exemplified function 33:static double a cos(double a): return the arc cosine of the specified angle, within the range between 0.0 and $\pi$.

Exemplified function 34:static double a tan(double a): return the arc tangent of the specified angle, within the range between $-\pi/2$ and $\pi/2$.

Exemplified function 35:static double a tan 2(double y, double x): convert the rectangular coordinate (x, y) into the corresponding polar coordinate (r, theta).

Although no example is given, libraries similar to those of Java are provided for existing programming languages (C/C++, JavaScript, etc.) other than Java. Some programming languages (other than Java) can use the Java libraries.

A Java functional library may be created by a user. User-created functions may be defined as user-defined functions. The user-defined functions may be created for different programming languages other than Java. For instance, the user-defined functions may be created for C or PHP. However, in the following the user-defined functions of Java will be exemplified.

Various methods (functions) contained in a Java class library may be combined as the case may be. For instance, if the math class is considered, "static double pow" of the involution may be combined with "static double log 10" of the logarithm. More specifically, involutional value y (=a to the power of b; or, y=a~b) may be obtained by using "static double pow(double a, double b)", and logarithmic value x (=log 10(y)) may be obtained by using "static double log 10(double y)." As a result, x=log 10(y)=log 10(a^b)=b*log 10(a), or "x" indicating the b-multiple log 10(a), is obtained. (Such a combinative function "log 10(a^b) or b*log 10(a)" may be registered in user-defined library 4214 shown in FIG. 38A.)

If parameter b=20 is applied to the combinative function "b*log 10(a)," user-defined function "20*log 10(a)" is obtained. If parameter a=10 is applied to the user-defined function "20*log 10(a)," the value of this function is 20*log 10(10)=20. If a decibel (dB) is used as the unit of this function, 20*log 10(10)=20 dB. Meanwhile, if different parameter b=10 is applied, different user-defined function "10*log 10(a)" is obtained. If parameter a=10 is applied to the user-defined function "10*log 10(a)," the value of this function is 10*log 10(10)=10 dB. Thus, the dynamic range of 20 dB is obtained when parameter a becomes 10-times large for b=20, and the dynamic range is reduced to 10 dB when parameter a becomes 10-times large for b=10, (Note that the dynamic range corresponds to the ratio between the minimum and maximum values within a given value range. If the decibel dB is used to represent the dynamic range, the dynamic range may indicate the difference between the minimum and maximum dB values. If the logarithmic change of parameter a can be expressed by a linear function with slope b, the dB value of the difference becomes large as the value of slope b becomes large.)

Assume that parameter a corresponds to the geometric progression change in the output from sensor A, and parameter b corresponds to the control parameter which is variable in response to the output from sensor B. Then, the logarithm slope of the geometric progression change parameter a (linear change) can be controlled by the value of parameter b to thereby provide value x (=b*log 10(a)). For instance, the dynamic range of the loudness (detected by mic A) of Public Address (PA) of a rock concert site (concert hall) can be controlled by the noise level (detected by noise mic B, which may vary depending on the degree of excitement of the audience) of the site.

More specifically, if the site noise level becomes large, the dynamic range of the PA is reduced to increase the sound pressure level (SPL) of a soft tone part. (This can be done: the reciprocal value of the output from noise mic B is used as the control parameter so that the value of parameter b becomes small as the site noise level becomes large.) Assume that the nominal maximum sound pressure level is 100 dB SPL and the nominal minimum sound pressure level is 80 dB SPL (in this case the dynamic range is 100 dB-80 dB=20 dB). If the site noise level increases, the minimum sound pressure level is increased to 90 dB SPL while keeping the maximum sound pressure level at 100 dB SPL (in this case the dynamic range is 100 dB-90 dB=10 dB). Then, the sound pressure level of the soft tone part does not become too small, and the audience can easily listen the sound-pressure-level-increased soft tone part. Conversely, if the site noise level becomes small, the dynamic range of the PA is increased to suitably reduce the sound pressure level (SPL) of a soft tone part. For instance, if the site noise level decreases, the minimum sound pressure level is decreased to 70 dB SPL while keeping the maximum sound pressure level at 100 dB SPL (in this case the dynamic range is 100 dB-70 dB=30 dB). Then, the PA can be controlled such that the pianissimo part may gently but clearly resound through the site (or hall).

Incidentally, if parameter a relates to a sound pressure level, parameter b may relate to known characteristic curves such as Fletcher and Munson loudness curves or Robinson and Dadson loudness curves.

In the above-mentioned examples, parameters a and b are both relate to the same type sensor (mic). However, parameters a and b may relate to sensors of different types. For instance, parameter a may relate to the output from optical sensor A, and parameter b may relate to the output from temperature sensor B. In this case, the dynamic range (the range between the upper and lower control targets of automatic temperature control using, e.g., an air-conditioner) of the temperature control may depend on the brightness of circumstances (e.g., in a plastic greenhouse). More specifically, the dynamic range of the temperature control may be large in a bright room, and the dynamic range of the temperature control may become small as the room becomes darker.

Thus, according to the embodiments, a new method (not available from the existing library) can be obtained, wherein the result of using the new method varies depending on the outputs from plural sensors of the same type or different types. In other words, it is possible to create a new function by which the detection characteristic of a sensor can be modified by that of another sensor. If such a new function is created, a new type sensor, having the new function not being obtained by existing sensors, can be obtained by suitably combining different sensors. The newly created method (corresponding to a newly created user-defined function) can be registered in the user-defined function library.

As mentioned above, various programmings can be performed by using the rich libraries of of Java language. Respective programming steps constituting the program may be related to the Java class files. Each of the Java class files may be a file including Java byte codes corresponding to the respective programming steps.

The Java byte codes may be executed by a Java Virtual Machine (abbreviated as JVM) installed in any computer, or by another Virtual Machine such as Android RunTime (abbreviated as ART) similar to JVM. The Java byte codes may be created by using a different programming language (such as Scala language: abbreviated as Scala) other than Java.

The Java byte codes may be converted into different codes (such as codes of HTML5 with JavaScript) which can be properly executed by a Web browser. Such code conversion can be done by using a suitable compiler (e.g., the compiler contained in Google Web Toolkit: GWT). The Java byte codes may also be converted into an HTML5 Web application utilizing Ajax (Asynchronous JavaScript+XML).

Incidentally, GWT is an open-source Java software development framework. By GWT, an Ajax application for Web may be developed, using Java. If asynchronous communication and interfaces are to be constructed in a Web browser, Ajax may be suitably used. According to Ajax, a dynamic Web page with no screen change (i.e., part of the page may be dynamically rewritten, by using dynamic HTML, in response to the result of asynchronous communication) can be provided.

GWT comprises a plurality of components such as:
GWT Java-to-JavaScript Compiler (a compiler to convert a Java application program into a JavaScript application);
GWT Hosted Web Browser (a special browser to execute Java byte codes on JVM, without converting into JavaScript, during development of a Web application)
JRE emulation library (a class library equipped with JavaScript, including classes (such as part of Java.lang and java.util packages) often used in the Java standard library; this emulation library may be used when Java codes are converted into JavaScript codes)
GWT Web UI class library (custom interfaces and classes for creating Widget). (Widget is a general term representing the parts of a graphical user-interface, and includes windows, buttons, text boxes, check boxes, etc. arranged on a display screen.)

<Examples of Types of Java8 Usable in the Embodiments (the Following Examples May be Properly Combined to Prepare a Program)>

[java.io]
UncheckedIOException: laps the IOException with non-check exception;
[java.lang]
FunctionalInterface: shows that the interface type statement is a functional interface defined in the Java language specification;
[java.lang.annotation]
Native: shows that a field defining a constant value could be referred to from a native code;
Repeatable: the annotation type "java.lang.annotation.Repeatable" is used to show that the annotation type for assigning (meta) annotations to the statement can be used repeatedly;

[java.lang.invoke]
MethodHandleInfo: shows information on method handling;
[java.lang.reflect]
Executable: shows a common super class for a function common to Method and Constructor;
Parameter: shows information relating to method parameters;
MalformedParametersException: is used if the type of one or more parameters is wrong or improper, when a java.lang.reflect package tries to read the method parameters from a class file;
[java.net]
URLPermission: shows the right to access resources or a set of resources to be used by a set of request method and request header, which request set may be defined by a specific URL and it can be set by a specific user;
[java.security]
KeyStore.Entry.Attribute: shows an attribute related to a key store entry;
DomainLoadStoreParameter: shows construction data to specify a key store in a key store domain;
PKCS12Attribute: shows an attribute related to a key store entry of PKCS12;
[java.security.cert]
CertPathChecker: executes one or more checks for each Certificate of CertPath;
PKIXRevocationChecker: shows PKIXCertPathChecker to confirm the status of revocation of Certificate;
[java.sql]
DriverAction: shows an interface to be equipped with, if Driver expects notice from DriveManager;
SQLType: shows an object to be used for discriminating a universal SQL type, called a JDBC type or a vendor-specific data type;
JDBCType: defines a constant to be used for discriminating a universal SQL type, called a JDBC type;
[java.time]
Clock: shows a clock to enable accessing the current time point, date, and time, using a time zone;
Duration: shows a time-based duration (such as "23.4 sec.");
Instant: shows the time point on a time line;
LocalDate: shows a date (such as "2015-09-30") with no time zone of the ISO-8601 calender system;
LocalDateTime: shows a date/time (such as "2015-09-30T11:16:40") with no time zone of the ISO-8601 calender system;
LocalTime: shows time (such as "11:16:40") with no time zone of the ISO-8601 calender system;
MonthDay: shows a calender month-day (such as "--09-30") according to the ISO-8601 calender system;
OffsetDateTime: shows a date/time (such as "2015-09-30T11:16:40+01:00") with time-offset from the UTC/Gurinijji according to the ISO-8601 calender system;
OffsetTime: shows time (such as "11:16:40+01:00") with time-offset from the UTC/Gurinijji according to the ISO-8601 calender system;
Period: shows an amount of time (such as "one year and two months and three days") based on date/time according to the ISO-8601 calender system;
Year: shows a calender year (such as "2015") according to the ISO-8601 calender system;
YearMonth: shows a calender year-month (such as "2015-09") according to the ISO-8601 calender system;

ZonedDateTime: shows a date/time (such as "2015-09-30T11:16:40+01:00 Europe/Paris") with a time zone of the ISO-8601 calender system;
ZoneId: shows a time zone ID (such as "Europe/Paris");
ZoneOffset: shows a time zone offset (such as "+01:00") from the UTC/Gurinijji;
DayOfWeek: shows a day of the week (such as "Tuesday");
Month: shows a month (such as "July");
DateTimeException; shows an exception to be added to indicate a problem of date/time calculation.
[java.time.chrono]
ChronoLocalDate: shows a date without time or a time zone according to an optional calender system;
ChronoLocalDateTime: shows a date/time without a time zone according to an optional calender system;
Chronology: shows a calender system used to configure and discriminate the date;
ChronoPeriod: shows an amount of date-based time such as "three year, 4 months, and five days" according to an optional calender system;
ChronoZonedDateTime: shows a date/time with a time zone of an optional calender system;
Era: shows an era or epoch if a time line;
AbstractChronology: shows an abstract equipment used to configure and discriminate the date;
IsoChronology: shows the ISO calender system;
JapaneseChronology: shows the Japanese calender system;
JapaneseDate: shows a date of the Japanese calender system;
JapaneseEra: shows an era or epoch of the Japanese calender system;
IsoEra: shows an era or epoch of the ISO calender system.
[java.time.format]
DateTimeFormatter: shows a formatter for outputting and analyzing a date/time object;
DateTimeFormatterBuilder: shows a builder for building a date/time formatter;
DecimalStyle: shows a localized decimal style to be used for setting a style of the date and time;
FormatStyle: shows an enumeration (or list) of formatter styles of the localized date, time or date/time;
ResolverStyle: shows an enumeration (or list) of styles of solution regarding date and time;
SignStyle: shows an enumeration (or list) of styles of processing the positive and negative signs;
DateTimeParseException; shows an exception to be added to indicate occurrence of errors during analysis.
[java.time.temporal]
Temporal: shows an interface of framework level to define read/write accesses to a temporal object (such as date, time, time offset, or any combination thereof);
TemporalAccessor: shows an interface of framework level to define an exclusive read access to a temporal object (such as date, time, time offset, or any combination thereof);
TemporalAdjuster: adjusts the temporal object;
TemporalAmount: shows an interface of framework level to define an amount of time, such as "seven hours", "nine days", or "three years and four months."
TemporalField: shows a date/time field for month, time/hour, etc.
TemporalQuery: inquires the temporal object;
TemporalUnit: shows a unit of date/time such as days and hours;

IsoFields: shows fields and units being specific to the ISO-8601 calender system, such as a quarter of one year, a reference year of calender weeks, etc.;

ValueRange: shows a range of active values of the date/time fields;

WeekFields: locally defines the fields of weeks, week numbers in a month, and week numbers in a year;

ChronoField: shows a standard set of the fields;

ChronoUnit; shows a standard set of the units of day-based periods;

UnsupportedTemporalTypeException: shows that ChronoField or ChronoUnit is not supported by the Temporal class.

[java.time.zone]

ZoneOffsetTransition . . . A transition between two offsets caused by a discontinuity in a local time-line.

ZoneOffsetTransitionRule . . . A rule that expresses how to create a transition.

ZoneRules . . . A rule that defines how a zone offset of a single time zone changes.

ZoneRules Provider . . . A provider of time-zone rules to a system.

ZonerulesException . . . Thrown to indicate a problem with time-zone configuration.

[java.util]

PrimitiveIterator . . . A base type used for primitive specializations of Iterator.

PrimitiveIterator.OfDouble . . . An Iterator specialized for double values.

PrimitiveIterator.OfInt . . . An Iterator specialized for int values.

PrimitiveIterator.OfLong . . . An Iterator specialized for long values.

Spliterator . . . An object for traversing and partitioning elements of a source.

Spliterator.OfDouble . . . A Spliterator specialized for double values.

Spliterator.OfInt . . . A Spliterator specialized for int values.

Spliterator.OfLong . . . A Spliterator specialized for long values.

Spliterator.OfPrimitive . . . A Spliterator specialized for primitive values.

Base64 . . . A class that consists exclusively of static methods for obtaining encoders and decoders for a Base64 encoding scheme.

Base64.Decoder . . . A class that implements a decoder for decoding byte data using a Base64 encoding scheme as specified in RFC 4648 and RFC 2045.

Base64.Encoder . . . A class that implements an encoder for encoding byte data using a Base64 encoding scheme as specified in RFC 4648 and RFC 2045.

Calendar.Builder . . . Used for creating a Calendar from various data/time parameters.

DoubleSummaryStatistics . . . A state object for collecting statistics (double values) such as count, min, max, sum, and average.

IntSummaryStatistics . . . A state object for collecting statistics (int values) such as count, min, max, sum, and average.

Locale.LanguageRange . . . A class that expresses a language range defined in RFC 4647 matching of language tags.

LongSummaryStatistics . . . A state object for collecting statistics (long values) such as count, min, max, sum, and average.

Optional . . . A container object which may or may not contain a non-null value.

OptionalDouble . . . A container object which may or may not contain a double value.

OptionalInt . . . A container object which may or may not contain an int value.

OptionalLong . . . A container object which may or may not contain a long value.

Spliterators . . . Static classes and methods for operating on or creating instances of Spliterator and its primitive specializations Spliterator.OfInt, Spliterator.OfLong, and Spliterator.OfDouble.

Spliterators.AbstractDoubleSpliterator . . . An abstract Spliterator.OfDobule that implements trySplit to permit limited parallelism.

Spliterators.AbstractIntSpliterator . . . An abstract Spliterator.OfInt that implements trySplit to permit limited parallelism.

Spliterators.AbstractLongSpliterator . . . An abstract Spliterator.OfLong that implements trySplit to permit limited parallelism.

Spliterators.AbstractSpliterator . . . An abstract Spliterator that implements trySplit to permit limited parallelism.

SplittableRandom . . . A generator of uniform random values applicable for use in isolated parallel computations that may generate subtasks.

StringJoiner . . . Used construct a sequence of characters separated by a delimiter and starting with a supplied prefix and ending with a supplied suffix.

Locale.FilteringMode . . . Provides constants to select a filtering mode for locale matching.

[java.util.concurrent]

CompletableFuture.AsynchronousCompletionTask . . . A marker interface that identifies asynchronous tasks produced by async methods.

CompletionStage . . . A stage of possibly asynchronous computation that performs an action or computes a value when CompletionStage completes.

CompletableFuture . . . A Future that may be explicitly completed (setting its value and status), and may be used as a CompletionStage, supporting dependent functions and actions that trigger upon its completion.

ConcurrentHashMap.KeySetView . . . A view of ConcurrentHashMap as a set of keys, in which additions may be enabled by mapping to a common value.

CountedCompleter . . . A ForkJoinTask with a completion action performed when triggered and there are no remaining pending actions.

CompletionException . . . Thrown when an error or other exception is encountered in the course of completing a result or task.

[java.util.concurrent.atomic]

DoubleAccumulator . . . One or more variables that together maintain a running double value updated using a supplied function.

DoubleAdder . . . One or more variables that together maintain an initially zero double sum.

LongAccumulator . . . One or more variables that together maintain a running long value updated using a supplied function.

LongAdder . . . One or more variables that together maintain an initially zero long sum.

[java.util.concurrent.locks]

StampedLock . . . A capability based lock with three modes for controlling read/write access.

[java.util.function]

BiConsumer . . . Represents an operation that accepts two input arguments and returns no result.

BiFunction . . . Represents a function that accepts two arguments and produces a result.

BinaryOperator . . . Represents an operation upon operands of the same type, producing a result of the same type as the operands.

BiPredicate . . . Represents a predicate (boolean-valued function) of two arguments.

BooleanSupplier . . . Represents a supplier of boolean-valued results.

Consumer . . . Represents an operation that accepts a single input argument and returns no result.

DoubleBinaryOperator . . . Represents an operation upon two double-valued operands and producing a double-valued result.

DoubleConsumer . . . Represents an operation that accepts a single double-valued argument and returns no result.

DoubleFunction . . . Represents a function that accepts one double-valued argument and produces a result.

DoublePredicate . . . Represents a predicate (boolean-valued function) of one double-valued argument.

DoubleSupplier . . . Represents a supplier of double-valued results.

DoubleToIntFunction . . . Represents a function that accepts one double-valued argument and produces an int-valued result.

DoubleToLongFunction . . . Represents a function that accepts one double-valued argument and produces a long-valued result.

DoubleUnaryOperator . . . Represents an operation on a single double-valued operand that produces a double-valued result.

Function . . . Represents a function that accepts one argument and produces a result.

IntBinaryOperator . . . Represents an operation upon two int-valued operands and producing an int-valued result.

IntConsumer . . . Represents an operation that accepts a single int-valued argument and returns no result.

IntFunction . . . Represents a function that accepts one int-valued argument and produces a result.

IntPredicate . . . Represents a predicate (boolean-valued function) of one int-valued argument.

IntSupplier . . . Represents a supplier of int-valued results.

IntToDoubleFunction . . . Represents a function that accepts one int-valued argument and produces a double-valued result.

IntToLongFunction . . . Represents a function that accepts one int-valued argument and produces a long-valued result.

IntUnaryOperator . . . Represents an operation upon a single int-valued operand that produces an int-valued result.

LongBinaryOperator . . . Represents an operation upon two long-valued operands and producing a long-valued result.

LongConsumer . . . Represents an operation that accepts a single long-valued argument and returns no result.

LongFunction . . . Represents a function that accepts one long-valued argument and produces a result.

LongPredicate . . . Represents a predicate (boolean-valued function) of one long-valued argument.

LongSupplier . . . Represents a supplier of long-valued results.

LongToDoubleFunction . . . Represents a function that accepts one long-valued argument and produces a double-valued result.

LongToIntFunction . . . Represents a function that accepts one long-valued argument and produces an int-valued result.

LongUnaryOperator . . . Represents an operation upon a single long-valued operand that produces a long-valued result.

ObjDoubleConsumer . . . Represents an operation that accepts an object-valued and a double-valued argument, and returns no result.

ObjIntConsumer . . . Represents an operation that accepts an object-valued and an int-valued argument, and returns no result.

ObjLongConsumer . . . Represents an operation that accepts an object-valued and a long-valued argument, and returns no result.

Predicate . . . Represents a predicate (boolean-valued function) of one argument.

Supplier . . . Represents a supplier of results.

ToDoubleBiFunction . . . Represents a function that accepts two arguments and produces a double-valued result.

ToDoubleFunction . . . Represents a function that produces a double-valued result.

ToIntBiFunction . . . Represents a function that accepts two arguments and produces an in-valued result.

ToIntFunction . . . Represents a function that produces an int-valued result.

ToLongBiFunction . . . Represents a function that accepts two arguments and produces a long-valued result.

ToLongFunction . . . Represents a function that produces a long-valued result.

UnaryOperator . . . Represents an operation on a single operand that produces a result of the same type as its operand.

[java.util.spi]

ResourceBundleControlProvider . . . An interface for service providers that provide implementations of ResourceBundle.Control.

CalendarDataProvider . . . An abstract class for service providers that provide locale-dependent Calendar parameters.

CalendarNameProvider . . . An abstract for service providers that provide localized string representations (display names) of Calendar field values.

[java.util.stream]

BaseStream . . . A base interface for streams, which are sequences of elements supporting sequential and parallel aggregate operations.

Collector . . . A mutable reduction operation that accumulates input elements into a mutable result container, optionally transforming the accumulated result into a final representation after all input elements have been processed.

DoubleStream . . . A sequence of primitive double-valued elements supporting sequential and parallel aggregate operations.

DoubleStream.Builder . . . A mutable builder for a DoubleStream.

IntStream . . . A sequence of primitive int-valued elements supporting sequential and parallel aggregate operations.

IntStream.Builder . . . A mutable builder for an IntStream.

LongStream . . . A sequence of primitive long-valued elements supporting sequential and parallel aggregate operations.

LongStream.Builder . . . A mutable builder for a LongStream.

Stream . . . A sequence of elements supporting sequential and parallel aggregate operations.

Stream.Builder . . . A mutable builder for a Stream.

Collectors . . . Implementations of Collector that implement various useful reduction operations, such as accumulating elements into collections, summarizing elements according to various criteria, etc.

StreamSupport . . . Low-level utility methods for creating and manipulating streams.

[javax.lang.model]

AnnotatedConstruct . . . Represents a construct that can be annotated.

[javax.lang.model.type]

IntersectionType . . . Represents an intersection type.

[javax.lang.model.util]

AbstractAnnotationValueVisitor8 . . . A skeletal visitor for annotation values with default behavior appropriate for the RELEASE_8 source version.

AbstractElementVisitor8 . . . A skeletal visitor of program elements with default behavior appropriate for the RELEASE_8 source version.

AbstractTypeVisitor8 . . . A skeletal visitor of types with default behavior appropriate for the RELEASE_8 source version.

ElementKindVisitor8 . . . A visitor of program elements based on their kind with default behavior appropriate for the RELEASE_8 source version.

ElementScanner8 . . . A scanning visitor of program elements with default behavior appropriate for the RELEASE_8 source version.

SimpleAnnotationValueVisitor8 . . . A simple visitor for annotation values with default behavior appropriate for the RELEASE_8 source version.

SimpleElementVisitor8 . . . A simple visitor of program elements with default behavior appropriate for the RELEASE_8 source version.

SimpleTypeVisitor8 . . . A simple visitor of types with default behavior appropriate for the RELEASE_7 source version.

TypeKindVisitor8 . . . A visitor of types based on their kind with default behavior appropriate for the RELEASE_8 source version.

[javax.net.ssl]

SNIHostName . . . Instances of this class represent a server name of type host name in a Server Name Indication (SNI) extension.

SNIMatcher . . . Instances of this class represent a matcher that performs matching operations on an SNIServerName instance.

SNIServerName . . . Instances of this class represent a server name in a Server Name Indication (SNI) extension.

StandardConstants . . . Standard constants definitions.

[javax.xml.validation]

SchemaFactoryConfigurationError . . . Thrown when a problem with configuration with the Schema Factories exists.

<Examples of Methods of Java8 that can be Used in Embodiments (the Following Examples can be Combined as Appropriate to Create User-Defined Classes or User-Defined Programs)>

{java.awt}

[KeyboardFocusManager]

clearFocusOwner:public void clearFocusOwner( ) . . . Clears the focus owner at both the Java and native levels if the focus owner exists and resides in the same context as the calling thread. Otherwise the method returns silently {java.io}

[BufferedReader]

lines:public Stream<String> lines( ) . . . Returns a Stream. The elements are lines read from BufferedReader.

{java.lang}

[CharSequence]

chars:default IntStream chars( ) . . . Returns a stream of int zero-extending the char values from this sequence.

codePoints:default IntStream codePoints( ) . . . Returns a stream of code point values from this sequence.

[Iterable]

forEach:default void forEach(Consumer<? super T> action) . . . Performs the given action for each element of the Iterable until all elements have been processed or the action throws an exception.

spliterator:default Spliterator<T> spliterator( ) . . . Creates a Spliterator over the elements described by this Iterable.

[Boolean]

hashCode:public static int hashCode(boolean value) . . . Returns a hash code for a boolean value; compatible with Boolean.hashCode( ).

logicalAnd:public static boolean logicalAnd(boolean a, boolean b) . . . Returns the result of applying the logical AND operator to the specified boolean operands.

logicalOR:public static boolean logicalOr(boolean a, boolean b) . . . Returns the result of applying the logical OR operator to the specified boolean operands.

logicalXor:public static boolean logicalXor(boolean a, boolean b) . . . Returns the result of applying the logical XOR operator to the specified boolean operands.

[Byte]

hashCode:public static int hashCode(byte value) . . . Returns a hash code for a byte value; compatible with Byte.hashCode( ).

toUnsignedInt:public static int toUnsignedInt(byte x) . . . Converts the argument to an int by an unsigned conversion.

toUnsignedLong:public static long toUnsignedLong(byte x) . . . Converts the argument to a long by an unsigned conversion.

[Character]

hashCode:public static int hashCode(char value) . . . Returns a hash code for a char value; compatible with Character.hashCode( ).

[Class]

getAnnotatedInterfaces:public AnnotatedType[ ] getAnnotatedInterfaces( ) . . . Returns an array of AnnotatedType objects that represent the use of types to specify superinterfaces of the entity represented by Class object.

getAnnotatedSuperclass:public AnnotatedType getAnnotatedSuperclass( ) . . . Returns an AnnotatedType object that represents the use of a type to specify the superclass of the entity represented by Class object.

getAnnotationsByType:public <A extends Annotation> A[ ] getAnnotationsByType(Class<A> annotationClass) . . . Returns annotations that are associated with this element.
getDeclaredAnnotation:public <A extends Annotation> A getDeclaredAnnotation(Class<A> annotationClass) . . . Returns this element's annotation for the specified type if such an annotation is directly present, else null.
getDeclaredAnnotationsByType:public <A extends Annotation> A[ ] getDeclaredAnnotationsByType (Class<A> annotationClass) . . . Returns this element's annotation(s) for the specified type if such annotations are either directly present or indirectly present.
getTypeName:public String getTypeName( ) . . . Returns an informative string for the name of this type.
toGenericString:public String toGenericString( ) . . . Returns a string describing this Class, including information about modifiers and type parameters.

[Double]
hashCode:public static int hashCode(double value) . . . Returns a hash code for a double value; compatible with Double.hashCode( ).
isFinite:public static boolean isFinite(double d) . . . Returns true if the argument is a finite floating-point value and returns false otherwise (for NaN and infinity arguments).
max:public static double max(double a, double b) . . . Returns the greater of two double values as if by calling Math.max.
min:public static double min(double a, double b) . . . Returns the smaller of two double values as if by calling Math.min.
sum:public static double sum(double a, double b) . . . Adds two double values together as per the + operator.

[Float]
hashCode:public static int hashCode(float value) . . . Returns a hash code for a float value; compatible with Float.hashCode( ).
isFinite:public static boolean isFinite(float f) . . . Returns true if the argument is a finite floating-point value and returns false otherwise (for NaN and infinity arguments).
max:public static float max(float a, float b) . . . Returns the greater of two float values as if by calling Math.max.
min:public static float min(float a, float b) . . . Returns the smaller of two float values as if by calling Math.min.
sum:public static float sum(float a, float b) . . . Adds two float values together as per the + operator.

[Integer]
compareUnsigned:public static int compareUnsigned(int x, int y) . . . Compares two int values numerically treating the values as unsigned.
divideUnsigned:public static int divideUnsigned(int dividend, int divisor) . . . Returns the unsigned quotient of dividing the first argument by the second argument. Each argument and the result are interpreted as an unsigned value.
hashCode:public static int hashCode(int value) . . . Returns a hash code for an int value; compatible with Integer.hashCode( ).
max:public static int max(int a, int b) . . . Returns the greater of two int values as if by calling Math.max.
min:public static int min(int a, int b) . . . Returns the smaller of two int values as if by calling Math.min.
parseUnsignedInt:public static int parseUnsignedInt (String s) throws NumberFormatException . . . Parses the string argument as an unsigned decimal integer.
parseUnsignedInt:public static int parseUnsignedInt (String s, int radix) throws NumberFormatException . . . Parses the string argument as an unsigned integer in the radix specified by the second argument.
remainderUnsigned:public static int remainderUnsigned (int dividend, int divisor) . . . Returns the unsigned remainder from dividing the first argument by the second argument. Each argument and the result are interpreted as an unsigned value.
sum:public static int sum(int a, int b) . . . Adds two integers together as per the + operator.
toUnsignedLong:public static long toUnsignedLong(int x) . . . Converts the argument to a long by an unsigned conversion.
toUnsignedString:public static String toUnsignedString (int i) . . . Returns a string representation of the argument as an unsigned decimal value.
toUnsignedString:public static String toUnsignedString (int i, int radix) . . . Returns a string representation of the first argument as an unsigned integer value in the radix specified by the second argument.

[Long]
compareUnsigned:public static int compareUnsigned (long x, long y) . . . Compares two long values numerically treating the values as unsigned.
divideUnsigned:public static long divideUnsigned(long dividend, long divisor) . . . Returns the unsigned quotient of dividing the first argument by the second argument. Each argument and the result are interpreted as an unsigned value.
hashCode:public static int hashCode(long value) . . . Returns a hash code for a long value; compatible with Long.hashCode( ).
max:public static long max(long a, long b) . . . Returns the greater of two long values as if by calling Math.max.
min:public static long min(long a, long b) . . . Returns the smaller of two long values as if by calling Math.min.
parseUnsignedLong:public static long parseUnsignedLong(String s) throws NumberFormatException . . . Parses the string argument as an unsigned decimal long.
parseUnsignedLong:public static long parseUnsignedLong(String s, int radix) throws NumberFormatException . . . Parses the string argument as an unsigned long in the radix specified by the second argument.
remainderUnsigned:public static long remainderUnsigned(long dividend, long divisor) . . . Returns the unsigned remainder from dividing the first argument by the second argument. Each argument and the result are interpreted as an unsigned value.
sum:public static long sum(long a, long b) . . . Adds two long values together as per the + operator.
toUnsignedString:public static String toUnsignedString (long i) . . . Returns a string representation of the argument as an unsigned decimal value.
toUnsignedString:public static String toUnsignedString (long i, int radix) . . . Returns a string representation of the first argument as an unsigned integer value in the radix specified by the second argument.

[Math]
addExact:public static int addExact(int x, int y) . . . Returns the sum of the arguments. An exception is thrown if the result overflows an int.
addExact:public static long addExact(long x, long y) . . . Returns the sum of arguments. An exception is thrown if the result overflows a long.

decrementExact:public static int decrementExact (int a) . . . Returns the argument decremented by one. An exception is thrown if the result overflows an int.
decrementExact:public static long decrementExact(long a) . . . Returns the argument decremented by one. An exception is thrown if the result overflows a long.
floorDiv:public static int floorDiv(int x, int y) . . . Returns the largest (closest to positive infinity) int value that is less than or equal to the algebraic quotient.
floorDiv:public static long floorDiv(long x, long y) . . . Returns the largest (closest to positive infinity) long value that is less than or equal to the algebraic quotient.
floorMod:public static int floorMod(int x, int y) . . . Returns the floor modulus of the int arguments.
floorMod:public static long floorMod(long x, long y) . . . Returns the floor modulus of the long arguments.
incrementExact:public static int incrementExact (int a) . . . Returns the argument incremented by one. An exception is thrown if the result overflows an int.
incrementExact:public static long incrementExact (long a) . . . Returns the argument incremented by one. An exception is thrown if the result overflows a long.
multiplyExact:public static int multiplyExact(int x, int y) . . . Returns the product of the arguments. An exception is thrown if the result overflows an int.
multiplyExact:public static long multiplyExact(long x, long y) . . . Returns the product of the arguments. An exception is thrown if the result overflows a long.
negateExact:public static int negateExact(int a) . . . Returns the negation of the argument. An exception is thrown if the result overflows an int.
negateExact:public static long negateExact(long a) . . . Returns the negation of the argument. An exception is thrown if the result overflows a long.
nextDown:public static double nextDown(double d) . . . Returns the floating-point value adjacent to d in the direction of negative infinity.
nextDown:public static float nextDown(float f) . . . Returns the floating-point value adjacent to f in the direction of negative infinity.
subtractExact:public static int subtractExact(int x, int y) . . . Returns the difference of the arguments. An exception is thrown if the result overflows an int.
subtractExact:public static long subtractExact(long x, long y) . . . Returns the difference of the arguments. An exception is thrown if the result overflows a long.
toIntExact:public static int toIntExact(long value) . . . Returns the value of the long argument. An exception is thrown if the result does not fall within an int.
[Package]
getAnnotationsByType:public <A extends Annotation> A[ ] getAnnotationsByType(Class<A> annotationClass) . . . Returns annotations that are associated with this element.
getDeclaredAnnotation:public <A extends Annotation> A getDeclaredAnnotation(Class<A> annotationClass) . . . Returns this element's annotation for the specified type if such an annotation is directly present, else null.
getDeclaredAnnotationsByType:public <A extends Annotation> A[ ] getDeclaredAnnotationsByType (Class<A> annotationClass) . . . Returns this element's annotation(s) for the specified type if such annotations are either directly present or indirectly present.
[Process]
destroyForcibly:public Process destroyForcibly( ) . . . Terminates the subprocess.
isAlive:public boolean isAlive( ) . . . Tests whether the subprocess represented by this Process is alive.
waitFor:public boolean waitFor(long timeout, TimeUnit unit) throws InterruptedException . . . Causes the current thread to wait until the subprocess represented by this Process object has terminated, or the specified waiting time elapses.
[Short]
hashCode:public static int hashCode(short value) . . . Returns a hash code for a short value; compatible with Short.hashCode( ).
toUnsignedInt:public static int toUnsignedInt (short x) . . . Converts the argument to an int by an unsigned conversion.
toUnsignedLong:public static long toUnsignedLong (short x) . . . Converts the argument to a long by an unsigned conversion.
[StrictMath]
addExact:public static int addExact(int x, int y) . . . Returns the sum of arguments. An exception is thrown if the result overflows an int.
addExact:public static long addExact(long x, long y) . . . Returns the sum of arguments. An exception is thrown if the result overflows a long.
floorDiv:public static int floorDiv(int x, int y) . . . Returns the largest (closest to positive infinity) int value that is less than or equal to the algebraic quotient.
floorDiv:public static long floorDiv(long x, long y) . . . Returns the largest (closest to positive infinity) long value that is less than or equal to the algebraic quotient.
floorMod:public static int floorMod(int x, int y) . . . Returns the floor modulus of the int arguments.
floorMod:public static long floorMod(long x, long y) . . . Returns the floor modulus of the long arguments.
multiplyExact:public static int multiplyExact(int x, int y) . . . Returns the product of the arguments. An exception is thrown if the result overflows an int.
multiplyExact:public static long multiplyExact(long x, long y) . . . Returns the product of the arguments. An exception is thrown if the result overflows a long.
nextDown:public static double nextDown(double d) . . . Returns the floating-point value adjacent to d in the direction of negative infinity.
nextDown:public static float nextDown(float f) . . . Returns the floating-point value adjacent to f in the direction of negative infinity.
subtractExact:public static int subtractExact(int x, int y) . . . Returns the difference of the arguments. An exception is thrown if the result overflows an int.
subtractExact:public static long subtractExact(long x, long y) . . . Returns the difference of the arguments. An exception is thrown if the result overflows a long.
toIntExact:public static int toIntExact(long value) . . . Returns the value of the long argument. An exception is thrown if the result does not fall within an int.
[String]
join:public static String join(CharSequence delimiter, CharSequence . . . elements) . . . Returns a new String composed of copies of the CharSequence elements joined together with a copy of the specified delimiter.
join:public static String join(CharSequence delimiter, Iterable<? extends CharSequence> elements) . . . Returns a new String composed of copies of the CharSequence related elements joined together with a copy of the specified delimiter.

[ThreadLocal]
withInitial:public static <S> ThreadLocal<S> withInitial (Supplier<? extends S> supplier) . . . Creates a thread local variable.
{java.lang.invoke}
[MethodHandles]
reflectAs:public static <T extends Member> T reflectAs (Class<T> expected, MethodHandle target) . . . Performs an unchecked crack of a direct method handle.
[MethodHandles.Lookup]
revealDirect:public MethodHandleInfo revealDirect (MethodHandle target) . . . Cracks a direct method handle created by this lookup object or a similar object.
{java.lang.management}
[LockInfo]
from:public static LockInfo from(CompositeData cd) . . . Returns a LockInfo object represented by the given CompositeData.
{java.lang.reflect}
[AnnotatedElement]
getAnnotationsByType:default <T extends Annotation> T[ ] getAnnotationsByType(Class<T> annotationClass) . . . Returns annotations that are associated with this element.
getDeclaredAnnotation:default <T extends Annotation> T getDeclaredAnnotation(Class<T> annotationClass) . . . Returns this element's annotation for the specified type if such an annotation is directly present, else null.
getDeclaredAnnotationsByType:default <T extends Annotation> T[ ] getDeclaredAnnotationsByType (Class<T> annotationClass) . . . Returns this element's annotation(s) for the specified type if such annotations are either directly present or indirectly present.
[Type]
getTypeName:default String getTypeName( ) . . . Returns a string describing this type, including information about any type parameters.
[TypeVariable]
getAnnotatedBounds:AnnotatedType[ ] getAnnotatedBounds( ) . . . Returns an array of AnnotatedType objects that represent the use of types to denote the upper bounds of the type parameter represented by this TypeVariable.
[AccessibleObject]
getAnnotationsByType:public <T extends Annotation> T[ ] getAnnotationsByType(Class<T> annotationClass) . . . Returns annotations that are associated with this element.
getDeclaredAnnotation:public <T extends Annotation> T getDeclaredAnnotation(Class<T> annotationClass) . . . Returns this element's annotation for the specified type if such an annotation is directly present, else null.
getDeclaredAnnotationsByType:public <T extends Annotation> T[ ] getDeclaredAnnotationsByType(Class<T> annotationClass) . . . Returns this element's annotation(s) for the specified type if such annotations are either directly present or indirectly present.
[Constructor]
getAnnotatedReceiverType:public AnnotatedType getAnnotatedReceiverType( ) . . . Returns an AnnotatedType object that represents the use of a type to specify the receiver type of the method or constructor represented by this Executable object.
getAnnotatedReturnType:public AnnotatedType getAnnotatedReturnType( ) . . . Returns an AnnotatedType object that represents the use of a type to specify the return type of the method or constructor represented by this Executable.
[Executable]
getAnnotatedExceptionTypes:public AnnotatedType[ ] getAnnotatedExceptionTypes( ) . . . Returns an array of AnnotatedType objects that represent the use of types to specify the declared exceptions of the method or constructor represented by this Executable.
getAnnotatedParameterTypes:public AnnotatedType[ ] getAnnotatedParameterTypes( ) . . . Returns an array of AnnotatedType objects that represent the use of types to specify formal parameter types of the method or constructor represented by this Executable.
getAnnotatedReceiverType:public AnnotatedType getAnnotatedReceiverType( ) . . . Returns an AnnotatedType object that represents the use of a type to specify the receiver type of the method or constructor represented by this Executable object.
getAnnotatedReturnType:public abstract AnnotatedType getAnnotatedReturnType( ) . . . Returns an AnnotatedType object that represents the use of a type to specify the return type of the method or constructor represented by this Executable.
getAnnotationsByType:public <T extends Annotation> T[ ] getAnnotationsByType(Class<T> annotation Class) . . . Returns annotations that are associated with this element.
getParameterCount:public int getParameterCount( ) . . . Returns the number of formal parameters (whether explicitly declared or implicitly declared or neither) for the executable represented by this object.
getParameters:public Parameter[ ] getParameters( ) . . . Returns an array of Parameter objects that represent all the parameters to the underlying executable represented by this object.
[Field]
getAnnotatedType:public AnnotatedType getAnnotatedType( ) . . . Returns an AnnotatedType object that represents the use of a type to specify the declared type of the field represented by this Field.
getAnnotationsByType:public <T extends Annotation> T[ ] getAnnotationsByType(Class<T> annotationClass) . . . Returns annotations that are associated with this element.
[Method]
getAnnotatedReturnType:public AnnotatedType getAnnotatedReturnType( ) . . . Returns an AnnotatedType object that represents the use of a type to specify the return type of the method or constructor represented by this Executable.
isDefault:public boolean isDefault( ) . . . Returns true if this method is a default method and returns false otherwise.
[Modifier]
parameterModifiers:public static int parameterModifiers( ) . . . Returns an int value OR-ing together the source language modifiers that can be applied to a parameter.
{java.math}
[BigInteger]
byteValueExact:public byte byteValueExact( ) . . . Converts this BigInteger to a byte, checking for lost information.
intValueExact:public int intValueExact( ) . . . Converts this BigInteger to an int, checking for lost information.

longValueExact:public long longValueExact( ) . . . Converts this BigInteger to a long, checking for lost information.
shortValueExact:public short shortValueExact( ) . . . Converts this BigInteger to a short, checking for lost information.
{java.nio.file}
[Files]
find:public static Stream<Path> find(Path start, int maxDepth, BiPredicate<Path,BasicFileAttributes> matcher, FileVisitOption . . . options) throws IOException . . . Returns a Stream that is lazily populated with Path by searching for files in a file tree rooted at a given starting file (throws IOException).
lines:public static Stream<String> lines(Path path) throws IOException . . . Read all lines from a file as a Stream (throws IOException).
lines:public static Stream<String> lines(Path path, Charset cs) throws IOException . . . Read Charset cs as a Stream in all lines from a file (throws IOException).
lines:public static Stream<String> lines(Path path) throws IOException . . . Returns a lazily populated Stream, the elements of which are the entries in the directory (throws IOException).
newBufferedReader:public static BufferedReader newBufferedReader(Path path) throws IOException . . . Opens a file for reading, returning a BufferedReader to read text from the file in an efficient manner (throws IOException).
newBufferedWriter:public static BufferedWriter newBufferedWriter(Path path, OpenOption . . . options) throws IOException . . . Opens or creates a file for writing, returning a BufferedWriter to write text to the file in an efficient manner (throws IOException).
readAllLines:public static List<String> readAllLines (Path path) throws IOException . . . Reads all lines from a file (throws IOException).
walk:public static Stream<Path> walk(Path start, FileVisitOption . . . options) throws IOException . . . Returns a Stream that is lazily populated with Path by walking the file tree rooted at a given starting file (throws IOException).
walk:public static Stream<Path> walk(Path start, int maxDepth, FileVisitOption . . . options) throws IOException . . . Returns a Stream that is lazily populated with Path at a maximum depth of int by walking the file tree rooted at a given starting file (throws IOException).
write:public static Path write(Path path, Iterable<? extends CharSequence> lines, OpenOption . . . Writes lines of text to a file (throws IOException).
{java.nio.file.attribute}
[FileTime]
from:public static FileTime from(Instant instant) . . . Returns a FileTime representing the same point of time value on the time-line as the provided Instant object.
toInstant:public Instant toInstant( ) . . . Converts this FileTime object to an Instant.
{java.security}
[KeyStore.Entry]
getAttributes:default Set<KeyStore.Entry.Attribute> getAttributes( ) . . . Gets the attributes associated with an entry.
[Principal]
implies:default boolean implies(Subject subject) . . . Returns true if a specified subject is implied in this subject.
[AccessController]
doPrivileged:public static <T> T doPrivileged (PrivilegedAction<T> action, AccessControlContext context, Permission . . . perms) . . . Performs the specified PrivilegedAction with privileges enabled and restricted by the specified AccessControlContext and with a privilege scope limited by specified Permission arguments.
doPrivileged:public static <T> T doPrivileged (PrivilegedExceptionAction<T> action, AccessControlContext context, Permission . . . perms) throws PrivilegedActionException . . . Performs the specified PrivilegedExceptionAction with privileges enabled and restricted by the specified AccessControlContext and with a privilege scope limited by specified Permission arguments (throws PrivilegedActionException).
doPrivilegedWithCombiner:public static <T> T doPrivilegedWithCombiner(PrivilegedAction<T> action, AccessControlContext context, Permission . . . perms) . . . Performs the specified PrivilegedAction with privileges enabled and restricted by the specified AccessControlContext and with a privilege scope limited by specified Permission arguments.
doPrivilegedWithCombiner:public static <T> T doPrivilegedWithCombiner(PrivilegedExceptionAction<T> action, AccessControlContext context, Permission . . . perms) throws PrivilegedActionException . . . Performs the specified PrivilegedExceptionAction with privileges enabled and restricted by the specified AccessControlContext and with a privilege scope limited by specified Permission arguments (throws PrivilegedActionException).
[KeyStore.PasswordProtection]
getProtectionAlgorithm:public String getProtectionAlgorithm( ) . . . Gets the name of the protection algorithm.
getProtectionParameters:public AlgorithmParameterSpec getProtectionParameters( ) . . . Gets the parameters specified for the protection algorithm.
[KeyStore.PrivateKeyEntry]
getAttributes:public Set<KeyStore.PrivateKeyEntry.Attribute> getAttributes( ) . . . Gets the attributes associated with a PrivateKeyEntry.
[KeyStore.SecretKeyEntry]
getAttributes:public Set<KeyStore.PrivateKeyEntry.Attribute> getAttributes( ) . . . Gets the attributes associated with a SecretKeyEntry.
[KeyStore.TrustedCertificateEntry]
getAttributes:public Set<KeyStore.TrustedCertificateEntry.Attribute> getAttributes( ) . . . Gets the attributes associated with an entry holding a trusted Certificate.
[Provider]
compute:public Object compute(Object key, BiFunction<? super Object,? super Object,? extends Object> remappingFunction) . . . Attempts to compute a mapping for the specified key and its current mapped value (or null if there is no current mapping).
computeIfAbsent:public Object computeIfAbsent(Object key, Function<? super Object,? extends Object> mappingFunction) . . . If the specified key is not already associated with a value (or is mapped to null), attempts to compute its value using the given mapping function and enters it into this map unless null.
computeIfPresent:public Object computeIfPresent(Object key, BiFunction<? super Object,? super Object,?

extends Object> remappingFunction) . . . If the value for the specified key is present and non-null, attempts to compute a new mapping from the key and its current mapped value.

forEach:public void forEach(BiConsumer<? super Object,? super Object> action) . . . Performs the given action for each entry until all entries in this map have been processed or the action throws an exception.

getOrDefault:public Object getOrDefault(Object key, Object defaultValue) . . . Returns the value to which the specified key is mapped, or defaultValue if this map contains no mapping for the key.

merge:public Object merge(Object key, Object value, BiFunction<? super Object,? super Object,? extends Object> remappingFunction) . . . If the specified key is not already associated with a value or is associated with null, associates it with the given value.

putIfAbsent:public Object putIfAbsent(Object key, Object value) . . . If the specified key is not already associated with a value (or is mapped to null), associates it with the given value and returns null, else returns the current value.

remove:public boolean remove(Object key, Object value) . . . Removes the entry for the specified key only if the specified key is currently mapped to the specified value.

replace:public Object replace(Object key, Object value) . . . Replaces the entry for the specified key only if the specified key is currently mapped to some value.

replace:public boolean replace(Object key, Object oldValue, Object newValue) . . . Replaces the entry for the specified key only if the specified key is currently mapped to the specified value.

replaceAll:public void replaceAll(BiFunction<? super Object,? super Object,? extends Object> function) . . . Replaces each entry's value with the result of invoking the given function on that entry, in the order entries are returned by an entry set iterator, until all entries have been processed or the function throws an exception.

[SecureRandom]
getInstanceStrong:public static SecureRandom getInstanceStrong( ) throws NoSuchAlgorithmException securerandom.strongAlgorithmsSecurity . . . Returns a SecureRandom object that was selected by using the algorithms or providers specified in the property.

{java.security.cert}
[Certificate]
verify:public void verify(PublicKey key, Provider sigProvider) throws CertificateException, NoSuchAlgorithmException, InvalidKeyException, SignatureException . . . Verifies that this certificate was signed using the private key that corresponds to the specified public key.

[CertPathBuilder]
getRevocationChecker:public final CertPathChecker getRevocationChecker( ) . . . Returns a CertPathChecker that the encapsulated CertPathBuilderSpi implementation uses to check the revocation status of certificates.

[CertPathBuilderSpi]
engineGetRevocationChecker:public CertPathChecker engineGetRevocationChecker( ) . . . Returns a CertPathChecker that this implementation uses to check the revocation status of certificates.

[CertPathValidator]
getRevocationChecker:public final CertPathChecker getRevocationChecker( ) . . . Returns a CertPathChecker that the encapsulated CertPathValidatorSpi implementation uses to check the revocation status of certificates.

[CertPathValidatorSpi]
engineGetRevocationChecker:public CertPathChecker engineGetRevocationChecker( ) . . . Returns a CertPathChecker that this implementation uses to check the revocation status of certificates.

[X509Certificate]
verify:public void verify(PublicKey key, Provider sigProvider) throws CertificateException, NoSuchAlgorithmException, InvalidKeyException, SignatureException . . . Verifies that this certificate was signed using the private key that corresponds to the specified public key.

[X509CRL]
verify:public void verify(PublicKey key, Provider sigProvider) throws CRLException, NoSuchAlgorithmException, InvalidKeyException, SignatureException . . . Verifies that this CRL was signed using the private key that corresponds to the specified public key.

{java.sql}
[CallableStatement]
registerOutParameter:default void registerOutParameter (int parameterIndex, SQLType sqlType) throws SQLException . . . Registers the OUT parameter of int parameterIndex to the SQLT type sqlType (throw SQLException).

registerOutParameter:default void registerOutParameter (String parameterName, SQLType sqlType) throws SQLException . . . Registers the OUT parameter named parameterName to the SQLT type sqlType (throw SQLException).

setObject:default void setObject(String parameterName, Object x, SQLType targetSqlType) throws SQLException . . . Sets the value of the designated parameter with the given object (throw SQLException).

setObject:default void setObject(String parameterName, Object x, SQLType targetSqlType, int scaleOrLength) throws SQLException . . . Sets the value of the designated parameter with the given object (throw SQLException).

[DatabaseMetaData]
getMaxLogicalLobSize:default long getMaxLogicalLobSize( ) throws SQLException . . . Gets the maximum number of bytes this database allows for the logical size for a LOB (throw SQLException).

supportsRefCursors:default boolean supportsRefCursors( ) throws SQLException . . . Gets whether REF CURSOR is supported by this database (throw SQLException).

[DriverAction]
deregister:void deregister( ) . . . Method called by DriverManager.deregisterDriver(Driver) to notify the JDBC driver that it has been deregistered.

[PreparedStatement]
executeLargeUpdate:default long executeLargeUpdate( ) throws SQLException . . . Executes the SQL statement in this PreparedStatement object (throw SQLException). It must be an SQL Data Manipulation Language (DML) statement (INSERT, UPDATE, or DELETE statement); or an SQL statement that returns nothing, such as a DDL statement.

setObject:default void setObject(int parameterIndex, Object x, SQLType targetSqlType) throws SQLException . . . Sets the value of the designated parameter with the given object (throw SQLException).

setObject:default void setObject(int parameterIndex, Object x, SQLType targetSqlType, int scaleOrLength)

throws SQLException . . . Sets the value of the designated parameter with the given object (throw SQLException).
[ResultSet]
updateObject:default void updateObject(int columnIndex, Object x, SQLType targetSqlType) throws SQLException . . . Updates the designated column with an Object value (throw SQLException).
updateObject:default void updateObject(int columnIndex, Object x, SQLType targetSqlType, int scaleOrLength) throws SQLException . . . Updates the designated column with an Object value (throw SQLException).
updateObject:default void updateObject(String columnLabel, Object x, SQLType targetSqlType) throws SQLException . . . Updates the designated column with an Object value (throw SQLException).
updateObject:default void updateObject(String columnLabel, Object x, SQLType targetSqlType, int scaleOrLength) throws SQLException . . . Updates the designated column with an Object value (throw SQLException).
[SQLInput]
readObject:default <T> T readObject(Class<T> type) throws SQLException . . . Reads the next attribute in the stream and returns it as an Object in the Java programming language (throw SQLException).
[SQLOutput]
writeObject:default void writeObject(Object x, SQLType targetSqlType) throws SQLException . . . Writes to the stream the data contained in the given object (throw SQLException).
[Statement]
executeLargeBatch:default long[ ] executeLargeBatch( ) throws SQLException . . . Submits a batch of commands to the database for execution and if all commands execute successfully, returns an array of update counts (throw SQLException).
executeLargeUpdate:default long executeLargeUpdate (String sql) throws SQLException . . . Executes the given SQL statement (throw SQLException). The SQL statement may be an INSERT, UPDATE, or DELETE statement or an SQL statement that returns nothing, such as an SQL DDL statement.
executeLargeUpdate:default long executeLargeUpdate (String sql, int autoGeneratedKeys) throws SQLException . . . Executes the given SQL statement and signal the driver with the given flag about whether the auto-generated keys produced by this Statement object should be made available for retrieval (throw SQLException).
executeLargeUpdate:default long executeLargeUpdate (String sql, int[ ] columnIndexes) throws SQLException . . . Executes the given SQL statement and signal the driver that the auto-generated keys indicated in the given array should be made available for retrieval. (throw SQLException).
executeLargeUpdate:default long executeLargeUpdate (String sql, String[ ] columnNames) throws SQLException . . . Executes the given SQL statement and signal the driver that the auto-generated keys indicated in the given array should be made available for retrieval. (throw SQLException).
getLargeMaxRows:default long getLargeMaxRows( ) throws SQLException . . . Gets the maximum number of rows that a ResultSet object produced by this Statement object can contain (throw SQLException).
getLargeUpdateCount:default long getLargeUpdateCount( ) throws SQLException . . . Gets the current result as an update count. If the result is a ResultSet object or there are no more results, −1 is returned (throw SQLException).
setLargeMaxRows:default void setLargeMaxRows(long max) throws SQLException . . . Sets the limit for the maximum number of rows that any ResultSet object generated by this Statement object can contain to the given number (throw SQLException).
[Date]
toLocalDate:public LocalDate toLocalDate( ) . . . Converts this Data object to a LocalDate.
valueOf:public static Date valueOf(LocalDate date) . . . Obtains an instance of Date from a LocalDate object with the same year, month and day of month value as the given LocalDate.
[DriverManager]
registerDriver:public static void registerDriver(Driver driver, DriverAction da) throws SQLException . . . Register the given driver with the DriverManager (throw SQLException).
[Time]
toLocalTime:public LocalTime toLocalTime( ) . . . Converts this Time object to a LocalTime.
valueOf:public static Time valueOf(LocalTime time) . . . Obtains an instance of Time from a LocalTime object with the same hour, minute and second time value as the given LocalTime.
[Timestamp]
from:public static Timestamp from(Instant instant) . . . Obtains an instance of Timestamp from an Instant object.
toInstant:public Instant toInstant( ) . . . Converts this Timestamp object to an Instant.
toLocalDateTime:public LocalDateTime toLocalDateTime( ) . . . Converts this Timestamp object to a LocalDateTime.
valueOf:public static Timestamp valueOf(LocalDateTime dateTime) . . . Obtains an instance of Timestamp from a LocalDateTime object, with the same year, month, day of month, hours, minutes, seconds and nanos date/time value as the provided LocalDateTime.
[BatchUpdateException]
getLargeUpdateCounts:public long[ ] getLargeUpdateCounts( ) . . . Retrieves the update count for each update statement in the batch update that are normally executed until this exception occurs.
{java.util}
[Collection]
parallelStream:default Stream<E> parallelStream( ) . . . Returns a possibly parallel Stream with this collection as its source.
removeIf:default boolean removeIf(Predicate<? super E> filter) . . . Removes all of the elements of this collection that satisfy the given predicate.
spliterator:default Spliterator<E> spliterator( ) . . . Creates a Spliterator over the elements in this collection.
stream:default Stream<E> stream( ) . . . Returns a sequential Stream with this collection as its source.
[Comparator]
comparing:static <T,U extends Comparable<? super U>> Comparator<T> comparing(Function<? super T,? extends U> keyExtractor) . . . Accepts a function that extracts a Comparable sort key from a type T, and returns a Comparator that compares by that sort key.

comparing:static <T,U> Comparator<T> comparing(Function<? super T,? extends U> keyExtractor, Comparator<? super U> keyComparator) . . . Accepts a function that extracts a sort key from a type T, and returns a Comparator that compares by that sort key using the specified Comparator.

comparingDouble:static <T> Comparator<T> comparingDouble(ToDoubleFunction<? super T> keyExtractor) . . . Accepts a function that extracts a double sort key from a type T, and returns a Comparator that compares by that sort key.

comparingInt:static <T> Comparator<T> comparingInt(ToIntFunction<? super T> keyExtractor) . . . Accepts a function that extracts an int sort key from a type T, and returns a Comparator that compares by that sort key.

comparingLong:static <T> Comparator<T> comparingLong(ToLongFunction<? super T> keyExtractor) . . . Accepts a function that extracts a long sort key from a type T, and returns a Comparator that compares by that sort key.

naturalOrder:static <T extends Comparable<? super T>> Comparator<T> naturalOrder( ) . . . Returns a comparator that compares Comparable objects in natural order.

nullsFirst:static <T> Comparator<T> nullsFirst(Comparator<? super T> comparator) . . . Returns a null-friendly comparator that considers null to be less than non-null.

nullsLast:static <T> Comparator<T> nullsLast(Comparator<? super T> comparator) . . . Returns a null-friendly comparator that considers null to be greater than non-null.

reversed:default Comparator<T> reversed( ) . . . Returns a reserved default comparator.

reverseOrder:static <T extends Comparable<? super T>> Comparator<T> reverseOrder( ) . . . Returns a comparator that imposes the reverse of the natural ordering.

thenComparing:default Comparator<T> thenComparing(Comparator<? super T> other) . . . Returns a lexicographic-order comparator with another comparator.

thenComparing:default <U extends Comparable<? super U>> Comparator<T> thenComparing(Function<? super T,? extends U> keyExtractor) . . . Returns a lexicographic-order comparator with a function that extracts a Comparable sort key.

thenComparing:default <U> Comparator<T> thenComparing(Function<? super T,? extends U> keyExtractor, Comparator<? super U> keyComparator) . . . Returns a lexicographic-order comparator with a function that extracts a key to be compared with the given Comparator.

thenComparingDouble:default Comparator<T> thenComparingDouble(ToDoubleFunction<? super T> keyExtractor) . . . Returns a lexicographic-order comparator with a function that extracts a double sort key.

thenComparingInt:default Comparator<T> thenComparingInt(ToIntFunction<? super T> keyExtractor) . . . Returns a lexicographic-order comparator with a function that extracts an int sort key.

thenComparingLong:default Comparator<T> thenComparingLong(ToLongFunction<? super T> keyExtractor) . . . Returns a lexicographic-order comparator with a function that extracts a long sort key.

[Iterator]
forEachRemaining:default void forEachRemaining(Consumer<? super E> action) . . . Performs the given action for each remaining element until all elements have been processed or the action throws an exception.

[List]
replaceAll:default void replaceAll(UnaryOperator<E> operator) . . . Replaces each element of this list with the result of applying the operator to that element.

sort:default void sort(Comparator<? super E> c) . . . Sorts this list by comparing the elements using the specified Comparator.

spliterator:default Spliterator<E> spliterator( ) . . . Creates a Spliterator over the elements in this list.

[Map]
compute:default V compute(K key, BiFunction<? super K,? super V,? extends V> remappingFunction) . . . Attempts to compute a mapping for the specified key and its current mapped value (or null if there is no current mapping).

computeIfAbsent:default V computeIfAbsent(K key, Function<? super K,? extends V> mappingFunction) . . . If the specified key is not already associated with a value (or is mapped to null), attempts to compute its value using the given mapping function and enters it into this map unless null.

computeIfPresent:default V computeIfPresent(K key, BiFunction<? super K,? super V,? extends V> remappingFunction) . . . If the value for the specified key is present and non-null, attempts to compute a new mapping from the key and its current mapped value.

forEach:default void forEach(BiConsumer<? super K,? super V> action) . . . Performs the given action for each entry until all entries in this map have been processed or the action throws an exception.

getOrDefault:default V getOrDefault(Object key, V defaultValue) . . . Returns the value to which the specified key is mapped. If this map contains no mapping for the key, defaultValue is returned.

merge:default V merge(K key, V value, BiFunction<? super V,? super V,? extends V> remappingFunction) . . . If the specified key is not already associated with a value or is associated with null, associates it with the given non-null value.

putIfAbsent:default V putIfAbsent(K key, V value) . . . If the specified key is not already associated with a value (or is mapped to null), associates it with the given value and returns null, else returns the current value.

remove:default boolean remove(Object key, Object value) . . . Removes the entry for the specified key only if the specified key is currently mapped to the specified value.

replace:default V replace(K key, V value) . . . Replaces the entry for the specified key only if the specified key is currently mapped to some value.

replace:default boolean replace(K key, V oldValue, V newValue) . . . Replaces the entry for the specified key only if the specified key is currently mapped to the specified value.

replaceAll:default void replaceAll(BiFunction<? super K,? super V,? extends V> function) . . . Replaces each entry's value with the result of invoking the given function on that entry until all entries have been processed or the function throws an exception.

[Map.Entry]
comparingByKey:static <K extends Comparable<? super K>,V> Comparator<Map.Entry<K,V>> comparingByKey( ) . . . Returns a comparator that compares Map.Entry in natural order on key.

comparingByKey:static <K,V> Comparator<Map.Entry<K,V>> comparingByKey(Comparator<? super K> cmp) . . . Returns a comparator that compares Map.Entry by key using the given Comparator.
comparingByValue:static <K,V extends Comparable<? super V>> Comparator<Map.Entry<K,V>> comparingByValue( ) . . . Returns a comparator that compares Map.Entry in natural order on value.
comparingByValue:static <K,V> Comparator<Map.Entry<K,V>> comparingByValue(Comparator<? super V> cmp) . . . Returns a comparator that compares Map.Entry by value using the given Comparator.

[Set]
spliterator:default Spliterator<E> spliterator( ) . . . Creates a Spliterator over the elements in this set.

[SortedSet]
spliterator:default Spliterator<E> spliterator( ) . . . Creates a Spliterator over the elements in this sorted set.

[ArrayDeque]
spliterator:public Spliterator<E> spliterator( ) . . . Creates a late-binding and fail-fast Spliterator over the elements in this deque.

[ArrayList]
spliterator:public Spliterator<E> spliterator( ) . . . Creates a late-binding and fail-fast Spliterator over the elements in this list.

[Arrays]
parallelPrefix:public static void parallelPrefix(double[ ] array, DoubleBinaryOperator op) . . . Cumulates, in parallel, each element of the given array in place, using the supplied function.
parallelPrefix:public static void parallelPrefix(double[ ] array, int fromIndex, int toIndex, DoubleBinaryOperator op) . . . Performs parallelPrefix(double[ ], DoubleBinaryOperator) for the given subrange of the array.
parallelPrefix:public static void parallelPrefix(int[ ] array, IntBinaryOperator op) . . . Cumulates, in parallel, each element of the given array in place, using the supplied function.
parallelPrefix:public static void parallelPrefix(int[ ] array, int fromIndex, int toIndex, IntBinaryOperator op) . . . Performs parallelPrefix(int[ ], IntBinaryOperator) for the given subrange of the array.
parallelPrefix:public static void parallelPrefix(long[ ] array, int fromIndex, int toIndex, LongBinaryOperator op) . . . Performs parallelPrefix(long[ ], LongBinaryOperator) for the given subrange of the array.
parallelPrefix:public static void parallelPrefix(long[ ] array, LongBinaryOperator op) . . . Cumulates, in parallel, each element of the given array in place, using the supplied function.
parallelPrefix:public static <T> void parallelPrefix(T[ ] array, BinaryOperator<T> op) . . . Cumulates, in parallel, each element of the given array in place, using the supplied function.
parallelPrefix:public static <T> void parallelPrefix(T[ ] array, int fromIndex, int toIndex, BinaryOperator<T> op) . . . Performs parallelPrefix(Object[ ], BinaryOperator) for the given subrange of the array.
parallelSetAll:public static void parallelSetAll(double[ ] array, IntToDoubleFunction generator) . . . Sets all elements of the specified array, in parallel, using the provided generator function to compute each element.
parallelSetAll:public static void parallelSetAll(int[ ] array, IntUnaryOperator generator) . . . Sets all elements of the specified array, in parallel, using the provided generator function to compute each element.
parallelSetAll:public static void parallelSetAll(long[ ] array, IntToLongFunction generator) . . . Sets all elements of the specified array, in parallel, using the provided generator function to compute each element.
parallelSetAll:public static <T> void parallelSetAll(T[ ] array, IntFunction<? extends T> generator) . . . Sets all elements of the specified array, in parallel, using the provided generator function to compute each element.
parallelSort:public static void parallelSort(byte[ ] a) . . . Sorts the specified array into ascending numerical order.
parallelSort:public static void parallelSort(byte[ ] a, int fromIndex, int toIndex) . . . Sorts the specified range into ascending numerical order.
parallelSort:public static void parallelSort(char[ ] a) . . . Sorts the specified array into ascending numerical order.
parallelSort:public static void parallelSort(char[ ] a, int fromIndex, int toIndex) . . . Sorts the specified range into ascending numerical order.
parallelSort:public static void parallelSort(double[ ] a) . . . Sorts the specified array into ascending numerical order.
parallelSort:public static void parallelSort(double[ ] a, int fromIndex, int toIndex) . . . Sorts the specified range into ascending numerical order.
parallelSort:public static void parallelSort(float[ ] a) . . . Sorts the specified array into ascending numerical order.
parallelSort:public static void parallelSort(float[ ] a, int fromIndex, int toIndex) . . . Sorts the specified range into ascending numerical order.
parallelSort:public static void parallelSort(int[ ] a) . . . Sorts the specified array into ascending numerical order.
parallelSort:public static void parallelSort(int[ ] a, int fromIndex, int toIndex) . . . Sorts the specified range into ascending numerical order.
parallelSort:public static void parallelSort(long[ ] a) . . . Sorts the specified array into ascending numerical order.
parallelSort:public static void parallelSort(long[ ] a, int fromIndex, int toIndex) . . . Sorts the specified range into ascending numerical order.
parallelSort:public static void parallelSort(short[ ] a) . . . Sorts the specified array into ascending numerical order.
parallelSort:public static void parallelSort(short[ ] a, int fromIndex, int toIndex) . . . Sorts the specified range into ascending numerical order.
parallelSort:public static <T extends Comparable<? super T>> void parallelSort(T[ ] a) . . . Sorts the specified array of objects into ascending order, according to the natural ordering of its elements.
parallelSort:public static <T> void parallelSort(T[ ] a, Comparator<? super T> cmp) . . . Sorts the specified array of objects according to the order induced by the specified comparator.
parallelSort:public static <T extends Comparable<? super T>> void parallelSort(T[ ] a, int fromIndex, int toIndex) . . . Sorts the specified range of the specified array of objects into ascending order, according to the natural ordering of its elements.
parallelSort:public static <T> void parallelSort(T[ ] a, int fromIndex, int toIndex, Comparator<? super T> cmp) . . . Sorts the specified range of the specified array of objects into ascending order, according to the order induced by the specified comparator.
setAll:public static void setAll(double[ ] array, IntToDoubleFunction generator) . . . Sets all elements of the specified array using the provided generator function to compute each element.
setAll:public static void setAll(int[ ] array, IntUnaryOperator generator) . . . Sets all elements of the specified array using the provided generator function to compute each element.
setAll:public static void setAll(long[ ] array, IntToLongFunction generator) . . . Sets all elements of the specified array using the provided generator function to compute each element.
setAll:public static <T> void setAll(T[ ] array, IntFunction<? extends T> generator) . . . Sets all elements of the specified array, using the provided generator function to compute each element.
spliterator:public static Spliterator.OfDouble spliterator (double[ ] array) . . . Returns a Spliterator.OfDouble covering all of the specified array.
spliterator:public static Spliterator.OfDouble spliterator (double[ ] array, int startInclusive, int endExclusive) . . . Returns a Spliterator.OfDouble covering the specified range of the specified array.
spliterator:public static Spliterator.OfInt spliterator(int[ ] array) . . . Returns a Spliterator.OfInt covering all of the specified array.
spliterator:public static Spliterator.OfInt spliterator(int[ ] array, int startInclusive, int endExclusive) . . . Returns a Spliterator.OfInt covering the specified range of the specified array.
spliterator:public static Spliterator.OfLong spliterator (long[ ] array) . . . Returns a Spliterator.OfLong covering all of the specified array.
spliterator:public static Spliterator.OfLong spliterator (long[ ] array, int startInclusive, int endExclusive) . . . Returns a Spliterator.OfLong covering the specified range of the specified array.
spliterator:public static <T> Spliterator<T> spliterator (T[ ] array) . . . Returns a Spliterator covering all of the specified array.
spliterator:public static <T> Spliterator<T> spliterator (T[ ] array, int startInclusive, int endExclusive) . . . Returns a Spliterator covering the specified range of the specified array.
stream:public static DoubleStream stream(double[ ] array) . . . Returns a sequential DoubleStream with the specified array as its source.
stream:public static DoubleStream stream(double[ ] array, int startInclusive, int endExclusive) . . . Returns a sequential DoubleStream with the specified range of the specified array as its source.
stream:public static IntStream stream(int[ ] array) . . . Returns a sequential IntStream with the specified array as its source.
stream:public static IntStream stream(int[ ] array, int startInclusive, int endExclusive) . . . Returns a sequential IntStream with the specified range of the specified array as its source.
stream:public static LongStream stream(long[ ] array) . . . Returns a sequential LongStream with the specified array as its source.
stream:public static LongStream stream(long[ ] array, int startInclusive, int endExclusive) . . . Returns a sequential LongStream with the specified range of the specified array as its source.
stream:public static <T> Stream<T> stream(T[ ] array) . . . Returns a sequential Stream with the specified array as its source.
stream:public static <T> Stream<T> stream(T[ ] array, int startInclusive, int endExclusive) . . . Returns a sequential Stream with the specified range of the specified array as its source.

[BitSet]
stream:public IntStream stream( ) . . . Returns a stream of indices for which this BitSet retains a bit in the set state.

[Calendar]
getAvailableCalendarTypes:public static Set<String> getAvailableCalendarTypes( ) . . . Returns an unmodifiable Set containing all calendar types supported by Calendar in the runtime environment.
getCalendarType:public String getCalendarType( ) . . . Returns the calendar type of this Calendar.
toInstant:public final Instant toInstant( ) . . . Converts this object to an Instant.

[Collections]
checkedNavigableMap:public static <K,V> NavigableMap<K,V> checkedNavigableMap (NavigableMap<K,V> m, Class<K> keyType, Class<V> valueType) . . . Returns a dynamically typesafe view of a specified navigable map.
checkedNavigableSet:public static <E> NavigableSet<E> checkedNavigableSet (NavigableSet<E> s, Class<E> type) . . . Returns a dynamically typesafe view of a specified navigable set.
checkedQueue:public static <E> Queue<E> checkedQueue(Queue<E> queue, Class<E> type) . . . Returns a dynamically typesafe view of a specified queue.
emptyNavigableMap:public static final <K,V> NavigableMap<K,V> emptyNavigableMap( ) . . . Returns an empty navigable map (immutable).
emptyNavigableSet:public static <E> NavigableSet<E> emptyNavigableSet( ) . . . Returns an empty navigable set (immutable).
emptySortedMap:public static final <K,V> SortedMap<K,V> emptySortedMap( ) . . . Returns an empty sorted map (immutable).
emptySortedSet:public static <E> SortedSet<E> emptySortedSet( ) . . . Returns an empty sorted set (immutable).
synchronizedNavigableMap:public static <K,V> NavigableMap<K,V> synchronizedNavigableMap (NavigableMap<K,V> m) . . . Returns a synchronized (thread-safe) navigable map backed by the specified navigable map.
synchronizedNavigableSet:public static <T> NavigableSet<T> synchronizedNavigableSet (NavigableSet<T> s) . . . Returns a synchronized (thread-safe) navigable set backed by the specified navigable map.
unmodifiableNavigableMap:public static <K,V> NavigableMap<K,V> unmodifiableNavigableMap (NavigableMap<K,? extends V> m) . . . Returns an unmodifiable view of the specified navigable map.
unmodifiableNavigableSet:public static <T> NavigableSet<T> unmodifiableNavigableSet (NavigableSet<T> s) . . . Returns an unmodifiable view of the specified navigable set.

[Date]
from:public static Data from(Instant instant) . . . Obtains an instance of Data from an Instant object.
toInstant:public Instant toInstant( ) . . . Converts this Data object to an Instant.
[GregorianCalendar]
from:public static GregorianCalendar from(ZonedDateTime zdt) . . . Obtains an instance of GregorianCalendar with the default locale from a ZonedDateTime object.
getCalendarType:public String getCalendarType( ) . . . Returns "gregory" as the calendar type.
toZonedDateTime:public ZonedDateTime toZonedDateTime( ) . . . Converts this object to a ZonedDateTime that represents the same point on the time-line as this GregorianCalendar.
[HashSet]
spliterator:public Spliterator<E> spliterator( ) . . . Creates a late-binding and fail-fast Spliterator over the elements in this set.
[LinkedHashSet]
spliterator:public Spliterator<E> spliterator( ) . . . Creates a late-binding and fail-fast Spliterator over the elements in this set.
[LinkedList]
spliterator:public Spliterator<E> spliterator( ) . . . Creates a late-binding and fail-fast Spliterator over the elements in this list.
[Locale]
filter:public static List<Locale> filter (List<Locale.LanguageRange> priorityList, Collection<Locale> locales) . . . Returns a list of matching Locale instances using the filtering mechanism defined in RFC 4647.
filter:public static List<Locale> filter (List<Locale.LanguageRange> priorityList, Collection<Locale> locales, Locale.FilteringMode mode) . . . Returns a list of matching Locale instances using the filtering mechanism defined in RFC 4647.
filterTags:public static List<String> filterTags (List<Locale.LanguageRange> priorityList, Collection<String> tags) . . . Returns a list of matching language tags using the basic filtering mechanism defined in RFC 4647.
filterTags:public static List<String> filterTags (List<Locale.LanguageRange> priorityList, Collection<String> tags, Locale.FilteringMode mode) . . . Returns a list of matching language tags using the basic filtering mechanism defined in RFC 4647.
hasExtensions:public boolean hasExtensions( ) . . . Returns true if this Locale has any extensions.
lookup:public static Locale lookup (List<Locale.LanguageRange> priorityList, Collection<Locale> locales) . . . Returns a Locale instance for the best-matching language tag using the lookup mechanism defined in RFC 4647.
lookupTag:public static String lookupTag (List<Locale.LanguageRange> priorityList, Collection<String> tags) . . . Returns the best-matching language tag using the lookup mechanism defined in RFC 4647.
stripExtensions:public Locale stripExtensions( ) . . . Returns a copy of this Locale with no extensions.
[Objects]
isNull:public static boolean isNull(Object obj) . . . Returns true if the provided reference is null, otherwise returns false.
nonNull:public static boolean nonNull(Object obj) . . . Returns true if the provided reference is non-null, otherwise returns false.
requireNonNull:public static <T> T requireNonNull(T obj, Supplier<String> messageSupplier) . . . Checks that the specified object reference is not null and throws a customized NullPointerException if it is null.
[PriorityQueue]
spliterator:public final Spliterator<E> spliterator( ) . . . Creates a late-binding and fail-fast Spliterator over the elements in this queue.
[Random]
doubles:public DoubleStream doubles( ) . . . Returns an effectively unlimited stream of pseudorandom double values, each between zero (inclusive) and one (exclusive).
doubles:public DoubleStream doubles(double randomNumberOrigin, double randomNumberBound) . . . Returns an effectively unlimited stream of pseudorandom double values, each conforming to the given origin (inclusive) and bound (exclusive).
doubles:public DoubleStream doubles(long streamSize) . . . Returns a stream producing the given streamSize number of pseudorandom double values, each between zero (inclusive) and one (exclusive).
doubles:public DoubleStream doubles(long streamSize, double randomNumberOrigin, double randomNumberBound) . . . Returns a stream producing the given streamSize number of pseudorandom double values, each conforming to the given origin (inclusive) and bound (exclusive).
ints:public IntStream ints( ) . . . Returns an effectively unlimited stream of pseudorandom int values.
ints:public IntStream ints(int randomNumberOrigin, int randomNumberBound) . . . Returns an effectively unlimited stream of pseudorandom int values, each conforming to the given origin (inclusive) and bound (exclusive).
ints:public IntStream ints(long streamSize) . . . Returns a stream producing the given streamSize number of pseudorandom int values.
ints:public IntStream ints(long streamSize, int randomNumberOrigin, int randomNumberBound) . . . Returns a stream producing the given streamSize number of pseudorandom int values, each conforming to the given origin (inclusive) and bound (exclusive).
longs:public LongStream longs( ) . . . Returns an effectively unlimited stream of pseudorandom long values.
longs:public LongStream longs(long streamSize) . . . Returns a stream producing the given streamSize number of pseudorandom long values.
longs:public LongStream longs(long randomNumberOrigin, long randomNumberBound) . . . Returns an effectively unlimited stream of pseudorandom long values, each conforming to the given origin (inclusive) and bound (exclusive).
longs:public LongStream longs(long streamSize, long randomNumberOrigin, long randomNumberBound) . . . Returns a stream producing the given streamSize number of pseudorandom long, each conforming to the given origin (inclusive) and bound (exclusive).
[ResourceBundle]
getBaseBundleName:public String getBaseBundleName( ) . . . Returns the base name of this bundle, if known, or null if unknown.

[TimeZone]
getTimeZone:public static TimeZone getTimeZone(ZoneId zoneId) . . . Gets the TimeZone for the given zoneId.
toZoneId:public ZoneId toZoneId( ) . . . Convert this TimeZone object to a ZoneId.
[TreeSet]
spliterator:public Spliterator<E> spliterator( ) . . . Creates a late-binding and fail-fast Spliterator over the elements in this set.
[Vector]
spliterator:public Spliterator<E> spliterator( ) . . . Creates a late-binding and fail-fast Spliterator over the elements in this list.
{java.util.concurrent}
[ConcurrentMap]
compute:default V compute(K key, BiFunction<? super K,? super V,? extends V> remappingFunction) . . . Attempts to compute a mapping for the specified key and its current mapped value (or null if there is no current mapping).
computeIfAbsent:default V computeIfAbsent(K key, Function<? super K,? extends V> mappingFunction) . . . If the specified key is not already associated with a value (or is mapped to null), attempts to compute its value using the given mapping function and enters it into this map unless null.
computeIfPresent:default V computeIfPresent(K key, BiFunction<? super K,? super V,? extends V> remappingFunction) . . . If the value for the specified key is present and non-null, attempts to compute a new mapping from the key and its current mapped value.
forEach:default void forEach(BiConsumer<? super K,? super V> action) . . . Performs the given action for each entry until all entries in this map have been processed or the action throws an exception.
getOrDefault:default V getOrDefault(Object key, V defaultValue) . . . Returns the value to which the specified key is mapped. If this map contains no mapping for the key, defaultValue is returned.
merge:default V merge(K key, V value, BiFunction<? super V,? super V,? extends V> remappingFunction) . . . If the specified key is not already associated with a value or is associated with null, associates it with the given non-null value.
replaceAll:default void replaceAll(BiFunction<? super K,? super V,? extends V> function) . . . Replaces each entry's value with the result of invoking the given function on that entry until all entries have been processed or the function throws an exception.
[ArrayBlockingQueue]
spliterator:public Spliterator<E> spliterator( ) . . . Returns a Spliterator over the elements in this queue.
[ConcurrentHashMap]
forEach:public void forEach(long parallelismThreshold, BiConsumer<? super K,? super V> action) . . . Performs the given action for each (key, value).
forEach:public <U> void forEach(long parallelismThreshold, BiFunction<? super K,? super V,? extends U> transformer, Consumer<? super U> action) . . . Performs the given action for each non-null transformation of each (key, value).
forEachEntry:public void forEachEntry(long parallelismThreshold, Consumer<? super Map.Entry<K,V>> action) . . . Performs the given action for each entry.
forEachEntry:public <U> void forEachEntry(long parallelismThreshold, Function<Map.Entry<K,V>,? extends U> transformer, Consumer<? super U> action) . . . Performs the given action for each non-null transformation of each entry.
forEachKey:public void forEachKey(long parallelismThreshold, Consumer<? super K> action) . . . Performs the given action for each key.
forEachKey:public <U> void forEachKey(long parallelismThreshold, Function<? super K,? extends U> transformer, Consumer<? super U> action) . . . Performs the given action for each non-null transformation of each key.
forEachValue:public void forEachValue(long parallelismThreshold, Consumer<? super V> action) . . . Performs the given action for each value.
forEachValue:public <U> void forEachValue(long parallelismThreshold, Function<? super V,? extends U> transformer, Consumer<? super U> action) . . . Performs the given action for each non-null transformation of each value.
mappingCount:public long mappingCount( ) . . . Returns the number of mappings.
newKeySet:public static <K> ConcurrentHashMap.KeySetView<K,Boolean> newKeySet( ) . . . Creates a new Set backed by a ConcurrentHashMap from the given type to Boolean.TRUE.
newKeySet:public static <K> ConcurrentHashMap.KeySetView<K,Boolean> newKeySet(int initialCapacity) . . . Creates a new Set backed by a ConcurrentHashMap from the given type to Boolean.TRUE.
reduce:public <U> U reduce(long parallelismThreshold, BiFunction<? super K,? super V,? extends U> transformer, BiFunction<? super U,? super U,? extends U> reducer) . . . Returns the result of accumulating the given transformation of all (key, value) pairs using the given reducer to combine values, or null if none.
reduceEntries:public Map.Entry<K,V> reduceEntries(long parallelismThreshold, BiFunction<Map.Entry<K,V>,Map.Entry<K,V>,? extends Map.Entry<K,V>> reducer) . . . Returns the result of accumulating all entries using the given reducer to combine values, or null if none.
reduceEntries:public <U> U reduceEntries(long parallelismThreshold, Function<Map.Entry<K,V>,? extends U> transformer, BiFunction<? super U,? super U,? extends U> reducer) . . . Returns the result of accumulating the given transformation of all entries using the given reducer to combine values, or null if none.
reduceEntriesToDouble:public double reduceEntriesToDouble(long parallelismThreshold, ToDoubleFunction<Map.Entry<K,V>> transformer, double basis, DoubleBinaryOperator reducer) . . . Returns the result of accumulating the given transformation of all entries using the given reducer to combine values, and the given basis as an identity value.
reduceEntriesToInt:public int reduceEntriesToInt(long parallelismThreshold, ToIntFunction<Map.Entry<K,V>> transformer, int basis, IntBinaryOperator reducer) . . . Returns the result of accumulating the given transformation of all entries using the given reducer to combine values, and the given basis as an identity value.
reduceEntriesToLong:public long reduceEntriesToLong(long parallelismThreshold, ToLongFunction<Map.Entry<K,V>> transformer, long basis, LongBinaryOperator reducer) . . . Returns the result of accumulating the given transformation of all entries using the given reducer to combine values, and the given basis as an identity value.

reduceKeys:public K reduceKeys(long parallelismThreshold, BiFunction<? super K,? super K,? extends K> reducer) . . . Returns the result of accumulating all keys using the given reducer to combine values, or null if none.

reduceKeys:public <U> U reduceKeys(long parallelismThreshold, Function<? super K,? extends U> transformer, BiFunction<? super U,? super U,? extends U> reducer) . . . Returns the result of accumulating the given transformation of all keys using the given reducer to combine values, or null if none.

reduceKeysToDouble:public double reduceKeysToDouble(long parallelismThreshold, ToDoubleFunction<? super K> transformer, double basis, DoubleBinaryOperator reducer) . . . Returns the result of accumulating the given transformation of all keys using the given reducer to combine values, and the given basis as an identity value.

reduceKeysToInt:public int reduceKeysToInt(long parallelismThreshold, ToIntFunction<? super K> transformer, int basis, IntBinaryOperator reducer) . . . Returns the result of accumulating the given transformation of all keys using the given reducer to combine values, and the given basis as an identity value.

reduceKeysToLong:public long reduceKeysToLong(long parallelismThreshold, ToLongFunction<? super K> transformer, long basis, LongBinaryOperator reducer) . . . Returns the result of accumulating the given transformation of all keys using the given reducer to combine values, and the given basis as an identity value.

reduceToDouble:public double reduceToDouble(long parallelismThreshold, ToDoubleBiFunction<? super K,? super V> transformer, double basis, DoubleBinaryOperator reducer) . . . Returns the result of accumulating the given transformation of all (key, value) pairs using the given reducer to combine values, and the given basis as an identity value.

reduceToInt:public int reduceToInt(long parallelismThreshold, ToIntBiFunction<? super K,? super V> transformer, int basis, IntBinaryOperator reducer) . . . Returns the result of accumulating the given transformation of all (key, value) pairs using the given reducer to combine values, and the given basis as an identity value.

reduceToLong:public long reduceToLong(long parallelismThreshold, ToLongBiFunction<? super K,? super V> transformer, long basis, LongBinaryOperator reducer) . . . Returns the result of accumulating the given transformation of all (key, value) pairs using the given reducer to combine values, and the given basis as an identity value.

reduceValues:public V reduceValues(long parallelismThreshold, BiFunction<? super V,? super V,? extends V> reducer) . . . Returns the result of accumulating all values using the given reducer to combine values, or null if none.

reduceValues:public <U> U reduceValues(long parallelismThreshold, Function<? super V,? extends U> transformer, BiFunction<? super U,? super U,? extends U> reducer) . . . Returns the result of accumulating the given transformation of all values using the given reducer to combine values, or null if none.

reduceValuesToDouble:public double reduceValuesToDouble(long parallelismThreshold, ToDoubleFunction<? super V> transformer, double basis, DoubleBinaryOperator reducer) . . . Returns the result of accumulating the given transformation of all values using the given reducer to combine values, and the given basis as an identity value.

reduceValuesToInt:public int reduceValuesToInt(long parallelismThreshold, ToIntFunction<? super V> transformer, int basis, IntBinaryOperator reducer) . . . Returns the result of accumulating the given transformation of all values using the given reducer to combine values, and the given basis as an identity value.

reduceValuesToLong:public long reduceValuesToLong(long parallelismThreshold, ToLongFunction<? super V> transformer, long basis, LongBinaryOperator reducer) . . . Returns the result of accumulating the given transformation of all values using the given reducer to combine values, and the given basis as an identity value.

search:public <U> U search(long parallelismThreshold, BiFunction<? super K,? super V,? extends U> searchFunction) . . . Returns a non-null result from applying the given search function on each (key, value), or null if none.

searchEntries:public <U> U searchEntries(long parallelismThreshold, Function<Map.Entry<K,V>,? extends U> searchFunction) . . . Returns a non-null result from applying the given search function on each entry, or null if none.

searchKeys:public <U> U searchKeys(long parallelismThreshold, Function<? super K,? extends U> searchFunction) . . . Returns a non-null result from applying the given search function on each key, or null if none.

searchValues:public <U> U searchValues(long parallelismThreshold, Function<? super V,? extends U> searchFunction) . . . Returns a non-null result from applying the given search function on each value, or null if none.

[ConcurrentLinkedDeque]

spliterator:public Spliterator<E> spliterator( ) . . . Returns a Spliterator over the elements in this deque.

[ConcurrentLinkedQueue]

spliterator:public Spliterator<E> spliterator( ) . . . Returns a Spliterator over the elements in this queue.

[ConcurrentSkipListMap]

compute:public V compute(K key, BiFunction<? super K,? super V,? extends V> remappingFunction) . . . Attempts to compute a mapping for the specified key and its current mapped value (or null if there is no current mapping).

computeIfAbsent:public V computeIfAbsent(K key, Function<? super K,? extends V> mappingFunction) . . . If the specified key is not already associated with a value, attempts to compute its value using the given mapping function and enters it into this map unless null.

computeIfPresent:public V computeIfPresent(K key, BiFunction<? super K,? super V,? extends V> remappingFunction) . . . If the value for the specified key is present, attempts to compute a new mapping from the key and its current mapped value.

getOrDefault:public V getOrDefault(Object key, V defaultValue) . . . Returns the value to which the specified key is mapped. If this map contains no mapping for the key, the specified defaultValue is returned.

merge:public V merge(K key, V value, BiFunction<? super V,? super V,? extends V> remappingFunction) . . . If the specified key is not already associated with a value, associates it with the given non-null value.

[ConcurrentSkipListSet]

spliterator:public Spliterator<E> spliterator( ) . . . Returns a Spliterator over the elements in this set.

[CopyOnWriteArrayList]

spliterator:public Spliterator<E> spliterator( ) . . . Returns a Spliterator over the elements in this list.

[CopyOnWriteArraySet]

spliterator:public Spliterator<E> spliterator( ) . . . Returns a Spliterator over the elements in this set in the order in which these elements are added.

[Executors]

newWorkStealingPool:public static ExecutorService newWorkStealingPool( ) . . . Creates a work-stealing thread pool using all available processors as its target parallelism level.

newWorkStealingPool:public static ExecutorService newWorkStealingPool(int parallelism) . . . Creates a thread pool that maintains enough threads to support the given parallelism level, and may use multiple queues to reduce contention.

[ForkJoinPool]

commonPool:public static ForkJoinPool common=Pool( ) . . . Returns the common pool instance.

getCommonPoolParallelism:public static int getCommonPoolParallelism( ) . . . Returns the targeted parallelism level of the common pool.

[ForkJoinTask]

compareAndSetForkJoinTaskTag:public final boolean compareAndSetForkJoinTaskTag(short e, short tag) . . . Atomically conditionally sets the tag value for this task.

getForkJoinTaskTag:public final short getForkJoinTaskTag( ) . . . Returns the tag for this task.

quietlyComplete:public final void quietlyComplete( ) . . . Completes this task normally without setting a value.

setForkJoinTaskTag:public final short setForkJoinTaskTag(short tag) . . . Atomically sets the tag value for this task.

[LinkedBlockingDeque]

spliterator:public Spliterator<E> spliterator( ) . . . Returns a Spliterator over the elements in this deque.

[LinkedBlockingQueue]

spliterator:public Spliterator<E> spliterator( ) . . . Returns a Spliterator over the elements in this queue.

[LinkedTransferQueue]

spliterator:public Spliterator<E> spliterator( ) . . . Returns a Spliterator over the elements in this queue.

[PriorityBlockingQueue]

spliterator:public Spliterator<E> spliterator( ) . . . Returns a Spliterator over the elements in this queue.

[SynchronousQueue]

spliterator:public Spliterator<E> spliterator( ) . . . Returns an empty spliterator in which calls to Spliterator.trySplit( ) always return null.

[ThreadLocalRandom]

doubles:public DoubleStream doubles( ) . . . Returns an effectively unlimited stream of pseudorandom double values, each between zero (inclusive) and one (exclusive).

doubles:public DoubleStream doubles(double randomNumberOrigin, double randomNumberBound) . . . Returns an effectively unlimited stream of pseudorandom double values, each conforming to the given origin (inclusive) and bound (exclusive).

doubles:public DoubleStream doubles(long streamSize) . . . Returns a stream producing the given streamSize number of pseudorandom double values, each between zero (inclusive) and one (exclusive).

doubles:public DoubleStream doubles(long streamSize, double randomNumberOrigin, double randomNumberBound) . . . Returns a stream producing the given streamSize number of pseudorandom double values, each conforming to the given origin (inclusive) and bound (exclusive).

ints:public IntStream ints( ) . . . Returns an effectively unlimited stream of pseudorandom int values.

ints:public IntStream ints(int randomNumberOrigin, int randomNumberBound) . . . Returns an effectively unlimited stream of pseudorandom int values, each conforming to the given origin (inclusive) and bound (exclusive).

ints:public IntStream ints(long streamSize) . . . Returns a stream producing the given streamSize number of pseudorandom int values.

ints:public IntStream ints(long streamSize, int randomNumberOrigin, int randomNumberBound) . . . Returns a stream producing the given streamSize number of pseudorandom int values, each conforming to the given origin (inclusive) and bound (exclusive).

longs:public LongStream longs( ) . . . Returns an effectively unlimited stream of pseudorandom long values.

longs:public LongStream longs(long streamSize) . . . Returns a stream producing the given streamSize number of pseudorandom long values.

longs:public LongStream longs(long randomNumberOrigin, long randomNumberBound) . . . Returns an effectively unlimited stream of pseudorandom long values, each conforming to the given origin (inclusive) and bound (exclusive).

longs:public LongStream longs(long streamSize, long randomNumberOrigin, long randomNumberBound) . . . Returns a stream producing the given streamSize number of pseudorandom long, each conforming to the given origin (inclusive) and bound (exclusive).

{java.util.concurrent.atomic}

This package "ava.util.concurrent.atomic" is a small toolkit of classes that support lock-free thread-safe programming on single variables. ("atomic" includes the meaning of "microscopic").

[AtomicInteger]

accumulateAndGet:public final int accumulateAndGet(int x, IntBinaryOperator accumulatorFunction) . . . Atomically updates the current value with the results of applying the given function to the current and given values, returning the updated value.

getAndAccumulate:public final int getAndAccumulate(int x, IntBinaryOperator accumulatorFunction) . . . Atomically updates the current value with the results of applying the given function to the current and given values, returning the previous value.

getAndUpdate:public final int getAndUpdate(IntUnaryOperator updateFunction) . . . Atomically updates the current value with the results of applying the given function, returning the previous value.

updateAndGet:public final int updateAndGet(IntUnaryOperator updateFunction) . . . Atomically updates the current value with the results of applying the given function, returning the updated value.

[AtomicIntegerArray]

accumulateAndGet:public final int accumulateAndGet (int i, int x, IntBinaryOperator accumulatorFunction) . . . Atomically updates the element at index i with the results of applying the given function to the current and given values, returning the updated value.

getAndAccumulate:public final int getAndAccumulate (int i, int x, IntBinaryOperator accumulatorFunction) . . . Atomically updates the element at index i with the results of applying the given function to the current and given values, returning the previous value.

getAndUpdate:public final int getAndUpdate(int i, IntUnaryOperator updateFunction) . . . Atomically updates the element at index i with the results of applying the given function, returning the previous value.

updateAndGet:public final int updateAndGet(int i, IntUnaryOperator updateFunction) . . . Atomically updates the element at index i with the results of applying the given function, returning the updated value.

[AtomicIntegerFieldUpdater]

accumulateAndGet:public final int accumulateAndGet(T obj, int x, IntBinaryOperator accumulatorFunction) . . . Atomically updates the element at index i with the results of applying the given function to the current and given values, returning the updated value.

getAndAccumulate:public final int getAndAccumulate(T obj, int x, IntBinaryOperator accumulatorFunction) . . . Atomically updates the element at index i with the results of applying the given function to the current and given values, returning the previous value.

getAndUpdate:public final int getAndUpdate(T obj, IntUnaryOperator updateFunction) . . . Atomically updates the field of the given object managed by this updater with the results of applying the given function, returning the previous value.

updateAndGet:public final int updateAndGet(T obj, IntUnaryOperator updateFunction) . . . Atomically updates the field of the given object managed by this updater with the results of applying the given function, returning the updated value.

[AtomicLong]

accumulateAndGet:public final long accumulateAndGet (long x, LongBinaryOperator accumulatorFunction) . . . Atomically updates the current value with the results of applying the given function to the current and given values, returning the updated value.

getAndAccumulate:public final long getAndAccumulate (long x, LongBinaryOperator accumulatorFunction) . . . Atomically updates the current value with the results of applying the given function to the current and given values, returning the previous value.

getAndUpdate:public final long getAndUpdate(LongUnaryOperator updateFunction) . . . Atomically updates the current value with the results of applying the given function, returning the previous value.

updateAndGet:public final long updateAndGet(LongUnaryOperator updateFunction) . . . Atomically updates the current value with the results of applying the given function, returning the updated value.

[AtomicLongArray]

accumulateAndGet:public final long accumulateAndGet (int i, long x, LongBinaryOperator accumulatorFunction) . . . Atomically updates the element at index i with the results of applying the given function to the current and given values, returning the updated value.

getAndAccumulate:public final long getAndAccumulate (int i, long x, LongBinaryOperator accumulatorFunction) . . . Atomically updates the element at index i with the results of applying the given function to the current and given values, returning the previous value.

getAndUpdate:public final long getAndUpdate(int i, LongUnaryOperator updateFunction) . . . Atomically updates the element at index i with the results of applying the given function, returning the previous value.

updateAndGet:public final long updateAndGet(int i, LongUnaryOperator updateFunction) . . . Atomically updates the element at index i with the results of applying the given function, returning the updated value.

[AtomicLongFieldUpdater]

accumulateAndGet:public final long accumulateAndGet(T obj, long x, LongBinaryOperator accumulatorFunction) . . . Atomically updates the element at index i with the results of applying the given function to the current and given values, returning the updated value.

getAndAccumulate:public final long getAndAccumulate(T obj, long x, LongBinaryOperator accumulatorFunction) . . . Atomically updates the element at index i with the results of applying the given function to the current and given values, returning the previous value.

getAndUpdate:public final long getAndUpdate(T obj, LongUnaryOperator updateFunction) . . . Atomically updates the field of the given object managed by this updater with the results of applying the given function, returning the previous value.

updateAndGet:public final long updateAndGet(T obj, LongUnaryOperator updateFunction) . . . Atomically updates the field of the given object managed by this updater with the results of applying the given function, returning the updated value.

[AtomicReference]

accumulateAndGet:public final V accumulateAndGet(V x, BinaryOperator<V> accumulatorFunction) . . . Atomically updates the current value with the results of applying the given function to the current and given values, returning the updated value.

getAndAccumulate:public final V getAndAccumulate(V x, BinaryOperator<V> accumulatorFunction) . . . Atomically updates the current value with the results of applying the given function to the current and given values, returning the previous value.

getAndUpdate:public final V getAndUpdate (UnaryOperator<V> updateFunction) . . . Atomically updates the current value with the results of applying the given function, returning the previous value.

updateAndGet:public final V updateAndGet (UnaryOperator<V> updateFunction) . . . Atomically updates the current value with the results of applying the given function, returning the updated value.

[AtomicReferenceArray]

accumulateAndGet:public final E accumulateAndGet(int i, E x, BinaryOperator<E> accumulatorFunction) . . . Atomically updates the element at index i with the results of applying the given function to the current and given values, returning the updated value.

getAndAccumulate:public final E getAndAccumulate(int i, E x, BinaryOperator<E> accumulatorFunction) . . . Atomically updates the element of the index i with the results of applying the given function to the current and given values, returning the previous value.

getAndUpdate:public final E getAndUpdate(int i, UnaryOperator<E> updateFunction) . . . Atomically updates the element at index i with the results of applying the given function, returning the previous value.

updateAndGet:public final E updateAndGet(int i, UnaryOperator<E> updateFunction) . . . Atomically updates the element at index i with the results of applying the given function, returning the updated value.

[AtomicReferenceFieldUpdater]

accumulateAndGet:public final V accumulateAndGet(T obj, V x, BinaryOperator<V> accumulatorFunction) . . . Atomically updates the element at index i with the results of applying the given function to the current and given values, returning the updated value.

getAndAccumulate:public final V getAndAccumulate(T obj, V x, BinaryOperator<V> accumulatorFunction) . . . Atomically updates the element at index i with the results of applying the given function to the current and given values, returning the previous value.

getAndUpdate:public final V getAndUpdate(T obj, UnaryOperator<V> updateFunction) . . . Atomically updates the field of the given object managed by this updater with the results of applying the given function, returning the previous value.

updateAndGet:public final V updateAndGet(T obj, UnaryOperator<V> updateFunction) . . . Atomically updates the field of the given object managed by this updater with the results of applying the given function, returning the updated value.

{java.util.logging}

[Logger]

config:public void config(Supplier<String> msgSupplier) . . . Logs a CONFIG. message, which is only to be constructed if the logging level is such that the message will actually be logged.

fine:public void fine(Supplier<String> msgSupplier) . . . Logs a FINE message, which is only to be constructed if the logging level is such that the message will actually be logged.

finer:public void finer(Supplier<String> msgSupplier) . . . Logs a FINER message, which is only to be constructed if the logging level is such that the message will actually be logged.

finest:public void finest(Supplier<String> msgSupplier) . . . Logs a FINEST message, which is only to be constructed if the logging level is such that the message will actually be logged.

information:public void info(Supplier<String> msgSupplier) . . . Logs an INFO message, which is only to be constructed if the logging level is such that the message will actually be logged.

log:public void log(Level level, Throwable thrown, Supplier<String> msgSupplier) . . . Logs a lazily constructed message, with associated Throwable information.

logp:public void logp(Level level, String sourceClass, String sourceMethod, Supplier<String> msgSupplier) . . . Logs a lazily constructed message, specifying source class and method, with no arguments.

logp:public void logp(Level level, String sourceClass, String sourceMethod, Throwable thrown, Supplier<String> msgSupplier) . . . Logs a lazily constructed message, specifying source class and method, with associated Throwable information.

logrb:public void logrb(Level level, String sourceClass, String sourceMethod, ResourceBundle bundle, String msg, Object . . . params) . . . Logs a message, specifying source class, method, and resource bundle, with an optional list of message parameters.

logrb:public void logrb(Level level, String sourceClass, String sourceMethod, ResourceBundle bundle, String msg, Throwable thrown) . . . Logs a message, specifying source class, method, and resource bundle, with associated Throwable information.

setResourceBundle:public void setResourceBundle(ResourceBundle bundle) . . . Sets a resource bundle on this logger.

severe:public void severe(Supplier<String> msgSupplier) . . . Logs a SEVERE message, which is only to be constructed if the logging level is such that the message will actually be logged.

warning:public void warning(Supplier<String> msgSupplier) . . . Logs a WARNING message, which is only to be constructed if the logging level is such that the message will actually be logged.

{java.util.regex}

[Matcher]

end:public int end(String name) . . . Returns the offset after the last character of the subsequence forward-looked up by the regular naming group that performs the given named forward lookup during the previous match operation.

start:public int start(String name) . . . Returns the start index of the subsequence forward-looked up by the given named forward lookup group during the previous match operation.

[Pattern]

asPredicate:public Predicate<String> asPredicate( ) . . . Creates a predicate which can be used to match a string.

splitAsStream:public Stream<String> splitAsStream (CharSequence input) . . . Creates a stream from the given input sequence around matches of this pattern.

{java.util.spi}

[LocaleServiceProvider]

isSupportedLocale:public boolean isSupportedLocale (Locale locale) . . . Returns true if the given locale is supported by this locale service provider.

[TimeZoneNameProvider]

getGenericDisplayName:public String getGenericDisplayName(String ID, int style, Locale locale) . . . Returns a generic name for the given time zone ID that is suitable for presentation to the user in the specified locale.

{java.util.zip}

[Adler32]

update:public void update(ByteBuffer buffer) . . . Updates the checksum with the bytes from the specified buffer.

[CRC32]

update:public void update(ByteBuffer buffer) . . . Updates the checksum with the bytes from the specified buffer.

[ZipEntry]

getCreationTime:public FileTime getCreationTime( ) . . . Returns the creation time of the entry.

getLastAccessTime:public FileTime getLastAccessTime( ) . . . Returns the last access time of the entry.

getLastModifiedTime:public FileTime getLastModifiedTime( ) . . . Returns the modification time of the entry.

getCreationTime:public FileTime getCreationTime( ) . . . Sets the creation time of the entry.

setLastAccessTime:public ZipEntry setLastAccessTime (FileTime time) . . . Sets the access time of the entry.
setLastModifiedTime:public ZipEntry setLastModifiedTime(FileTime time) . . . Sets the modification time of the entry.
[ZipFile]
stream:public Stream<? extends ZipEntry> stream( ) . . . Returns an ordered Stream over the ZIP file entries.
{javax.crypto.spec}
[PBEParameterSpec]
getParameterSpec:public AlgorithmParameterSpec getParameterSpec( ) . . . Returns the cipher algorithm parameter specification.
{javax.lang.model.element}
[ExecutableElement]
getReceiverType:TypeMirror getReceiverType( ) . . . Returns the receiver type of this executable file, and returns NoType with kind NONE if the executable file has no receiver type.
isDefault:boolean isDefault( ) . . . Returns true if this method is a default method and returns false otherwise.
{javax.lang.model.type}
[ExecutableType]
getReceiverType:TypeMirror getReceiverType( ) . . . Returns the receiver type of this executable file, and returns NoType with kind NONE if the executable file has no receiver type.
[TypeVisitor]
visitIntersection:R visitIntersection(IntersectionType t, P p) . . . Visits an intersection type.
{javax.lang.model.util}
[Elements]
isFunctionalInterface:boolean isFunctionalInterface (TypeElement type) . . . Returns true if this type element is a functional interface, and returns false otherwise.
[AbstractTypeVisitor6]
visitIntersection:public R visitIntersection(IntersectionType t, P p) . . . Visits an IntersectionType element by calling visitUnknown.
{javax.net.ssl}
[ExtendedSSLSession]
getRequestedServerNames:public List<SNIServerName> getRequestedServerNames( ) . . . Obtains a List containing all SNIServerNames of the requested Server Name Indication (SNI) extension.
[SSLParameters]
getServerNames:public final List<SNIServerName> getServerNames( ) . . . Returns a List containing all SNIServerNames of the Server Name Indication (SNI) parameter (or null if none has been set).
getSNIMatchers:public final Collection<SNIMatcher> getSNIMatchers( ) . . . Returns a Collection containing all SNIMatchers of the Server Name Indication (SNI) parameter (or null if none has been set).
getUseCipherSuitesOrder:public final boolean getUseCipherSuitesOrder( ) . . . Returns whether the local cipher suites preference should be honored.
setServerNames:public final void setServerNames (List<SNIServerName> serverNames) . . . Sets the desired SNIServerNames of the Server Name Indication (SNI) parameter.
setSNIMatchers:public final void setSNIMatchers (Collection<SNIMatcher> matchers) . . . Sets the SNIMatchers of the Server Name Indication (SNI) parameter.
setUseCipherSuitesOrder:public final void setUseCipherSuitesOrder(boolean honorOrder) . . . Sets whether the local cipher suites preference should be honored.
[SSLSocketFactory]
createSocket:public Socket createSocket(Socket s, InputStream consumed, boolean autoClose) throws IOException . . . Creates a server mode Socket layered over an existing connected socket, and is able to read data which has already been consumed/removed from the Socket's underlying InputStream.
{javax.security.auth.kerberos}
[KeyTab]
getInstance:public static KeyTab getInstance(KerberosPrincipal princ) . . . Returns a default KeyTab instance that is bound to a specified service principal.
getInstance:public static KeyTab getInstance(KerberosPrincipal princ, File file) . . . Returns a KeyTab instance from a File object that is bound to a specified service principal.
getPrincipal:public KerberosPrincipal getPrincipal( ) . . . Returns a service principal this KeyTab object is bound to.
getUnboundInstance:public static KeyTab getUnboundInstance( ) . . . Returns a default unbound KeyTab instance.
getUnboundInstance:public static KeyTab getUnboundInstance(File file) . . . Returns an unbound KeyTab instance from a File object.
isBound:public boolean isBound( ) . . . Returns if a keytab is bound to a principal.

Java class library includes abundant class files, including the classes exemplified above. Processing of, for example, each Step shown in Step 101 to Step 105 in FIG. 22, Step 109 to Step 119 in FIG. 26A, Step 120 to Step 130 in FIG. 26B, Step 141 to Step 143 in FIG. 29, and Step 129 to Step 158 in FIG. 30 can be realized by appropriately combining methods or functions various classes included in this Java class library. That is, the program corresponding to the combination of Steps exemplified in FIG. 22 and the like can be described in Java language (it can also be described in JavaScript or other programming languages). Java bytecode generated from the program described in Java language (originally Java source code) can be converted into a corresponding Web application or a corresponding JavaScript. Also, JavaScript code and Java source code can be combined by using JavaScript Native Interface (JSNI) or the like. Then, by appropriately writing JavaScript to Java source code, it is possible to expand the function of the Web application corresponding to the source code and change the processing contents.

<Regarding Security>

Example of Security in Internet Communication Between Each Fog Server and Cloud Server (Using Public Key Method)

In HTML5, the following elements that can be manipulated by a user are added so as to strengthen a form function.

"progress element representing progress of processing"

"meter element representing measurement result in a specified range"

"command element specifying each command of a manipulation menu"

"details element representing detailed information that can be additionally obtained"

"summary element representing a summary of contents of details element"

"keygen element issuing secret key and public key when sending a form"

"output element representing calculation result"

It is assumed that the cloud server (for example, 1116-n of FIG. 2 or 6200 of FIG. 43B) has a unique identification code ID01 (public information) that specifies itself. (A URL of the cloud server may be used as ID01.) A public key for the cloud server can be created by using the identification code ID01 (all or a part thereof).

It is assumed that the fog server (for example, 1126 of FIG. 2 or 6300 of FIG. 43B) also has a unique identification code ID02 (publicly available information) that specifies itself. (A URL of the fog server or an email address of an administrator of the fog server may also be used as ID02.) The fog server further includes a unique secret key (non-public information) that is different for each fog server.

The identification code ID02 and the secret key of the fog server are pre-registered in the cloud server. Any fog server can send information, which is encrypted with the public key for the cloud server, to the cloud server via the Internet. The cloud server can retrieve the pre-registered private key based on the ID02 of the fog server of the information sender and decrypt the sent information.

The cloud server can send information, which is encrypted with its own public key, to a specific fog server (ID02) via the Internet. The specific fog server can decrypt the sent information by using its own secret key.

Example of Security in Medium to Short Range Communication (Middleware) Between Each Unit and Fog Server (Using Public Key Method)

It is assumed that the fog server (for example, 1126 of FIG. 2 or 6300 of FIG. 43B) has a unique identification code ID02 (public information) that specifies itself. When the fog server is on the Internet, a URL of the fog server may be used as ID02. A public key can be created by using the identification code ID02 (all or a part thereof).

It is assumed that each unit (for example, 1290 of FIG. 2 or 6610 of FIG. 43B) also has a unique identification code ID03 (publicly available information) that specifies itself. The identification code ID03 may be used in a logical address of the unit.

It is assumed that the controller's own unique identification code ID04 (non-public information) is recorded in the device controller (or memory) of each unit. For example, a part or all of all or a part of a serial number of each controller LSI can be used to create the identification code ID04. A public key can be created by using the identification code ID04 (all or a part thereof).

It is assumed that the device (sensor or actuator) of each unit has a unique identification code ID05 (non-public information) that specifies itself. The identification code IDOL can be created by using the serial number or the like of each device. The identification code ID05 (all or a part thereof) can also be used to create a secret key.

The identification code (ID03) of each unit and the secret key (ID04 and/or ID05) belonging to the unit are pre-registered in the fog server. When each unit accesses the fog server, the identification code ID02 (public information) of the fog server can be used. When the fog server accesses each unit, the identification code ID03 of each unit can be used.

If the unit provides to the fog server (via medium to short range wireless communication), the information to be provided is encrypted by using the public key (ID02), and its decryption is made to require the secret key (ID04 and/or ID05), thereby preventing a third party from deciphering the provided information.

Specifically, when the unit encrypts and sends the information to the fog server, the information is encrypted with the public key using ID02. Any unit can send information encrypted with the public key to the target fog server. The sent encrypted information cannot be decrypted with the public key. However, the target fog server can decrypt encryption information sent from the unit by using the pre-registered non-public secret key (ID04 and/or ID05).

When confidential information is sent from the fog server to a specific unit, the fog server pre-registers the secret key in the specific unit (publicly available ID2 is not used as the secret key, and the secret key is separately prepared). Then, the information encrypted by the public key method is sent from the fog server to the specific unit. The specific unit can decrypt the sent encryption information by using the pre-registered secret key.

In the class library of Java8, there is a security system package (java.security.cert) including a class "X509Certificate". For example, by using this "X509Certificate", a program "verifying that a certificate was signed using a non-public key (secret key) corresponding to a specified public key" can be created.

In regard to information requiring no secret, the fog server can perform communication without encryption. In this case, communication time can be shortened because there is no encryption/decryption process.

Example of Security in Extremely Short Range Communication (Middleware) Between Each Unit and Device (Using Methods Other than Public Key Method)

A short range communication between the device controller of the unit and one or more devices (sensor and actuator) connected thereto by UPnP (for example, Class2 Bluetooth with an effective coverage of 10 m or less, or Class2 Bluetooth with an effective coverage of 1 m or less) is considered to have a relatively low risk of being intercepted by a third party. Therefore, in such a short range communication, it is also considered to emphasize a communication speed rather than a strong security (it does not take a lot of time on encryption/decryption processes. Specifically, a passcode using a part of the non-public information (ID04 or ID05) is merely described in a part of a header of a communication packet, and communication of information desired to prevent information leakage is performed only by a packet group having a header including a correct passcode. The possibility of information leakage to a third party can be reduced by such a relatively simple method.

As the passcode, a total (N+M)-bit passcode (bit code that are not all zero or all 1) is generated by collecting a unique N-bit pattern in which "0" and "1" are mixed+tail M bits of non-public information (ID04 or ID05) It is assumed that this passcode has been delivered in advance from a communication source to a communication destination (appropriately scrambled) before starting communication (this passcode can be changed whenever individual communication is performed). The communication destination extracts only a packet having a header matching the passcode from a bitstream of a packet group sent from the communication source, and receives necessary information (information desired to prevent information leakage). A packet group that is not extracted herein can be used to transmit information requiring no secret.

When communication between each device controller and one or more devices connected thereto by UPnP is performed through a wired dedicated line, it is assumed that there is no unexpected information leakage from the dedicated line to a third party. In that case, the passcode of the packet header can be all zero (or all 1) and the process of security check can be skipped.

Even when the device is physically directly connected to the unit incorporating the device controller and the device is logically automatically connected to the device controller by UPnP, it is assumed that there is little possibility of information leakage from the connection part to a third party. Even in this case, the passcode may not be provided in the packet header (alternatively, the security check is disabled with the passcode set to all zero or all 1).

<Exemplified Correspondence Between the Conceptional Contents and Embodiments>

[1]<Information processing apparatus (a smart phone, tablet, personal computer, digital TV, etc.>

According to an embodiment an information processing apparatus (such as a smart phone) is used with a network including one or more units (IoT devices) each comprising a sensor and/or actuator. The information processing apparatus is connectable to any of the one or more units. The information processing apparatus is configured to use one or more computer programs (JavaScript, Java, etc.) each for controlling the sensor and/or actuator of the connected one or more units. The computer program may be created from a combination (UD_PGC) of one or more classes obtained from a library (default library/user-defined library). The library comprises the classes each describing a method to control the sensor and/or actuator of the one or more units. The information processing apparatus is configured to control the sensor and/or actuator of the one or more units according to the created computer program.

[2]<Information communication terminal (a smart phone, tablet, personal computer, digital TV, etc.>

According to an embodiment a mark-up language (HTML) used in an internet communication is configured to mark-up a JavaScript or a code (bytecode or its source code) of Java. An information communication terminal of the embodiment has a browser to display information (e.g., 5200 in FIG. 39) corresponding to elements (contents of description) of the mark-up language.

[3] In the above [1] the JavaScript may be directly described by a JavaScript language or may be obtained by compiling a code (byte code or its source code) of the Java by using a specific cross-compiler.

[4] In the above [1] the information communication terminal comprises a virtual machine to execute a bytecode of the Java.

[5] In the above [1], according to the information communication terminal, display of the information corresponding to one or more elements of the mark-up language is performed on a web page, and a cascading style sheet is used with the mark-up language, where the cascading sheet indicates how the one or more elements of the mark-up language is to be shown in the web page.

[6] In the above [1] assume that there is one or more units each comprising a sensor and/or actuator. Under this assumption the information communication terminal is connectable via a server to any of one or more units. The sensor and/or actuator of the unit connected to the information communication terminal may be controlled by the JavaScript and/or the code of Java.

[7] In the above [6] a file management system (FIG. 38A/38B) is used to manage the one or more units. Write of information (control instruction write) to the one or more units or read of information (control result read) from the one or more units may be performed by using the JavaScript and/or the code of Java.

[8] A method of an embodiment may be used in a network having one or more units each comprising a sensor and/or actuator. According to the method, one or more computer program may be created based on a combination of one or more classes obtained from a library. The library comprises the classes each describing a method to control the sensor and/or actuator of the one or more units. The sensor and/or actuator of the one or more units can be controlled by the created computer program.

[9] According to a method of an embodiment, information display (e.g., 5200 in FIG. 39) may be performed on a web browser by using elements (contents of description) of a mark-up language (HTML) used in an internet communication. The mark-up language (e.g., HTML5 or its future version) can mark-up a JavaScript or a code of Java.

[10] In the above [9] the JavaScript may be directly described by a JavaScript language or may be obtained by compiling a code (byte code or its source code) of the Java by using a specific cross-compiler.

[11] In the above [10] the Java bytecode is executed by a virtual machine.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information communication terminal having a browser to display information corresponding to one or more elements of a mark-up language used in an internet communication, wherein the mark-up language is configured to mark-up JAVA code and/or JAVASCRIPT scripts and wherein the information communication terminal is connectable to at least one of the one or more units;

the information communication terminal is configured to use one or more computer programs each for controlling a sensor and/or actuator of the one or more units being connected to the information communication terminal, the computer program being created by a combination of one or more classes obtained from a library which comprises the classes each describing a method to control the sensor and/or actuator of the one or more units;

the information communication terminal is configured to control the sensor and/or actuator of the one or more units according to the created computer program;

the information communication terminal is configured to use a program language providing a JAVA bytecode and an application using a code other than the JAVA bytecode;

the library is configured to comprise one or more JAVA classes and one or more JAVASCRIPT scripts, the program language to provide the JAVA bytecode being JAVA;

the program language to provide the JAVA bytecode can be bridged to the application using the code other than the JAVA bytecode by using the one or more JAVASCRIPT scripts, according to a combination of the one or more JAVA classes and the one or more JAVASCRIPT scripts; and a file management system including user-defined management information (UD_PGCi) is used to manage the one or more units, and writing of information to the one or more units or reading of information from the one or more units is configured to be performed by using the user-defined management information (UD_PGCi) including information of the one or more JAVA classes and the one or more JAVASCRIPT scripts.

2. The information communication terminal of claim 1, wherein the one or more JAVASCRIPT scripts is described by a JAVASCRIPT language or is obtained by cross-compiling JAVA code.

3. The information communication terminal of claim 1, comprising a virtual machine to execute the JAVA bytecode.

4. The information communication terminal of claim 1, wherein display of the information corresponding to one or more elements of the mark-up language is performed on a web page, and a cascading style sheet is used with the mark-up language, the cascading sheet indicating how the one or more elements of the mark-up language is to be shown in the web page.

5. The information communication terminal of claim 1, wherein the information communication terminal is configured to be connectable via a server to any of one or more units each comprising a sensor and/or actuator, the sensor and/or actuator of the unit connected to the information communication terminal being controlled by the one or more JAVA classes and/or the one or more JAVASCRIPT scripts.

6. A method of controlling an information communication terminal having a browser to display information corresponding to one or more elements of a mark-up language used in an internet communication, wherein the mark-up language is configured to mark-up JAVA code and/or JAVASCRIPT scripts and wherein the information communication terminal is connectable to at least one of the one or more units, the method comprising:

using one or more computer programs each for controlling a sensor and/or actuator of the one or more units being connected to the information communication terminal, the computer program being created by a combination of one or more classes obtained from a library which comprises the classes each describing a method to control the sensor and/or actuator of the one or more units;

controlling the sensor and/or actuator of the one or more units according to the created computer program;

using a program language providing a JAVA bytecode and an application using a code other than the JAVA bytecode;

comprising one or more JAVA classes and one or more JAVASCRIPT scripts, the program language to provide the JAVA bytecode being JAVA;

providing the JAVA bytecode being able to be bridged to the application using the code other than the JAVA bytecode by using the one or more JAVASCRIPT scripts, according to a combination of the one or more JAVA classes and the one or more JAVASCRIPT scripts; and using, by a file management system including user-defined management information (UD_PGCi), the one or more units, and writing of information to the one or more units or reading of information from the one or more units is configured to be performed by using the one or more JAVA classes and the one or more JAVASCRIPT scripts.

\* \* \* \* \*